United States Patent
Cavalli et al.

(10) Patent No.: US 12,459,914 B2
(45) Date of Patent: Nov. 4, 2025

(54) COMPOUNDS AND COMPOSITIONS FOR THE TREATMENT OF TUMORS

(71) Applicants: FONDAZIONE ISTITUTO ITALIANO DI TECNOLOGIA, Genoa (IT); TES PHARMA S.R.L., Perugia (IT); ALMA MATER STUDIORUM—UNIVERSITA' DI BOLOGNA, Bologna (IT); ISTITUTO EUROPEO DI ONCOLOGIA S.R.L., Milan (IT)

(72) Inventors: Andrea Cavalli, Genoa (IT); Domenico Milano, Genoa (IT); Marcella Manerba, Genoa (IT); Greta Bagnolini, Genoa (IT); Jose Antonio Ortega Martinez, Genoa (IT); Marinella Roberti, Bologna (IT); Giuseppina Di Stefano, Bologna (IT); Roberto Pellicciari, Perugia (IT); Francesca De Franco, Perugia (IT); Saverio Minucci, Perugia (IT); Pier Giuseppe Pelicci, Milan (IT); Viola Previtali, Genoa (IT)

(73) Assignees: FONDAZIONE ISTITUTO ITALIANO DI TECNOLOGIA, Genoa (IT); TES PHARMA S.R.L., Perugia (IT); ALMA MATER STUDIORUM—UNIVERSITA' DI BOLOGNA, Bologna (IT); ISTITUTO EUROPEO DI ONCOLOGIA S.R.L., Milan (IT)

( * ) Notice: Subject to any disclaimer, the term of this patent is extended or adjusted under 35 U.S.C. 154(b) by 617 days.

(21) Appl. No.: 17/783,729

(22) PCT Filed: Dec. 11, 2020

(86) PCT No.: PCT/IB2020/061825
§ 371 (c)(1),
(2) Date: Jun. 9, 2022

(87) PCT Pub. No.: WO2021/116999
PCT Pub. Date: Jun. 17, 2021

(65) Prior Publication Data
US 2023/0052747 A1    Feb. 16, 2023

(30) Foreign Application Priority Data
Dec. 11, 2019   (IT) .................. 102019000023700

(51) Int. Cl.
*C07D 401/04*   (2006.01)
*C07D 401/14*   (2006.01)

(52) U.S. Cl.
CPC .......... *C07D 401/04* (2013.01); *C07D 401/14* (2013.01)

(58) Field of Classification Search
CPC .. C07D 401/04; C07D 401/14; C07D 405/14; A61P 35/00
See application file for complete search history.

(56) References Cited

U.S. PATENT DOCUMENTS

2016/0368897 A1 * 12/2016 Acker .................... A61P 25/18

FOREIGN PATENT DOCUMENTS

| WO | 2010/088408 | 8/2010 | |
|----|-------------|--------|---|
| WO | 2014/210456 | 12/2014 | |
| WO | 2019/200224 | 10/2019 | |
| WO | WO-2019200224 A1 * | 10/2019 | ............ A61K 31/12 |

OTHER PUBLICATIONS

International Search Report and Written Opinion corresponding to International Patent Application No. PCT/IB2020/061825, mailed Mar. 1, 2021.
Oyewumi Moses O et al: "Screening and identification of novel compounds with potential anti-proliferative effects on gallium-resistant lung cancer through an AXL kinase pathway", Bioorganic & Medicinal Chemistry Letters, Pergamon, Amsterdam, NL, vol. 24, No. 18, Aug. 2, 2014 (Aug. 2, 2014), pp. 4553-4556, XP029053311.

(Continued)

*Primary Examiner* — Jeffrey S Lundgren
*Assistant Examiner* — W. Justin Youngblood
(74) *Attorney, Agent, or Firm* — Lathrop GPM LLP; Malaika O.D. Tyson

(57) ABSTRACT

The present invention relates to compounds of Formula (Ia) or pharmaceutically acceptable salts, hydrates, solvates, clathrates, polymorphs, stereoisomers thereof. It further discloses a pharmaceutical composition comprising compounds of Formula (Ia) and the use of compounds of Formula (Ib), in particular for the use in the treatment of diseases or disorders wherein disrupting Rad51-BRCA2 interaction is beneficial.

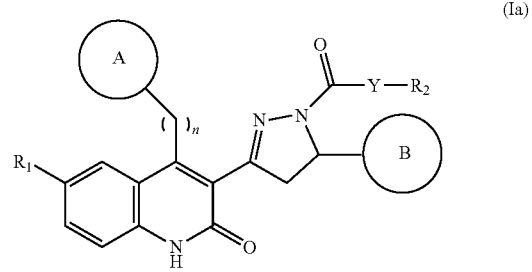

7 Claims, 1 Drawing Sheet

(56) References Cited

OTHER PUBLICATIONS

Wang Yanxing et al: Discovery of novel glycogen synthase kinase-3 [alpha] inhibitors: Structure-based virtual screening, preliminary SAR and biological evaluation for treatment of acute myeloid leukemia, European Journal of Medicinal Chemistry, vol. 171, Mar. 20, 2019 (Mar. 20, 2019), pp. 221-234, XP085661309.
T. M. Acker et al: "Mechanism for Noncompetitive Inhibition by Novel GluN2C/D N-Methyl-D-aspartate Receptor Subunit-Selective Modulators", Molecular Pharmacology, vol. 80, No. 5, Aug. 1, 2011 (Aug. 1, 2011), pp. 782-795, XP055121576.
Database Registry [Online] Chemical Abstracts Service, Columbus, Ohio, US; Sep. 29, 2015 (Sep. 29, 2015), XP002799985.
Database Registry [Online] Chemical Abstracts Service, Columbus, Ohio, US; Jul. 6, 2015 (Jul. 6, 2015), XP002799986.
Database Registry [Online] Chemical Abstracts Service, Columbus, Ohio, US; Dec. 31, 2008 (Dec. 31, 2008), XP002799987.
Database Registry [Online] Chemical Abstracts Service, Columbus, Ohio, US; Jun. 24, 2015 (Jun. 24, 2015), XP002799988.
Database Registry [Online] Chemical Abstracts Service, Columbus, Ohio, US; Feb. 20, 2002 (Feb. 20, 2002), XP002799989.
Database Registry [Online] Chemical Abstracts Service, Columbus, Ohio, US; Oct. 11, 2001 (Oct. 11, 2001), XP002799990.
Database Registry [Online] Chemical Abstracts Service, Columbus, Ohio, US; Apr. 13, 2001 (Apr. 13, 2001), XP002799991.
Database Registry [Online] Chemical Abstracts Service, Columbus, Ohio, US; Jan. 3, 2001 (Jan. 3, 2001), XP002799992.
Database Registry [Online] Chemical Abstracts Service, Columbus, Ohio, US; Sep. 29, 2015 (Sep. 29, 2015), XP002799993.
Database Registry [Online] Chemical Abstracts Service, Columbus, Ohio, US; Jul. 10, 2015 (Jul. 10, 2015), XP002799994.
Database Registry [Online] Chemical Abstracts Service, Columbus, Ohio, US; Jun. 24, 2015 (Jun. 24, 2015), XP002799995.
Database Registry [Online] Chemical Abstracts Service, Columbus, Ohio, US; Jul. 22, 2004 (Jul. 22, 2004), XP002799996.
Database Registry [Online] Chemical Abstracts Service, Columbus, Ohio, Apr. 9, 2004 (Apr. 9, 2004), XP002799997.
Database Registry [Online] Chemical Abstracts Service, Columbus, Ohio, US; Apr. 23, 2002 (Apr. 23, 2002), XP002799998.
Database Registry [Online] Chemical Abstracts Service, Columbus, Ohio, US; Feb. 21, 2002 (Feb. 21, 2002), XP002799999.

\* cited by examiner

COMPOUNDS AND COMPOSITIONS FOR THE TREATMENT OF TUMORS

CROSS-REFERENCE TO RELATED APPLICATIONS

The present application is filed pursuant to 35 U.S.C. 371 as a U.S. National Phase application of International Patent Application No. PCT/IB2020/061825, which was filed Dec. 11, 2020, claiming the benefit of Italian Patent Application No. 102019000023700 filed on Dec. 11, 2019. The entire text of the aforementioned applications is incorporated herein by reference in its entirety.

TECHNICAL FIELD

Synthetic lethality is a new concept with great potential for discovering new anticancer molecules within the framework of precision medicine. Synthetic lethality arose from genetic studies in model organisms. Two genes are synthetically lethal if the perturbation of either gene alone is compatible with cell viability, but simultaneous perturbation of both genes leads to cell death (1).

BACKGROUND ART

In recent years, synthetic lethality explained the sensitivity of some cancer cells to certain drugs and provided a new perspective for anticancer therapy. Indeed, synthetic lethality shows that is possible to kill selectively cancer cells, while sparing healthy cells, by using a small organic molecule to target the synthetically lethal partner of a mutant gene (2). While one DNA repair mechanism is genetically inactivated, the other is inhibited by the small organic molecule. Selectivity comes from the much higher genetic instability of cancer cells, compared to normal cells, which are therefore much more sensitive to the inhibition of DNA repair mechanisms.

One example of synthetic lethality is the use of poly [ADPribose] polymerase (PARP) inhibitors in oncology patients with BRCA1/2 mutations. BRCA2 is important for repairing DNA double-strands breaks (DSBs) by homologous recombination (HR), whereas PARP is important for repairing single-strand breaks. Synthetic lethality arises from the simultaneous impairment of the repair mechanisms for single-strand and double-strand breaks. Olaparib (Lynparza™), developed by AstraZeneca, is an example of PARP inhibitor (PARPi) which exploits synthetic lethality mechanism. In 2014, it was the first PARPi to treat advanced ovarian cancer associated with defective BRCA genes (3) and, nowadays, is in clinical trials to treat breast and pancreatic tumors with defective BRCA genes.

Synthetic lethality concept can be broader than its genetic origin; the inhibition of two independent DNA repair processes can mimic synthetic lethality in the absence of gene mutations (4). In the case of BRCA2, its key mechanism point is the recruitment of Rad51, an evolutionarily conserved recombinase that uses homologous recombination to repair double-strand breaks. Rad51 and BRCA2 interact through eight well-conserved motifs, namely the BRC repeats (5).

In a previous study, the same authors proved that the disruption of the Rad51-BRCA2 interaction with small organic molecules results in a pharmacologically induced synthetic lethality when combined with PARP inhibitors, like Olaparib, or a DNA damage agent, like Cisplatin (6, 7). This result was explained by the chemical inhibition of both single and double-strand DNA repair mechanisms simultaneously. Rad51 is over expressed in a wide variety of cancers (e.g. ovarian, breast and pancreatic), where an enhanced homologous recombination activity has been observed (8).

This can be explained by the increased genetic instability of cancer cells, which experience DNA damage more frequently than healthy ones. Therefore, the disruption Rad51-BRCA2 interaction could make cancer cells more sensitive to PARPi, DNA-damaging agents, and radiotherapy in individuals without BRCA mutations because a sensitivity to PARP inhibitors will be induced, as observed in genetically BRCA defective oncology patients.

Accordingly, there is a need for novel compounds to be used for the disruption Rad51-BRCA2 interaction, for example for the treatment of cancer.

DISCLOSURE OF INVENTION

The aim of the present invention is to provide novel compounds acting as Rad51-BRCA2 interaction disruptors.

The aforementioned objective has been met according to compounds of claim 1, to a pharmaceutical composition of claim 6, and to the use of claim 7. Preferred embodiments are set out within the dependent claims.

BRIEF DESCRIPTION OF THE DRAWINGS

The present invention will be described in detail with reference to the figures in the annexed drawings, which show purely illustrative and non-exhaustive examples in which.

BEST MODE FOR CARRYING OUT THE INVENTION

Figure 1:
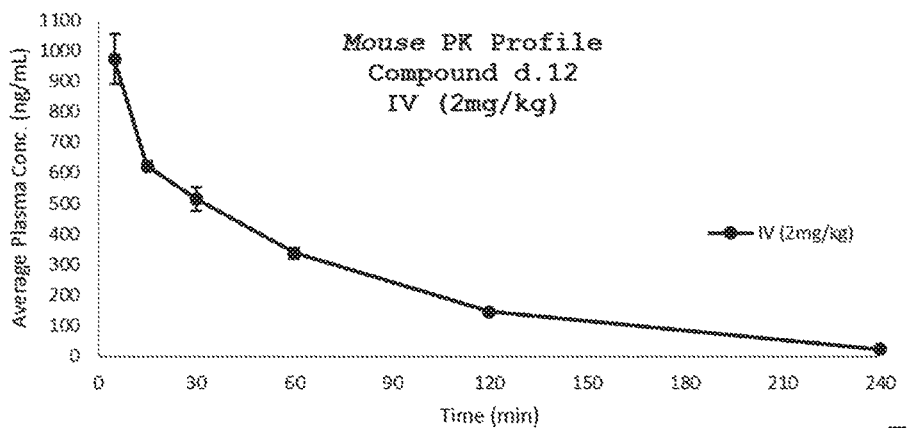
FIG. 1 illustrates the pharmacokinetic profile of compound d.12 administered intravenously.

The following paragraphs provide definitions of the various chemical moieties of the compounds according to the invention and are intended to apply uniformly throughout the specification and claims unless an otherwise expressly set out definition provides a broader definition.

The term "alkyl", as used herein, refers to saturated aliphatic hydrocarbon groups. Such term includes straight (unbranched) chains or branched chains.

Non-limiting examples of alkyl groups according to the invention are, for example, methyl, ethyl, propyl, isopropyl, n-butyl, iso-butyl, tert-butyl, n-pentyl, iso-pentyl, n-hexyl and the like.

The terms "alkenyl" and "alkynyl", as used herein, refer to partially unsaturated aliphatic hydrocarbon groups. Such term includes straight (unbranched) chains or branched chains.

Non-limiting examples of alkyl groups according to the invention are, for example, ethenyl, 1-propenyl, 2-propenyl, 1- or 2-butenyl, ethynyl, 1-propynyl, 2-propynyl, 1- or 2-butynyl, and the like.

The term "cycloalkyl", as used herein, refers to a saturated or partially unsaturated carbocyclic group having a single ring. It includes cycloalkenyl groups.

Non-limiting examples of cycloalkyl groups according to the invention are, for example, cyclopropane, cyclobutane, cyclopentane, cyclohexane, cycloheptane, cyclopentene, cyclohexene, cyclohexadiene and the like.

The term "heterocycloalkyl" group, ("non-aromatic heterocycle" group), refers to a cycloalkyl group (non aromatic group) wherein at least one of the carbon atoms has been replaced by a heteroatom selected from nitrogen, oxygen and sulfur. Heterocycloalkyl groups can be unsubstituted or substituted by one or more substituents as defined below.

Examples of heterocycloalkyls include, but are not limited to lactams, lactones, cyclic imides, cyclic thioimides, cyclic carbamates, 1-(1,2,5,6-tetrahydropyridyl), tetrahydrothiopyran, 4H-pyran, tetrahydropyran, piperidine (1-piperidinyl, 2-piperidinyl, 3-piperidinyl), 1,3-dioxin, 1,3-dioxane, 1,4-dioxin, 1,4-dioxane, piperazine, 1,3-oxathiane, 1,4-oxathiin, 1,4-oxathiane, tetrahydro-1,4-thiazine, 2H-1,2-oxazine, morpholine (4-morpholinyl, 3-morpholinyl, 2-morpholinyl) trioxane, hexahydro-1,3,5-triazine, tetrahydrothiophene, tetrahydrofuran (tetrahydrofuran-2-yl, tetrahydrofuran-3-yl), pyrroline, pyrrolidine, pyrrolidone, pyrrolidindione, pyrazoline, pyrazolidine, imidazoline, imidazolidine, 1,3-dioxole, 1,3-dioxolane, 1,3-dithiole, 1,3-dithiolane, isoxazoline, isoxazolidine, oxazoline, oxazolidine, oxazolidinone, thiazoline, thiazolidine, and 1,3-oxathiolane.

The term "halogen", as used herein, refers to fluorine, chlorine, bromine and iodine.

The term "aryl", as used herein, refers to a hydrocarbon consisting of an unsubstituted or substituted mono-, bi- or tricarbocyclic ring system, wherein the rings are fused together and at least one of the carbocyclic ring is aromatic. The term "aryl" means for example a cyclic aromatic such as a 6-membered hydrocarbon ring, a two six-membered fused hydrocarbon rings. Non-limiting examples of aryl groups are, for example, phenyl, alpha- or beta-naphthyl, 9,10-dihydroanthracenyl, indanyl, fluorenyl and the like. Aryl groups according to the present invention may be unsubstituted or substituted by one or more substituents as defined below.

The term "heteroaryl", as used herein, refers to an aryl as defined above wherein one to four carbon atoms are independently replaced by heteroatoms chosen from the group consisting of nitrogen, oxygen and sulphur. Non-limiting examples of heteroaryl groups are, for example, pyrrolyl, furyl, thiophenyl, imidazolyl, pyrazolyl, oxazolyl, isoxazolyl, thiazolyl, isothiazolyl, indolyl, benzofuranyl, benzothiophenyl, benzimidazolyl, benzopyrazolyl, benzoxazolyl, benzoisoxazolyl, benzothiazolyl, benzoisothiazolyl, triazolyl, oxadiazolyl, tetrazolyl, pyridyl, pyrazinyl, pyrimidinyl, pyridazinyl, quinolinyl, isoquinolinyl, quinazolinyl, quinoxalinyl. Heteroaryl groups according to the present invention may be unsubstituted or substituted by one or more substituents as defined below.

The term "pharmaceutically acceptable salts" refers to salts of the below identified compounds of Formula (I) that retain the desired biological activity and are accepted by regulatory authorities.

As used herein, the term "salt" refers to any salt of a compound according to the present invention prepared from an inorganic or organic acid or base and internally formed salts. Typically, such salts have a physiologically acceptable anion or cation.

Furthermore, the compounds of Formula (Ia) and (Ib) may form an acid addition salt or a salt with a base, depending on the kind of the substituents, and these salts are included in the present invention, as long as they are pharmaceutically acceptable salts.

Examples of such salts include, but are not restricted to acid addition salts formed with inorganic acids (e.g. hydrochloric acid, hydrobromic acid, sulfuric acid, phosphoric acid, nitric acid, and the like), and salts formed with organic acids such as acetic acid, trifluoroacetic acid, oxalic acid, tartaric acid, succinic acid, malic acid, fumaric acid, maleic acid, ascorbic acid, benzoic acid, alginic acid, polyglutamic acid, methanesulfonic acid, p-toluene sulfonic acid, and naphthalene sulfonic acid.

The compounds of Formula (Ia) and (Ib) containing acidic protons may be converted into their therapeutically active, non-toxic base addition salt forms, e.g. metal or amine salts, by treatment with appropriate organic and inorganic bases. Appropriate base salt forms include, for example, ammonium salts, alkali and earth alkaline metal salts, e.g. lithium, sodium, potassium, magnesium, calcium salts and the like, salts with organic bases, e.g. N-methyl-D-glucamine, hydrabamine salts, and salts with amino acids such as, for example, arginine, lysine and the like.

Physiologically or pharmaceutically acceptable salts are particularly suitable for medical applications because of their greater aqueous solubility relative to the parent compound.

Pharmaceutically acceptable salts may also be prepared from other salts including other pharmaceutically acceptable salts of the compounds of Formula (Ia) and (Ib) using conventional methods.

Those skilled in the art of organic chemistry will appreciate that many organic compounds can form complexes with solvents in which they are reacted or from which they are precipitated or crystallized. These complexes are known as "solvates". For example, a complex with water is known as a "hydrate". Solvates of the compounds of the invention are within the scope of the invention. The compounds of Formula (I) may readily be isolated in association with solvent molecules by crystallization or evaporation of an appropriate solvent to give the corresponding solvates.

The compounds of Formula (Ia) and (Ib) may be in crystalline form. In certain embodiments, the crystalline forms of the compounds of Formula (Ia) and (Ib) are polymorphs.

The subject invention also includes isotopically-labelled compounds, which are identical to those recited in Formula (Ia) and (Ib) and following, but differ for the fact that one or more atoms are replaced by an atom having an atomic mass or mass number different from the atomic mass or mass number usually found in nature. Examples of isotopes that can be incorporated into the compounds of the invention and pharmaceutically acceptable salts thereof include isotopes of hydrogen, carbon, nitrogen, oxygen, sulfur, fluorine, and chlorine, such as $^{2}H$, $^{3}H$, $^{11}C$, $^{13}C$, $^{14}C$, $^{15}N$, $^{17}O$, $^{18}O$, $^{35}S$, $^{18}F$, $^{36}Cl$.

Compounds of the present invention and pharmaceutically acceptable salts of said compounds that contain the aforementioned isotopes and/or other isotopes of other atoms are within the scope of the present invention. Isotopically-labelled compounds of the present invention, for example those into which radioactive isotopes such as $^{3}H$, $^{14}C$ are incorporated, are useful in drug and/or substrate tissue distribution assays. Tritiated, i.e. $^{3}H$, and carbon-14, i.e. $^{14}C$, isotopes are particularly preferred for their ease of preparation and detectability. $^{11}C$ and $^{18}F$ isotopes are particularly useful in PET (Positron Emission Tomography). Furthermore, substitution with heavier isotopes such as deuterium, i.e. $^{2}H$, can afford certain therapeutic advantages resulting from greater metabolic stability, for example increased in vivo half-life or reduced dosage requirements and, hence, may be preferred in some circumstances. Isotopically-labelled compounds of Formula (Ia) and (Ib) and following of this invention can generally be prepared by carrying out the procedures disclosed in the Schemes and/or in the Examples below, by replacing a non-isotopically-labelled reagent with a readily available isotopically-labelled reagent.

Certain groups/substituents included in the present invention may be present as isomers or in one or more tautomeric forms. Accordingly, in certain embodiments, the compounds of Formula (Ia) and (Ib) may exist in the form of other tautomers or geometrical isomers in some cases, depending on the kinds of the substituents. In the present specification, the compounds may be described in only one form of such isomers, but the present invention includes all such isomers, isolated forms of the isomers, or a mixture thereof. Furthermore, the compounds of Formula (Ia) and (Ib) may have asymmetric carbon atoms or axial asymmetries in some cases and, correspondingly, they may exist in the form of optical isomers such as an (R)-form, an (S)-form, and the like. The present invention includes within the scope all such isomers, including racemates, enantiomers and mixtures thereof.

In particular, within the scope of the present invention are included all stereoisomeric forms, including enantiomers, diastereoisomers, and mixtures thereof, including racemates and the general reference to the compounds of Formula (Ia) and (Ib) includes all the stereoisomeric forms, unless otherwise indicated.

In general, the compounds or salts of the invention should be interpreted as excluding those compounds (if any) which are so chemically unstable, either per se or in water, that they are clearly unsuitable for pharmaceutical use through all administration routes, whether oral, parenteral, or otherwise. Such compounds are known to the skilled chemist.

According to a first aspect of the invention, compounds of Formula (Ia):

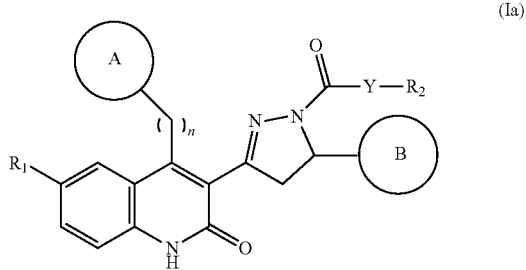

(Ia)

or its pharmaceutically acceptable salts, solvates or isomers thereof are provided.

In the compounds of Formula (Ia):
$R_1$ is halogen;
$R_2$ is selected from the group consisting of hydrogen, $C_{1-6}$alkyl, halogen, COOH, COO$C_{1-6}$alkyl, CONH$_2$, CONHC$_{1-6}$alkyl, CONH(C$_{1-6}$alkyl)$_2$, OH, O, NH$_2$, NHC$_{1-6}$alkyl, N(C$_{1-6}$alkyl)$_2$ and CONHSO$_2$Me;
n is 0-3;
Y is selected from the group consisting of $C_{1-6}$alkyl, haloC$_{1-6}$alkyl, $C_{2-6}$alkenyl, or $C_{2-6}$alkynyl;
A and B are individually and independently selected from the group consisting of aryl, heteroaryl, cycloalkyl and heterocycloalkyl that are unsubstituted or substituted with one or more substituents selected from the group consisting of halogen, linear or branched $C_{1-4}$alkyl, halo-$C_{1-4}$alkyl, O—$C_{1-4}$alkyl, NH$_2$, NH—$C_{1-4}$alkyl, N(C$_{1-4}$alkyl)$_2$, $C_{1-4}$alkylaryl, haloaryl, $C_{1-4}$alkoxyaryl, $C_{1-4}$alkylheteroaryl, haloheteroaryl, $C_{1-4}$alkoxyheteroaryl, $C_{1-4}$alkylcycloalkyl, halocycloalkyl, $C_{1-4}$alkoxycycloalkyl, $C_{1-4}$alkylheterocycloalkyl, haloheterocycloalkyl, $C_{1-4}$alkoxyheterocycloalkyl;
with the proviso that when n=0, B is selected from the group consisting of
a) heteroaryl containing at least one N atom, unsubstituted or substituted with one or more substituents selected from the group consisting of halogen, linear or branched $C_{1-4}$alkyl, halo-$C_{1-4}$alkyl, O—$C_{1-4}$alkyl, NH$_2$, NH—$C_{1-4}$alkyl, N(C$_{1-4}$alkyl)$_2$, $C_{1-4}$alkylaryl, haloaryl, $C_{1-4}$alkoxyaryl, $C_{1-4}$alkylheteroaryl, haloheteroaryl, $C_{1-4}$alkoxyheteroaryl, $C_{1-4}$alkylcycloalkyl, halocycloalkyl, $C_{1-4}$alkoxycycloalkyl, $C_{1-4}$alkylheterocycloalkyl, haloheterocycloalkyl, $C_{1-4}$alkoxyheterocycloalkyl;
b) aryl substituted with two substituents selected from the group consisting of halogen, linear or branched $C_{1-4}$alkyl, halo-$C_{1-4}$alkyl, O—$C_{1-4}$alkyl, NH$_2$, NH—$C_{1-4}$alkyl, N(C$_{1-4}$alkyl)$_2$, $C_{1-4}$alkylaryl, haloaryl, $C_{1-4}$alkoxyaryl, $C_{1-4}$alkylheteroaryl, haloheteroaryl, $C_{1-4}$alkoxyheteroaryl, $C_{1-4}$alkylcycloalkyl, halocycloalkyl, $C_{1-4}$alkoxycycloalkyl, $C_{1-4}$alkylheterocycloalkyl, haloheterocycloalkyl, $C_{1-4}$alkoxyheterocycloalkyl; and
c) biphenyl unsubstituted or substituted with one or more substituents selected from the group consisting of halogen, linear or branched $C_{1-4}$alkyl, halo-$C_{1-4}$alkyl, O—$C_{1-4}$alkyl, NH$_2$, NH—$C_{1-4}$alkyl, N(C$_{1-4}$alkyl)$_2$, $C_{1-4}$alkylaryl, haloaryl, $C_{1-4}$alkoxyaryl, $C_{1-4}$alkylheteroaryl, haloheteroaryl, $C_{1-4}$alkoxyheteroaryl, $C_{1-4}$alkylcycloalkyl, halocycloalkyl, $C_{1-4}$alkoxycycloalkyl, $C_{1-4}$alkylheterocycloalkyl, haloheterocycloalkyl, $C_{1-4}$alkoxyheterocycloalkyl;
d) phenyl substituted with heteroaryl unsubstituted or substituted with one or more substituents selected from the group consisting of halogen, linear or branched $C_{1-4}$alkyl, halo-$C_{1-4}$alkyl, O—$C_{1-4}$alkyl, NH$_2$, NH—$C_{1-4}$alkyl, N(C$_{1-4}$alkyl)$_2$, $C_{1-4}$alkylaryl, haloaryl, $C_{1-4}$alkoxyaryl, $C_{1-4}$alkylheteroaryl, haloheteroaryl, $C_{1-4}$alkoxyheteroaryl, $C_{1-4}$alkylcycloalkyl, halocycloalkyl, $C_{1-4}$alkoxycycloalkyl, $C_{1-4}$ alkylheterocycloalkyl, haloheterocycloalkyl, $C_{1-4}$alkoxyheterocycloalkyl
provided that the compound of formula (Ia) is not one of the following:

| Y | $R_2$ | n | A | B | $R_1$ |
|---|---|---|---|---|---|
| (CH$_2$)$_2$ | COOH | 0 | Phenyl | 2,3-dichlorophenyl | Cl |
| (CH$_2$)$_2$ | COOH | 0 | Phenyl | 3,4-dichlorophenyl | Cl |

| Y | R₂ | n | A | B | R₁ |
|---|---|---|---|---|---|
| (CH$_2$)$_2$ | H | 0 | Phenyl | 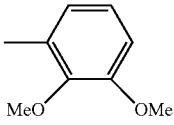 3-MeO, 2-OMe, methyl | Cl |
| (CH$_2$)$_3$ | COOH | 0 | Phenyl | 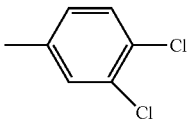 3,4-diCl | Cl |
| (CH$_2$)$_2$ | COOH | 0 | Phenyl | 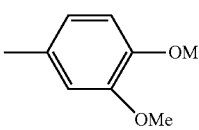 4-OMe, 3-OMe | Br |
| (CH$_2$)$_3$ | COOH | 0 | Phenyl | 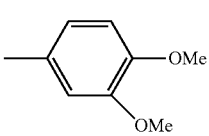 4-OMe, 3-OMe | Cl |
| CH$_2$ | H | 0 | Phenyl | 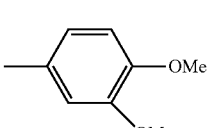 4-OMe, 3-OMe | Cl |
| (CH$_2$)$_2$ | COOH | 0 | Phenyl | 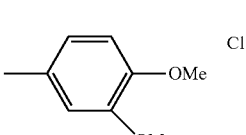 4-OMe, 3-OMe | Cl |
| CH$_2$ | H | 0 | Phenyl | 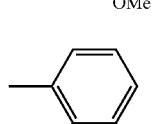 2,3-diCl | Cl |
| CH$_2$ | H | 0 | Phenyl | 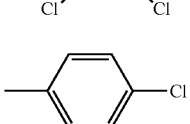 3,4-diCl | Cl |
| (CH$_2$)$_3$ | COOH | 0 | Phenyl | 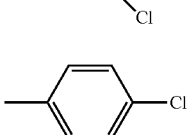 3,4-diCl | Cl |
| (CH$_2$)$_3$ | COOH | 0 | Phenyl | 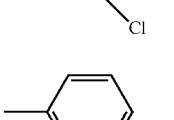 3-MeO, 2-OMe, methyl | Cl |
| (CH$_2$)$_3$ | COOH | 0 | Phenyl | 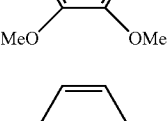 3-MeO, 2-OMe, methyl | Br |
| (CH$_2$)$_3$ | COOH | 0 | Phenyl | 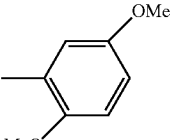 4-OMe, 2-methyl (MeO at other pos) | Cl |
| (CH$_2$)$_2$ | H | 0 | Phenyl | 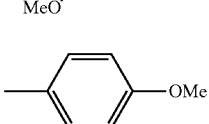 4-OMe, 3-OMe | Cl |
| CH$_2$ | H | 0 | Phenyl | 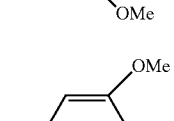 4-OMe, MeO | Br |
| CH$_2$ | H | 0 | Phenyl | 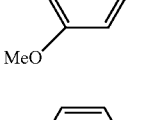 4-F, 3-Cl | Cl |
| CH$_2$ | H | 0 | Phenyl | 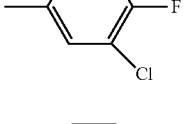 2-MeO, 3-OMe | Cl |
| (CH$_2$)$_2$ | COOH | 0 | Phenyl | 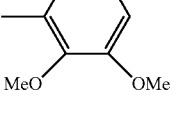 4-OMe, MeO | Br |

According to a first embodiment of the invention:

R$_1$ is halogen;

R$_2$ is selected from the group consisting of hydrogen, COOH and NH$_2$;

Y is C$_{1-4}$alkyl;

A is phenyl unsubstituted or substituted with one or more substituents selected from the group consisting of halogen, linear or branched C$_{1-4}$alkyl, halo-C$_{1-4}$alkyl, O—C$_{1-4}$alkyl, NH$_2$, NH—C$_{1-4}$alkyl, N(C$_{1-4}$alkyl)$_2$, C$_{1-4}$alkylaryl, haloaryl, C$_{1-4}$alkoxyaryl, C$_{1-4}$alkylheteroaryl, haloheteroaryl, C$_{1-4}$alkoxyheteroaryl, C$_{1-4}$alkylcycloalkyl, halocycloalkyl, C$_{1-4}$alkoxycycloalkyl, C$_{1-4}$alkylheterocycloalkyl, haloheterocycloalkyl, C$_{1-4}$alkoxyheterocycloalkyl and B is selected from the group consisting of aryl, heteroaryl, cycloalkyl and heterocycloalkyl that are unsubstituted or substituted with one or more substituents selected from the group consisting of halogen, linear or branched C$_{1-4}$alkyl, halo-C$_{1-4}$alkyl, O—C$_{1-4}$alkyl, C$_{1-4}$alkylaryl, haloaryl, C$_{1-4}$alkoxyaryl, C$_{1-4}$alkylheteroaryl, C$_{1-4}$alkylheterocycloalkyl.

According to a second embodiment, A is phenyl and B is selected from the group consisting of:

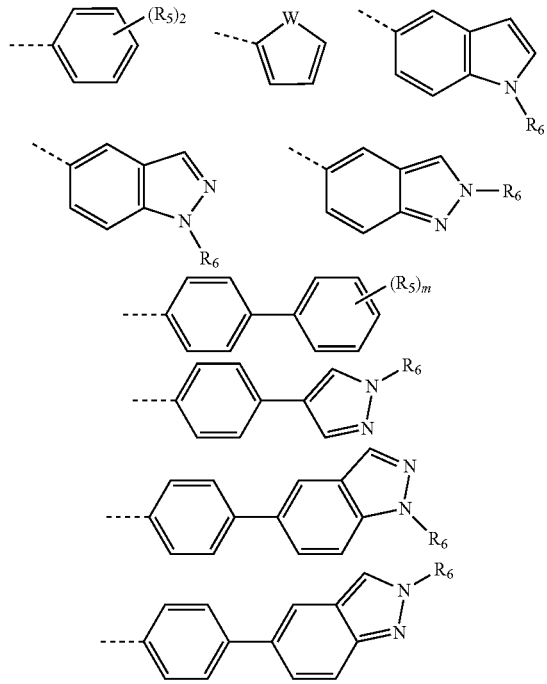

wherein
$R_5$ is selected from the group consisting of halogen, linear or branched $C_{1-4}$alkyl, halo-$C_{1-4}$alkyl, O—$C_{1-4}$alkyl, $NH_2$, NH—$C_{1-4}$alkyl, $N(C_{1-4}alkyl)_2$;
$R_6$ is selected from the group consisting of H and $C_{1-4}$alkyl;
m is an integer from 0 to 3;
W is selected from the group consisting of O and NH.
According to a third embodiment:
$R_1$ is halogen;
$R_2$ is selected from the group consisting of hydrogen, and COOH;
n is 1;
Y is selected from the group consisting of $C_{1-4}$alkyl;
A is phenyl;
B is

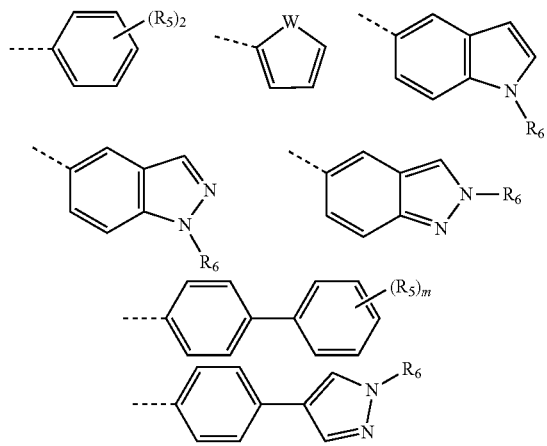

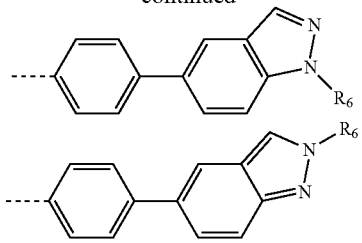

$R_5$ is hydrogen, halogen, linear or branched $C_{1-4}$alkyl, halo-$C_{1-4}$alkyl, O—$C_{1-4}$alkyl and
m is 1 or 2.
According to a fourth embodiment:
$R_1$ is halogen;
$R_2$ is selected from the group consisting of hydrogen, and COOH;
n is 0;
Y is selected from the group consisting of $C_{1-4}$alkyl;
A is morpholino;
B is

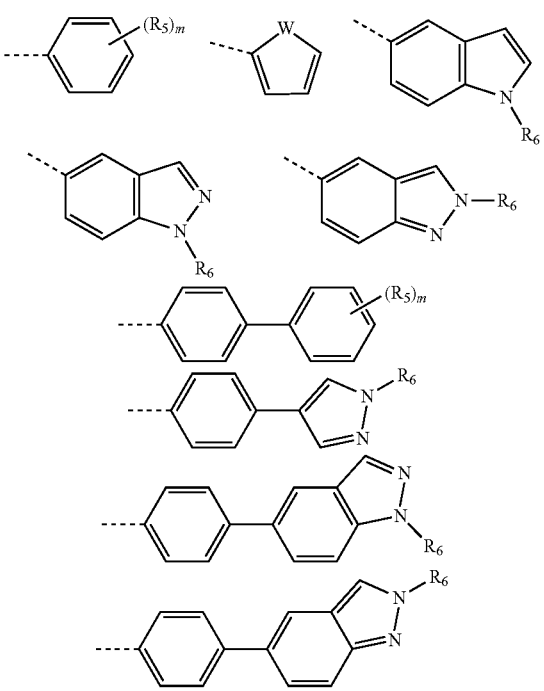

$R_5$ is hydrogen, halogen, linear or branched $C_{1-4}$alkyl, halo-$C_{1-4}$alkyl, O—$C_{1-4}$alkyl and
m is 1 or 2.
According to a fifth embodiment, the compounds of formula (Ia) can be selected from the group consisting of:

| | |
|---|---|
| d.18 | 4-[5-(6-chloro-2-oxo-4-phenyl-1H-quinolin-3-yl)-3-(3-fluoro-4-methoxy-phenyl)-3,4-dihydropyrazol-2-yl]-4-oxo-butanoic acid |
| d.22 | 4-[5-(6-chloro-2-oxo-4-phenyl-1H-quinolin-3-yl)(1-methylindol-5-yl)-3,4-dihydropyrazol-2-yl]-4-oxo-butanoic acid |
| d.23 | 3-[2-acetyl-3-(1-methylindol-5-yl)-3,4-dihydropyrazol-5-yl]-6-chloro-4-phenyl-1H-quinolin-2-one |

-continued

| | |
|---|---|
| d.24 | 4-[5-(6-chloro-2-oxo-4-phenyl-1H-quinolin-3-yl)(1-ethylindol-5-yl)-3,4-dihydropyrazol-2-yl]-4-oxo-butanoic acid |
| d.25 | 3-[2-acetyl-3-(1-ethylindol-5-yl)-3,4-dihydropyrazol-5-yl]-6-chloro-4-phenyl-1H-quinolin-2-one |
| d.26 | 4-[5-(6-chloro-2-oxo-4-phenyl-1H-quinolin-3-yl)(1-methylindazol-5-yl)-3,4-dihydropyrazol-2-yl]-4-oxo-butanoic acid |
| d.27 | 3-[2-acetyl-3-(1-methylindazol-5-yl)-3,4-dihydropyrazol-5-yl]-6-chloro-4-phenyl-1H-quinolin-2-one |
| d.28 | 4-[5-(6-chloro-2-oxo-4-phenyl-1H-quinolin-3-yl)(2-methylindazol-5-yl)-3,4-dihydropyrazol-2-yl]-4-oxo-butanoic acid |
| d.29 | 4-[5-(6-chloro-2-oxo-4-phenyl-1H-quinolin-3-yl)-3-(2-ethylindazol-5-yl)-3,4-dihydropyrazol-2-yl]-4-oxo-butanoic acid |
| d.30 | 3-[2-acetyl-3-(2-ethylindazol-5-yl)-3,4-dihydropyrazol-5-yl]-6-chloro-4-phenyl-1H-quinolin-2-one |
| d.31 | 4-[5-(6-chloro-2-oxo-4-phenyl-1H-quinolin-3-yl)-3-(1-ethylindazol-5-yl)-3,4-dihydropyrazol-2-yl]-4-oxo-butanoic acid |
| d.32 | 3-[2-acetyl-3-(1-ethylindazol-5-yl)-3,4-dihydropyrazol-5-yl]-6-chloro-4-phenyl-1H-quinolin-2-one |
| d.33 | 4-[5-(6-chloro-2-oxo-4-phenyl-1H-quinolin-3-yl)-3-(1-propylindazol-5-yl)-3,4-dihydropyrazol-2-yl]-4-oxo-butanoic acid |
| d.34 | 3-[2-acetyl-3-(1-propylindazol-5-yl)-3,4-dihydropyrazol-5-yl]-6-chloro-4-phenyl-1H-quinolin-2-one |
| d.35 | 4-[5-(6-chloro-2-oxo-4-phenyl-1H-quinolin-3-yl)-3-(2-propylindazol-5-yl)-3,4-dihydropyrazol-2-yl]-4-oxo-butanoic acid |
| d.36 | 4-[5-(6-chloro-2-oxo-4-phenyl-1H-quinolin-3-yl)-3-[4-(4-fluorophenyl)phenyl]-3,4-dihydropyrazol-2-yl]-4-oxo-butanoic acid |
| d.37 | 4-[5-(6-chloro-2-oxo-4-phenyl-1H-quinolin-3-yl)-3-[4-(4-chlorophenyl)phenyl]-3,4-dihydropyrazol-2-yl]-4-oxo-butanoic acid |
| d.38 | 3-[2-acetyl-3-[4-(4-chlorophenyl)phenyl]-3,4-dihydropyrazol-5-yl]-6-chloro-4-phenyl-1H-quinolin-2-one |
| d.39 | 4-[3-[4-(4-bromophenyl)phenyl]-5-(6-chloro-2-oxo-4-phenyl-1H-quinolin-3-yl)-3,4-dihydropyrazol-2-yl]-4-oxo-butanoic acid |
| d.40 | 3-[2-acetyl-3-[4-(4-bromophenyl)phenyl]-3,4-dihydropyrazol-5-yl]-6-chloro-4-phenyl-1H-quinolin-2-one |
| d.41 | 4-[5-(6-chloro-2-oxo-4-phenyl-1H-quinolin-3-yl)-3-[4-(4-methoxyphenyl)phenyl]-3,4-dihydropyrazol-2-yl]-4-oxo-butanoic acid |
| d.42 | 3-[2-acetyl-3-[4-(4-methoxyphenyl)phenyl]-3,4-dihydropyrazol-5-yl]-6-chloro-4-phenyl-1H-quinolin-2-one |
| d.43 | 4-[5-(6-chloro-2-oxo-4-phenyl-1H-quinolin-3-yl)-3-[4-(1-propylpyrazol-4-yl)phenyl]-3,4-dihydropyrazol-2-yl]-4-oxo-butanoic acid |
| d.44 | 3-[2-acetyl-3-[4-(1-propylpyrazol-4-yl)phenyl]-3,4-dihydropyrazol-5-yl]-6-chloro-4-phenyl-1H-quinolin-2-one |
| d.45 | 4-[5-(6-chloro-2-oxo-4-phenyl-1H-quinolin-3-yl)-3-[4-(1-ethylindazol-5-yl)phenyl]-3,4-dihydropyrazol-2-yl]-4-oxo-butanoic acid |
| d.46 | 4-[5-(6-chloro-2-oxo-4-phenyl-1H-quinolin-3-yl)-3-[4-(2-ethylindazol-5-yl)phenyl]-3,4-dihydropyrazol-2-yl]-4-oxo-butanoic acid |
| d.50 | 4-[5-(4-benzyl-6-chloro-2-oxo-1H-quinolin-3-yl)-3-(4-fluorophenyl)-3,4-dihydropyrazol-2-yl]-4-oxo-butanoic acid |
| d.51 | 3-[2-acetyl-3-(4-fluorophenyl)-3,4-dihydropyrazol-5-yl]-4-benzyl-6-chloro-1H-quinolin-2-one |
| d.52 | 3-[2-acetyl-3-(4-methoxyphenyl)-3,4-dihydropyrazol-5-yl]-4-benzyl-6-chloro-1H-quinolin-2-one |
| d.53 | 4-benzyl-6-chloro-3-[3-(4-methoxyphenyl)-2-propanoyl-3,4-dihydropyrazol-5-yl]-1H-quinolin-2-one |
| d.54 | 4-benzyl-6-chloro-3-[3-(4-fluorophenyl)-2-propanoyl-3,4-dihydropyrazol-5-yl]-1H-quinolin-2-one |
| d.55 | 4-[5-(4-benzyl-6-chloro-2-oxo-1H-quinolin-3-yl)-3-(4-chlorophenyl)-3,4-dihydropyrazol-2-yl]-4-oxo-butanoic acid |
| d.56 | 3-[2-acetyl-3-(4-chlorophenyl)-3,4-dihydropyrazol-5-yl]-4-benzyl-6-chloro-1H-quinolin-2-one |
| d.57 | 4-benzyl-6-chloro-3-[3-(4-chlorophenyl)-2-propanoyl-3,4-dihydropyrazol-5-yl]-1H-quinolin-2-one |
| d.58 | 4-[5-(4-benzyl-6-chloro-2-oxo-1H-quinolin-3-yl)-3-(4-bromophenyl)-3,4-dihydropyrazol-2-yl]-4-oxo-butanoic acid |
| d.59 | 3-[2-acetyl-3-(4-bromophenyl)-3,4-dihydropyrazol-5-yl]-4-benzyl-6-chloro-1H-quinolin-2-one |
| d.60 | 4-benzyl-3-[3-(4-bromophenyl)-2-propanoyl-3,4-dihydropyrazol-5-yl]-6-chloro-1H-quinolin-2-one |
| d.61 | 4-[5-(4-benzyl-6-chloro-2-oxo-1H-quinolin-3-yl)-3-(4-methoxyphenyl)-3,4-dihydropyrazol-2-yl]-4-oxo-butanoic acid |
| d.62 | 4-[5-(4-benzyl-6-chloro-2-oxo-1H-quinolin-3-yl)-3-[4-(trifluoromethyl)phenyl]-3,4-dihydropyrazol-2-yl]-4-oxo-butanoic acid |
| d.63 | 3-[2-acetyl-3-[4-(trifluoromethyl)phenyl]-3,4-dihydropyrazol-5-yl]-4-benzyl-6-chloro-1H-quinolin-2-one |
| d.64 | 4-[5-(4-benzyl-6-chloro-2-oxo-1H-quinolin-3-yl)-3-(4-tert-butylphenyl)-3,4-dihydropyrazol-2-yl]-4-oxo-butanoic acid |
| d.65 | 3-[2-acetyl-3-(4-tert-butylphenyl)-3,4-dihydropyrazol-5-yl]-4-benzyl-6-chloro-1H-quinolin-2-one |
| d.66 | 4-[5-(4-benzyl-6-chloro-2-oxo-1H-quinolin-3-yl)-3-(3-fluoro-4-methoxy-phenyl)-3,4-dihydropyrazol-2-yl]-4-oxo-butanoic acid |
| d.67 | 4-[5-(4-benzyl-6-chloro-2-oxo-1H-quinolin-3-yl)-3-(2-furyl)-3,4-dihydropyrazol-2-yl]-4-oxo-butanoic acid |
| d.68 | 3-[2-acetyl-3-(2-furyl)-3,4-dihydropyrazol-5-yl]-4-benzyl-6-chloro-1H-quinolin-2-one |
| d.69 | 4-[5-(4-benzyl-6-chloro-2-oxo-1H-quinolin-3-yl)-3-(1-methylindol-5-yl)-3,4-dihydropyrazol-2-yl]-4-oxo-butanoic acid |
| d.70 | 3-[2-acetyl-3-(1-methylindol-5-yl)-3,4-dihydropyrazol-5-yl]-4-benzyl-6-chloro-1H-quinolin-2-one |
| d.71 | 4-[5-(4-benzyl-6-chloro-2-oxo-1H-quinolin-3-yl)-3-(1-ethylindol-5-yl)-3,4-dihydropyrazol-2-yl]-4-oxo-butanoic acid |
| d.72 | 3-[2-acetyl-3-(1-ethylindol-5-yl)-3,4-dihydropyrazol-5-yl]-4-benzyl-6-chloro-1H-quinolin-2-one |
| d.73 | 4-[5-(4-benzyl-6-chloro-2-oxo-1H-quinolin-3-yl)-3-(1-methylindazol-5-yl)-3,4-dihydropyrazol-2-yl]-4-oxo-butanoic acid |
| d.74 | 3-[2-acetyl-3-(1-methylindazol-5-yl)-3,4-dihydropyrazol-5-yl]-4-benzyl-6-chloro-1H-quinolin-2-one |
| d.75 | 4-[5-(4-benzyl-6-chloro-2-oxo-1H-quinolin-3-yl)-3-(2-methylindazol-5-yl)-3,4-dihydropyrazol-2-yl]-4-oxo-butanoic acid |
| d.76 | 4-[5-(4-benzyl-6-chloro-2-oxo-1H-quinolin-3-yl)-3-(2-ethylindazol-5-yl)-3,4-dihydropyrazol-2-yl]-4-oxo-butanoic acid |
| d.77 | 3-[2-acetyl-3-(2-ethylindazol-5-yl)-3,4-dihydropyrazol-5-yl]-4-benzyl-6-chloro-1H-quinolin-2-one |
| d.78 | 4-[5-(4-benzyl-6-chloro-2-oxo-1H-quinolin-3-yl)-3-(1-ethylindazol-5-yl)-3,4-dihydropyrazol-2-yl]-4-oxo-butanoic acid |
| d.79 | 3-[2-acetyl-3-(1-ethylindazol-5-yl)-3,4-dihydropyrazol-5-yl]-4-benzyl-6-chloro-1H-quinolin-2-one |

| | |
|---|---|
| d.80 | 4-[5-(4-benzyl-6-chloro-2-oxo-1H-quinolin-3-yl)-3-(1-propylindazol-5-yl)-3,4-dihydropyrazol-2-yl]-4-oxo-butanoic acid |
| d.81 | 3-[2-acetyl-3-(1-propylindazol-5-yl)-3,4-dihydropyrazol-5-yl]-4-benzyl-6-chloro-1H-quinolin-2-one |
| d.82 | 4-[5-(4-benzyl-6-chloro-2-oxo-1H-quinolin-3-yl)-3-(2-propylindazol-5-yl)-3,4-dihydropyrazol-2-yl]-4-oxo-butanoic acid |
| d.83 | 4-[5-(4-benzyl-6-chloro-2-oxo-1H-quinolin-3-yl)-3-[4-(4-fluorophenyl)phenyl]-3,4-dihydropyrazol-2-yl]-4-oxo-butanoic acid |
| d.84 | 4-[5-(4-benzyl-6-chloro-2-oxo-1H-quinolin-3-yl)-3-[4-(4-chlorophenyl)phenyl]-3,4-dihydropyrazol-2-yl]-4-oxo-butanoic acid |
| d.85 | 3-[2-acetyl-3-[4-(4-chlorophenyl)phenyl]-3,4-dihydropyrazol-5-yl]-4-benzyl-6-chloro-1H-quinolin-2-one |
| d.86 | 4-[5-(4-benzyl-6-chloro-2-oxo-1H-quinolin-3-yl)-3-[4-(4-bromophenyl)phenyl]-3,4-dihydropyrazol-2-yl]-4-oxo-butanoic acid |
| d.87 | 3-[2-acetyl-3-[4-(4-bromophenyl)phenyl]-3,4-dihydropyrazol-5-yl]-4-benzyl-6-chloro-1H-quinolin-2-one |
| d.88 | 4-[5-(4-benzyl-6-chloro-2-oxo-1H-quinolin-3-yl)-3-[4-(4-methoxyphenyl)phenyl]-3,4-dihydropyrazol-2-yl]-4-oxo-butanoic acid |
| d.89 | 3-[2-acetyl-3-[4-(4-methoxyphenyl)phenyl]-3,4-dihydropyrazol-5-yl]-4-benzyl-6-chloro-1H-quinolin-2-one |
| d.90 | 4-[5-(4-benzyl-6-chloro-2-oxo-1H-quinolin-3-yl)-3-[4-(1-propylpyrazol-4-yl)phenyl]-3,4-dihydropyrazol-2-yl]-4-oxo-butanoic acid |
| d.91 | 3-[2-acetyl-3-[4-(1-propylpyrazol-4-yl)phenyl]-3,4-dihydropyrazol-5-yl]-4-benzyl-6-chloro-1H-quinolin-2-one |
| d.92 | 4-[5-(4-benzyl-6-chloro-2-oxo-1H-quinolin-3-yl)-3-[4-(1-ethylindazol-5-yl)phenyl]-3,4-dihydropyrazol-2-yl]-4-oxo-butanoic acid |
| d.93 | 4-[5-(4-benzyl-6-chloro-2-oxo-1H-quinolin-3-yl)-3-[4-(2-ethylindazol-5-yl)phenyl]-3,4-dihydropyrazol-2-yl]-4-oxo-butanoic acid |
| d.94 | 3-(2-acetyl-3-phenyl-3,4-dihydropyrazol-5-yl)-4-benzyl-6-chloro-1H-quinolin-2-one |
| d.95 | 4-benzyl-6-chloro-3-(3-phenyl-2-propanoyl-3,4-dihydropyrazol-5-yl)-1H-quinolin-2-one |
| d.96 | 3-[2-acetyl-3-(p-tolyl)-3,4-dihydropyrazol-5-yl]-4-benzyl-6-chloro-1H-quinolin-2-one |
| d.97 | 3-[2-acetyl-3-(4-pyridyl)-3,4-dihydropyrazol-5-yl]-6-chloro-4-phenyl-1H-quinolin-2-one |
| d.100 | 4-[5-(4-benzyl-6-chloro-2-oxo-1H-quinolin-3-yl)-3-(3-pyridyl)-3,4-dihydropyrazol-2-yl]-4-oxo-butanoic acid |
| d.101 | 4-[5-(4-benzyl-6-chloro-2-oxo-1H-quinolin-3-yl)-3-(3-pyridyl)-3,4-dihydropyrazol-2-yl]-4-oxo-butanoic acid |
| d.102 | 4-[5-(4-benzyl-6-chloro-2-oxo-1H-quinolin-3-yl)-3-(1-methylindol-3-yl)-3,4-dihydropyrazol-2-yl]-4-oxo-butanoic acid |
| d.103 | 4-benzyl-6-chloro-3-[3-(6-methoxy-3-pyridyl)-2-propanoyl-3,4-dihydropyrazol-5-yl]-1H-quinolin-2-one |
| d.104 | 4-[5-(4-benzyl-6-chloro-2-oxo-1H-quinolin-3-yl)-3-(6-methoxy-3-pyridyl)-3,4-dihydropyrazol-2-yl]-4-oxo-butanoic acid |
| d.105 | 4-[5-(4-benzyl-6-chloro-2-oxo-1H-quinolin-3-yl)-3-(2-chlorophenyl)-3,4-dihydropyrazol-2-yl]-4-oxo-butanoic acid |
| d.106 | 4-[5-(4-benzyl-6-chloro-2-oxo-1H-quinolin-3-yl)-3-(3,4-dimethoxyphenyl)-3,4-dihydropyrazol-2-yl]-4-oxo-butanoic acid |
| d.107 | 4-[5-[6-chloro-2-oxo-4-(2-phenylethyl)-1H-quinolin-3-yl]-3-(4-methoxyphenyl)-3,4-dihydropyrazol-2-yl]-4-oxo-butanoic acid |
| d.108 | Synthesisof6-chloro-3-[3-(4-methoxyphenyl)-2-propanoyl-3,4-dihydropyrazol-5-yl]-4-(2-phenylethyl)-1H-quinolin-2-one |
| d.109 | 4-[5-(6-chloro-4-morpholino-2-oxo-1H-quinolin-3-yl)-3-(4-methoxyphenyl)-3,4-dihydropyrazol-2-yl]-4-oxo-butanoic acid |

A second aspect of the present invention relates to a pharmaceutical composition comprising a compound of Formula (Ia) or pharmaceutically acceptable salts, hydrates, solvates, clathrates, polymorphs, stereoisomers thereof and a pharmaceutically acceptable carrier, stabilizer, diluent or excipient thereof. A person skilled in the art is aware of a whole variety of such carrier, diluent or excipient compounds suitable to formulate a pharmaceutical composition.

Compounds of Formula (Ia) and (Ib), together with a conventionally employed adjuvant, carrier, diluent or excipient may be placed into the form of pharmaceutical compositions and unit dosages thereof, and in such form may be employed as solids, such as tablets or filled capsules, or liquids such as solutions, suspensions, emulsions, elixirs, or capsules filled with the same, all for oral use, or in the form of sterile injectable solutions for parenteral administration (including subcutaneous and intravenous use). Such pharmaceutical compositions and unit dosage forms thereof may comprise ingredients in conventional proportions, with or without additional active compounds or principles, and such unit dosage forms may contain any suitable effective amount of the active ingredient commensurate with the intended daily dosage range to be employed.

Pharmaceutical compositions containing a compound of this invention can be prepared in a manner well known in the pharmaceutical art and comprise at least one active compound. Generally, the compounds of this invention are administered in a pharmaceutically effective amount. The amount of the compound actually administered will typically be determined by a physician, in the light of the relevant circumstances, including the condition to be treated, the chosen route of administration, the actual compound administered, the age, weight, and response of the individual patient, the severity of the patient's symptoms, and the like.

The pharmaceutical compositions of the present invention can be administered by a variety of routes including oral, rectal, subcutaneous, intravenous, intramuscular, intranasal and pulmonary routes. The compositions for oral administration can take the form of bulk liquid solutions or suspensions, or bulk powders. More commonly, however, the compositions are presented in unit dosage forms to facilitate accurate dosing. The term "unit dosage forms" refers to physically discrete units suitable as unitary dosages for human subjects and other mammals, each unit containing a predetermined quantity of active material calculated to produce the desired therapeutic effect, in association with a suitable pharmaceutical excipient. Typical unit dosage forms include pre-filled, pre-measured ampoules or syringes of the liquid compositions or pills, tablets, capsules or the like in the case of solid compositions.

Liquid forms suitable for oral administration may include a suitable aqueous or non-aqueous vehicle with buffers, suspending and dispensing agents, colorants, flavours and the like. Solid forms may include, for example, any of the following ingredients, or compounds of a similar nature: a binder such as microcrystalline cellulose, gum tragacanth, acacia, corn starch or gelatine; an excipient such as starch, dicalcium phosphate or lactose, a disintegrating agent such as alginic acid, Primogel or corn starch; a lubricant such as magnesium stearate; a glidant such as colloidal silicon dioxide; a sweetening agent such as sucrose, lactose or saccharin; or a flavouring agent such as peppermint, methyl salicylate, or orange flavouring.

Injectable compositions are typically based upon injectable sterile saline or phosphate-buffered saline or other injectable carriers known in the art.

The pharmaceutical compositions may be in the form of tablets, pills, capsules, solutions, suspensions, emulsion, powders, suppository and as sustained release formulations.

If desired, tablets may be coated by standard aqueous or non-aqueous techniques. In certain embodiments, such compositions and preparations can contain at least 0.1 percent of active compound. The percentage of active compound in these compositions may, of course, be varied and may conveniently be between about 1 percent to about 60 percent of the weight of the unit. The amount of active compound in such therapeutically useful compositions is such that therapeutically active dosage will be obtained.

When a dosage unit form is a capsule, it may contain, in addition to materials of the above type, a liquid carrier such as a fatty oil. Various other materials may be present as coatings or to modify the physical form of the dosage unit. For instance, tablets may be coated with shellac, sugar or both. A syrup or elixir may contain, in addition to the active ingredient, sucrose as a sweetening agent, methyl and propylparabens as preservatives, a dye and a flavoring agent such as cherry or orange flavor. To prevent breakdown during transit through the upper portion of the gastrointestinal tract, the composition be an enteric coated formulation.

The active compounds can also be administered intranasally as, for example, liquid drops or spray.

Compositions for pulmonary administration include, but are not limited to, dry powder compositions consisting of the powder of a compound of Formula (Ia) and (Ib) or a salt thereof, and the powder of a suitable carrier and/or lubricant. The compositions for pulmonary administration can be inhaled from any suitable dry powder inhaler device known to a person skilled in the art.

Administration of the compositions is performed under a protocol and at a dosage sufficient to reduce the inflammation and pain in the subject. In some embodiments, in the pharmaceutical compositions of the present invention the active principle or active principles are generally formulated in dosage units. The dosage unit may contain from 0.1 to 1000 mg of a compound of Formula (Ia) and (Ib) per dosage unit for daily administration.

In some embodiments, the amounts effective for a specific formulation will depend on the severity of the disease, disorder or condition, previous therapy, the individual's health status and response to the drug. In some embodiments, the dose is in the range from 0.001% by weight to about 60% by weight of the formulation.

When used in combination with one or more other active ingredients, the compound of the present invention and the other active ingredient may be used in lower doses than when each is used singly.

Concerning formulations with respect to any variety of routes of administration, methods and formulations for the administration of drugs are disclosed in Remington's Pharmaceutical Sciences, 17th Edition, Gennaro et al. Eds., Mack Publishing Co., 1985, and Remington's Pharmaceutical Sciences, Gennaro A R ed. 20th Edition, 2000, Williams & Wilkins PA, USA, and Remington: The Science and Practice of Pharmacy, 21st Edition, Lippincott Williams & Wilkins Eds., 2005; and in Loyd V. Allen and Howard C. Ansel, Ansel's Pharmaceutical Dosage Forms and Drug Delivery Systems, 10th Edition, Lippincott Williams & Wilkins Eds., 2014.

The above described components for orally administered or injectable compositions are merely representative.

The compounds of this invention can also be administered in sustained release forms or from sustained release drug delivery systems.

A third aspect of the present invention relates to compounds of Formula (Ia) as disclosed above or the pharmaceutical composition thereof, for the use as a medicament.

A fourth aspect of the present invention relates to compounds of Formula (Ib) or its pharmaceutically acceptable salts, solvates or isomers thereof, for the use in the treatment of diseases or disorders wherein disrupting Rad51-BRCA2 interaction is beneficial,

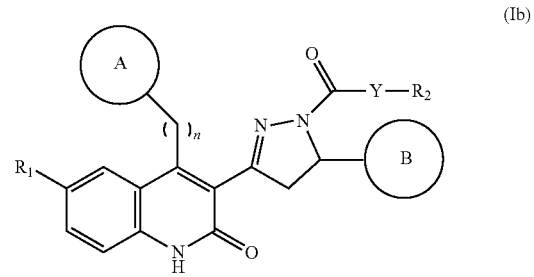

(Ib)

wherein $R_1$ is halogen;

$R_2$ is selected from the group consisting of hydrogen, $C_{1-6}$alkyl, halogen, COOH, COOC$_{1-6}$alkyl, CONH$_2$, CONHC$_{1-6}$alkyl, CONH(C$_{1-6}$alkyl)$_2$, OH, O, NH$_2$, NHC$_{1-6}$alkyl, N(C$_{1-6}$alkyl)$_2$ and CONHSO$_2$Me;

n is 0-3;

Y is selected from the group consisting of $C_{1-6}$alkyl, haloC$_{1-6}$alkyl, $C_{2-6}$alkenyl, or $C_{2-6}$alkynyl;

A and B are individually and independently selected from the group consisting of aryl, heteroaryl, cycloalkyl and heterocycloalkyl that are unsubstituted or substituted with one or more substituents selected from the group consisting of halogen, linear or branched $C_{1-4}$alkyl, halo-$C_{1-4}$alkyl, O—$C_{1-4}$alkyl, NH$_2$, NH—$C_{1-4}$alkyl, N($C_{1-4}$alkyl)$_2$, $C_{1-4}$alkylaryl, haloaryl, $C_{1-4}$alkoxyaryl, $C_{1-4}$alkylheteroaryl, haloheteroaryl, $C_{1-4}$alkoxyheteroaryl, $C_{1-4}$alkylcycloalkyl, halocycloalkyl, $C_{1-4}$alkoxycycloalkyl, $C_{1-4}$alkylheterocycloalkyl, haloheterocycloalkyl, $C_{1-4}$alkoxyheterocycloalkyl.

According to one embodiment, in a compound of Formula (Ib):

$R_1$ is halogen;

$R_2$ is selected from the group consisting of hydrogen, COOH and NH$_2$;

Y is $C_{1-4}$alkyl;

A is phenyl unsubstituted or substituted with one or more substituents selected from the group consisting of halogen, linear or branched $C_{1-4}$alkyl, halo-$C_{1-4}$alkyl, O—$C_{1-4}$alkyl, NH$_2$, NH—$C_{1-4}$alkyl, N($C_{1-4}$alkyl)$_2$, $C_{1-4}$alkylaryl, haloaryl, $C_{1-4}$alkoxyaryl, $C_{1-4}$alkylheteroaryl, haloheteroaryl, $C_{1-4}$alkoxyheteroaryl, $C_{1-4}$alkylcycloalkyl, halocycloalkyl, $C_{1-4}$alkoxycycloalkyl, $C_{1-4}$alkylheterocycloalkyl, haloheterocycloalkyl, $C_{1-4}$alkoxyheterocycloalkyl and B is selected from the group consisting of aryl, heteroaryl, cycloalkyl and heterocycloalkyl that are unsubstituted or substituted with one or more substituents selected from the group consisting of halogen, linear or branched $C_{1-4}$alkyl, halo-$C_{1-4}$alkyl, O—$C_{1-4}$alkyl, $C_{1-4}$alkylaryl, haloaryl, $C_{1-4}$alkoxyaryl, $C_{1-4}$alkylheteroaryl, $C_{1-4}$alkylheterocycloalkyl.

According to a further embodiment, in a compound of Formula (Ib), B is selected from the group consisting of:

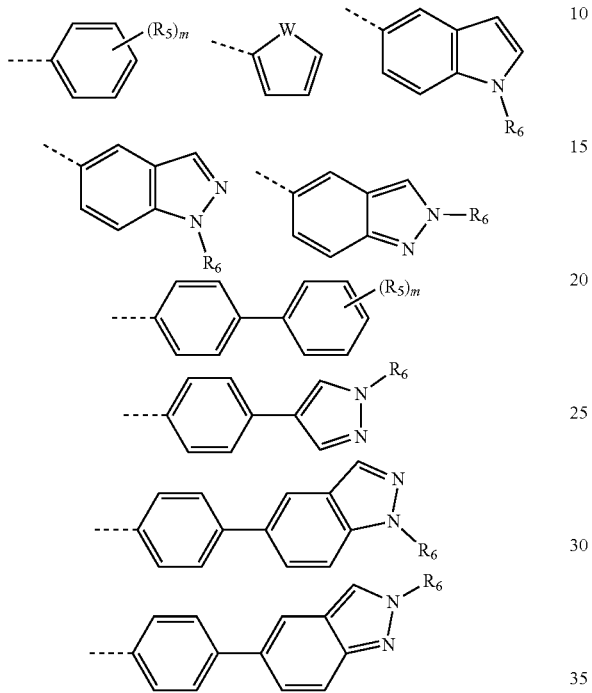

wherein
$R_5$ is selected from the group consisting of halogen, linear or branched $C_{1-4}$alkyl, halo-$C_{1-4}$alkyl, O—$C_{1-4}$alkyl, $NH_2$, NH—$C_{1-4}$alkyl, $N(C_{1-4}$alkyl$)_2$;
$R_6$ is selected from the group consisting of H and $C_{1-4}$alkyl;
m is an integer from 0 to 3;
W is selected from the group consisting of O and NH.

According to a further embodiment, in the compound of formula (Ib):
$R_1$ is halogen;
$R_2$ is selected from the group consisting of hydrogen, and COOH;
n is 1;
Y is selected from the group consisting of $C_{1-4}$alkyl;
A is phenyl;
B is

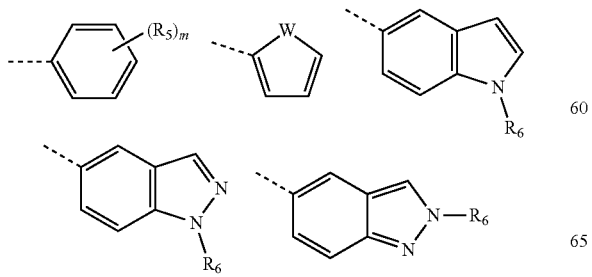

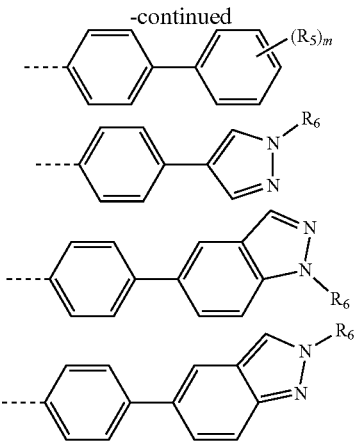

$R_5$ is hydrogen, halogen, linear or branched $C_{1-4}$alkyl, halo-$C_{1-4}$alkyl, O—$C_{1-4}$alkyl and
m is 1 or 2.

Compounds of Formula (Ib) as disclosed above may be effective for the treatment of diseases or disorders selected from the group consisting of primary and metastatic neoplastic diseases, hyperplasia, metaplasia, dysplasia, cancer, cancer metastasis, benign tumors, hyperproliferative disorders, preferably selected from the group consisting of ovarian, breast and pancreatic cancer.

In particular, the following compounds can be used:

| | |
|---|---|
| d.1 | 4-[5-(6-chloro-2-oxo-4-phenyl-1H-quinolin-3-yl)-3-(4-fluorophenyl)-3,4-dihydropyrazol-2-yl]-4-oxo-butanoic acid |
| d.2 | 3-[2-acetyl-3-(4-fluorophenyl)-3,4-dihydropyrazol-5-yl]-6-chloro-4-phenyl-1H-quinolin-2-one |
| d.3 | 6-chloro-3-[3-(4-fluorophenyl)-2-propanoyl-3,4-dihydropyrazol-5-yl]-4-phenyl-1H-quinolin-2-one |
| d.4 | 3-[2-(3-aminopropanoyl)-3-(4-fluorophenyl)-3,4-dihydropyrazol-5-yl]-6-chloro-4-phenyl-1H-quinolin-2-one |
| d.5 | 4-[5-(6-chloro-2-oxo-4-phenyl-1H-quinolin-3-yl)-3-(4-chlorophenyl)-3,4-dihydropyrazol-2-yl]-4-oxo-butanoic acid |
| d.6 | 3-[2-acetyl-3-(4-chlorophenyl)-3,4-dihydropyrazol-5-yl]-6-chloro-4-phenyl-1H-quinolin-2-one |
| d.7 | 6-chloro-3-[3-(4-chlorophenyl)-2-propanoyl-3,4-dihydropyrazol-5-yl]-4-phenyl-1H-quinolin-2-one |
| d.9 | 3-[2-acetyl-3-(4-bromophenyl)-3,4-dihydropyrazol-5-yl]-6-chloro-4-phenyl-1H-quinolin-2-one |
| d.10 | 3-[3-(4-bromophenyl)-2-propanoyl-3,4-dihydropyrazol-5-yl]-6-chloro-4-phenyl-1H-quinolin-2-one |
| d.11 | 4-[5-(6-chloro-2-oxo-4-phenyl-1H-quinolin-3-yl)-3-(4-methoxyphenyl)-3,4-dihydropyrazol-2-yl]-4-oxo-butanoic acid |
| d.12 | 6-chloro-3-[3-(4-methoxyphenyl)-2-propanoyl-3,4-dihydropyrazol-5-yl]-4-phenyl-1H-quinolin-2-one |
| d.14 | 4-[5-(6-chloro-2-oxo-4-phenyl-1H-quinolin-3-yl)-3-[4-(trifluoromethyl)phenyl]-3,4-dihydropyrazol-2-yl]-4-oxo-butanoic acid |
| d.15 | 3-[2-acetyl-3-[4-(trifluoromethyl)phenyl]-3,4-dihydropyrazol-5-yl]-6-chloro-4-phenyl-1H-quinolin-2-one |
| d.16 | 4-[3-(4-tert-butylphenyl)-5-(6-chloro-2-oxo-4-phenyl-1H-quinolin-3-yl)-3,4-dihydropyrazol-2-yl]-4-oxo-butanoic acid |
| d.17 | 3-[2-acetyl-3-(4-tert-butylphenyl)-3,4-dihydropyrazol-5-yl]-6-chloro-4-phenyl-1H-quinolin-2-one |
| d.18 | 4-[5-(6-chloro-2-oxo-4-phenyl-1H-quinolin-3-yl)-3-(3-fluoro-4-methoxy-phenyl)-3,4-dihydropyrazol-2-yl]-4-oxo-butanoic acid |
| d.19 | 4-[5-[6-chloro-4-(4-methoxyphenyl)-2-oxo-1H-quinolin-3-yl]-3-(4-fluorophenyl)-3,4-dihydropyrazol-2-yl]-4-oxo-butanoic acid |

| | |
|---|---|
| d.22 | 4-[5-(6-chloro-2-oxo-4-phenyl-1H-quinolin-3-yl)-3-(1-methylindol-5-yl)-3,4-dihydropyrazol-2-yl]-4-oxo-butanoic acid |
| d.23 | 3-[2-acetyl-3-(1-methylindol-5-yl)-3,4-dihydropyrazol-5-yl]-6-chloro-4-phenyl-1H-quinolin-2-one |
| d.24 | 4-[5-(6-chloro-2-oxo-4-phenyl-1H-quinolin-3-yl)-3-(1-ethylindol-5-yl)-3,4-dihydropyrazol-2-yl]-4-oxo-butanoic acid |
| d.25 | 3-[2-acetyl-3-(1-ethylindol-5-yl)-3,4-dihydropyrazol-5-yl]-6-chloro-4-phenyl-1H-quinolin-2-one |
| d.26 | 4-[5-(6-chloro-2-oxo-4-phenyl-1H-quinolin-3-yl)-3-(1-methylindazol-5-yl)-3,4-dihydropyrazol-2-yl]-4-oxo-butanoic acid |
| d.27 | 3-[2-acetyl-3-(1-methylindazol-5-yl)-3,4-dihydropyrazol-5-yl]-6-chloro-4-phenyl-1H-quinolin-2-one |
| d.28 | 4-[5-(6-chloro-2-oxo-4-phenyl-1H-quinolin-3-yl)-3-(2-methylindazol-5-yl)-3,4-dihydropyrazol-2-yl]-4-oxo-butanoic acid |
| d.29 | 4-[5-(6-chloro-2-oxo-4-phenyl-1H-quinolin-3-yl)-3-(2-ethylindazol-5-yl)-3,4-dihydropyrazol-2-yl]-4-oxo-butanoic acid |
| d.30 | 3-[2-acetyl-3-(2-ethylindazol-5-yl)-3,4-dihydropyrazol-5-yl]-6-chloro-4-phenyl-1H-quinolin-2-one |
| d.31 | 4-[5-(6-chloro-2-oxo-4-phenyl-1H-quinolin-3-yl)-3-(1-ethylindazol-5-yl)-3,4-dihydropyrazol-2-yl]-4-oxo-butanoic acid |
| d.32 | 3-[2-acetyl-3-(1-ethylindazol-5-yl)-3,4-dihydropyrazol-5-yl]-6-chloro-4-phenyl-1H-quinolin-2-one |
| d.33 | 4-[5-(6-chloro-2-oxo-4-phenyl-1H-quinolin-3-yl)-3-(1-propylindazol-5-yl)-3,4-dihydropyrazol-2-yl]-4-oxo-butanoic acid |
| d.34 | 3-[2-acetyl-3-(1-propylindazol-5-yl)-3,4-dihydropyrazol-5-yl]-6-chloro-4-phenyl-1H-quinolin-2-one |
| d.35 | 4-[5-(6-chloro-2-oxo-4-phenyl-1H-quinolin-3-yl)-3-(2-propylindazol-5-yl)-3,4-dihydropyrazol-2-yl]-4-oxo-butanoic acid |
| d.36 | 4-[5-(6-chloro-2-oxo-4-phenyl-1H-quinolin-3-yl)-3-[4-(4-fluorophenyl)phenyl]-3,4-dihydropyrazol-2-yl]-4-oxo-butanoic acid |
| d.37 | 4-[5-(6-chloro-2-oxo-4-phenyl-1H-quinolin-3-yl)-3-[4-(4-chlorophenyl)phenyl]-3,4-dihydropyrazol-2-yl]-4-oxo-butanoic acid |
| d.38 | 3-[2-acetyl-3-[4-(4-chlorophenyl)phenyl]-3,4-dihydropyrazol-5-yl]-6-chloro-4-phenyl-1H-quinolin-2-one |
| d.39 | 4-[3-[4-(4-bromophenyl)phenyl]-5-(6-chloro-2-oxo-4-phenyl-1H-quinolin-3-yl)-3,4-dihydropyrazol-2-yl]-4-oxo-butanoic acid |
| d.40 | 3-[2-acetyl-3-[4-(4-bromophenyl)phenyl]-3,4-dihydropyrazol-5-yl]-6-chloro-4-phenyl-1H-quinolin-2-one |
| d.41 | 4-[5-(6-chloro-2-oxo-4-phenyl-1H-quinolin-3-yl)-3-[4-(4-methoxyphenyl)phenyl]-3,4-dihydropyrazol-2-yl]-4-oxo-butanoic acid |
| d.42 | 3-[2-acetyl-3-[4-(4-methoxyphenyl)phenyl]-3,4-dihydropyrazol-5-yl]-6-chloro-4-phenyl-1H-quinolin-2-one |
| d.43 | 4-[5-(6-chloro-2-oxo-4-phenyl-1H-quinolin-3-yl)-3-[4-(1-propylpyrazol-4-yl)phenyl]-3,4-dihydropyrazol-2-yl]-4-oxo-butanoic acid |
| d.44 | 3-[2-acetyl-3-[4-(1-propylpyrazol-4-yl)phenyl]-3,4-dihydropyrazol-5-yl]-6-chloro-4-phenyl-1H-quinolin-2-one |
| d.45 | 4-[5-(6-chloro-2-oxo-4-phenyl-1H-quinolin-3-yl)-3-[4-(1-ethylindazol-5-yl)phenyl]-3,4-dihydropyrazol-2-yl]-4-oxo-butanoic acid |
| d.46 | 4-[5-(6-chloro-2-oxo-4-phenyl-1H-quinolin-3-yl)-3-[4-(2-ethylindazol-5-yl)phenyl]-3,4-dihydropyrazol-2-yl]-4-oxo-butanoic acid |
| d.47 | 3-(2-acetyl-3-phenyl-3,4-dihydropyrazol-5-yl)-6-chloro-4-phenyl-1H-quinolin-2-one |
| d.48 | 6-chloro-4-phenyl-3-(3-phenyl-2-propanoyl-3,4-dihydropyrazol-5-yl)-1H-quinolin-2-one |
| d.49 | 3-[2-acetyl-3-(p-tolyl)-3,4-dihydropyrazol-5-yl]-6-chloro-4-phenyl-1H-quinolin-2-one |
| d.50 | 4-[5-(4-benzyl-6-chloro-2-oxo-1H-quinolin-3-yl)-3-(4-fluorophenyl)-3,4-dihydropyrazol-2-yl]-4-oxo-butanoic acid |
| d.51 | 3-[2-acetyl-3-(4-fluorophenyl)-3,4-dihydropyrazol-5-yl]-4-benzyl-6-chloro-1H-quinolin-2-one |
| d.52 | 3-[2-acetyl-3-(4-methoxyphenyl)-3,4-dihydropyrazol-5-yl]-4-benzyl-6-chloro-1H-quinolin-2-one |
| d.53 | 4-benzyl-6-chloro-3-[3-(4-methoxyphenyl)-2-propanoyl-3,4-dihydropyrazol-5-yl]-1H-quinolin-2-one |
| d.54 | 4-benzyl-6-chloro-3-[3-(4-fluorophenyl)-2-propanoyl-3,4-dihydropyrazol-5-yl]-1H-quinolin-2-one |
| d.55 | 4-[5-(4-benzyl-6-chloro-2-oxo-1H-quinolin-3-yl)-3-(4-chlorophenyl)-3,4-dihydropyrazol-2-yl]-4-oxo-butanoic acid |
| d.56 | 3-[2-acetyl-3-(4-chlorophenyl)-3,4-dihydropyrazol-5-yl]-4-benzyl-6-chloro-1H-quinolin-2-one |
| d.57 | 4-benzyl-6-chloro-3-[3-(4-chlorophenyl)-2-propanoyl-3,4-dihydropyrazol-5-yl]-1H-quinolin-2-one |
| d.58 | 4-[5-(4-benzyl-6-chloro-2-oxo-1H-quinolin-3-yl)-3-(4-bromophenyl)-3,4-dihydropyrazol-2-yl]-4-oxo-butanoic acid |
| d.59 | 3-[2-acetyl-3-(4-bromophenyl)-3,4-dihydropyrazol-5-yl]-4-benzyl-6-chloro-1H-quinolin-2-one |
| d.60 | 4-benzyl-3-[3-(4-bromophenyl)-2-propanoyl-3,4-dihydropyrazol-5-yl]-6-chloro-1H-quinolin-2-one |
| d.61 | 4-[5-(4-benzyl-6-chloro-2-oxo-1H-quinolin-3-yl)-3-(4-methoxyphenyl)-3,4-dihydropyrazol-2-yl]-4-oxo-butanoic acid |
| d.62 | 4-[5-(4-benzyl-6-chloro-2-oxo-1H-quinolin-3-yl)-3-[4-(trifluoromethyl)phenyl]-3,4-dihydropyrazol-2-yl]-4-oxo-butanoic acid |
| d.63 | 3-[2-acetyl-3-[4-(trifluoromethyl)phenyl]-3,4-dihydropyrazol-5-yl]-4-benzyl-6-chloro-1H-quinolin-2-one |
| d.64 | 4-[5-(4-benzyl-6-chloro-2-oxo-1H-quinolin-3-yl)-3-(4-tert-butylphenyl)-3,4-dihydropyrazol-2-yl]-4-oxo-butanoic acid |
| d.65 | 3-[2-acetyl-3-(4-tert-butylphenyl)-3,4-dihydropyrazol-5-yl]-4-benzyl-6-chloro-1H-quinolin-2-one |
| d.66 | 4-[5-(4-benzyl-6-chloro-2-oxo-1H-quinolin-3-yl)-3-(3-fluoro-4-methoxy-phenyl)-3,4-dihydropyrazol-2-yl]-4-oxo-butanoic acid |
| d.67 | 4-[5-(4-benzyl-6-chloro-2-oxo-1H-quinolin-3-yl)-3-(2-furyl)-3,4-dihydropyrazol-2-yl]-4-oxo-butanoic acid |
| d.68 | 3-[2-acetyl-3-(2-furyl)-3,4-dihydropyrazol-5-yl]-4-benzyl-6-chloro-1H-quinolin-2-one |
| d.69 | 4-[5-(4-benzyl-6-chloro-2-oxo-1H-quinolin-3-yl)-3-(1-methylindol-5-yl)-3,4-dihydropyrazol-2-yl]-4-oxo-butanoic acid |
| d.70 | 3-[2-acetyl-3-(1-methylindol-5-yl)-3,4-dihydropyrazol-5-yl]-4-benzyl-6-chloro-1H-quinolin-2-one |
| d.71 | 4-[5-(4-benzyl-6-chloro-2-oxo-1H-quinolin-3-yl)-3-(1-ethylindol-5-yl)-3,4-dihydropyrazol-2-yl]-4-oxo-butanoic acid |
| d.72 | 3-[2-acetyl-3-(1-ethylindol-5-yl)-3,4-dihydropyrazol-5-yl]-4-benzyl-6-chloro-1H-quinolin-2-one |
| d.73 | 4-[5-(4-benzyl-6-chloro-2-oxo-1H-quinolin-3-yl)-3-(1-methylindazol-5-yl)-3,4-dihydropyrazol-2-yl]-4-oxo-butanoic acid |
| d.74 | 3-[2-acetyl-3-(1-methylindazol-5-yl)-3,4-dihydropyrazol-5-yl]-4-benzyl-6-chloro-1H-quinolin-2-one |
| d.75 | 4-[5-(4-benzyl-6-chloro-2-oxo-1H-quinolin-3-yl)-3-(2-methylindazol-5-yl)-3,4-dihydropyrazol-2-yl]-4-oxo-butanoic acid |
| d.76 | 4-[5-(4-benzyl-6-chloro-2-oxo-1H-quinolin-3-yl)-3-(2-ethylindazol-5-yl)-3,4-dihydropyrazol-2-yl]-4-oxo-butanoic acid |
| d.77 | 3-[2-acetyl-3-(2-ethylindazol-5-yl)-3,4-dihydropyrazol-5-yl]-4-benzyl-6-chloro-1H-quinolin-2-one |
| d.78 | 4-[5-(4-benzyl-6-chloro-2-oxo-1H-quinolin-3-yl)-3-(1-ethylindazol-5-yl)-3,4-dihydropyrazol-2-yl]-4-oxo-butanoic acid |
| d.79 | 3-[2-acetyl-3-(1-ethylindazol-5-yl)-3,4-dihydropyrazol-5-yl]-4-benzyl-6-chloro-1H-quinolin-2-one |

| | |
|---|---|
| d.80 | 4-[5-(4-benzyl-6-chloro-2-oxo-1H-quinolin-3-yl)-3-(1-propylindazol-5-yl)-3,4-dihydropyrazol-2-yl]-4-oxo-butanoic acid |
| d.81 | 3-[2-acetyl-3-(1-propylindazol-5-yl)-3,4-dihydropyrazol-5-yl]-4-benzyl-6-chloro-1H-quinolin-2-one |
| d.82 | 4-[5-(4-benzyl-6-chloro-2-oxo-1H-quinolin-3-yl)-3-(2-propylindazol-5-yl)-3,4-dihydropyrazol-2-yl]-4-oxo-butanoic acid |
| d.83 | 4-[5-(4-benzyl-6-chloro-2-oxo-1H-quinolin-3-yl)-3-[4-(4-fluorophenyl)phenyl]-3,4-dihydropyrazol-2-yl]-4-oxo-butanoic acid |
| d.84 | 4-[5-(4-benzyl-6-chloro-2-oxo-1H-quinolin-3-yl)-3-[4-(4-chlorophenyl)phenyl]-3,4-dihydropyrazol-2-yl]-4-oxo-butanoic acid |
| d.85 | 3-[2-acetyl-3-[4-(4-chlorophenyl)phenyl]-3,4-dihydropyrazol-5-yl]-4-benzyl-6-chloro-1H-quinolin-2-one |
| d.86 | 4-[5-(4-benzyl-6-chloro-2-oxo-1H-quinolin-3-yl)-3-[4-(4-bromophenyl)phenyl]-3,4-dihydropyrazol-2-yl]-4-oxo-butanoic acid |
| d.87 | 3-[2-acetyl-3-[4-(4-bromophenyl)phenyl]-3,4-dihydropyrazol-5-yl]-4-benzyl-6-chloro-1H-quinolin-2-one |
| d.88 | 4-[5-(4-benzyl-6-chloro-2-oxo-1H-quinolin-3-yl)-3-[4-(4-methoxyphenyl)phenyl]-3,4-dihydropyrazol-2-yl]-4-oxo-butanoic acid |
| d.89 | 3-[2-acetyl-3-[4-(4-methoxyphenyl)phenyl]-3,4-dihydropyrazol-5-yl]-4-benzyl-6-chloro-1H-quinolin-2-one |
| d.90 | 4-[5-(4-benzyl-6-chloro-2-oxo-1H-quinolin-3-yl)-3-[4-(1-propylpyrazol-4-yl)phenyl]-3,4-dihydropyrazol-2-yl]-4-oxo-butanoic acid |
| d.91 | 3-[2-acetyl-3-[4-(1-propylpyrazol-4-yl)phenyl]-3,4-dihydropyrazol-5-yl]-4-benzyl-6-chloro-1H-quinolin-2-one |
| d.92 | 4-[5-(4-benzyl-6-chloro-2-oxo-1H-quinolin-3-yl)-3-[4-(1-ethylindazol-5-yl)phenyl]-3,4-dihydropyrazol-2-yl]-4-oxo-butanoic acid |
| d.93 | 4-[5-(4-benzyl-6-chloro-2-oxo-1H-quinolin-3-yl)-3-[4-(2-ethylindazol-5-yl)phenyl]-3,4-dihydropyrazol-2-yl]-4-oxo-butanoic acid |
| d.95 | 4-benzyl-6-chloro-3-(3-phenyl-2-propanoyl-3,4-dihydropyrazol-5-yl)-1H-quinolin-2-one |
| d.96 | 3-[2-acetyl-3-(p-tolyl)-3,4-dihydropyrazol-5-yl]-4-benzyl-6-chloro-1H-quinolin-2-one |
| d.97 | 3-[2-acetyl-3-(4-pyridyl)-3,4-dihydropyrazol-5-yl]-6-chloro-4-phenyl-1H-quinolin-2-one |
| d.98 | 4-[5-(6-chloro-2-oxo-4-phenyl-1H-quinolin-3-yl)-3-(3-pyridyl)-3,4-dihydropyrazol-2-yl]-4-oxo-butanoic acid |
| d.99 | 4-[5-(6-chloro-2-oxo-4-phenyl-1H-quinolin-3-yl)-3-(2-pyridyl)-3,4-dihydropyrazol-2-yl]-4-oxo-butanoic acid |
| d.100 | 4-[5-(4-benzyl-6-chloro-2-oxo-1H-quinolin-3-yl)-3-(3-pyridyl)-3,4-dihydropyrazol-2-yl]-4-oxo-butanoic acid |
| d.101 | 4-[5-(4-benzyl-6-chloro-2-oxo-1H-quinolin-3-yl)-3-(3-pyridyl)-3,4-dihydropyrazol-2-yl]-4-oxo-butanoic acid |
| d.102 | 4-[5-(4-benzyl-6-chloro-2-oxo-1H-quinolin-3-yl)-3-(1-methylindol-3-yl)-3,4-dihydropyrazol-2-yl]-4-oxo-butanoic acid |
| d.103 | 4-benzyl-6-chloro-3-[3-(6-methoxy-3-pyridyl)-2-propanoyl-3,4-dihydropyrazol-5-yl]-1H-quinolin-2-one |
| d.104 | 4-[5-(4-benzyl-6-chloro-2-oxo-1H-quinolin-3-yl)-3-(6-methoxy-3-pyridyl)-3,4-dihydropyrazol-2-yl]-4-oxo-butanoic acid |
| d.105 | 4-[5-(4-benzyl-6-chloro-2-oxo-1H-quinolin-3-yl)-3-(2-chlorophenyl)-3,4-dihydropyrazol-2-yl]-4-oxo-butanoic acid |
| d.106 | 4-[5-(4-benzyl-6-chloro-2-oxo-1H-quinolin-3-yl)-3-(3,4-dimethoxyphenyl)-3,4-dihydropyrazol-2-yl]-4-oxo-butanoic acid |
| d.107 | 4-[5-[6-chloro-2-oxo-4-(2-phenylethyl)-1H-quinolin-3-yl]-3-(4-methoxyphenyl)-3,4-dihydropyrazol-2-yl]-4-oxo-butanoic acid |
| d.108 | 6-chloro-3-[3-(4-methoxyphenyl)-2-propanoyl-3,4-dihydropyrazol-5-yl]-4-(2-phenylethyl)-1H-quinolin-2-one |
| d.109 | 4-[5-(6-chloro-4-morpholino-2-oxo-1H-quinolin-3-yl)-3-(4-methoxyphenyl)-3,4-dihydropyrazol-2-yl]-4-oxo-butanoic acid |

Advantageously, the compounds of the invention block homologous recombination DNA repairing mechanism by disrupting Rad51-BRCA2 interaction.

Pharmacological inhibition of homologous recombination can be used to "chemically induce" synthetic lethality effect, especially useful in cancer treatment because makes cancer cells more sensitive to drugs acting as DNA repairing mechanism inhibitors (i.e. PARPi), DNA-damaging agents, and radiotherapy. The compounds of the invention are potent disruptors of Rad51-BRCA2 interaction and, at the same time, they show promising results in blocking the proliferation of cancer cells either alone or in combination with other chemotherapeutic compounds, for example PARP inhibitors such as Olaparib, or radiotherapy. Moreover, the compounds of the invention are potent inhibitors towards Rad51 enzyme, showing $EC_{50}$ values in the micromolar range in a cell-based assay measuring cancer cells proliferation. These results suggest that these compounds are able to penetrate the cell membrane in a complex biological environment.

In the following, the present invention shall be illustrated by means of some examples, which are not construed to be viewed as limiting the scope of the invention.

The following abbreviations are hereinafter used in the accompanying examples: acetic acid (AcOH), aryl (Ar), apparent triplet (app-t), apparent doublet of triplet (app-dt), apparent doublet (app-d), apparent singlet (app-s), aqueous (aq.), atmospheres (atm), benzyl (Bn), broad signal (bs), tert-butyl (tBu), tert-butylmethyl ether (TBME); normal-butyl lithium (nBuLi), calculated (calcd), carbon nuclear magnetic resonance spectroscopy ($^{13}C$ NMR), m-chloro perbenzoic acid (m-CPBA), cyclohexane (CyH or Cy), Deuterium (D), doublet (d), dichloromethane (DCM), doublet of doublet (dd), doublet of doublet of triplets (ddt), diisopropyl azodicarboxylate (DIAD), ethyldiisopropylamine (DIPEA), doublet of quartet (dq), N,N-dimethylformamide (DMF), dimethyl sulfoxide (DMSO), hexadeuterodimethyl sulfoxide (DMSO-$d_6$), doublet of triplet (dt), N-(3-dimethylamino propyl)-N'-ethylcarbodiimide (EDC), half maximal effective concentration (EC50), equivalents (equiv. or eq.), enantiomeric excess (e.e.), electrospray ionization (ESI), ethyl (Et), diethyl ether ($Et_2O$), ethyl acetate (EtOAc), hour (h), proton nuclear magnetic resonance spectroscopy ($^1H$ NMR), 1-[bis(dimethylamino)methylene]-1H-1,2,3-triazolo[4,5-b]pyridinium 3-oxid hexafluorophosphate (HATU), 1-hydroxybenzotriazole hydrate (HOBt), high performance liquid chromatography (HPLC), hertz (Hz), infrared spectroscopy (IR), half maximal inhibitory concentration (IC50), coupling constant (J), potassium carbonate ($K_2CO_3$), liter (L), lithium hydroxide (LiOH), molarity (M), multiplet (m), methyl (Me), acetonitrile (MeCN), methanol (MeOH), milligram (mg), megahertz (MHz), minutes (min), milliliter (mL), millimole (mmol), Mass Spectrometry (MS), molecular weight (MW), sodium hydride (NaH), sodium bicarbonate ($NaHCO_3$), sodium carbonate ($Na_2CO_3$), sodium sulphate ($Na_2SO_4$), ammonium chloride ($NH_4Cl$), not determined (nd), nanomolar (nM), Nuclear Magnetic Resonace (NMR), protecting group (Pg), parts per million (ppm), triphenylphospine ($PPh_3$), isopropyl (i-Pr), quartet (q), substituent (R), racemic (rac-), room temperature (rt), singlet (s), temperature (T), triplet or time (t), retention time (tr), triethylamine (TEA or Et$_3$N), trifluoroacetic acid (TFA), tetrahydrofuran (THF), thin-layer chromatography (TLC), ultraviolet (UV), Ultra-Performance Liquid Chromotography—Mass Spectroscopy (UPLC-MS), anionic ligand, halide, substituent, or number (X), chemical shift (δ), microliter (μL), micromolar (μM), Watt (W), deuterated chloroform (CDCl$_3$), ammonium acetate (NH$_4$OAc).

1. Chemical Synthesis

Automated column chromatography purifications were conducted using a Teledyne ISCO apparatus (CombiFlash™ Rf) with prepacked silica gel columns of different sizes (from 4 g to 120 g). Mixtures of increasing polarity of cyclohexane and ethyl acetate or dichloromethane and methanol or dichloromethane and ethanol were used as eluents. Preparative TLCs were performed using Macherey-Nagel precoated 0.05 mm TLC plates (SIL G-50 UV254). Microwave heating was performed using Explorer-48 positions instrument (CEM). NMR experiments were run on a Bruker Avance III 400 MHz spectrometer (400.13 MHz for 1H, and 100.62 MHz for $^{13}$C), equipped with a BBI probe and Z-gradients, or on a Bruker FT NMR Avance III 600-MHz spectrometer (600.130 MHz for 1H, and 150.903 MHz for $^{13}$C) equipped with a 5-mm CryoProbe QCI quadruple resonance, a shielded Z-gradient coil and the automatic sample changer SampleJet NMR system. Spectra were acquired at 300 K, using deuterated dimethyl sulfoxide (DMSO-d$_6$) or deuterated chloroform (CDCl$_3$) as solvents. Chemical shifts for $^1$H and $^{13}$C spectra were recorded in parts per million using the residual non-deuterated solvent as the internal standard (for CDCl$_3$: $^1$H 7.26 ppm, $^{13}$C 77.16 ppm; for DMSO-d$_6$: $^1$H 2.50 ppm, $^{13}$C 39.52 ppm). UPLC-MS analyses were run on a Waters ACQUITY UPLC/MS system consisting of a SQD (Single Quadropole Detector) Mass Spectrometer equipped with an Electrospray Ionization interface and a Photodiode Array Detector. The PDA range was 210-400 nm. The analyses were performed on either an ACQUITY UPLC HSS T3 C18 column (50×2.1 mmID, particle size 1.8 μm) with a VanGuard HSS T3 C18 pre-column (5×2.1 mmID, particle size 1.8 μm) (Log D<1) or an ACQUITY UPLC BEH C18 column (50×2.1 mmID, particle size 1.7 μm) with a VanGuard BEH C18 pre-column (5×2.1 mmID, particle size 1.7 μm) (Log D>1). The mobile phase was 10 mM NH$_4$OAc in H$_2$O at pH 5 adjusted with AcOH (A) and 10 mM NH$_4$OAc in MeCN—H$_2$O (95:5) at pH 5 (B). Electrospray ionization in positive and negative mode was applied in the mass scan range 100-500 Da.

Methods and Gradients Used:

Polar Method:
  Column: Waters ACQUITY UPLC HSS T3 C18, 1.8 μm, 50×2.1 mmID
  Pre-column: VanGuard HSS T3 C18, 1.8 μm, 5×2.1 mmID
  Linear gradient: 0-0.2 min: 0% B, 0.2-2.7 min: 0-50% B, 2.7-2.8 min: 50-100% B, 2.8-3.0 min: 100% B
  Flow rate: 0.5 mL/min Generic Method:
  Column: Waters ACQUITY UPLC BEH C18, 1.7 μm, 50×2.1 mmID
  Pre-column: VanGuard BEH C18, 1.7 μm, 5×2.1 mmID
  Linear gradient: 0-0.2 min: 5% B, 0.2-2.7 min: 5-95% B, 2.7-2.8 min: 95-100% B, 2.8-3.0 min: 100% B
  Flow rate: 0.5 mL/min Apolar Method:
  Column: Waters ACQUITY UPLC BEH C18, 1.7 μm, 50×2.1 mmID
  Pre-column: VanGuard BEH C18, 1.7 μm, 5×2.1 mmID
  Gradient: 0-0.2 min: 50% B, 0.2-2.7 min: 50-100% B, 2.7-3.0 min: 100% B
  Flow rate: 0.5 mL/min Scheme of synthesis 1

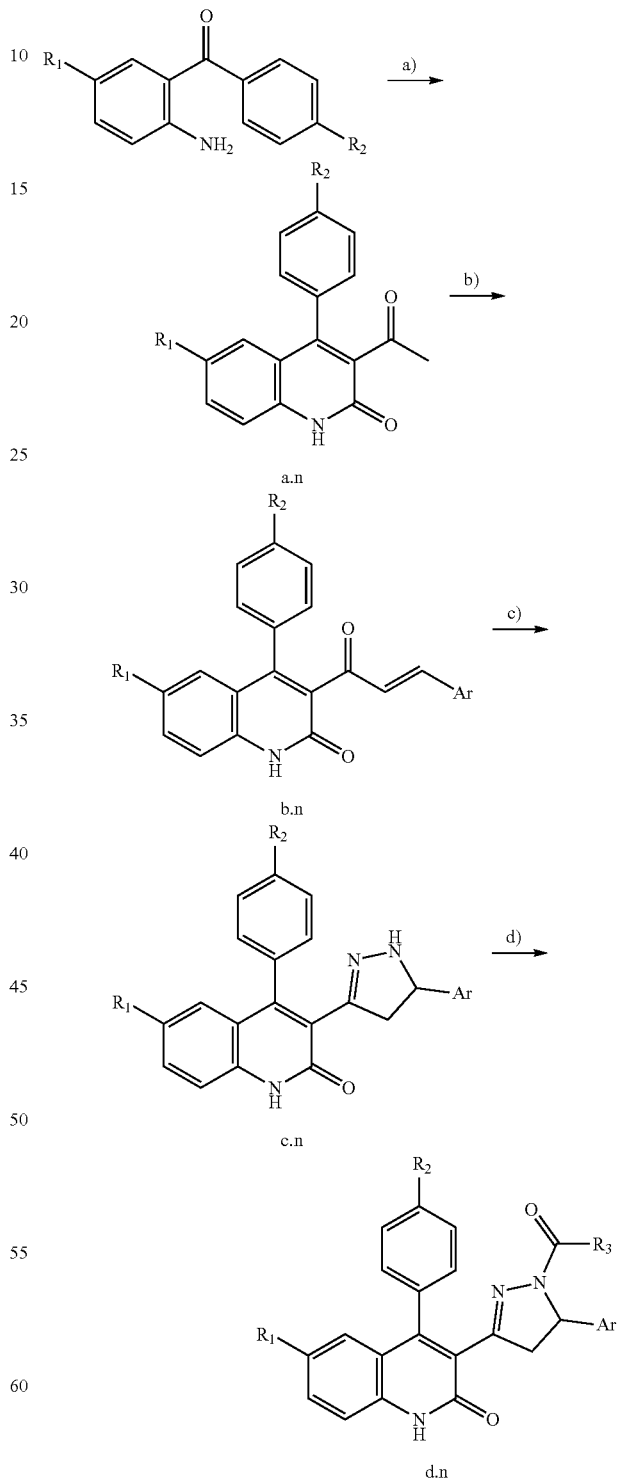

(a) Ethyl acetoacetate, DMF, 120° C.; (b) ArCHO, KOH, 4:3 EtOH/H$_2$O 0° C. to rt; (c) hydrazine monohydrate, EtOH, 110° C.; (d) anhydride, THF (dry), heating or propionic acid, HOBt, EDCI, DCM, rt Scheme of synthesis 2

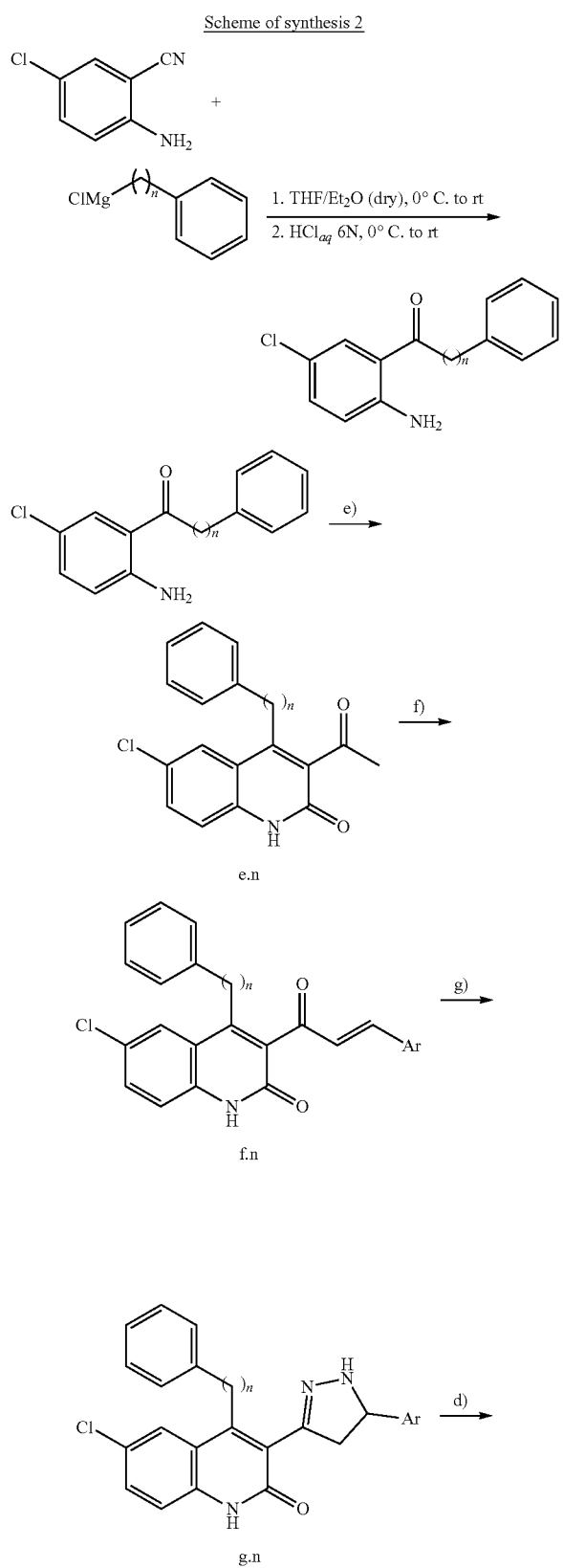

(e) Ethyl acetoacetate, THF (dry), 4 A ms, 140° C., 75 min (f) ArCHO, KOH, 4:3 EtOH/H$_2$O 0° C. to rt; (g) hydrazine monohydrate, EtOH, 110° C.; (d) anhydride, THF (dry), heating or propionic acid, HOBt, EDCI, DCM, 0° C. to rt Synthetic Procedures General Procedures A: Synthesis of quinolin-2(1H)-one A1) An appropriate 2-aminobenzophenone (1.0 eq) and the ethyl acetoacetate (1.5 eq) were dissolved in DMF (1.00 M) in an appropriately sized microwaveable vessel and microwaved at 120° C. (200 W) for 1.5 hours. The solvent was concentrated under reduced pressure, the residue was diluted with DCM and washed three times with water. The organic layer was dried over Na$_2$SO$_4$, filtered and the solvent removed. The title compound was obtained after purification over silica gel, unless otherwise noted.

A2) An appropriate 2-aminobenzophenone (1.0 eq) and the ethyl acetoacetate (3 eq) were dissolved in DMF (1.00 M) in an appropriately sized screw-capped pressure tube. The mixture was heated to reflux and stirred for 19 hours. Finally the solvent was removed under reduced pressure.

General Procedure B: Synthesis of quinolin-2(1H)-one acrolyl Intermediates

In a round bottom flask, the quinolin-2(1H)-one (1.00 eq) and potassium hydroxide (25 eq) were stirred in EtOH/H$_2$O (4:3 v/v, 0.05 M) at 0° C. for 45 minutes prior to the addition of an appropriately substituted arylaldehyde (1 eq). The reaction was stirred overnight while gradually reached room temperature. The reaction was quenched by slow addition of acetic acid (equimolar to KOH), the crude was extracted with DCM/H$_2$O, the organic layer was then anhydrified over a phase separator and the organic solvent removed. The title compound was obtained after purification over silica gel, unless otherwise noted.

General Procedure C: Synthesis of pyrazol-3-yl-quinolin-2(1H)-one Intermediates

In an appropriately sized microwaveable vessel, the quinolin-2(1H)-one acrolyl intermediate (1 eq) was dissolved in EtOH (0.2 M, 190 proof or 200 proof) and hydrazine monohydrate (2 eq) was added. The mixture was microwaved for 45 minutes at 110° C. (200 W). Ethanol was removed under vacuum, followed by purification over silica gel, unless otherwise noted.

General Procedures D: Synthesis of Acylated Quinolinone Pyrazoline Products

D1) In an appropriately sized microwaveable vessel, the pyrazol-3-ylquinolin-2(1H)-one intermediate (1.00 eq) was dissolved in anhydrous THF (0.5 M). The appropriate anhydride (2.00 equiv) was added. The solution was microwaved (200 W) with stirring for 45 min at the appropriate temperature. The THF was removed under vacuum, and the organics were dissolved in dichloromethane (DCM), washed three times with aqueous HCl (pH 2), anhydrified over a phase separator, the solvent removed and purified over silica gel.

D2) In a round bottomed flask, propionic acid (1.8 eq), HOBt (1.8 eq) and EDCI (1.8 eq) were stirred in DCM (0.50 M) at room temperature for 1 hour. Then a solution of the pyrazol-3-ylquinolin-2(1H)-one intermediate (1.0 eq) and Et$_3$N (2.50 eq) in DCM (0.50 M) were added. The reaction was stirred at rt for 3 hours. The organic layer was washed with aqueous NaHCO$_3$ (1M), citric acid 10% and water, dried over Na$_2$SO$_4$ and the solvent removed under reduced pressure. Title compound was obtained after purification over silica gel, unless otherwise noted.

All examples compounds are summarized in Table 1 and the synthetic procedures are described in detail below.

Example d.1. 4-[5-(6-chloro-2-oxo-4-phenyl-1H-quinolin-3-yl)-3-(4-fluorophenyl)-3,4-dihydropyrazol-2-yl]-4-oxo-butanoic acid Step 1. Synthesis of 3-acetyl-6-chloro-4-phenyl-1H-quinolin-2-one (a.1)

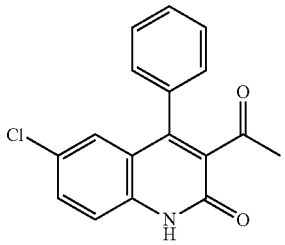 [SMILES: CC(=O)c1c(-c2ccccc2)c2cc(Cl)ccc2[nH]c1=O]

Compound a.1 was synthesized following the general procedure A2 with (2-amino-5-chlorophenyl)-phenyl-methanone (1.460 g, 6.3 mmol) yielding title compound (1.875 g, quantitative yield). $^1$H NMR (400 MHz, DMSO-d$_6$) δ 12.38 (s, 1H), 7.64 (dd, J=8.8, 2.4 Hz, 1H), 7.59-7.48 (m, 3H), 7.44 (d, J=8.8 Hz, 1H), 7.39-7.28 (m, 2H), 6.95 (d, J=2.3 Hz, 1H), 2.22 (s, 3H). R$_t$ 2.06 min (generic method). ESI-MS for C$_{17}$H$_{12}$ClNO$_2$: calculated 297.1, found m/z 298.0 [M+H]$^+$, 296.0 [M-H]$^-$.

Step 2. Synthesis of 6-chloro-3-[(E)-3-(4-fluorophenyl)prop-2-enoyl]-4-phenyl-1H-quinolin-2-one (b.1)

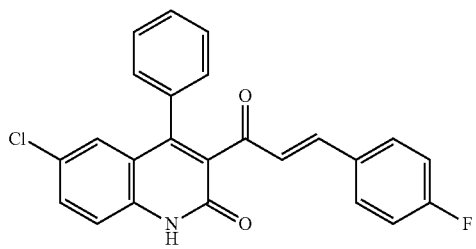 [SMILES: O=C(/C=C/c1ccc(F)cc1)c1c(-c2ccccc2)c2cc(Cl)ccc2[nH]c1=O]

Compound b.1 was synthesized following the general procedure B using a.1 (2.517 g, 8.45 mmol) and 4-fluorobenzaldehyde. Purification by normal phase flash column chromatography (solvent A: DCM, solvent B: EtOH, gradient: 0-20% solvent B) yielded title compound (2.548 g, yield 75%). $^1$H NMR (400 MHz, DMSO-d$_6$) δ 12.35 (s, 1H), 7.81-7.70 (m, 2H), 7.66 (dd, J=8.8, 2.4 Hz, 1H), 7.54-7.41 (m, 5H), 7.36-7.30 (m, 2H), 7.28-7.19 (m, 2H), 6.98 (d, J=2.4 Hz, 1H), 6.73 (d, J=16.4 Hz, 1H). R$_t$ 2.42 min (generic method). ESI-MS for C$_{24}$H$_{15}$ClFNO$_2$: calculated 403.1, found m/z 404.1 [M+H]$^+$, 402.1 [M-H]$^-$.

Step 3. Synthesis of 6-chloro-3-[5-(4-fluorophenyl)-4,5-dihydro-1H-pyrazol-3-yl]-4-phenyl-1H-quinolin-2-one (c.1)

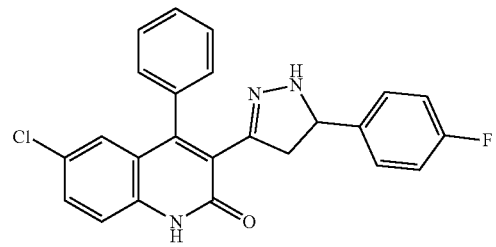 [SMILES: O=c1[nH]c2ccc(Cl)cc2c(-c2ccccc2)c1C1=NNC(c2ccc(F)cc2)C1]

Compound c.1 was synthesized following the general procedure C using b.1 (317 mg, 0.78 mmol). Purification by normal phase flash column chromatography (solvent A: DCM, solvent B: DCM/EtOH 8:2 v/v—gradient: 0-20% solvent B) yielded title compound (303 mg, yield 92%). $^1$H NMR (400 MHz, DMSO-d$_6$) δ 12.19 (s, 1H), 7.57 (dd, J=8.8, 2.4 Hz, 1H), 7.50 (m, 2H), 7.41 (d, J=8.8 Hz, 1H), 7.33 (dt, J=6.9, 1.5 Hz, 1H), 7.23 (dt, J=6.8, 2.0 Hz, 1H), 7.14 (d, J=3.2 Hz, 1H), 7.13-7.02 (m, 4H), 6.89 (d, J=2.3 Hz, 1H), 4.59 (td, J=10.9, 10.2, 3.1 Hz, 1H), 3.23 (dd, J=16.5, 11.0 Hz, 1H), 2.59-2.52 (m, 1H). R$_t$ 2.31 min (generic method). ESI-MS for C$_{24}$H$_{17}$ClFN$_3$O: calculated 417.1, found m/z 418 [M+H]$^+$, 416 [M-H]$^-$.

Step 4. Synthesis of 4-[5-(6-chloro-2-oxo-4-phenyl-1H-quinolin-3-yl)-3-(4-fluorophenyl)-3,4-dihydro-pyrazol-2-yl]-4-oxo-butanoic acid (d.1)

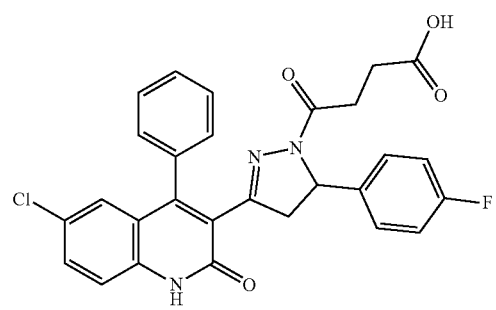 [SMILES: O=C(O)CCC(=O)N1N=C(c2c(-c3ccccc3)c3cc(Cl)ccc3[nH]c2=O)CC1c1ccc(F)cc1]

Compound d.1 was synthesized following the general procedure D1 using c.1 (270 mg, 0.65 mmol) with succinic anhydride (120° C., 200 W). Purification by normal phase flash column chromatography (solvent A: DCM, solvent B: DCM/EtOH 8:2 v/v—gradient: 0-50% solvent B) yielded title compound (208 mg, yield 62%). $^1$H NMR (400 MHz, DMSO-d$_6$) δ 12.38 (s, 1H), 12.02 (s, 1H), 7.64 (dd, J=8.8, 2.4 Hz, 1H), 7.60-7.37 (m, 5H), 7.28 (dt, J=6.8, 2.0 Hz, 1H), 7.04 (t, J=8.9 Hz, 2H), 6.94 (d, J=2.3 Hz, 1H), 6.88-6.76 (m, 2H), 5.32 (dd, J=12.0, 4.5 Hz, 1H), 3.73 (dd, J=18.5, 12.0 Hz, 1H), 2.79 (dd, J=18.4, 4.5 Hz, 1H), 2.48-2.40 (m, 2H), 2.32-2.26 (m, 2H). R$_t$ 2.04 min (generic method). ESI-MS for C$_{28}$H$_{21}$ClFN$_3$O$_4$: calculated 517.1, found m/z 518 [M+H]$^+$, 516 [M−H]$^-$.

Example d.2. 3-[2-acetyl-3-(4-fluorophenyl)-3,4-dihydropyrazol-5-yl]-6-chloro-4-phenyl-1H-quinolin-2-one

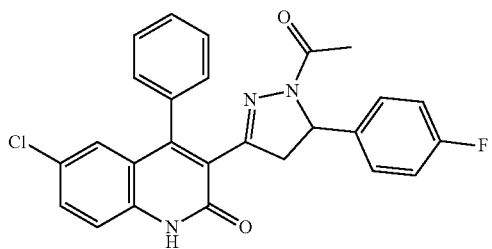 [SMILES: CC(=O)N1N=C(c2c(-c3ccccc3)c3cc(Cl)ccc3[nH]c2=O)CC1c1ccc(F)cc1]

Compound d.2 was synthesized following the general procedure D1 using c.1 (200 mg, 0.48 mmol) with acetic anhydride. Purification by normal phase flash column chromatography (solvent A: DCM, solvent B: MeOH—gradient: 0-20% solvent B) yielded title compound (207 mg, yield 47%). $^1$H NMR (400 MHz, DMSO-d$_6$) δ 12.38 (s, 1H), 7.64 (dd, J=8.8, 2.4 Hz, 1H), 7.61-7.50 (m, 3H), 7.46 (d, J=8.8 Hz, 1H), 7.41 (dt, J=6.6, 1.9 Hz, 1H), 7.29 (dt, J=6.4, 1.9 Hz, 1H), 7.06 (t, J=8.9 Hz, 2H), 6.94 (d, J=2.3 Hz, 1H), 6.84 (dd, J=8.6, 5.6 Hz, 2H), 5.32 (dd, J=12.0, 4.5 Hz, 1H), 3.73 (dd, J=18.4, 12.1 Hz, 1H), 2.84 (dd, J=18.5, 4.5 Hz, 1H), 1.88 (s, 3H). R$_t$ 2.38 min (generic method). ESI-MS for C$_{26}$H$_{19}$ClFN$_3$O$_2$: calculated 459.1, found m/z 460.1 [M+H]$^+$, 458.1 [M−H]$^-$.

Example d.3. 6-chloro-3-[3-(4-fluorophenyl)-2-propanoyl-3,4-dihydropyrazol-5-yl]-4-phenyl-1H-quinolin-2-one

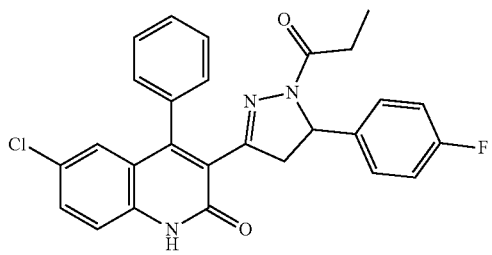 [SMILES: CCC(=O)N1N=C(c2c(-c3ccccc3)c3cc(Cl)ccc3[nH]c2=O)CC1c1ccc(F)cc1]

Compound d.3 was synthesized following the general procedure D2 using c.1 (250 mg, 0.60 mmol). Purification by normal phase flash column chromatography (solvent A: DCM, solvent B: MeOH—gradient: 0-1% solvent B) yielded title compound (60 mg, yield 21%). $^1$H NMR (400 MHz, DMSO-d$_6$) δ 12.38 (s, 1H), 7.64 (dd, J=2.0, 8.0 Hz, 1H), 7.58-7.50 (m, 3H), 7.45 (d, J=8.8 Hz, 1H), 7.41-7.39 (m, 1H), 7.28 (d, J=5.6 Hz, 1H), 7.06 (t, J=8.8 Hz, 2H), 6.93 (d, J=2.0 Hz, 1H), 6.84 (dd, J=4.0, 8.0, Hz, 2H), 5.32 (dd, J=8.0, 12.0 Hz, 1H), 3.73 (dd, J=12.0, 16.0 Hz, 1H), 2.81 (dd, J=4.0, 16.0 Hz, 1H), 2.30-2.16 (m, 2H), 0.83 (t, J=7.6 Hz, 3H). ESI-MS for C$_{27}$H$_{21}$ClFN$_3$O$_2$: calculated 473.1, found m/z 474.1 [M+H]$^+$, 472.1 [M−H]$^-$.

Example d.4. 3-[2-(3-aminopropanoyl)-3-(4-fluorophenyl)-3,4-dihydropyrazol-5-yl]-6-chloro-4-phenyl-1H-quinolin-2-one Step 1. Synthesis of 3-((tert-Butoxycarbonyl)amino)propanoic acid

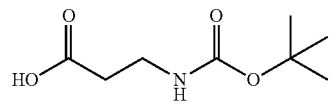

In a round bottom flask, β-alanine (1.0 g, 11.2 mmol) was stirred in a 1:1 v/v MeOH/1M NaOH mixture (20.0 ml), then Boc$_2$O (2.94 g, 13.5 mmol) was added at 0° C. The reaction mixture was left to gradually reach room temperature and stirred overnight. The solvent was removed under reduced pressure and the residue re-dissolved in EtOAc, then washed three times with 1M HCl$_{aq}$ (pH 2). The organic layer was anhydrified over Na$_2$SO$_4$ and the solvent removed yielding title compound (2.14 g, yield 99%). $^1$H NMR (400 MHz, DMSO-d$_6$) 12.14 (s, 1H), 6.78 (s, 1H), 3.12 (dd, J=8.0, 12.0 Hz, 2H), 2.34 (t, J=8.0 Hz, 2H), 1.37 (s, 9H).

Step 2. Synthesis of tert-butyl N-[3-[5-(6-chloro-2-oxo-4-phenyl-1H-quinolin-3-yl)-3-(4-fluorophenyl)-3,4-dihydropyrazol-2-yl]-3-oxo-propyl]carbamate

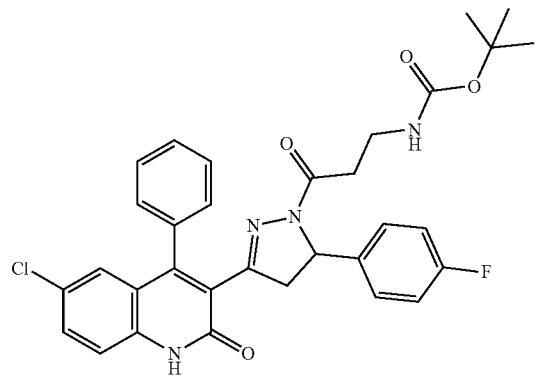 [SMILES: CC(C)(C)OC(=O)NCCC(=O)N1N=C(c2c(-c3ccccc3)c3cc(Cl)ccc3[nH]c2=O)CC1c1ccc(F)cc1]

In round bottom flask, 3-((tert-butoxycarbonyl)amino) propanoic acid (182 mg, 0.96 mmol), HOBt (156 mg, 1.16 mmol) and EDCI (222 mg, 1.16 mmol) were stirred in DCM (15 ml) at room temperature for 1 hour. Then a solution of the c.1 (400 mg, 0.96 mmol) and Et$_3$N (296 µl, 2.12 mmol) in DCM (5 ml) was added. The mixture was stirred at room temperature overnight. The solvent was removed under reduced pressure, the residue re-dissolved with EtOAc and then washed with water, 1M NaHCO$_3$ solution and finally 10% citric acid solution. The organic layer was anhydrified over Na$_2$SO$_4$ and evaporated to dryness. Purification by normal phase flash column chromatography (solvent A: DCM, solvent B: EtOAc—gradient: 0-30% solvent B) yielded title compound (72 mg, yield 25%). $^1$H NMR (400

MHz, DMSO-$d_6$) δ 12.40 (s, 1H), 7.65 (dd, J=4.0, 8.0 Hz, 1H), 7.59-7.50 (m, 4H), 7.46 (d, J=8.0 Hz, 1H), 7.43-7.42 (m, 1H), 7.28 (d, J=8.0 Hz, 1H), 7.04 (t, J=8.0 Hz, 2H), 6.93 (d, J=2.0 Hz, 1H), 6.80 (dd, J=4.0, 8.0 Hz, 2H), 6.66 (t, J=8.0 Hz, 1H), 5.32 (dd, J=4.0, 12.0 Hz, 1H), 3.73 (dd, J=12.0, 16.0 Hz, 1H), 2.99 (dd, J=8.0, 12.0 Hz, 2H), 2.76 (dd, J=4.0, 20.0 Hz, 1H) 2.41 (q, J=8.0 Hz, 2H), 1.38 (s, 9H).

Step 3. Synthesis of [3-[5-(6-chloro-2-oxo-4-phenyl-1H-quinolin-3-yl)-3-(4-fluorophenyl)-3,4-dihydropyrazol-2-yl]-3-oxo-propyl]ammonium; chloride

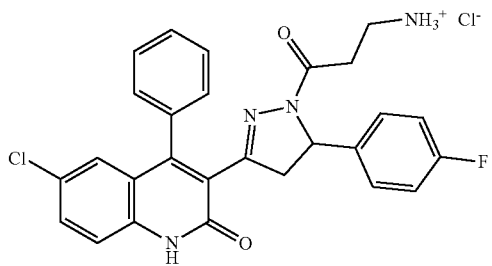

In round bottom flask tert-Butyl (3-(3-(6-chloro-2-oxo-4-phenyl-1,2-dihydroquinolin-3-yl)-5-(4-fluorophenyl)-4,5-dihydro-1H-pyrazol-1-yl)-3-oxopropyl) carbamate (200 mg, 0.34 mmol) was treated with 4M HCl in dioxane (4 ml) and stirred at rt for 15 minutes. The solvent was removed under reduced pressure and the solid washed three times with diethyl ether. The title compound was obtained by filtration (170 mg, yield 95%). $^1$H NMR (400 MHz, DMSO-$d_6$) δ 12.46 (s, 1H), 7.81 (br, 3H), 7.66 (dd, J=2.4, 8.8 Hz, 1H), 7.61-7.53 (m, 3H), 7.49 (d, J=8.8 Hz), 7.44-7.42 (m, 1H), 7.30 (d, J=6.8 Hz, 1H), 7.05 (t, J=8.8 Hz, 2H), 6.94 (d, J=2.0 Hz, 1H), 6.79 (dd, J=8.8, 5.2 Hz, 2H), 5.35 (dd, J=4.0, 12.0 Hz, 1H), 3.77 (dd, J=12.0, 16.0 Hz, 1H), 2.88 (dd, J=8.0, 12.0 Hz, 2H), 2.76 (dd, J=4.0, 20.0 Hz, 1H), 2.71-2.62 (m, 2H).

Step 4. Synthesis of 3-[2-(3-aminopropanoyl)-3-(4-fluorophenyl)-3,4-dihydropyrazol-5-yl]-6-chloro-4-phenyl-1H-quinolin-2-one (d.4)

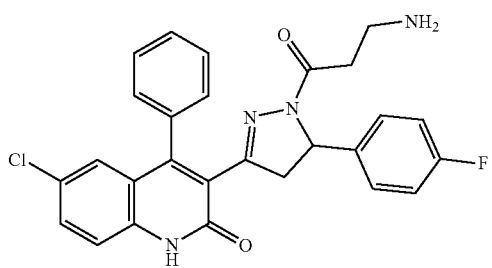 [SMILES: NCCC(=O)N1N=C(c2c(-c3ccccc3)c3cc(Cl)ccc3[nH]c2=O)CC1c1ccc(F)cc1]

In a round bottom flask 3-(1-(3-Aminopropanoyl)-5-(4-fluorophenyl)-4,5-dihydro-1H-pyrazol-3-yl)-6-chloro-4-phenylquinolin-2(1H)-one hydrochloride (110 mg, 0.21 mmol) was treated with NaOH 0.5 M (420 μl) in EtOAc (5 ml) stirring at rt for 30 minutes. The mixture was then diluted with further EtOAc and washed twice with water. The organic layer was anhydrified over Na$_2$SO$_4$, filtered and evaporated to dryness. Purification by normal phase flash column chromatography (solvent A: DCM, solvent B: MeOH, solvent C: NH$_4$OH—gradient: 0-10% solvent B—gradient: 0-0.1% solvent C) yielded title compound (50 mg, yield 50%). $^1$H NMR (400 MHz, DMSO-$d_6$) δ 7.63 (dd, J=12.0, 4.0 Hz, 1H), 7.57-7.50 (m, 3H), 7.54 (d, J=4.8 Hz, 1H), 7.42-7.40 (m, 1H), 7.26 (d, J=7.2 Hz, 1H), 7.03 (t, J=8.8 Hz, 2H), 6.92 (d, J=2.0 Hz, 1H), 6.81 (dd, J=2.0, 8.0 Hz, 2H), 5.32 (dd, J=2.0, 12.0 Hz, 1H), 3.72 (dd, J=12.0, 20.0 Hz, 1H), 2.76 (dd, J=4.0, 16.0 Hz, 1H), 2.57 (t, J=6.6 Hz, 2H), 2.42-2.28 (m, 2H). ESI-MS for C$_{27}$H$_{22}$ClFN$_4$O$_2$: calculated 488.1, found m/z 489.1 [M+H]$^+$, 487.1 [M−H]$^−$.

Example d.5. 4-[5-(6-chloro-2-oxo-4-phenyl-1H-quinolin-3-yl)-3-(4-chlorophenyl)-3,4-dihydropyrazol-2-yl]-4-oxo-butanoic acid Step 1. Synthesis of 6-chloro-3-[(E)-3-(4-chlorophenyl)prop-2-enoyl]-4-phenyl-1H-quinolin-2-one (b.2)

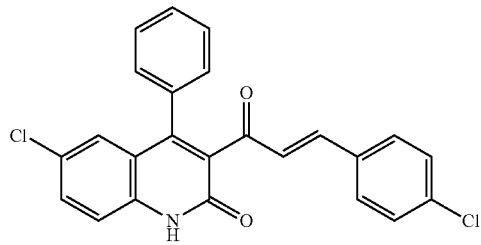 [SMILES: O=C(/C=C/c1ccc(Cl)cc1)c1c(-c2ccccc2)c2cc(Cl)ccc2[nH]c1=O]

Compound b.2 was synthesized following the general procedure B using a.1 (304 mg, 1.0 mmol) and 4-chlorobenzaldehyde. Title compound was obtained by precipitation and filtration from the reaction crude (429 mg, quantitative yield). $^1$H NMR (400 MHz, DMSO-$d_6$) δ 7.70 (d, J=8.6 Hz, 2H), 7.63 (dd, J=8.8, 2.4 Hz, 1H), 7.55-7.37 (m, 7H), 7.32 (dd, J=7.6, 1.9 Hz, 2H), 6.96 (d, J=2.4 Hz, 1H), 6.78 (d, J=16.4 Hz, 1H). R$_t$ 2.55 min (generic method). ESI-MS for C$_{24}$H$_{15}$Cl$_2$NO$_2$: calculated 419.0, found m/z 420.0 [M+H]$^+$, 418.0 [M−H]$^−$.

Step 2. Synthesis of 6-chloro-3-[5-(4-chlorophenyl)-4,5-dihydro-1H-pyrazol-3-yl]-4-phenyl-1H-quinolin-2-one (c.2)

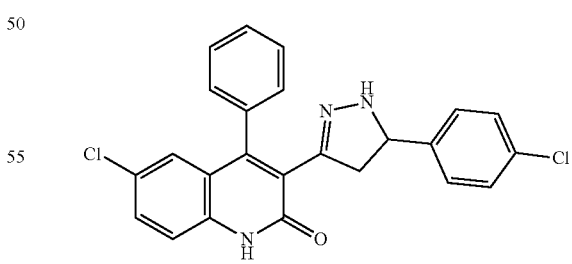

Compound c.2 was synthesized following the general procedure C using b.2 (429 mg, 1.0 mmol). Purification by normal phase flash column chromatography (solvent A: DCM, solvent B: DCM/EtOH 8:2 v/v—gradient: 0-50% solvent B) yielded title compound (301 mg, yield 68%). $^1$H NMR (400 MHz, DMSO-$d_6$) δ 12.20 (s, 1H), 7.58 (dd, J=8.8, 2.4 Hz, 1H), 7.50 (tt, J=7.5, 2.9 Hz, 3H), 7.42 (d, J=8.8 Hz, 1H), 7.34 (dt, J=7.0, 1.7 Hz, 1H), 7.30 (d, J=8.4 Hz, 2H), 7.23 (dt, J=7.3, 2.0 Hz, 1H), 7.18 (d, J=3.2 Hz, 1H), 7.09 (d, J=8.4 Hz, 2H), 6.90 (d, J=2.3 Hz, 1H), 4.59 (td, J=11.6, 9.3, 3.1 Hz, 1H), 3.25 (dd, J=16.5, 11.1 Hz, 1H), 2.58-2.53 (m, 1H). $R_t$ 2.45 min (generic method). ESI-MS for $C_{24}H_{17}C_{12}N_3O$: calculated 433.1, found m/z 434.1 [M+H]$^+$, 432.1 [M−H]$^−$.

Step 3. Synthesis of 4-[5-(6-chloro-2-oxo-4-phenyl-1H-quinolin-3-yl)-3-(4-chlorophenyl)-3,4-dihydro-pyrazol-2-yl]-4-oxo-butanoic acid (d.5)

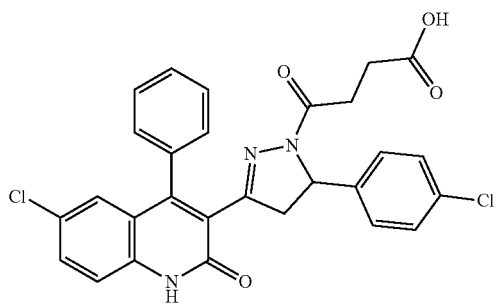 [SMILES: O=C(O)CCC(=O)N1N=C(c2c(-c3ccccc3)c3cc(Cl)ccc3[nH]c2=O)CC1c1ccc(Cl)cc1]

Compound d.5 was synthesized following the general procedure D1 using c.2 (253 mg, 0.58 mmol) with succinic anhydride (120° C., 200 W). Purification by normal phase flash column chromatography (solvent A: DCM, solvent B: DCM/EtOH 8:2 v/v—gradient: 0-60% solvent B) yielded title compound (231 mg, yield 74%). $^1$H NMR (400 MHz, DMSO-$d_6$) δ 12.38 (s, 1H), 12.03 (s, 1H), 7.64 (dd, J=8.8, 2.4 Hz, 1H), 7.59-7.48 (m, 3H), 7.45 (d, J=8.8 Hz, 1H), 7.41 (dt, J=6.3, 2.0 Hz, 1H), 7.31-7.23 (m, 3H), 6.93 (d, J=2.4 Hz, 1H), 6.83-6.76 (m, 2H), 5.32 (dd, J=12.0, 4.6 Hz, 1H), 3.74 (dd, J=18.5, 12.1 Hz, 1H), 2.78 (dd, J=18.5, 4.6 Hz, 1H), 2.48-2.41 (m, 2H), 2.29 (t, J=7.1 Hz, 2H). $R_t$ 2.16 min (generic method). ESI-MS for $C_{28}H_{21}C_{12}N_3O_4$: calculated 533.1, found m/z 534.1 [M+H]$^+$, 532.1 [M−H]$^−$.

Example d.6. 3-[2-acetyl-3-(4-chlorophenyl)-3,4-dihydropyrazol-5-yl]-6-chloro-4-phenyl-1H-quinolin-2-one

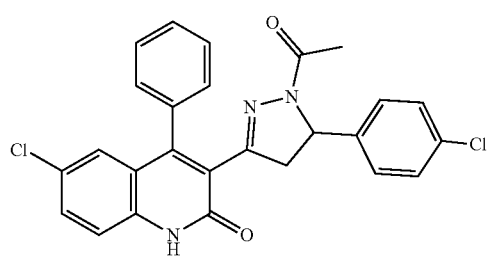 [SMILES: CC(=O)N1N=C(c2c(-c3ccccc3)c3cc(Cl)ccc3[nH]c2=O)CC1c1ccc(Cl)cc1]

Compound d.6 was synthesized following the general procedure D1 using c.2 (210 mg, 0.48 mmol) with acetic anhydride. Purification by normal phase flash column chromatography (solvent A: DCM, solvent B: MeOH—gradient: 0-1.5% solvent B) yielded title compound (200 mg, yield 94%). $^1$H NMR (400 MHz, DMSO-$d_6$) δ 12.41 (s, 1H), 7.64 (dt, J=8.0, 1.2 Hz, 1H), 7.58-7.53 (m, 3H), 7.44 (d, J=8.0 Hz, 1H), 7.41-7.39 (m, 1H), 7.30-7.28 (m, 3H), 6.93 (d, J=0.8 Hz, 1H), 6.80 (d, J=7.6 Hz, 2H), 5.32 (dd, J=12.0, 8.0 Hz, 1H), 3.74 (dd, J=20.0, 12.0 Hz, 1H), 2.82 (dd, J=16.0, 4.0 Hz, 1H), 1.87 (s, 3H). ESI-MS for $C_{26}H_{19}C_{12}N_3O_2$: calculated 475.1, found m/z 476.1 [M+H]$^+$, 474.1 [M−H]$^−$.

Example d.7. 6-chloro-3-[3-(4-chlorophenyl)-2-propanoyl-3,4-dihydropyrazol-5-yl]-4-phenyl-1H-quinolin-2-one

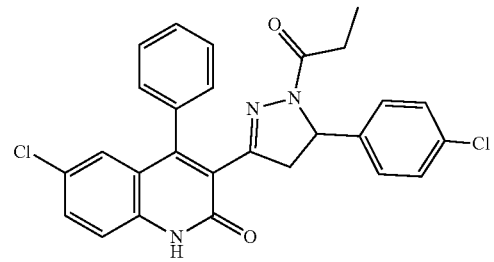 [SMILES: CCC(=O)N1N=C(c2c(-c3ccccc3)c3cc(Cl)ccc3[nH]c2=O)CC1c1ccc(Cl)cc1]

Compound d.7 was synthesized following the general procedure D2 using c.2 (200 mg, 0.46 mmol). Purification by normal phase flash column chromatography (solvent A: DCM, solvent B: MeOH—gradient: 0-2% solvent B) yielded title compound (76 mg, yield 34%). $^1$H NMR (400 MHz, DMSO-$d_6$) δ 12.38 (s, 1H), 7.63 (dd, J=9.0, 2.4 Hz, 1H), 7.54-7.49 (m, 3H), 7.44 (d, J=8.8 Hz, 1H), 7.41-7.39 (m, 1H), 7.30-7.27 (m, 3H), 6.92 (d, J=2.4 Hz, 1H), 6.80 (d, J=8.8 Hz, 2H), 5.31 (dd, J=12.2, 4.6 Hz, 1H), 3.74 (dd, J=18.4, 12.0 Hz, 1H), 2.80 (dd, J=18.4, 4.0 Hz, 1H), 2.31-2.14 (m, 2H), 0.82 (t, J=7.2 Hz, 3H). ESI-MS for $C_{27}H_{21}C_{12}N_3O_2$: calculated 489.1, found m/z 490.1 [M+H]$^+$, 488.1 [M−H]$^−$.

Example d.8. 4-[3-(4-bromophenyl)-5-(6-chloro-2-oxo-4-phenyl-1H-quinolin-3-yl)-3,4-dihydropyrazol-2-yl]-4-oxo-butanoic acid Step 1. Synthesis of 3-[(E)-3-(4-bromophenyl)prop-2-enoyl]-6-chloro-4-phenyl-1H-quinolin-2-one (b.3)

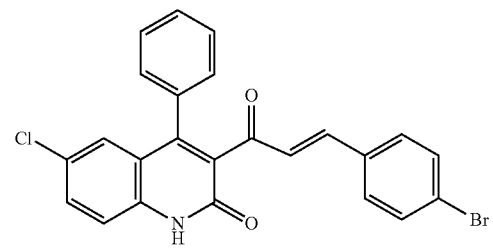 [SMILES: O=C(/C=C/c1ccc(Br)cc1)c1c(-c2ccccc2)c2cc(Cl)ccc2[nH]c1=O]

Compound b.3 was synthesized following the general procedure B using a.1 (328 mg, 1.1 mmol) and 4-bromobenzaldehyde. Title compound was obtained by precipitation and filtration from the reaction crude (511 mg, yield quantitative). $^1$H NMR (400 MHz, DMSO-$d_6$) δ 7.67-7.47 (m, 6H), 7.46-7.35 (m, 4H), 7.30 (dd, J=7.7, 1.8 Hz, 2H), 6.93 (d, J=2.3 Hz, 1H), 6.80 (d, J=16.4 Hz, 1H). $R_t$ 2.59 min (generic method). ESI-MS for $C_{24}H_{15}BrClNO_2$: calculated 462.0/464.0, found m/z 463.0/465.0 [M+H]$^+$, 461.0/463.0 [M−H]$^−$.

Step 2. Synthesis of 3-[5-(4-bromophenyl)-4,5-dihydro-1H-pyrazol-3-yl]-6-chloro-4-phenyl-1H-quinolin-2-one (c.3)

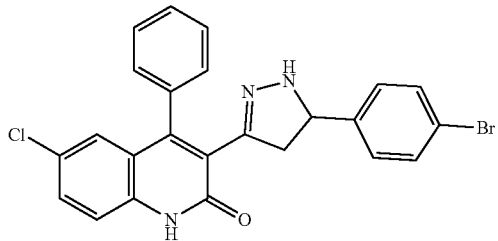 [SMILES: O=c1[nH]c2ccc(Cl)cc2c(-c2ccccc2)c1C1=NNC(c2ccc(Br)cc2)C1]

Compound c.3 was synthesized following the general procedure C using b.3 (510 mg, 1.1 mmol). Purification by normal phase flash column chromatography: solvent A: DCM, solvent B: DCM/EtOH 8:2 v/v—gradient: 0-40% solvent B. Yielding title compound 349 mg, 64%. $^1$H NMR (400 MHz, DMSO-$d_6$) δ 12.20 (s, 1H), 7.58 (dd, J=8.8, 2.4 Hz, 1H), 7.56-7.45 (m, 3H), 7.42 (dd, J=8.6, 5.5 Hz, 3H), 7.34 (dt, J=7.2, 1.6 Hz, 1H), 7.23 (dt, J=7.2, 2.0 Hz, 1H), 7.18 (d, J=3.2 Hz, 1H), 7.07-6.99 (m, 2H), 6.89 (d, J=2.3 Hz, 1H), 4.58 (td, J=11.6, 9.3, 3.2 Hz, 1H), 3.25 (dd, J=16.5, 11.1 Hz, 1H), 2.57-2.53 (m, 1H). $R_t$ 2.50 min (generic method). ESI-MS for $C_{24}H_{17}BrClN_3O$: calculated 476.0/478.0, found m/z 477.0/479.0 [M+H]$^+$, 475.0/477.0 [M−H]$^−$.

Step 3. Synthesis of 4-[3-(4-bromophenyl)-5-(6-chloro-2-oxo-4-phenyl-1H-quinolin-3-yl)-3,4-dihydropyrazol-2-yl]-4-oxo-butanoic acid (d.8)

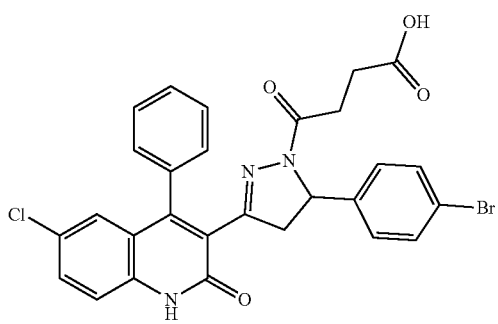 [SMILES: O=C(O)CCC(=O)N1N=C(c2c(-c3ccccc3)c3cc(Cl)ccc3[nH]c2=O)CC1c1ccc(Br)cc1]

Compound d.8 was synthesized following the general procedure D1 using c.3 (330 mg, 0.69 mmol) with succinic anhydride (120° C., 200 W). Purification by normal phase flash column chromatography (solvent A: DCM, solvent B: DCM/EtOH 8:2 v/v—gradient: 0-50% solvent B) yielded title compound (275 mg, yield 68%). $^1$H NMR (400 MHz, DMSO-$d_6$) δ 12.38 (s, 1H), 12.03 (s, 1H), 7.63 (dd, J=8.8, 2.3 Hz, 1H), 7.59-7.47 (m, 3H), 7.45 (d, J=8.8 Hz, 1H), 7.40 (d, J=8.4 Hz, 2H), 7.27 (dd, J=6.5, 1.8 Hz, 1H), 6.93 (d, J=2.3 Hz, 1H), 6.73 (d, J=8.5 Hz, 2H), 5.30 (dd, J=12.0, 4.6 Hz, 1H), 3.74 (dd, J=18.5, 12.1 Hz, 1H), 2.77 (dd, J=18.5, 4.6 Hz, 1H), 2.48-2.36 (m, 2H), 2.28 (t, J=7.1 Hz, 2H). $R_t$ 2.18 min (generic method). ESI-MS for $C_{28}H_{21}BrClN_3O_4$: calculated 576.0/579.0, found m/z 577.0/580.0 [M+H]$^+$, 575.0/578.0 [M−H]$^−$.

Example d.9. 3-[2-acetyl-3-(4-bromophenyl)-3,4-dihydropyrazol-5-yl]-6-chloro-4-phenyl-1H-quinolin-2-one Compound d.9 was synthesized following the general procedure D1 using c.3 (100 mg, 0.21 mmol) with acetic anhydride. Purification by normal phase flash column chromatography (solvent A: DCM, solvent B: MeOH—gradient: 0-2% solvent B) yielded title compound (80 mg, yield 73%). $^1$H NMR (400 MHz, DMSO-$d_6$) δ 12.39 (s, 1H), 7.64 (dd, J=8.0, 4.0 Hz, 1H), 7.57-7.53 (m, 3H), 7.45-7.39 (m, 4H), 7.28 (dd, J=6.0, 1.6 Hz, 1H), 6.93 (d, J=2.0 Hz, 1H), 6.75 (d, J=8.8 Hz, 2H), 5.30 (dd, J=12.0, 4.4 Hz, 1H), 3.74 (dd, J=18.5, 12.0 Hz, 1H), 2.82 (dd, J=4.0, 20.0 Hz, 1H), 1.86 (s, 3H). ESI-MS for $C_{26}H_{19}BrClN_3O_2$: calculated 518.0/520.0, found m/z 519.0/521.0 [M+H]$^+$, 517.0/519.0 [M−H]$^−$.

Example d.10. 3-[3-(4-bromophenyl)-2-propanoyl-3,4-dihydropyrazol-5-yl]-6-chloro-4-phenyl-1H-quinolin-2-one Compound d.10 was synthesized following the general procedure D2 using c.3 (150 mg, 0.31 mmol). Purification by normal phase flash column chromatography (solvent A: DCM, solvent B: MeOH—gradient: 0-0.5% solvent B) yielded title compound (60 mg, yield 36%). $^1$H NMR (400 MHz, DMSO-$d_6$) δ 12.41 (s, 1H), 7.64 (dd, J=12.8, 1.6 Hz, 1H), 7.55-7.50 (m, 3H), 7.46-7.41 (m, 4H), 7.28 (d, J=6.8 Hz, 1H), 6.93 (d, J=2.0 Hz, 1H), 6.75 (d, J=8.0 Hz, 2H), 5.30 (dd, J=12.4, 4.0 Hz, 1H), 3.75 (dd, J=18.4, 12.0 Hz, 1H), 2.80 (dd, J=18.2, 4.6 Hz, 1H), 2.31-2.14 (m, 2H), 0.83 (t, J=7.6 Hz, 3H). ESI-MS for $C_{27}H_{21}BrClN_3O_2$: calculated 532.1/534.1, found m/z 533.1/535.1 [M+H]$^+$, 531.1/533.1 [M−H]$^−$.

Example d.11. 4-[5-(6-chloro-2-oxo-4-phenyl-1H-quinolin-3-yl)-3-(4-methoxyphenyl)-3,4-dihydropyrazol-2-yl]-4-oxo-butanoic acid

Step 1. Synthesis of 6-chloro-3-[(E)-3-(4-methoxyphenyl)prop-2-enoyl]-4-phenyl-1H-quinolin-2-one (b.4)

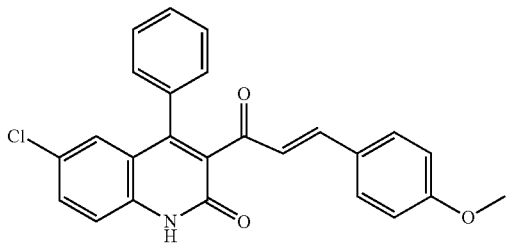 [SMILES: COc1ccc(/C=C/C(=O)c2c(-c3ccccc3)c3cc(Cl)ccc3[nH]c2=O)cc1]

Compound b.4 was synthesized following the general procedure B using a.1 (611 mg, 2.0 mmol) and p-anisaldehyde. Purification by normal phase flash column chromatography (solvent A: DCM, solvent B: EtOH—gradient: 0-5% solvent B) yielded title compound (867 mg, quantitative yield). $^1$H NMR (400 MHz, DMSO-$d_6$) δ 12.31 (s, 1H), 7.68-7.58 (m, 3H), 7.49-7.38 (m, 5H), 7.34-7.29 (m, 2H), 6.99-6.89 (m, 3H), 6.60 (d, J=16.3 Hz, 1H), 3.78 (s, 3H). $R_t$ 1.19 min (apolar method). ESI-MS for $C_{25}H_{18}ClNO_3$: calculated 415.1, found m/z 416.1 [M+H]$^+$, 414.1 [M−H]$^-$.

Step 2. Synthesis of 6-chloro-3-[5-(4-methoxyphenyl)-4,5-dihydro-1H-pyrazol-3-yl]-4-phenyl-1H-quinolin-2-one (c.4)

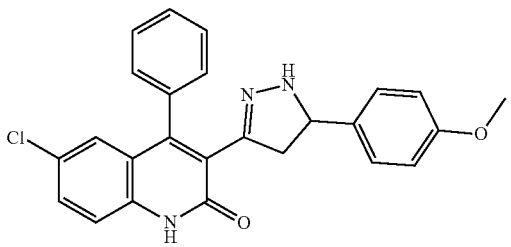 [SMILES: COc1ccc(C2CC(c3c(-c4ccccc4)c4cc(Cl)ccc4[nH]c3=O)=NN2)cc1]

Compound c.4 was synthesized following the general procedure C using b.4 (780 mg, 1.9 mmol). Purification by normal phase flash column chromatography (solvent A: DCM, solvent B: EtOH—gradient: 0-10% solvent B) yielded title compound (611 mg, yield 75%). $^1$H NMR (400 MHz, DMSO-$d_6$) δ 12.19 (s, 1H), 7.57 (dd, J=8.8, 2.3 Hz, 1H), 7.53-7.47 (m, 3H), 7.42 (d, J=8.8 Hz, 1H), 7.34 (dd, J=10.3, 3.8 Hz, 1H), 7.27-7.19 (m, 1H), 7.02 (dd, J=8.9, 5.9 Hz, 3H), 6.90 (d, J=2.3 Hz, 1H), 6.80 (d, J=8.7 Hz, 2H), 4.52 (td, J=10.4, 2.9 Hz, 1H), 3.73 (s, 3H), 3.18 (dd, J=16.4, 10.9 Hz, 1H), 2.58-2.53 (m, 1H). $R_t$ 2.24 min (generic method). ESI-MS for $C_{25}H_{20}ClN_3O_2$: calculated 429.1, found m/z 430.1 [M+H]$^+$, 428.1 [M−H]$^-$.

Step 3. Synthesis of 4-[5-(6-chloro-2-oxo-4-phenyl-1H-quinolin-3-yl)-3-(4-methoxyphenyl)-3,4-dihydropyrazol-2-yl]-4-oxo-butanoic acid (d.11)

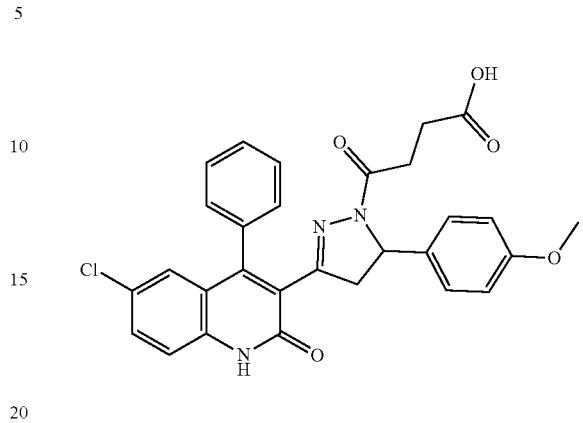

Compound d.11 was synthesized following the general procedure D1 using c.4 (320 mg, 0.74 mmol) with succinic anhydride (120° C., 200 W). Purification by normal phase flash column chromatography (solvent A: DCM, solvent B: EtOH—gradient: 0-15% solvent B) yielded title compound (339 mg, yield 86%). $^1$H NMR (400 MHz, DMSO-$d_6$) δ 12.19 (s, 1H), 7.57 (dd, J=8.8, 2.3 Hz, 1H), 7.51 (m, 3H), 7.42 (d, J=8.8 Hz, 1H), 7.36-7.31 (m, 1H), 7.27-7.21 (m, 1H), 7.02 (dd, J=8.9, 5.9 Hz, 3H), 6.90 (d, J=2.3 Hz, 1H), 6.80 (d, J=8.7 Hz, 2H), 4.52 (td, J=10.4, 2.9 Hz, 1H), 3.73 (s, 3H), 3.18 (dd, J=16.4, 10.9 Hz, 1H), 2.58-2.52 (m, 5H). $R_t$ 1.99 min (generic method). ESI-MS for $C_{29}H_{24}ClN_3O_5$: calculated 529.1, found m/z 530.1 [M+H]$^+$, 528.1 [M−H]$^-$.

Example d.12. 6-chloro-3-[3-(4-methoxyphenyl)-2-propanoyl-3,4-dihydropyrazol-5-yl]-4-phenyl-1H-quinolin-2-one

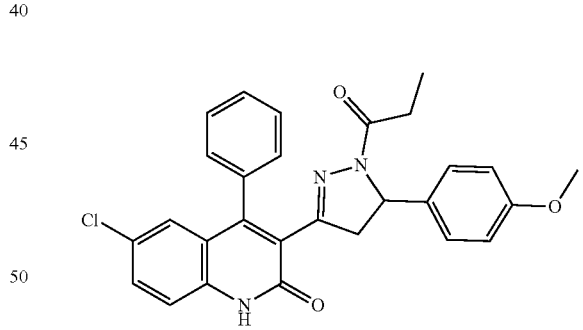

Compound d.12 was synthesized following the general procedure D2 using c.4 (150 mg, 0.358 mmol). Purification by normal phase flash column chromatography (solvent A: DCM, solvent B: MeOH—gradient: 0-2% solvent B) yielded title compound (100 mg, yield 59%). $^1$H NMR (400 MHz, DMSO-$d_6$) δ 12.36 (s, 1H), 7.64 (dd, J=8.6, 2.4 Hz, 1H), 7.56-7.52 (m, 3H), 7.45 (d, J=8.4 Hz, 1H), 7.40-7.38 (m, 1H), 7.29-7.27 (m, 1H), 6.92 (d, J=2.0 Hz, 1H), 6.75 (dd, J=15.2, 9.2 Hz, 4H), 5.24 (dd, J=12.0, 4.8 Hz, 1H), 3.72 (s, 3H), 3.70 (dd, J=16.0, 12.0 Hz, 1H), 2.81 (dd, J=20.0, 4.4 Hz, 1H), 2.29-2.12 (m, 2H), 0.82 (t, J=8.0 Hz, 3H). ESI-MS for $C_{28}H_{24}ClN_3O_3$: calculated 485.2, found 486.2 [M+H]$^+$, 484.3 [M−H]$^-$.

Example d.14. 4-[5-(6-chloro-2-oxo-4-phenyl-1H-quinolin-3-yl)-3-[4-(trifluoromethyl)phenyl]-3,4-dihydropyrazol-2-yl]-4-oxo-butanoic acid Step 1. Synthesis of 6-chloro-4-phenyl-3-[(E)-3-[4-(trifluoromethyl)phenyl]prop-2-enoyl]-1H-quinolin-2-one (b.6)

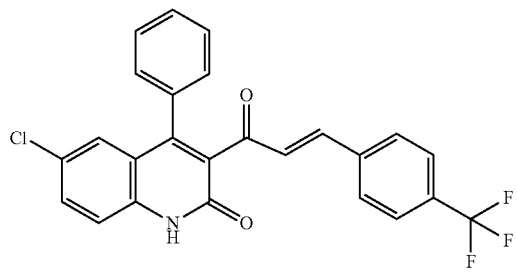 [SMILES: O=C(/C=C/c1ccc(C(F)(F)F)cc1)c1c(-c2ccccc2)c2cc(Cl)ccc2[nH]c1=O]

Compound b.6 was synthesized following the general procedure B using a.1 (760 mg, 2.5 mmol) and 4-(trifluoromethyl)benzaldehyde. Purification by normal phase flash column chromatography (solvent A: DCM, solvent B: EtOH—gradient: 0-5% solvent B) yielded title compound (820 mg, yield 71%). $^1$H NMR (400 MHz, DMSO-$d_6$) δ 12.38 (s, 1H), 7.89 (d, J=8.2 Hz, 2H), 7.74 (d, J=8.4 Hz, 2H), 7.67 (dd, J=8.8, 2.4 Hz, 1H), 7.62-7.57 (m, 1H), 7.53-7.40 (m, 4H), 7.36-7.31 (m, 2H), 6.99 (d, J=2.3 Hz, 1H), 6.91 (d, J=16.5 Hz, 1H). $R_t$ 1.65 min (apolar method). ESI-MS for $C_{25}H_{15}ClF_3NO_2$: calculated 453.1, found m/z 454.1 [M+H]$^+$, 452.1 [M−H]$^−$.

Step 2. Synthesis of 6-chloro-4-phenyl-3-[5-[4-(trifluoromethyl)phenyl]-4,5-dihydro-1H-pyrazol-3-yl]-1H-quinolin-2-one (c.6)

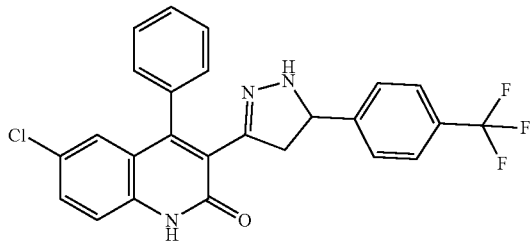 [SMILES: O=c1[nH]c2ccc(Cl)cc2c(-c2ccccc2)c1C1=NNC(c2ccc(C(F)(F)F)cc2)C1]

Compound c.6 was synthesized following the general procedure C using b.6 (752 mg, 1.7 mmol). Purification by normal phase flash column chromatography (solvent A: DCM, solvent B: EtOH—gradient: 0-5% solvent B) yielded title compound (696 mg, yield 90%). $^1$H NMR (400 MHz, DMSO-$d_6$) δ 12.21 (s, 1H), 7.63-7.56 (m, 3H), 7.56-7.44 (m, 3H), 7.42 (d, J=8.8 Hz, 1H), 7.37-7.32 (m, 1H), 7.29 (d, J=8.5 Hz, 3H), 7.25-7.20 (m, 1H), 6.90 (d, J=2.3 Hz, 1H), 4.75-4.64 (m, 1H), 3.39-3.25 (m, 1H), 2.63-2.54 (m, 1H). $R_t$ 2.52 min (generic method). ESI-MS for $C_{25}H_{17}ClF_3N_3O$: calculated 467.1, found m/z 468.1 [M+H]$^+$, 466.1 [M−H]$^−$.

Step 3. Synthesis of 4-[5-(6-chloro-2-oxo-4-phenyl-1H-quinolin-3-yl)-3-[4-(trifluoromethyl)phenyl]-3,4-dihydropyrazol-2-yl]-4-oxo-butanoic acid (d.14)

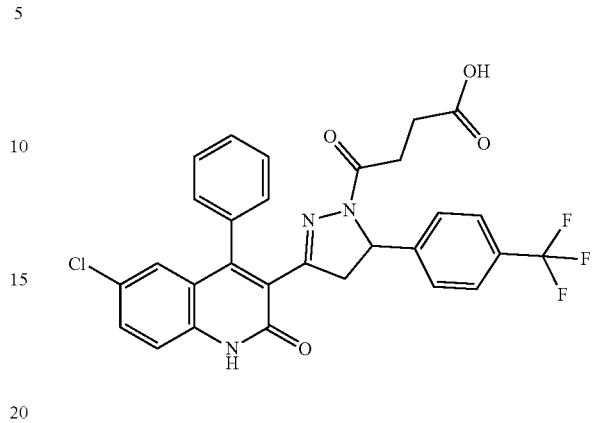

Compound d.14 was synthesized following the general procedure D1 using c.6 (309 mg, 0.66 mmol) with succinic anhydride (120° C., 200 W). Purification by normal phase flash column chromatography (solvent A: DCM, solvent B: EtOH—gradient: 0-10% solvent B) yielded title compound (266 mg, yield 71%). $^1$H NMR (400 MHz, DMSO-$d_6$) δ 12.38 (s, 1H), 12.05 (s, 1H), 7.63 (dd, J=8.8, 2.4 Hz, 1H), 7.60-7.39 (m, 7H), 7.31-7.19 (m, 1H), 7.00 (d, J=8.1 Hz, 2H), 6.93 (d, J=2.3 Hz, 1H), 5.42 (dd, J=12.1, 4.7 Hz, 1H), 3.78 (dd, J=18.5, 12.2 Hz, 1H), 2.80 (dd, J=18.5, 4.7 Hz, 1H), 2.59-2.38 (m, 2H), 2.36-2.26 (m, 2H). $R_t$ 2.22 min (generic method). ESI-MS for $C_{29}H_{21}ClF_3N_3O_4$: calculated 567.1, found m/z 568.1 [M+H]$^+$, 566.1 [M−H]$^−$.

Example d.15. 3-[2-acetyl-3-[4-(trifluoromethyl)phenyl]-3,4-dihydropyrazol-5-yl]-6-chloro-4-phenyl-1H-quinolin-2-one

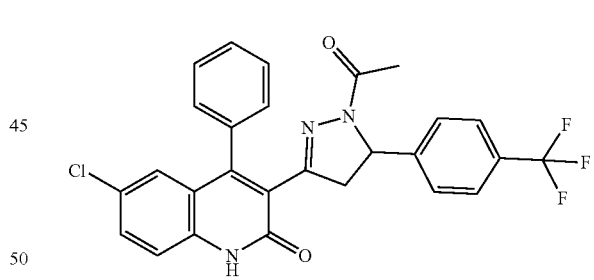

Compound d.15 was synthesized following the general procedure D1 using c.6 (326 mg, 0.70 mmol) with acetic anhydride (165° C., 200 W). Purification by normal phase flash column chromatography (solvent A: DCM, solvent B: EtOH—gradient: 0-5% solvent B) yielded title compound (268 mg, yield 74%). $^1$H NMR (400 MHz, DMSO-$d_6$) δ 12.39 (s, 1H), 7.67-7.49 (m, 6H), 7.46 (d, J=8.8 Hz, 1H), 7.44-7.39 (m, 1H), 7.32-7.25 (m, 1H), 7.03 (d, J=8.0 Hz, 2H), 6.95 (d, J=2.4 Hz, 1H), 5.42 (dd, J=12.1, 4.7 Hz, 1H), 3.79 (dd, J=18.5, 12.1 Hz, 1H), 2.87 (dd, J=18.5, 4.8 Hz, 1H), 1.89 (s, 3H). $R_t$ 2.55 min (generic method). ESI-MS for $C_{27}H_{19}ClF_3N_3O_2$: calculated 509.1, found m/z 510.1 [M+H]$^+$, 508.1 [M−H]$^−$.

Example d.16. 4-[3-(4-tert-butylphenyl)-5-(6-chloro-2-oxo-4-phenyl-1H-quinolin-3-yl)-3,4-dihydropyrazol-2-yl]-4-oxo-butanoic acid

Step 1. Synthesis of 3-[(E)-3-(4-tert-butylphenyl)prop-2-enoyl]-6-chloro-4-phenyl-1H-quinolin-2-one (b.7)

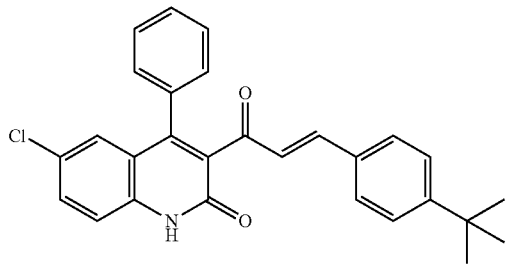 [SMILES: CC(C)(C)c1ccc(/C=C/C(=O)c2c(-c3ccccc3)c3cc(Cl)ccc3[nH]c2=O)cc1]

Compound b.7 was synthesized following the general procedure B using a.1 (543 mg, 1.8 mmol) and 4-tert-buthylbenzaldehyde. Purification by normal phase flash column chromatography (solvent A: DCM, solvent B: EtOH—gradient: 0-10% solvent B) yielded title compound (441 mg, yield 55%). $^1$H NMR (400 MHz, DMSO-$d_6$) δ 12.33 (s, 1H), 7.64 (dd, J=8.8, 2.4 Hz, 1H), 7.58 (d, J=8.5 Hz, 2H), 7.50-7.37 (m, 7H), 7.32 (dd, J=7.7, 1.9 Hz, 2H), 6.97 (d, J=2.4 Hz, 1H), 6.69 (d, J=16.4 Hz, 1H), 1.26 (s, 9H). $R_t$ 2.18 min (generic method). ESI-MS for $C_{28}H_{24}ClNO_2$: calculated 441.1, found m/z 442.1 [M+H]$^+$, 440.1 [M−H]$^−$.

Step 2. Synthesis of 3-[5-(4-tert-butylphenyl)-4,5-dihydro-1H-pyrazol-3-yl]-6-chloro-4-phenyl-1H-quinolin-2-one (c.7)

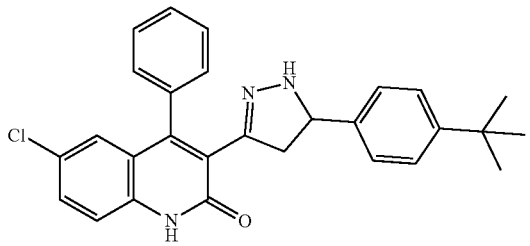 [SMILES: CC(C)(C)c1ccc(C2CC(c3c(-c4ccccc4)c4cc(Cl)ccc4[nH]c3=O)=NN2)cc1]

Compound c.7 was synthesized following the general procedure C using b.7 (369 mg, 0.83 mmol). Purification by normal phase flash column chromatography (solvent A: CHX, solvent B: AcOEt—gradient: 0-90% solvent B) yielded title compound (351 mg, yield 93%). $^1$H NMR (400 MHz, DMSO-$d_6$) δ 12.20 (s, 1H), 7.56 (dd, J=8.8, 2.4 Hz, 1H), 7.49 (dtd, J=9.6, 7.2, 5.3 Hz, 3H), 7.42 (d, J=8.8 Hz, 1H), 7.33 (dt, J=7.2, 1.7 Hz, 1H), 7.25 (d, J=8.3 Hz, 3H), 7.06 (d, J=3.0 Hz, 1H), 7.02 (d, J=8.4 Hz, 2H), 6.90 (d, J=2.3 Hz, 1H), 4.54 (t, J=10.4 Hz, 1H), 3.19 (dd, J=16.4, 10.9 Hz, 1H), 2.58 (dd, J=16.4, 9.6 Hz, 1H), 1.26 (s, 9H). $R_t$ 1.82 min (generic method). ESI-MS for $C_{28}H_{26}ClN_3O$: calculated 455.2, found m/z 456.2 [M+H]$^+$, 454.2 [M−H]$^−$.

Step 3. Synthesis of 4-[3-(4-tert-butylphenyl)-5-(6-chloro-2-oxo-4-phenyl-1H-quinolin-3-yl)-3,4-dihydropyrazol-2-yl]-4-oxo-butanoic acid (d.16)

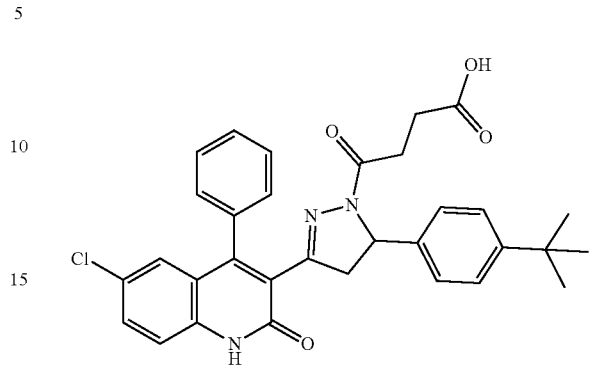

Compound d.16 was synthesized following the general procedure D1 using c.7 (124 mg, 0.27 mmol) with succinic anhydride (120° C., 200 W). Purification by normal phase flash column chromatography (solvent A: DCM, solvent B: EtOH—gradient: 0-20% solvent B) yielded title compound (121 mg, yield 81%). $^1$H NMR (400 MHz, DMSO-$d_6$) δ 12.27 (d, J=78.0 Hz, 1H), 12.08 (s, 1H), 7.64 (dd, J=8.8, 2.3 Hz, 1H), 7.59-7.47 (m, 3H), 7.47-7.43 (m, 1H), 7.40 (dd, J=4.6, 2.1 Hz, 1H), 7.28 (d, J=7.5 Hz, 1H), 7.23 (d, J=8.3 Hz, 2H), 6.93 (d, J=2.3 Hz, 1H), 6.73 (d, J=8.3 Hz, 2H), 5.26 (dd, J=11.9, 4.5 Hz, 1H), 3.69 (dt, J=24.9, 12.5 Hz, 1H), 2.85 (ddd, J=23.0, 18.2, 4.3 Hz, 1H), 2.47 (dd, J=6.7, 4.0 Hz, 2H), 2.36-2.22 (m, 2H), 1.27 (s, 9H). $R_t$ 2.39 min (generic method). ESI-MS for $C_{32}H_{30}ClN_3O_4$: calculated 555.2, found m/z 556.2 [M+H]$^+$, 554.2 [M−H]$^−$.

Example d.17. 3-[2-acetyl-3-(4-tert-butylphenyl)-3,4-dihydropyrazol-5-yl]-6-chloro-4-phenyl-1H-quinolin-2-one

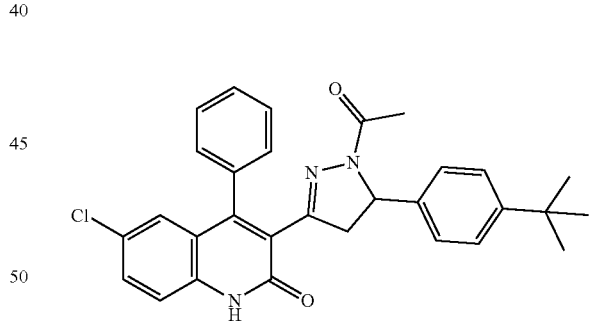

Compound d.17 was synthesized following the general procedure D1 using c.7 (141 mg, 0.31 mmol) with acetic anhydride (165° C., 200 W). Purification by normal phase flash column chromatography (solvent A: DCM, solvent B: EtOH—gradient: 0-5% solvent B) yielded title compound (105 mg, yield 68%). $^1$H NMR (400 MHz, DMSO-$d_6$) δ 12.36 (s, 1H), 7.63 (dt, J=9.8, 4.9 Hz, 1H), 7.60-7.48 (m, 3H), 7.44 (t, J=9.5 Hz, 1H), 7.41-7.36 (m, 1H), 7.30 (d, J=7.1 Hz, 1H), 7.24 (d, J=8.3 Hz, 2H), 6.94 (d, J=2.3 Hz, 1H), 6.75 (d, J=8.3 Hz, 2H), 5.32-5.17 (m, 1H), 3.69 (dt, J=28.5, 14.3 Hz, 1H), 2.86 (dd, J=18.4, 4.6 Hz, 1H), 1.86 (s, 3H), 1.27 (s, 9H). $R_t$ 1.83 min (apolar method). ESI-MS for $C_{30}H_{28}ClN_3O_2$: calculated 497.2, found m/z 498.2 [M+H]$^+$, 496.2 [M−H]$^−$.

Example d.18. 4-[5-(6-chloro-2-oxo-4-phenyl-1H-quinolin-3-yl)-3-(3-fluoro-4-methoxy-phenyl)-3,4-dihydropyrazol-2-yl]-4-oxo-butanoic acid

Step 1. Synthesis of 3-fluoro-4-methoxy-benzaldehyde

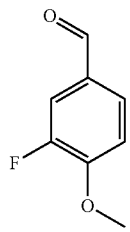

In a screw capped pressure tube 3-fluoro-4-hydroxybenzaldehyde (461 mg, 3.29 mmol) was dissolved with 3.0 ml of anhydrous DMF then potassium carbonate (1.49 g, 10.8 mmol) was added and the mixture kept under stirring for 5 minutes at rt MeI (245 µl, 3.95 mmol) was then added. The reaction was thus heated to 70° C. and stirred for 3.5 hours. The crude mixture was diluted with CHCl₃ and washed three times with water. The organic layer was anhydrified through a phase separator and the solvent removed under reduced pressure. Purification by normal phase flash column chromatography (solvent A: CHX—Solvent B: AtOAc—gradient: 0-20% solvent B) yielded title compound (440 mg, yield 87%). ¹H NMR (400 MHz, DMSO-$d_6$) δ 9.87 (d, J=2.1 Hz, 1H), 7.79 (ddd, J=8.4, 2.0, 1.0 Hz, 1H), 7.69 (dd, J=11.4, 2.0 Hz, 1H), 7.39 (t, J=8.4 Hz, 1H), 3.95 (s, 3H). $R_t$ 1.59 min (generic method). ESI-MS for $C_8H_7FO_2$: calculated 154.0, found m/z 156.0 [M+H]⁺.

Step 2. Synthesis of 6-chloro-3-[(E)-3-(3-fluoro-4-methoxy-phenyl)prop-2-enoyl]-4-phenyl-1H-quinolin-2-one (b.8)

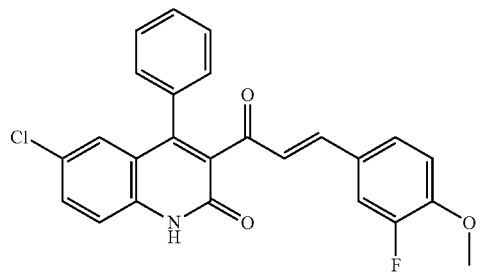 [SMILES: COc1ccc(/C=C/C(=O)c2c(-c3ccccc3)c3cc(Cl)ccc3[nH]c2=O)cc1F]

Compound b.8 was synthesized following the general procedure B using a.1 (473 mg, 1.6 mmol) and 3-Fluoro-4-methoxybenzaldehyde. Title compound was obtained after precipitation and filtration from the reaction crude (547 mg, yield 79%). ¹H NMR (600 MHz, DMSO-$d_6$) δ 12.38 (s, 1H), 7.70-7.62 (m, 2H), 7.52-7.40 (m, 6H), 7.35-7.30 (m, 2H), 7.18 (t, J=8.7 Hz, 1H), 6.97 (d, J=2.4 Hz, 1H), 6.69 (d, J=16.3 Hz, 1H), 3.88 (s, 3H). ESI-MS for $C_{25}H_{17}ClFNO_3$: calculated 433.1, found m/z 434.1 [M+H]⁺, 432.1 [M−H]⁻.

Step 3. Synthesis of 6-chloro-3-[5-(3-fluoro-4-methoxy-phenyl)-4,5-dihydro-1H-pyrazol-3-yl]-4-phenyl-1H-quinolin-2-one (c.8)

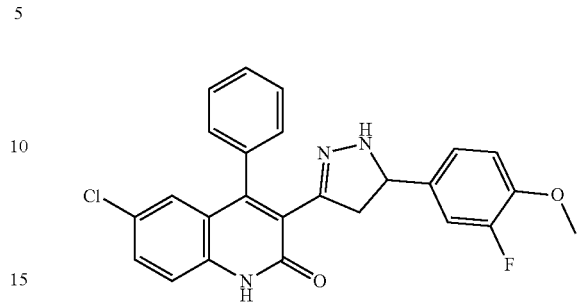

Compound c.8 was synthesized following the general procedure C using b.8 (203 mg, 0.50 mmol). Purification by normal phase flash column chromatography (solvent A: DCM, solvent B: EtOH—gradient: 0-5% solvent B) yielded title compound (213 mg, quantitative yield). ¹H NMR (400 MHz, DMSO-$d_6$) δ 12.20 (s, 1H), 7.63-7.39 (m, 5H), 7.35-7.29 (m, 1H), 7.23 (dt, J=7.0, 2.0 Hz, 1H), 7.12 (d, J=3.1 Hz, 1H), 7.03 (t, J=8.6 Hz, 1H), 6.97-6.85 (m, 3H), 4.55 (ddd, J=11.5, 9.0, 2.9 Hz, 1H), 3.81 (s, 3H), 3.19 (dd, J=16.5, 11.0 Hz, 1H), 2.60-2.53 (m, 1H). $R_t$ 2.27 min (generic method). ESI-MS for $C_{25}H_{19}ClFN_3O_2$: calculated 447.1, found m/z 448.1 [M+H]⁺, 446.1 [M−H]⁻.

Step 4. Synthesis of 4-[5-(6-chloro-2-oxo-4-phenyl-1H-quinolin-3-yl)-3-(3-fluoro-4-methoxy-phenyl)-3,4-dihydropyrazol-2-yl]-4-oxo-butanoic acid (d.18)

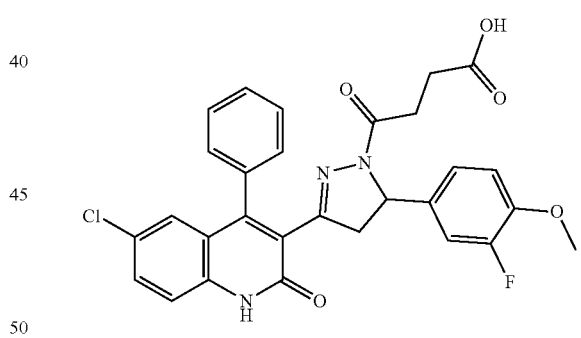

Compound d.18 was synthesized following the general procedure D1 using c.8 (184 mg, 0.41 mmol) with succinic anhydride (120° C., 200 W). Purification by normal phase flash column chromatography (solvent A: DCM, solvent B: EtOH—gradient: 0-10% solvent B) yielded title compound (115 mg, yield 51%). ¹H NMR (400 MHz, DMSO-$d_6$) δ 12.38 (s, 1H), 12.06 (s, 1H), 7.64 (dd, J=8.8, 2.4 Hz, 1H), 7.59-7.43 (m, 4H), 7.43-7.38 (m, 1H), 7.29 (dd, J=7.1, 1.9 Hz, 1H), 7.01 (t, J=8.8 Hz, 1H), 6.94 (d, J=2.4 Hz, 1H), 6.69-6.61 (m, 2H), 5.27 (dd, J=12.0, 4.5 Hz, 1H), 3.82 (s, 3H), 3.70 (dd, J=18.5, 12.0 Hz, 1H), 2.82 (dd, J=18.5, 4.5 Hz, 1H), 2.46 (dd, J=14.3, 7.0 Hz, 2H), 2.29 (t, J=7.2 Hz, 2H). $R_t$ 2.00 min (generic method). ESI-MS for $C_{29}H_{23}ClFN_3O_5$: calculated 547.1, found m/z 548.1 [M+H]⁺, 546.1 [M−H]⁻.

Example d.19. 4-[5-[6-chloro-4-(4-methoxyphenyl)-2-oxo-1H-quinolin-3-yl]-3-(4-fluorophenyl)-3,4-dihydropyrazol-2-yl]-4-oxo-butanoic acid

Step 1. Synthesis of 3-acetyl-6-chloro-4-(4-methoxyphenyl)-1H-quinolin-2-one (a.2)

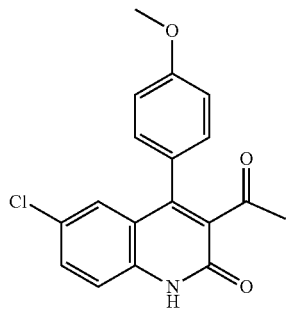 [SMILES: COc1ccc(-c2c(C(C)=O)c(=O)[nH]c3ccc(Cl)cc23)cc1]

Compound a.2 was synthesized following the general procedure A1 with (2-Amino-5-chlorophenyl) (4-methoxyphenyl)methanone (495 mg, 1.9 mmol). Purification by normal phase flash column chromatography (solvent A: DCM, solvent B: DCM/EtOH 8:2 v/v—gradient: 0-20% solvent B) yielded title compound (343 mg, yield 56%). $^1$H NMR (400 MHz, DMSO-$d_6$) δ 12.33 (s, 1H), 7.63 (dd, J=8.8, 2.3 Hz, 1H), 7.43 (d, J=8.8 Hz, 1H), 7.26 (d, J=8.6 Hz, 2H), 7.08 (d, J=8.7 Hz, 2H), 7.03 (d, J=2.3 Hz, 1H), 3.84 (s, 3H), 2.19 (s, 3H). $R_t$ 2.04 min (generic method). ESI-MS for $C_{18}H_{14}ClNO_3$: calculated 327.1, found m/z 328.1 [M+H]$^+$, 326.1 [M−H]$^−$.

Step 2. Synthesis of 6-chloro-3-[(E)-3-(4-fluorophenyl)prop-2-enoyl]-4-(4-methoxyphenyl)-1H-quinolin-2-one (b.9)

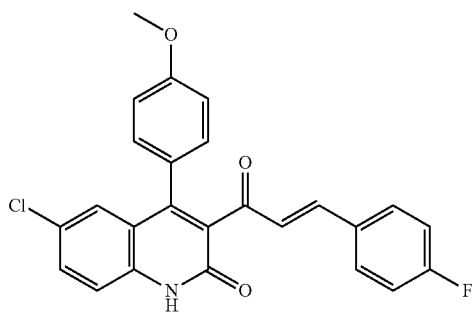 [SMILES: COc1ccc(-c2c(C(=O)/C=C/c3ccc(F)cc3)c(=O)[nH]c3ccc(Cl)cc23)cc1]

Compound b.9 was synthesized following the general procedure B using a.2 (231 mg, 0.7 mmol) and 4-fluorobenzaldehyde. Title compound was obtained after precipitation and filtration from the reaction crude (253 mg, yield 83%). $^1$H NMR (400 MHz, DMSO-$d_6$) δ 7.74 (dd, J=8.6, 5.5 Hz, 2H), 7.58 (dd, J=8.8, 2.4 Hz, 1H), 7.51 (d, J=8.9 Hz, 1H), 7.43 (d, J=16.4 Hz, 1H), 7.23 (t, J=9.1 Hz, 4H), 7.06-6.95 (m, 3H), 6.73 (d, J=16.4 Hz, 1H), 3.76 (s, 3H). $R_t$ 2.35 min (generic method). ESI-MS for $C_{25}H_{17}ClFNO_3$: calculated 433.1, found m/z 434.1 [M+H]$^+$, 432.1 [M−H]$^−$.

Step 3. Synthesis of 6-chloro-3-[5-(4-fluorophenyl)-4,5-dihydro-1H-pyrazol-3-yl]-4-(4-methoxyphenyl)-1H-quinolin-2-one (c.9)

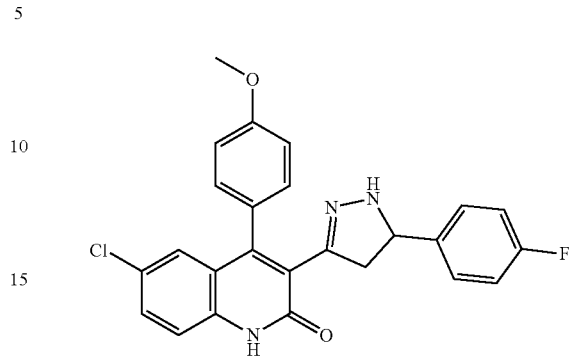

Compound c.9 was synthesized following the general procedure C using b.9 (250 mg, 0.60 mmol). Purification by normal phase flash column chromatography (solvent A: DCM, solvent B: DCM/EtOH 8:2 v/v—gradient: 0-25% solvent B) yielded title compound (179 mg, yield 69%). $^1$H NMR (400 MHz, DMSO-$d_6$) δ 12.15 (s, 1H), 7.57 (dd, J=8.8, 2.4 Hz, 1H), 7.40 (d, J=8.8 Hz, 1H), 7.26 (dd, J=8.4, 2.3 Hz, 1H), 7.20-6.93 (m, 9H), 4.60 (dd, J=11.0, 9.2 Hz, 1H), 3.85 (s, 3H), 3.20 (dd, J=16.4, 11.0 Hz, 1H), 2.55-2.53 (s, 1H). $R_t$ 2.30 min (generic method). ESI-MS for $C_{25}H_{19}ClFN_3O_2$: calculated 447.1, found m/z 448.1 [M+H]$^+$, 446.1 [M−H]$^−$.

Step 4. Synthesis of 4-[5-[6-chloro-4-(4-methoxyphenyl)-2-oxo-1H-quinolin-3-yl]-3-(4-fluorophenyl)-3,4-dihydropyrazol-2-yl]-4-oxo-butanoic acid (d.19)

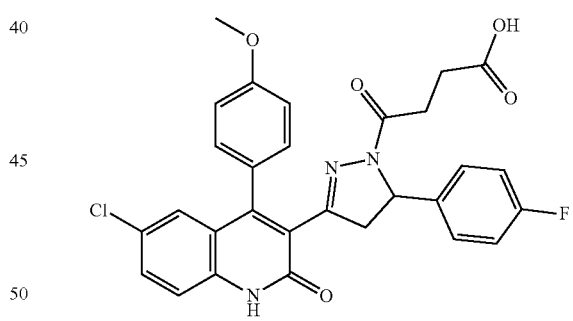

Compound d.19 was synthesized following the general procedure D1 using c.9 (164 mg, 0.36 mmol) with succinic anhydride (120° C., 200 W). Purification by normal phase flash column chromatography (solvent A: DCM, solvent B: DCM/EtOH 8:2 v/v—gradient: 0-80% solvent B) yielded title compound (136 mg, yield 69%). $^1$H NMR (400 MHz, DMSO-$d_6$) δ 12.34 (s, 1H), 12.08 (s, 1H), 7.63 (dd, J=8.8, 2.3 Hz, 1H), 7.44 (d, J=8.8 Hz, 1H), 7.32 (dd, J=8.5, 2.3 Hz, 1H), 7.20 (dd, J=8.4, 2.2 Hz, 1H), 7.10 (dd, J=8.5, 2.7 Hz, 1H), 7.02 (td, J=8.9, 6.9 Hz, 4H), 6.91-6.83 (m, 2H), 5.33 (dd, J=11.9, 4.4 Hz, 1H), 3.86 (s, 3H), 3.66 (dd, J=18.4, 12.0 Hz, 1H), 2.73 (dd, J=18.4, 4.4 Hz, 1H), 2.59 (tt, J=15.5, 6.8 Hz, 2H), 2.33 (t, J=6.8 Hz, 2H). $R_t$ 2.05 min (generic method). ESI-MS for $C_{29}H_{23}ClFN_3O_5$: calculated 547.1, found m/z 548.1 [M+H]$^+$, 546.1 [M−H]$^−$.

Example d.20. 4-[5-(6-chloro-2-oxo-4-phenyl-1H-quinolin-3-yl)-3-(2-furyl)-3,4-dihydropyrazol-2-yl]-4-oxo-butanoic acid Step 1. Synthesis of 6-chloro-3-[(E)-3-(2-furyl)prop-2-enoyl]-4-phenyl-1H-quinolin-2-one (b.10)

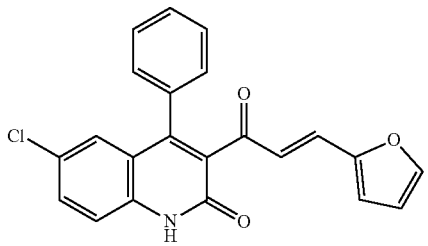 [SMILES: O=C(/C=C/c1ccco1)c1c(-c2ccccc2)c2cc(Cl)ccc2[nH]c1=O]

Compound b.10 was synthesized following the general procedure B using a.1 (503 mg, 1.7 mmol) and furan-2-carbaldehyde. Purification by normal phase flash column chromatography (solvent A: DCM, solvent B: EtOH—gradient: 0-5% solvent B) yielded title compound (471 mg, yield 74%). $^1$H NMR (400 MHz, DMSO-$d_6$) δ 12.34 (s, 1H), 7.85 (d, J=1.7 Hz, 1H), 7.64 (dd, J=8.8, 2.4 Hz, 1H), 7.51-7.40 (m, 4H), 7.35 (s, 1H), 7.33-7.26 (m, 2H), 6.96 (dd, J=6.9, 2.9 Hz, 2H), 6.63 (dd, J=3.5, 1.8 Hz, 1H), 6.37 (d, J=16.1 Hz, 1H). $R_t$ 2.24 min (generic method). ESI-MS for $C_{22}H_{14}ClNO_3$: calculated 375.1, found m/z 376.0 [M+H]$^+$, 374.0 [M–H]$^-$.

Step 2. Synthesis of 6-chloro-3-[5-(2-furyl)-4,5-dihydro-1H-pyrazol-3-yl]-4-phenyl-1H-quinolin-2-one (c.10)

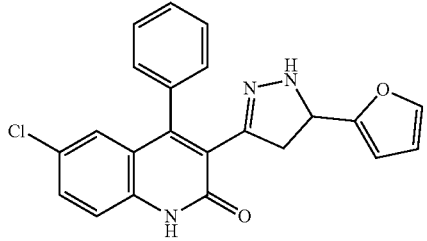 [SMILES: O=c1[nH]c2ccc(Cl)cc2c(-c2ccccc2)c1C1=NNC(c2ccco2)C1]

Compound c.10 was synthesized following the general procedure C using b.10 (442 mg, 1.2 mmol). Purification by normal phase flash column chromatography (solvent A: DCM, solvent B: EtOH—gradient: 0-7.5% solvent B) yielded title compound (422 mg, yield 91%). $^1$H NMR (400 MHz, DMSO-$d_6$) δ 12.21 (s, 1H), 7.57 (dd, J=8.8, 2.3 Hz, 1H), 7.54-7.51 (m, 1H), 7.50-7.38 (m, 4H), 7.31-7.23 (m, 2H), 7.07 (d, J=2.8 Hz, 1H), 6.90 (d, J=2.3 Hz, 1H), 6.34 (dd, J=3.1, 1.9 Hz, 1H), 6.17 (d, J=3.2 Hz, 1H), 4.61-4.53 (m, 1H), 3.04 (dd, J=16.2, 10.6 Hz, 1H), 2.87 (dd, J=16.2, 9.2 Hz, 1H). $R_t$ 2.14 min (generic method). ESI-MS for $C_{22}H_{16}ClN_3O_2$: calculated 389.1, found m/z 390.1 [M+H]$^+$, 388.1 [M–H]$^-$.

Step 3. Synthesis of 4-[5-(6-chloro-2-oxo-4-phenyl-1H-quinolin-3-yl)-3-(2-furyl)-3,4-dihydropyrazol-2-yl]-4-oxo-butanoic acid (d.20)

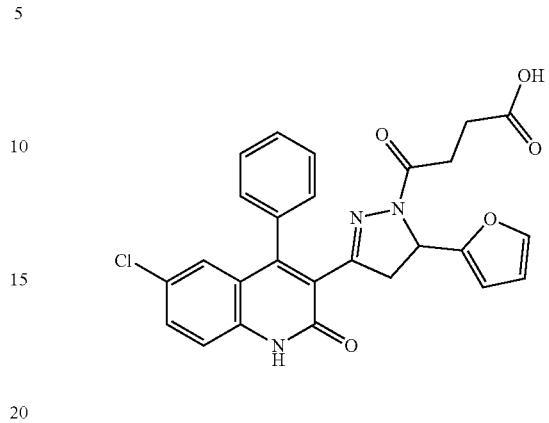

Compound d.20 was synthesized following the general procedure D1 using c.10 (201 mg, 0.51 mmol) with succinic anhydride (120° C., 200 W). Purification by normal phase flash column chromatography (solvent A: DCM, solvent B: EtOH—gradient: 0-10% solvent B) yielded title compound (226 mg, yield 90%). $^1$H NMR (400 MHz, DMSO-$d_6$) δ 12.38 (s, 1H), 12.06 (s, 1H), 7.64 (dd, J=8.8, 2.3 Hz, 1H), 7.54-7.43 (m, 5H), 7.32 (t, J=6.4 Hz, 2H), 6.96 (d, J=2.3 Hz, 1H), 6.33 (dd, J=3.1, 1.9 Hz, 1H), 5.99 (d, J=3.2 Hz, 1H), 5.39 (dd, J=11.8, 4.5 Hz, 1H), 3.58 (dd, J=18.2, 11.9 Hz, 1H), 3.17 (dd, J=18.2, 4.6 Hz, 1H), 2.41-2.18 (m, 4H). $R_t$ 1.90 min (generic method). ESI-MS for $C_{26}H_{20}ClN_3O_5$: calculated 489.1, found m/z 490.1 [M+H]$^+$, 488.1 [M–H]$^-$.

Example d.21. 3-[2-acetyl-3-(2-furyl)-3,4-dihydropyrazol-5-yl]-6-chloro-4-phenyl-1H-quinolin-2-one

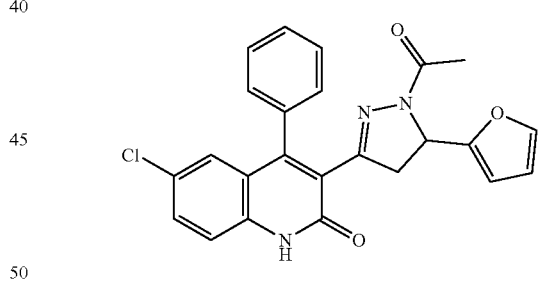

Compound d.21 was synthesized following the general procedure D1 using c.10 (202 mg, 0.52 mmol) with acetic anhydride (165° C., 200 W). Purification by normal phase flash column chromatography (solvent A: DCM, solvent B: EtOH—gradient: 0-5% solvent B) yielded title compound (162 mg, yield 73%). $^1$H NMR (400 MHz, DMSO-$d_6$) δ 12.36 (s, 1H), 7.63 (dd, J=8.8, 2.3 Hz, 1H), 7.52-7.42 (m, 5H), 7.35-7.29 (m, 2H), 6.96 (d, J=2.3 Hz, 1H), 6.33 (dd, J=3.3, 1.9 Hz, 1H), 6.03 (d, J=3.2 Hz, 1H), 5.38 (dd, J=11.9, 4.6 Hz, 1H), 3.57 (dd, J=18.2, 11.9 Hz, 1H), 3.20 (dd, J=18.2, 4.7 Hz, 1H), 1.75 (s, 3H). ESI-MS for $C_{24}H_{18}ClN_3O_3$: calculated 431.1, found m/z 432.3 [M+H]$^+$, 430.1 [M–H]$^-$.

Example d.22. 4-[5-(6-chloro-2-oxo-4-phenyl-1H-quinolin-3-yl)-3-(1-methylindol-5-yl)-3,4-dihydro-pyrazol-2-yl]-4-oxo-butanoic acid Step 1. Synthesis of 1-methylindole-5-carbaldehyde

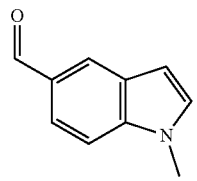

In a screw capped pressure tube 1H-indole-5-carboxaldehyde (333 mg, 2.3 mmol) was dissolved with 2.0 ml of anhydrous DMF then potassium carbonate (630 mg, 4.6 mmol) was added and the mixture kept under stirring for 10 minutes at rt. MeI (647 mg, d=2.28 g/ml, 284 µl, 4.6 mmol) was then added. The reaction was thus heated to 35° C. and stirred for 18 hours. The crude mixture was diluted with DCM and washed three times with water. The organic layer was anhydrified through a phase separator and the solvent removed under reduced pressure. Purification by normal phase flash column chromatography (solvent A: CHX, solvent B: EtOAc—gradient: 0-7.5% solvent B) yielded title compound (286 mg, yield 81%). $^1$H NMR (400 MHz, DMSO-$d_6$) δ 9.98 (s, 1H), 8.18 (d, J=1.5 Hz, 1H), 7.74-7.56 (m, 2H), 7.49 (d, J=3.2 Hz, 1H), 6.67 (dd, J=3.1, 0.8 Hz, 1H), 3.85 (d, J=1.3 Hz, 3H). $R_t$ 1.75 min (generic method). ESI-MS for $C_{10}H_9NO$: calculated 159.1, found m/z 160.1 $[M+H]^+$.

Step 2. Synthesis of 6-chloro-3-[(E)-3-(1-methylindol-5-yl)prop-2-enoyl]-4-phenyl-1H-quinolin-2-one (b.11)

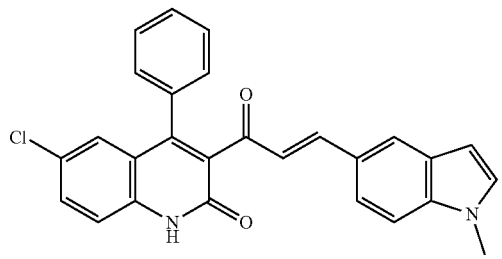 [SMILES: Cn1ccc2cc(/C=C/C(=O)c3c(-c4ccccc4)c4cc(Cl)ccc4[nH]c3=O)ccc21]

Compound b.11 was synthesized following the general procedure B using a.1 (545 mg, 1.8 mmol) and 1-Methyl-2H-indole-5-carbaldehyde. Purification by normal phase flash column chromatography (solvent A: DCM, solvent B: EtOH—gradient: 0-10% solvent B) yielded title compound (427 mg, 1-Methyl-2H-indole-5-carbaldehyde 53%). $^1$H NMR (400 MHz, DMSO-$d_6$) δ 12.31 (s, 1H), 7.86 (d, J=1.5 Hz, 1H), 7.65 (dd, J=8.8, 2.3 Hz, 1H), 7.56 (d, J=16.3 Hz, 1H), 7.51-7.30 (m, 9H), 6.97 (d, J=2.3 Hz, 1H), 6.65 (d, J=16.3 Hz, 1H), 6.44 (dd, J=3.2, 0.7 Hz, 1H), 3.79 (s, 3H). $R_t$ 2.45 min (generic method). ESI-MS for $C_{27}H_{19}ClN_2O_2$: calculated 438.1, found m/z 439.1 $[M+H]^+$, 437.1 $[M-H]^-$.

Step 3. Synthesis of 6-chloro-3-[5-(1-methylindol-5-yl)-4,5-dihydro-1H-pyrazol-3-yl]-4-phenyl-1H-quinolin-2-one (c.11)

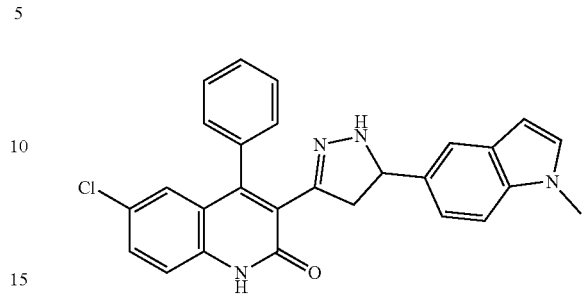

Compound c.11 was synthesized following the general procedure C using b.11 (370 mg, 0.84 mmol). Purification by normal phase flash column chromatography (solvent A: DCM, solvent B: EtOH—gradient: 0-5% solvent B) yielded title compound (325 mg, yield 85%). $^1$H NMR (400 MHz, DMSO-$d_6$) δ 12.20 (s, 1H), 7.57-7.46 (m, 4H), 7.41 (d, J=8.8 Hz, 1H), 7.35 (dt, J=7.2, 1.7 Hz, 1H), 7.31-7.21 (m, 4H), 7.02 (s, 1H), 6.91 (td, J=3.9, 1.7 Hz, 2H), 6.34 (dd, J=3.0, 0.7 Hz, 1H), 4.66 (t, J=10.5 Hz, 1H), 3.75 (s, 3H), 3.22 (dd, J=16.4, 11.0 Hz, 1H), 2.63 (dd, J=16.4, 9.9 Hz, 1H). $R_t$ 2.38 min (generic method). ESI-MS for $C_{27}H_{21}ClN_4O$: calculated 452.1, found m/z 453.1 $[M+H]^+$, 451.1 $[M-H]^-$.

Step 4. Synthesis of 4-[5-(6-chloro-2-oxo-4-phenyl-1H-quinolin-3-yl)-3-(1-methylindol-5-yl)-3,4-dihydropyrazol-2-yl]-4-oxo-butanoic acid (d.22)

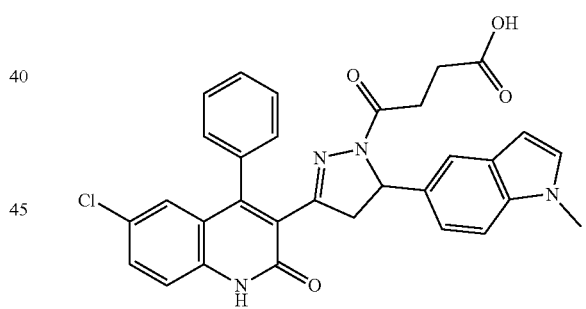

Compound d.22 was synthesized following the general procedure D1 using c.11 (153 mg, 0.34 mmol) with succinic anhydride (120° C., 200 W). Purification by normal phase flash column chromatography (solvent A: DCM, solvent B: EtOH—gradient: 0-20% solvent B) yielded title compound (150 mg, yield 79%). $^1$H NMR (400 MHz, DMSO-$d_6$) δ 12.37 (s, 1H), 12.18 (s, 1H), 7.63 (dd, J=8.8, 2.3 Hz, 1H), 7.60-7.55 (m, 2H), 7.55-7.49 (m, 1H), 7.44 (dd, J=7.7, 4.3 Hz, 2H), 7.31-7.20 (m, 3H), 6.98 (d, J=1.7 Hz, 1H), 6.93 (d, J=2.3 Hz, 1H), 6.61 (dd, J=8.5, 1.7 Hz, 1H), 6.34 (dd, J=3.0, 0.8 Hz, 1H), 5.35 (dd, J=12.0, 4.6 Hz, 1H), 3.84-3.69 (m, 4H), 2.85 (dd, J=18.4, 4.6 Hz, 1H), 2.53-2.45 (m, 2H), 2.26 (t, J=6.9 Hz, 2H). $R_t$ 2.09 min (generic method). ESI-MS for $C_{31}H_{25}ClN_4O_4$: calculated 552.2, found m/z 553.2 $[M+H]^+$, 551.2 $[M-H]^-$.

Example d.23. 3-[2-acetyl-3-(1-methylindol-5-yl)-3,4-dihydropyrazol-5-yl]-6-chloro-4-phenyl-1H-quinolin-2-one

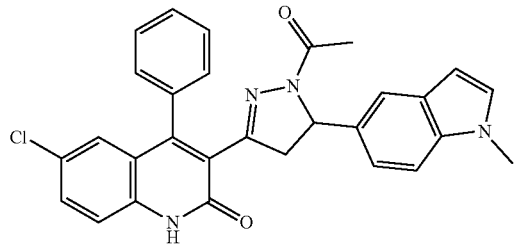

Compound d.23 was synthesized following the general procedure D1 using c.11 (127 mg, 0.28 mmol) with acetic anhydride (165° C., 200 W). Purification by normal phase flash column chromatography (solvent A: DCM, solvent B: EtOH—gradient: 0-10% solvent B) yielded title compound (107 mg, yield 75%). $^1$H NMR (400 MHz, DMSO-$d_6$) δ 12.36 (s, 1H), 7.64-7.56 (m, 3H), 7.53 (ddd, J=8.9, 5.6, 3.3 Hz, 1H), 7.47-7.40 (m, 2H), 7.31-7.23 (m, 3H), 6.99 (d, J=1.7 Hz, 1H), 6.94 (d, J=2.3 Hz, 1H), 6.65 (dd, J=8.5, 1.7 Hz, 1H), 6.35 (dd, J=3.1, 0.8 Hz, 1H), 5.36 (dd, J=12.0, 4.5 Hz, 1H), 3.75 (s, 4H), 2.90 (dd, J=18.4, 4.6 Hz, 1H), 1.86 (s, 3H). $R_t$ 2.41 min (generic method). ESI-MS for $C_{29}H_{23}ClN_4O_2$: calculated 494.2, found m/z 495.2 [M+H]$^+$, 493.2 [M−H]$^-$.

Example d.24. 4-[5-(6-chloro-2-oxo-4-phenyl-1H-quinolin-3-yl)-3-(1-ethylindol-5-yl)-3,4-dihydropyrazol-2-yl]-4-oxo-butanoic acid Step 1. Synthesis of 1-ethylindole-5-carbaldehyde

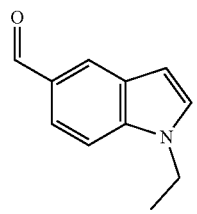

In a screw capped pressure tube 1H-indole-5-carboxaldehyde (338 mg, 2.3 mmol) was dissolved with 2.0 ml of anhydrous DMF then potassium carbonate (638 mg, 4.6 mmol) was added and the mixture kept under stirring for 10 minutes at rt. Iodoethane (503 mg, d=1.94 g/ml, 344 μl, 4.6 mmol) was then added. The reaction was thus heated to 35° C. and stirred for 18 hours. The crude mixture was diluted with DCM and washed three times with water. The organic layer was anhydrified through a phase separator and the solvent removed under reduced pressure. Purification by normal phase flash column chromatography (solvent A: CHX, solvent B: EtOAc—gradient: 0-5% solvent B) yielded title compound (363 mg, yield 91%). $^1$H NMR (400 MHz, DMSO-$d_6$) δ 9.98 (s, 1H), 8.18 (t, J=1.1 Hz, 1H), 7.71-7.62 (m, 2H), 7.57 (d, J=3.2 Hz, 1H), 6.67 (dd, J=3.2, 0.7 Hz, 1H), 4.27 (q, J=7.2 Hz, 2H), 1.37 (t, J=7.2 Hz, 3H). $R_t$ 1.94 min (generic method). ESI-MS for $C_{11}H_{11}NO$: calculated 173.1, found m/z 174.1 [M+H]$^+$.

Step 2. Synthesis of 6-chloro-3-[(E)-3-(1-ethylindol-5-yl)prop-2-enoyl]-4-phenyl-1H-quinolin-2-one (b.12)

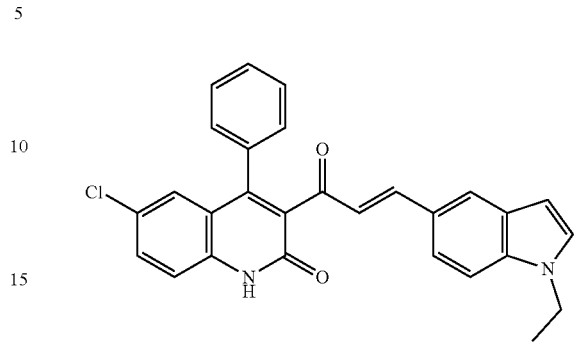

Compound b.12 was synthesized following the general procedure B using a.1 (402 mg, 1.3 mmol) and 1-Ethyl-indole-5-carbaldehyde. Purification by normal phase flash column chromatography (solvent A: DCM, solvent B: EtOH—gradient: 0-5% solvent B) yielded title compound (395 mg, yield 65%). $^1$H NMR (400 MHz, DMSO-$d_6$) δ 12.31 (s, 1H), 7.85 (d, J=1.4 Hz, 1H), 7.65 (dd, J=8.8, 2.4 Hz, 1H), 7.56 (d, J=16.3 Hz, 1H), 7.50-7.45 (m, 3H), 7.45-7.38 (m, 4H), 7.33 (dd, J=7.7, 1.8 Hz, 2H), 6.97 (d, J=2.3 Hz, 1H), 6.65 (d, J=16.2 Hz, 1H), 6.45 (d, J=3.1 Hz, 1H), 4.20 (q, J=7.2 Hz, 2H), 1.34 (t, J=7.2 Hz, 3H). $R_t$ 2.56 min (generic method). ESI-MS for $C_{28}H_{21}ClN_2O_2$: calculated 452.1291, found m/z 453 [M+H]$^+$, 451 [M−H]$^-$.

Step 3. Synthesis of 6-chloro-3-[5-(1-ethylindol-5-yl)-4,5-dihydro-1H-pyrazol-3-yl]-4-phenyl-1H-quinolin-2-one (c.12)

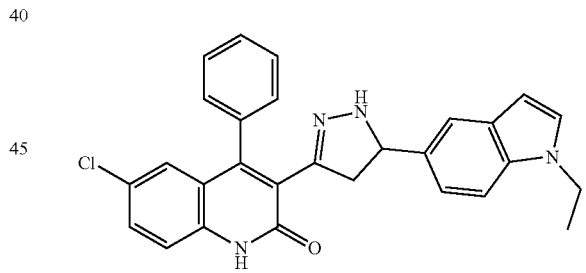

Compound c.12 was synthesized following the general procedure C using b.12 (336 mg, 0.79 mmol). Purification by normal phase flash column chromatography (solvent A: DCM, solvent B: EtOH—gradient: 0-10% solvent B) yielded title compound (322 mg, yield 87%). $^1$H NMR (400 MHz, DMSO-$d_6$) δ 12.18 (s, 1H), 7.60-7.48 (m, 4H), 7.41 (d, J=8.8 Hz, 1H), 7.38-7.30 (m, 3H), 7.25 (dt, J=6.6, 2.1 Hz, 2H), 7.00 (d, J=3.2 Hz, 1H), 6.89 (dd, J=9.7, 2.0 Hz, 2H), 6.34 (dd, J=3.2, 0.8 Hz, 1H), 4.64 (td, J=10.4, 3.2 Hz, 1H), 4.17 (q, J=7.2 Hz, 2H), 3.21 (dd, J=16.4, 11.0 Hz, 1H), 2.63 (dd, J=16.4, 9.9 Hz, 1H), 1.33 (t, J=7.2 Hz, 3H). $R_t$ 2.51 min (generic method). ESI-MS for $C_{28}H_{23}ClN_4O$: calculated 466.2, found m/z 467 [M+H]$^+$, 465 [M−H]$^-$.

Step 4. Synthesis of 4-[5-(6-chloro-2-oxo-4-phenyl-1H-quinolin-3-yl)-3-(1-ethylindol-5-yl)-3,4-dihydropyrazol-2-yl]-4-oxo-butanoic acid (d.24)

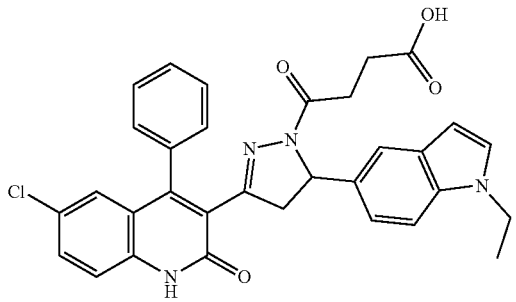

Compound d.26 was synthesized following the general procedure D1 using c.12 (153 mg, 0.33 mmol) with succinic anhydride (120° C., 200 W). Purification by normal phase flash column chromatography (solvent A: DCM, solvent B: EtOH—gradient: 0-10% solvent B) yielded title compound (92 mg, yield 49%). $^1$H NMR (400 MHz, DMSO-$d_6$) δ 12.37 (s, 1H), 12.02 (s, 1H), 7.63 (dd, J=8.8, 2.4 Hz, 1H), 7.58 (dd, J=5.5, 3.3 Hz, 2H), 7.52 (ddd, J=8.9, 5.2, 3.1 Hz, 1H), 7.44 (dd, J=8.7, 4.4 Hz, 2H), 7.35 (d, J=3.1 Hz, 1H), 7.29 (dd, J=8.5, 2.2 Hz, 2H), 6.95 (dd, J=15.5, 2.0 Hz, 2H), 6.60 (dd, J=8.5, 1.7 Hz, 1H), 6.34 (d, J=3.1 Hz, 1H), 5.34 (dd, J=12.0, 4.7 Hz, 1H), 4.17 (q, J=7.2 Hz, 2H), 3.77 (dd, J=18.4, 12.1 Hz, 1H), 2.86 (dd, J=18.4, 4.7 Hz, 1H), 2.48-2.42 (m, 2H), 2.26 (t, J=6.9 Hz, 2H), 1.34 (t, J=7.2 Hz, 3H). $R_t$ 2.20 min (generic method). ESI-MS for $C_{32}H_{27}ClN_4O_4$: calculated 566.2, found m/z 567.2 [M+H]$^+$, 565.2 [M−H]$^−$.

Example d.25. 3-[2-acetyl-3-(1-ethylindol-5-yl)-3,4-dihydropyrazol-5-yl]-6-chloro-4-phenyl-1H-quinolin-2-one

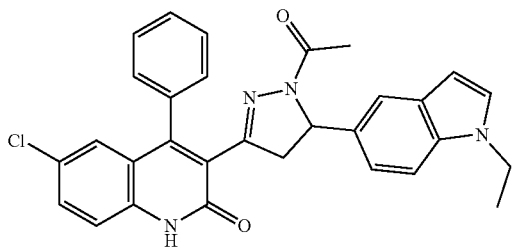 [SMILES: CCn1ccc2cc(C3CC(c4c(-c5ccccc5)c5cc(Cl)ccc5[nH]c4=O)=NN3C(C)=O)ccc21]

Compound d.25 was synthesized following the general procedure $D_1$ using c.12 (168 mg, 0.36 mmol) with acetic anhydride (165° C., 200 W). Purification by normal phase flash column chromatography (solvent A: DCM, solvent B: EtOH—gradient: 0-10% solvent B) yielded title compound (128 mg, yield 70%). $^1$H NMR (400 MHz, DMSO-$d_6$) δ 12.36 (s, 1H), 7.64-7.50 (m, 4H), 7.47-7.40 (m, 2H), 7.35 (d, J=3.1 Hz, 1H), 7.32-7.27 (m, 2H), 6.97 (dd, J=22.0, 2.0 Hz, 2H), 6.64 (dd, J=8.5, 1.7 Hz, 1H), 6.35 (dd, J=3.1, 0.8 Hz, 1H), 5.35 (dd, J=12.0, 4.6 Hz, 1H), 4.16 (q, J=7.2 Hz, 2H), 3.78 (dd, J=18.4, 12.0 Hz, 1H), 2.91 (dd, J=18.4, 4.6 Hz, 1H), 1.86 (s, 3H), 1.33 (t, J=7.2 Hz, 3H). $R_t$ 2.51 min (generic method). ESI-MS for $C_{30}H_{25}ClN_4O_2$: calculated 508.2, found m/z 509.2 [M+H]$^+$, 507.2 [M−H]$^−$.

Example d.26. 4-[5-(6-chloro-2-oxo-4-phenyl-1H-quinolin-3-yl)-3-(1-methylindazol-5-yl)-3,4-dihydropyrazol-2-yl]-4-oxo-butanoic acid

Step 1. Synthesis of 1-methylindazole-5-carbaldehyde and 2-methylindazole-5-carbaldehyde

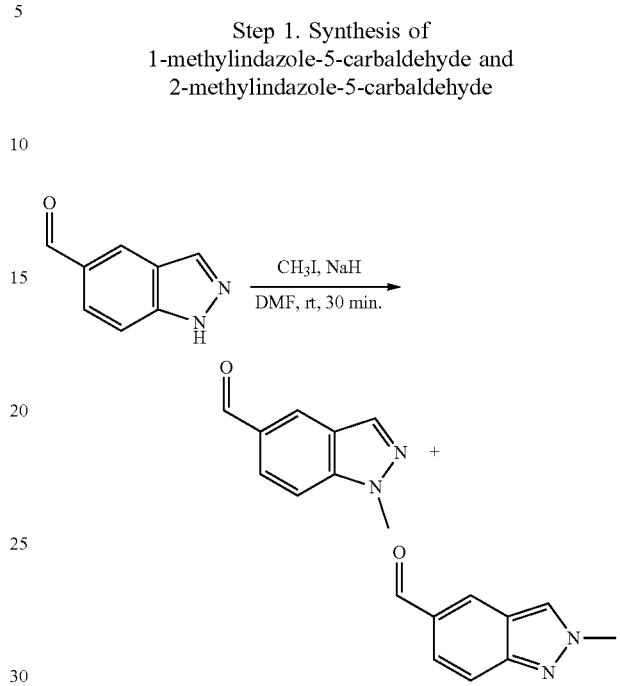

In a screw capped pressure tube 1H-indazole-5-carboxaldehyde (73 mg, 0.5 mmol) was dissolved with 500 μl of anhydrous DMF then sodium hydride (36 mg, 1.5 mmol) was added and the mixture kept under stirring for 30 minutes at rt. MeI (68 μl, 1.1 mmol) was then added. The reaction was thus stirred at rt for 30 minutes. The crude mixture was diluted with DCM and washed three times with water. The organic layer was anhydrified through a phase separator and the solvent removed under reduced pressure. Purification by normal phase flash column chromatography (solvent A: DCM, solvent B: DCM/EtOH 9:1 v/v—gradient: 0-35% solvent B) yielded both title compounds separately. Mono- and bi-dimensional $^1$H- and $^{13}$C-NMR (HMBC) analyses confirmed the structure of the title compounds 1-methyl-1H-indazole-5-carbaldehyde, which showed a positive $^1$H-$^{13}$C correlation between C$\underline{H}_3$ at 4.11 ppm and a quaternary C at 141.7 ppm, and 2-methyl-1H-indazole-5-carbaldehyde, which showed a positive $^1$H-$^{13}$C correlation between C$\underline{H}_3$ at 4.22 ppm and the $C_3$ at 128.3 ppm.

1-methyl-indazole-5-carbaldehyde: 31 mg, yield 38%. $^1$H NMR (400 MHz, DMSO-$d_6$) δ 10.03 (s, 1H), 8.43-8.42 (m, 1H), 8.32 (d, J=1.0 Hz, 1H), 7.95-7.72 (m, 2H), 4.10 (s, 3H). $^{13}$C NMR (101 MHz, DMSO-$d_6$) δ 192.24, 141.77, 135.03, 129.97, 127.62, 124.37, 123.22, 110.58, 35.64. $R_t$ 1.41 min (generic method). ESI-MS for $C_9H_8N_2O$: calculated 160.1, found m/z 161.1 [M+H]$^+$;

2-methyl-indazole-5-carbaldehyde: 18 mg, yield 22%. $^1$H NMR (400 MHz, DMSO-$d_6$) δ 9.96 (s, 1H), 8.69 (s, 1H), 8.44 (t, J=1.2 Hz, 1H), 7.72-7.63 (m, 2H), 4.22 (s, 3H). 13C NMR (101 MHz, DMSO-$d_6$) δ 192.19, 149.84, 130.51, 130.18, 128.36, 122.02, 120.96, 117.56, 40.31. $R_t$ 1.22 min (generic method). ESI-MS for $C_9H_8N_2O$: calculated 160.1, found m/z 161.1 [M+H]$^+$.

Step 2. Synthesis of 6-chloro-3-[(E)-3-(1-methylindazol-5-yl)prop-2-enoyl]-4-phenyl-1H-quinolin-2-one (b.13)

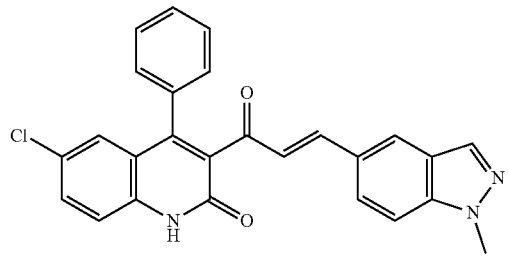 [SMILES: Cn1ncc2cc(/C=C/C(=O)c3c(-c4ccccc4)c4cc(Cl)ccc4[nH]c3=O)ccc21]

Compound b.13 was synthesized following the general procedure B using a.1 (229 mg, 0.77 mmol) and 1-methylindazole-5-carbaldehyde. Purification by normal phase flash column chromatography (solvent A: DCM, solvent B: EtOH—gradient: 0-5% solvent B) yielded title compound (275 mg, yield 81%). $^1$H NMR (400 MHz, DMSO-d$_6$) δ 12.33 (s, 1H), 8.07 (dd, J=5.0, 1.2 Hz, 2H), 7.73 (dd, J=8.9, 1.6 Hz, 1H), 7.68-7.57 (m, 3H), 7.53-7.30 (m, 6H), 6.98 (d, J=2.3 Hz, 1H), 6.74 (d, J=16.3 Hz, 1H), 4.04 (s, 3H). R$_t$ 2.26 min (generic method). ESI-MS for C$_{26}$H$_{18}$ClN$_3$O$_2$: calculated 439.1, found m/z 440.1 [M+H]$^+$, 438.1 [M−H]$^-$.

Step 3. Synthesis of 6-chloro-3-[5-(1-methylindazol-5-yl)-4,5-dihydro-1H-pyrazol-3-yl]-4-phenyl-1H-quinolin-2-one (c.13)

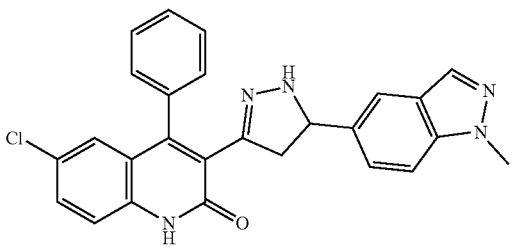 [SMILES: Cn1ncc2cc(C3CC(c4c(-c5ccccc5)c5cc(Cl)ccc5[nH]c4=O)=NN3)ccc21]

Compound c.13 was synthesized following the general procedure C using b.13 (268 mg, 0.61 mmol). Purification by normal phase flash column chromatography (solvent A: DCM, solvent B: EtOH—gradient: 0-10% solvent B) yielded title compound (245 mg, yield 88%). $^1$H NMR (400 MHz, DMSO-d$_6$) δ 12.19 (s, 1H), 7.95 (d, J=0.9 Hz, 1H), 7.60-7.45 (m, 5H), 7.43-7.39 (m, 2H), 7.36 (dt, J=6.7, 1.7 Hz, 1H), 7.27-7.20 (m, 1H), 7.16-7.09 (m, 2H), 6.90 (d, J=2.3 Hz, 1H), 4.70 (ddd, J=11.0, 9.3, 3.1 Hz, 1H), 4.01 (s, 3H), 3.27 (dd, J=16.8, 11.4 Hz, 2H), 2.60 (dd, J=16.5, 9.4 Hz, 1H). R$_t$ 0.83 min (apolar method). ESI-MS for C$_{26}$H$_{20}$ClN$_5$O: calculated 453.1, found m/z 454.1 [M+H]$^+$.

Step 4. Synthesis of 4-[5-(6-chloro-2-oxo-4-phenyl-1H-quinolin-3-yl)-3-(1-methylindazol-5-yl)-3,4-dihydropyrazol-2-yl]-4-oxo-butanoic acid (d.26)

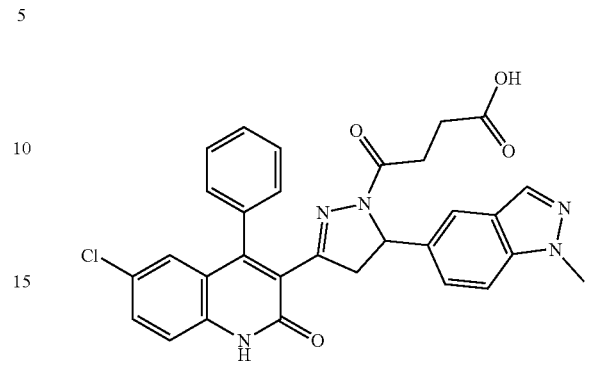

Compound d.26 was synthesized following the general procedure D1 using c.13 (102 mg, 0.22 mmol) with succinic anhydride (120° C., 200 W). Purification by normal phase flash column chromatography (solvent A: DCM, solvent B: EtOH—gradient: 0-20% solvent B) yielded title compound (103 mg, yield 86%). $^1$H NMR (400 MHz, DMSO-d$_6$) δ 12.38-12.11 (m, 2H), 7.96 (d, J=1.0 Hz, 1H), 7.65-7.56 (m, 3H), 7.54-7.41 (m, 4H), 7.29-7.24 (m, 1H), 7.15-7.11 (m, 1H), 6.93 (d, J=2.3 Hz, 1H), 6.83 (dd, J=8.7, 1.6 Hz, 1H), 5.42 (dd, J=12.0, 4.6 Hz, 1H), 4.01 (s, 3H), 3.80 (dd, J=18.5, 12.1 Hz, 1H), 2.84 (dd, J=18.5, 4.6 Hz, 1H), 2.56-2.44 (m, 2H), 2.28 (t, J=6.9 Hz, 2H). R$_t$ 1.93 min (generic method). ESI-MS for C$_{30}$H$_{24}$ClN$_5$O$_4$: calculated 553.2, found m/z 554.2 [M+H]$^+$, 552.2 [M−H]$^-$.

Example d.27. 3-[2-acetyl-3-(1-methylindazol-5-yl)-3,4-dihydropyrazol-5-yl]-6-chloro-4-phenyl-1H-quinolin-2-one

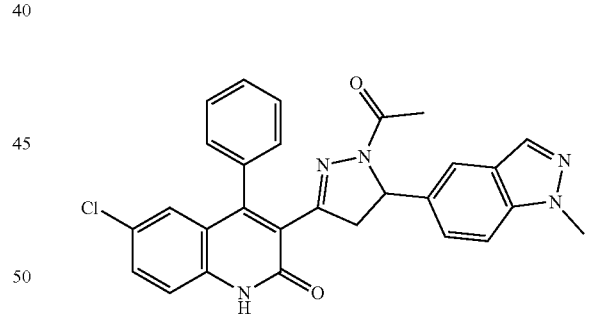

Compound d.27 was synthesized following the general procedure D1 using c.13 (131 mg, 0.30 mmol) with acetic anhydride (165° C., 200 W). Purification by normal phase flash column chromatography (solvent A: DCM, solvent B: EtOH—gradient: 0-10% solvent B) yielded title compound (126 mg, yield 86%). $^1$H NMR (400 MHz, DMSO-d$_6$) δ 12.37 (s, 1H), 7.97 (d, J=0.9 Hz, 1H), 7.66-7.40 (m, 7H), 7.32-7.23 (m, 1H), 7.17-7.12 (m, 1H), 6.94 (d, J=2.4 Hz, 1H), 6.86 (dd, J=8.7, 1.6 Hz, 1H), 5.42 (dd, J=12.0, 4.5 Hz, 1H), 4.01 (s, 3H), 3.80 (dd, J=18.5, 12.1 Hz, 1H), 2.88 (dd, J=18.4, 4.6 Hz, 1H), 1.88 (s, 3H). R$_t$ 2.19 min (generic method). ESI-MS for C$_{28}$H$_{22}$ClN$_5$O$_2$: calculated 495.1, found m/z 496.1 [M+H]$^+$, 494.4 [M−H]$^-$.

Example d.28. 4-[5-(6-chloro-2-oxo-4-phenyl-1H-quinolin-3-yl)-3-(2-methylindazol-5-yl)-3,4-dihydropyrazol-2-yl]-4-oxo-butanoic acid Step 1. Synthesis of 6-chloro-3-[(E)-3-(2-methylindazol-5-yl)prop-2-enoyl]-4-phenyl-1H-quinolin-2-one (b.14)

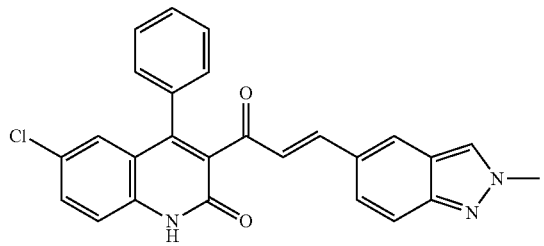 [SMILES: Cn1cc2cc(/C=C/C(=O)c3c(-c4ccccc4)c4cc(Cl)ccc4[nH]c3=O)ccc2n1]

Compound b.14 was synthesized following the general procedure B using a.1 (229 mg, 0.77 mmol) and 2-methyl-1H-indazole-5-carbaldehyde. Purification by normal phase flash column chromatography (solvent A: DCM, solvent B: EtOH—gradient: 0-10% solvent B) yielded title compound (160 mg, yield 72%). $^1$H NMR (400 MHz, DMSO-$d_6$) δ 12.33 (s, 1H), 8.43 (s, 1H), 8.02 (d, J=1.5 Hz, 1H), 7.65 (dd, J=8.8, 2.4 Hz, 1H), 7.59-7.53 (m, 3H), 7.48 (d, J=8.8 Hz, 1H), 7.44-7.40 (m, 3H), 7.34 (dd, J=7.8, 1.8 Hz, 2H), 6.98 (d, J=2.4 Hz, 1H), 6.69 (d, J=16.3 Hz, 1H), 4.15 (s, 3H). $R_t$ 2.11 min (generic method). ESI-MS for $C_{26}H_{18}ClN_3O_2$: calculated 439.1, found m/z 440.1 [M+H]$^+$, 438.1 [M−H]$^−$.

Step 2. Synthesis of 6-chloro-3-[5-(2-methylindazol-5-yl)-4,5-dihydro-1H-pyrazol-3-yl]-4-phenyl-1H-quinolin-2-one (c.14)

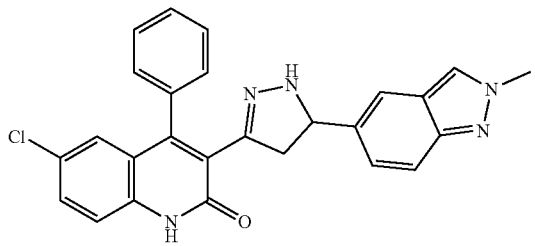 [SMILES: Cn1cc2cc(C3CC(c4c(-c5ccccc5)c5cc(Cl)ccc5[nH]c4=O)=NN3)ccc2n1]

Compound c.14 was synthesized following the general procedure C using b.14 (147 mg, 0.33 mmol). Purification by normal phase flash column chromatography (solvent A: DCM, solvent B: EtOH—gradient: 0-10% solvent B) yielded title compound (140 mg, yield 94%). $^1$H NMR (400 MHz, DMSO-$d_6$) δ 12.19 (s, 1H), 8.23 (s, 1H), 7.60-7.38 (m, 6H), 7.35 (dd, J=6.1, 1.7 Hz, 2H), 7.24 (dt, J=6.3, 2.0 Hz, 1H), 7.09 (d, J=3.2 Hz, 1H), 6.97-6.88 (m, 2H), 4.64 (td, J=10.4, 3.2 Hz, 1H), 4.14 (s, 3H), 3.23 (dd, J=16.5, 11.1 Hz, 1H), 2.59 (dd, J=16.5, 9.7 Hz, 1H). $R_t$ 1.98 min (generic method). ESI-MS for $C_{26}H_{20}ClN_5O$: calculated 453.1, found m/z 454.1 [M+H]$^+$, 452.1 [M−H]$^−$.

Step 3. Synthesis of 4-[5-(6-chloro-2-oxo-4-phenyl-1H-quinolin-3-yl)-3-(2-methylindazol-5-yl)-3,4-dihydropyrazol-2-yl]-4-oxo-butanoic acid (d.28)

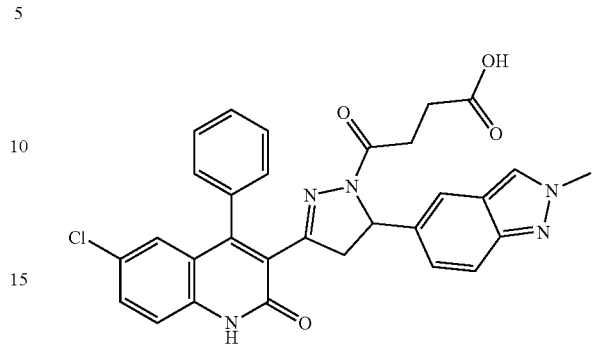

Compound d.28 was synthesized following the general procedure D1 using c.14 (129 mg, 0.28 mmol) with succinic anhydride (120° C., 200 W). Purification by normal phase flash column chromatography (solvent A: DCM, solvent B: EtOH—gradient: 0-20% solvent B) yielded title compound (119 mg, yield 77%). $^1$H NMR (400 MHz, DMSO-$d_6$) δ 12.37 (s, 1H), 12.05 (s, 1H), 8.25 (s, 1H), 7.65-7.55 (m, 3H), 7.55-7.47 (m, 1H), 7.47-7.39 (m, 3H), 7.27 (dd, J=7.5, 1.8 Hz, 1H), 7.09-7.04 (m, 1H), 6.93 (d, J=2.3 Hz, 1H), 6.63 (dd, J=9.0, 1.7 Hz, 1H), 5.35 (dd, J=12.0, 4.6 Hz, 1H), 4.15 (s, 3H), 3.77 (dd, J=18.5, 12.1 Hz, 1H), 2.82 (dd, J=18.4, 4.6 Hz, 1H), 2.54-2.46 (m, 2H), 2.28 (t, J=6.9 Hz, 2H). $R_t$ 1.77 min (generic method). ESI-MS for $C_{30}H_{24}ClN_5O_4$: calculated 553.2, found m/z 554.2 [M+H]$^+$, 552.2 [M−H]$^−$.

Example d.29. 4-[5-(6-chloro-2-oxo-4-phenyl-1H-quinolin-3-yl)-3-(2-ethylindazol-5-yl)-3,4-dihydropyrazol-2-yl]-4-oxo-butanoic acid Step 1. Synthesis of 1-ethylindazole-5-carbaldehyde and 2-ethylindazole-5-carbaldehyde

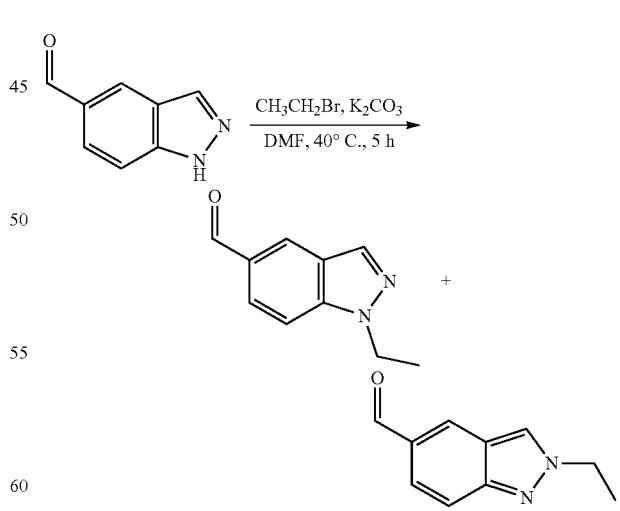

In a screw capped pressure tube 1H-indazole-5-carbaldehyde (300 mg, 2.84 mmol) was dissolved with 3.0 ml of anhydrous DMF then potassium carbonate (1.13 g, 8.2 mmol) was added and the mixture kept under stirring for 10 minutes at rt. Ethyl bromide (230 µl, 3.1 mmol) was then added. The reaction was thus heated to 40° C. and stirred for 5 hours. The crude mixture was diluted with DCM and washed three times with water. The organic layer was anhydrified through a phase separator and the solvent removed under reduced pressure. Purification by normal phase flash column chromatography (solvent A: DCM, solvent B: DCM/EtOH 8:2 v/v—gradient: 0-5% solvent B) yielded both title compounds separately. Mono- and bi-dimensional $^1$H- and $^{13}$C-NMR (HMBC) analyses confirmed the structure of the title compounds named 1-ethyl-1H-indazole-5-carbaldehyde, which showed a positive $^1$H-$^{13}$C correlation between C$\underline{H}_2$ at 4.49 ppm and a quaternary C at 141.7 ppm, and 2-ethyl-1H-indazole-5-carbaldehyde, which showed a positive $^1$H-$^{13}$C correlation between CH$_2$ at 4.51 ppm and the C$_3$ at 127.5 ppm.

1-ethyl-indazole-5-carbaldehyde: 179 mg, yield 50%. $^1$H NMR (400 MHz, DMSO-d$_6$) δ 10.04 (s, 1H), 8.43 (t, J=1.1 Hz, 1H), 8.34 (d, J=0.8 Hz, 1H), 7.92-7.81 (m, 2H), 4.50 (q, J=7.2 Hz, 2H), 1.42 (t, J=7.2 Hz, 3H). $^{13}$C NMR (101 MHz, DMSO-d$_6$) δ 192.67, 141.43, 135.64, 130.49, 128.16, 124.80, 123.78, 110.94, 43.85, 15.32. R$_t$ 1.56 min (generic method). ESI-MS for C$_{10}$H$_{10}$N$_2$O: calculated 174.1, found m/z 175.1 [M+H]$^+$.

2-ethyl-indazole-5-carbaldehyde: 121 mg, yield 34%. $^1$H NMR (400 MHz, DMSO-d$_6$) δ 9.98 (s, 1H), 8.75 (s, 1H), 8.45 (d, J=1.2 Hz, 1H), 7.69 (qd, J=9.0, 1.3 Hz, 2H), 4.52 (q, J=7.3 Hz, 2H), 1.54 (t, J=7.3 Hz, 3H). $^{13}$C NMR (101 MHz, DMSO-d$_6$) δ 192.69, 150.17, 130.99, 130.81, 127.49, 122.46, 121.23, 118.24, 48.63, 16.02. R$_t$ 1.36 min (generic method). ESI-MS for C$_{10}$H$_{10}$N$_2$O: calculated 174.1, found m/z 175.1 [M+H]$^+$.

Step 2. Synthesis of 6-chloro-3-[(E)-3-(2-ethylindazol-5-yl)prop-2-enoyl]-4-phenyl-1H-quinolin-2-one (b.15)

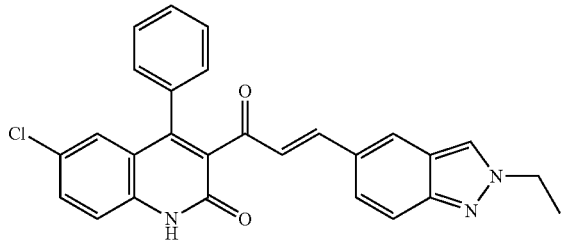 [SMILES: CCn1cc2cc(/C=C/C(=O)c3c(-c4ccccc4)c4cc(Cl)ccc4[nH]c3=O)ccc2n1]

Compound b.15 was synthesized following the general procedure B using a.1 (307 mg, 1.0 mmol) and 2-ethyl-indazole-5-carbaldehyde. Purification by normal phase flash column chromatography (solvent A: DCM, solvent B: EtOH—gradient: 0-5% solvent B) yielded title compound (386 mg, yield 82%). $^1$H NMR (400 MHz, DMSO-d$_6$) δ 12.33 (s, 1H), 8.48 (s, 1H), 8.02 (s, 1H), 7.65 (dd, J=8.8, 2.4 Hz, 1H), 7.61-7.51 (m, 3H), 7.51-7.38 (m, 4H), 7.34 (dd, J=7.7, 1.9 Hz, 2H), 6.98 (d, J=2.3 Hz, 1H), 6.68 (d, J=16.3 Hz, 1H), 4.44 (q, J=7.3 Hz, 2H), 1.49 (t, J=7.2 Hz, 3H). R$_t$ 2.22 min (generic method). ESI-MS for C$_{27}$H$_{20}$ClN$_3$O$_2$: calculated 453.1, found m/z 454.1 [M+H]$^+$, 452.1 [M−H]$^-$.

Step 3. Synthesis of 6-chloro-3-[5-(2-ethylindazol-5-yl)-4,5-dihydro-1H-pyrazol-3-yl]-4-phenyl-1H-quinolin-2-one (c.15)

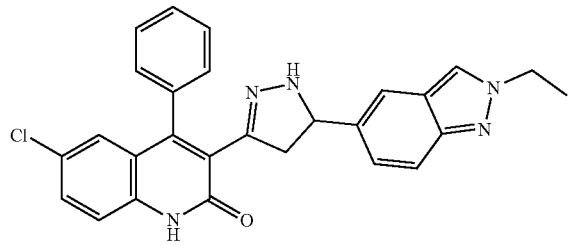 [SMILES: CCn1cc2cc(C3CC(c4c(-c5ccccc5)c5cc(Cl)ccc5[nH]c4=O)=NN3)ccc2n1]

Compound c.15 was synthesized following the general procedure C using b.15 (302 mg, 0.6 mmol). Purification by normal phase flash column chromatography (solvent A: DCM, solvent B: EtOH—gradient: 0-10% solvent B) yielded title compound (236 mg, yield 76%). $^1$H NMR (400 MHz, DMSO-d$_6$) δ 12.19 (s, 1H), 8.27 (d, J=0.9 Hz, 1H), 7.59-7.38 (m, 6H), 7.35 (td, J=3.1, 1.5 Hz, 2H), 7.28-7.20 (m, 1H), 7.08 (d, J=3.2 Hz, 1H), 6.98-6.86 (m, 2H), 4.65 (td, J=10.3, 3.1 Hz, 1H), 4.42 (q, J=7.3 Hz, 2H), 3.24 (dd, J=16.5, 11.1 Hz, 1H), 2.60 (dd, J=16.5, 9.6 Hz, 1H), 1.48 (t, J=7.3 Hz, 3H). R$_t$ 2.06 min (generic method). ESI-MS for C$_{27}$H$_{22}$ClN$_5$O: calculated 467.1, found m/z 468.1 [M+H]$^+$, 466.1 [M−H]$^-$.

Step 4. Synthesis of 4-[5-(6-chloro-2-oxo-4-phenyl-1H-quinolin-3-yl)-3-(2-ethylindazol-5-yl)-3,4-dihydropyrazol-2-yl]-4-oxo-butanoic acid (d.29)

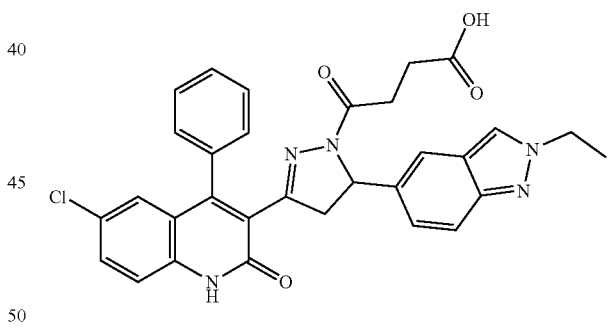

Compound d.29 was synthesized following the general procedure D1 using c.15 (198 mg, 0.42 mmol) with succinic anhydride (120° C., 200 W). Purification by normal phase flash column chromatography (solvent A: DCM, solvent B: EtOH—gradient: 0-20% solvent B) yielded title compound (120 mg, yield 50%). $^1$H NMR (400 MHz, DMSO-d$_6$) δ 12.37 (s, 1H), 12.04 (s, 1H), 8.29 (s, 1H), 7.66-7.55 (m, 3H), 7.51 (td, J=6.6, 5.5, 3.3 Hz, 1H), 7.44 (dd, J=10.0, 6.8 Hz, 3H), 7.28 (d, J=7.5 Hz, 1H), 7.07 (d, J=1.6 Hz, 1H), 6.93 (d, J=2.4 Hz, 1H), 6.61 (dd, J=8.9, 1.7 Hz, 1H), 5.35 (dd, J=12.0, 4.6 Hz, 1H), 4.43 (q, J=7.3 Hz, 2H), 3.77 (dd, J=18.4, 12.1 Hz, 1H), 2.82 (dd, J=18.4, 4.6 Hz, 1H), 2.54-2.44 (m, 2H), 2.28 (t, J=6.9 Hz, 2H), 1.49 (t, J=7.2 Hz, 3H). R$_t$ 1.85 min (generic method). ESI-MS for C$_{31}$H$_{26}$ClN$_5$O$_4$: calculated 567.2, found m/z 568.2 [M+H]$^+$, 566.2 [M−H]$^-$.

Example d.30. 3-[2-acetyl-3-(2-ethylindazol-5-yl)-3,4-dihydropyrazol-5-yl]-6-chloro-4-phenyl-1H-quinolin-2-one

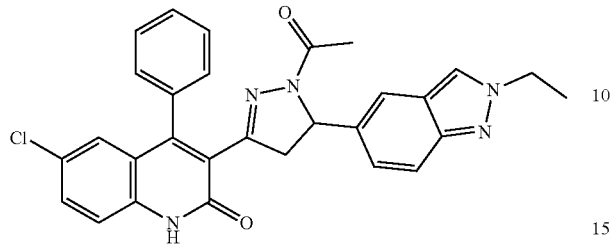

Compound d.30 was synthesized following the general procedure D1 using c.15 (80 mg, 0.17 mmol) with acetic anhydride (165° C., 200 W). Purification by normal phase flash column chromatography (solvent A: DCM, solvent B: EtOH—gradient: 0-10% solvent B) yielded title compound (67 mg, yield 77%). $^1$H NMR (400 MHz, DMSO-$d_6$) δ 12.37 (s, 1H), 8.31 (d, J=0.9 Hz, 1H), 7.67-7.57 (m, 3H), 7.57-7.51 (m, 1H), 7.49-7.42 (m, 3H), 7.32-7.26 (m, 1H), 7.10-7.06 (m, 1H), 6.94 (d, J=2.4 Hz, 1H), 6.65 (dd, J=9.0, 1.7 Hz, 1H), 5.36 (dd, J=12.0, 4.6 Hz, 1H), 4.44 (q, J=7.3 Hz, 2H), 3.78 (dd, J=18.4, 12.0 Hz, 1H), 2.87 (dd, J=18.4, 4.6 Hz, 1H), 1.89 (s, 3H), 1.50 (t, J=7.2 Hz, 3H). $R_t$ 2.14 min (generic method). ESI-MS for $C_{29}H_{24}ClN_5O_2$: calculated 509.2, found m/z 510.2 [M+H]$^+$, 508.2 [M–H]$^-$.

Example d.31. 4-[5-(6-chloro-2-oxo-4-phenyl-1H-quinolin-3-yl)-3-(1-ethylindazol-5-yl)-3,4-dihydropyrazol-2-yl]-4-oxo-butanoic acid Step 1. Synthesis of 6-chloro-3-[(E)-3-(1-ethylindazol-5-yl)prop-2-enoyl]-4-phenyl-1H-quinolin-2-one (b.16)

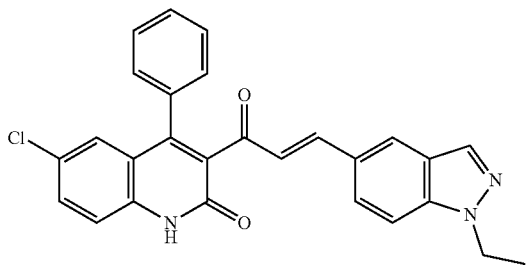 [SMILES: CCn1ncc2cc(/C=C/C(=O)c3c(-c4ccccc4)c4cc(Cl)ccc4[nH]c3=O)ccc21]

Compound b.16 was synthesized following the general procedure B using a.1 (292 mg, 0.98 mmol) and 1-ethylindazole-5-carbaldehyde. Purification by normal phase flash column chromatography (solvent A: DCM, solvent B: EtOH—gradient: 0-5% solvent B) yielded title compound (275 mg, yield 61%). $^1$H NMR (400 MHz, DMSO-$d_6$) δ 12.33 (s, 1H), 8.09 (s, 1H), 8.07 (d, J=1.4 Hz, 1H), 7.72 (dd, J=8.9, 1.6 Hz, 1H), 7.69-7.57 (m, 3H), 7.48 (d, J=8.8 Hz, 1H), 7.46-7.36 (m, 3H), 7.34 (dd, J=7.8, 1.8 Hz, 2H), 6.98 (d, J=2.3 Hz, 1H), 6.74 (d, J=16.3 Hz, 1H), 4.43 (q, J=7.2 Hz, 2H), 1.38 (t, J=7.2 Hz, 3H). $R_t$ 2.35 min (generic method). ESI-MS for $C_{27}H_{20}ClN_3O_2$: calculated 453.1, found m/z 454.1 [M+H]$^+$, 452.1 [M–H]$^-$.

Step 2. Synthesis of 6-chloro-3-[5-(1-ethylindazol-5-yl)-4,5-dihydro-1H-pyrazol-3-yl]-4-phenyl-1H-quinolin-2-one (c.16)

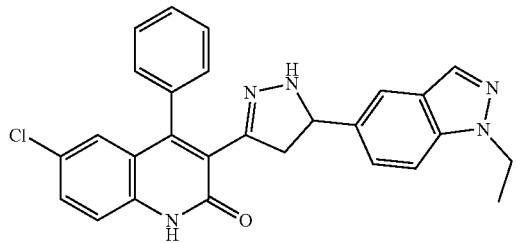 [SMILES: CCn1ncc2cc(C3CC(c4c(-c5ccccc5)c5cc(Cl)ccc5[nH]c4=O)=NN3)ccc21]

Compound c.16 was synthesized following the general procedure C using b.16 (260 mg, 0.57 mmol). Purification by normal phase flash column chromatography (solvent A: DCM, solvent B: EtOH—gradient: 0-10% solvent B) yielded title compound (228 mg, yield 86%). $^1$H NMR (400 MHz, DMSO-$d_6$) δ 12.21 (s, 1H), 7.97 (d, J=0.9 Hz, 1H), 7.59-7.46 (m, 5H), 7.42 (d, J=8.8 Hz, 2H), 7.38-7.34 (m, 1H), 7.27-7.21 (m, 1H), 7.17-7.08 (m, 2H), 6.91 (d, J=2.4 Hz, 1H), 4.71 (ddd, J=11.3, 9.3, 2.5 Hz, 1H), 4.41 (q, J=7.2 Hz, 2H), 3.27 (dd, J=16.5, 11.1 Hz, 1H), 2.62 (dd, J=16.5, 9.4 Hz, 1H), 1.38 (t, J=7.2 Hz, 3H). $R_t$ 2.19 min (generic method). ESI-MS for $C_{27}H_{22}ClN_5O$: calculated 467.2, found m/z 468.2 [M+H]$^+$, 466.2 [M–H]$^-$.

Step 3. Synthesis of 4-[5-(6-chloro-2-oxo-4-phenyl-1H-quinolin-3-yl)-3-(1-ethylindazol-5-yl)-3,4-dihydropyrazol-2-yl]-4-oxo-butanoic acid (d.31)

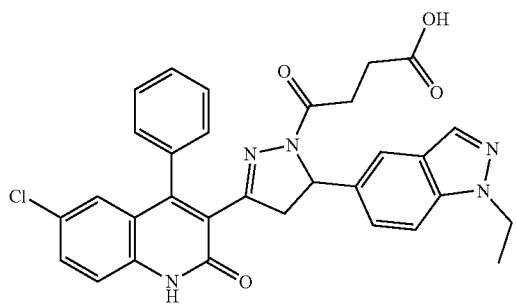

Compound d.31 was synthesized following the general procedure D1 using c.16 (196 mg, 0.42 mmol) with succinic anhydride (120° C., 200 W). Purification by normal phase flash column chromatography (solvent A: DCM, solvent B: EtOH—gradient: 0-10% solvent B) yielded title compound (177 mg, yield 74%). $^1$H NMR (400 MHz, DMSO-$d_6$) δ 12.39 (s, 1H), 12.03 (s, 1H), 7.98 (s, 1H), 7.64 (dd, J=8.8, 2.4 Hz, 1H), 7.59 (dd, J=5.4, 3.5 Hz, 2H), 7.52 (dd, J=10.0, 6.6 Hz, 2H), 7.48-7.43 (m, 2H), 7.29 (d, J=7.5 Hz, 1H), 7.14 (d, J=1.5 Hz, 1H), 6.94 (d, J=2.3 Hz, 1H), 6.83 (dd, J=8.7, 1.6 Hz, 1H), 5.42 (dd, J=12.0, 4.6 Hz, 1H), 4.42 (q, J=7.2 Hz, 2H), 3.80 (dd, J=18.5, 12.1 Hz, 1H), 2.85 (dd, J=18.5, 4.6 Hz, 1H), 2.54-2.48 (m, 2H), 2.28 (t, J=6.9 Hz, 2H), 1.38 (t, J=7.2 Hz, 3H). $R_t$ 1.95 min (generic method). ESI-MS for $C_{31}H_{26}ClN_5O_4$: calculated 567.2, found m/z 568.2 [M+H]$^+$, 566.2 [M–H]$^-$.

Example d.32. 3-[2-acetyl-3-(1-ethylindazol-5-yl)-3,4-dihydropyrazol-5-yl]-6-chloro-4-phenyl-1H-quinolin-2-one

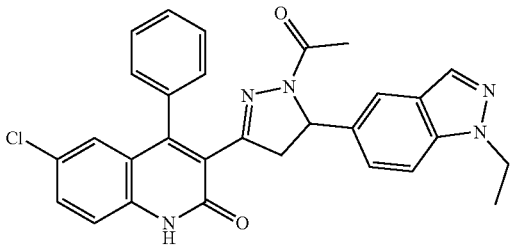 [SMILES: CCn1ncc2cc(C3CC(c4c(-c5ccccc5)c5cc(Cl)ccc5[nH]c4=O)=NN3C(C)=O)ccc21]

Compound d.32 was synthesized following the general procedure D1 using c.16 (131 mg, 0.28 mmol) with acetic anhydride (165° C., 200 W). Purification by normal phase flash column chromatography (solvent A: DCM, solvent B: EtOH—gradient: 0-5% solvent B) yielded title compound (118 mg, 82%). $^1$H NMR (400 MHz, DMSO-d$_6$) δ 12.37 (s, 1H), 7.98 (d, J=0.9 Hz, 1H), 7.66-7.57 (m, 3H), 7.57-7.49 (m, 2H), 7.48-7.40 (m, 2H), 7.29 (ddt, J=7.6, 2.0, 1.0 Hz, 1H), 7.15 (t, J=1.1 Hz, 1H), 6.94 (d, J=2.3 Hz, 1H), 6.84 (dd, J=8.7, 1.6 Hz, 1H), 5.41 (dd, J=12.0, 4.5 Hz, 1H), 4.41 (q, J=7.2 Hz, 2H), 3.79 (dd, J=18.5, 12.1 Hz, 1H), 2.88 (dd, J=18.4, 4.6 Hz, 1H), 1.88 (s, 3H), 1.37 (t, J=7.2 Hz, 3H). R$_t$ 2.29 min (generic method). ESI-MS for C$_{29}$H$_{24}$ClN$_5$O$_2$: calculated 509.2, found m/z 510.2 [M+H]$^+$, 508.2 [M−H]$^-$.

Example d.33. 4-[5-(6-chloro-2-oxo-4-phenyl-1H-quinolin-3-yl)-3-(1-propylindazol-5-yl)-3,4-dihydropyrazol-2-yl]-4-oxo-butanoic acid Step 1. Synthesis of 1-propylindazole-5-carbaldehyde and 2-propylindazole-5-carbaldehyde

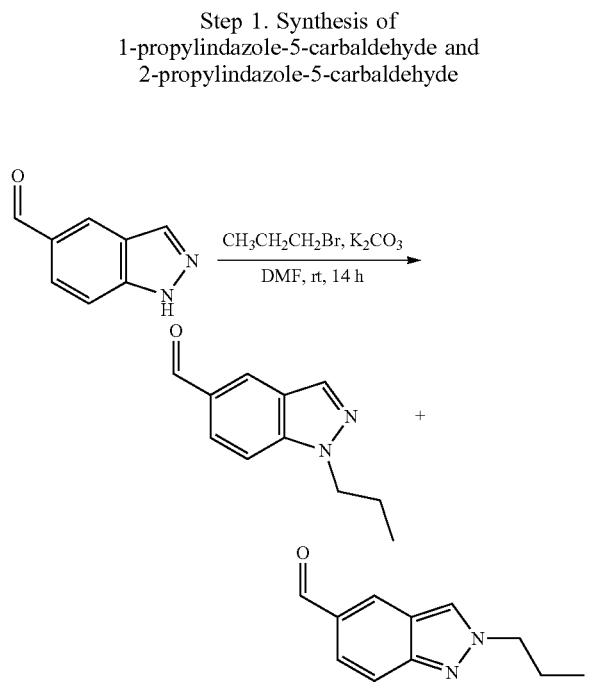

In a screw capped pressure tube 1H-indazole-5-carboxyaldehyde (152 mg, 1.0 mmol) was dissolved with 1.1 ml of anhydrous DMF then potassium carbonate (359 mg, 2.6 mmol) was added and the mixture kept under stirring for 30 minutes at rt. 1-Bromopropane (189 μl, 2.0 mmol) was then added. The reaction was thus stirred for 14 hours at rt. The crude mixture was diluted with DCM and washed three times with water. The organic layer was anhydrified through a phase separator and the solvent removed under reduced pressure. Purification by normal phase flash column chromatography (solvent A: DCM, solvent B: DCM/EtOH 9:1 v/v—gradient: 0-70% solvent B) yielded both title compounds separately. Mono- and bi-dimensional 1H- and 13C-NMR (HMBC) analyses confirmed the structure of the title compounds named 1-Propyl-indazole-5-carbaldehyde, which showed a positive $^1$H-$^{13}$C correlation between CH$_2$ at 4.42 ppm and a quaternary C at 142.0 ppm, and 2-Propyl-indazole-5-carbaldehyde, which showed a positive $^1$H-$^{13}$C correlation between CH$_2$ at 4.44 ppm and the C$_3$ at 128.2 ppm.

1-Propyl-indazole-5-carbaldehyde: 99 mg, yield 50%. $^1$H NMR (400 MHz, DMSO-d$_6$) δ 10.02 (s, 1H), 8.42 (d, J=1.2 Hz, 1H), 8.33 (s, 1H), 7.88-7.80 (m, 2H), 4.42 (t, J=6.9 Hz, 2H), 1.85 (h, J=7.2 Hz, 2H), 0.85-0.77 (m, 3H). R$_t$ 1.82 min (generic method). ESI-MS for C$_{11}$H$_{12}$N$_2$O: calculated 188.1, found m/z 189.1 [M+H]$^+$.

2-Propyl-indazole-5-carbaldehyde: 66 mg, yield 34%. $^1$H NMR (400 MHz, DMSO-d$_6$) δ 9.97 (s, 1H), 8.73 (s, 1H), 8.44 (d, J=1.4 Hz, 1H), 7.78-7.62 (m, 2H), 4.43 (t, J=7.0 Hz, 2H), 1.95 (h, J=7.2 Hz, 2H), 0.85 (t, J=7.4 Hz, 3H). R 1.61 min (generic method). ESI-MS for C$_{11}$H$_{12}$N$_2$O: calculated 188.1, found m/z 189.1 [M+H]$^+$.

Step 2. Synthesis of 6-chloro-4-phenyl-3-[(E)-3-(1-propylindazol-5-yl)prop-2-enoyl]-1H-quinolin-2-one (b.17)

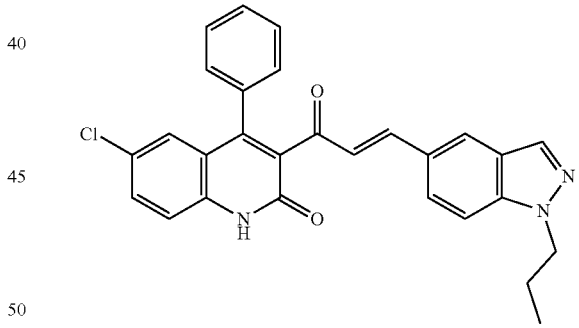

Compound b.17 was synthesized following the general procedure B using a.1 (402 mg, 1.35 mmol) and 1-Propyl-indazole-5-carbaldehyde. Purification by normal phase flash column chromatography (solvent A: DCM, solvent B: EtOH—gradient: 0-7% solvent B) yielded title compound (401 mg, yield 64%). $^1$H NMR (400 MHz, DMSO-d$_6$) δ 12.33 (s, 1H), 8.10 (d, J=0.8 Hz, 1H), 8.07 (d, J=1.4 Hz, 1H), 7.72 (dd, J=9.0, 1.6 Hz, 1H), 7.70-7.57 (m, 3H), 7.48 (d, J=8.8 Hz, 1H), 7.44-7.38 (m, 3H), 7.34 (dd, J=7.7, 1.8 Hz, 2H), 6.98 (d, J=2.4 Hz, 1H), 6.74 (d, J=16.3 Hz, 1H), 4.36 (t, J=6.9 Hz, 2H), 1.82 (h, J=7.2 Hz, 2H), 0.80 (t, J=7.4 Hz, 3H). R$_t$ 2.51 min (generic method). ESI-MS for C$_{28}$H$_{22}$ClN$_3$O$_2$: calculated 467.1, found m/z 468.1 [M+H]$^+$, 466.1 [M−H]$^-$.

Step 3. Synthesis of 6-chloro-4-phenyl-3-[5-(1-pro-pylindazol-5-yl)-4,5-dihydro-1H-pyrazol-3-yl]-1H-quinolin-2-one (c.17)

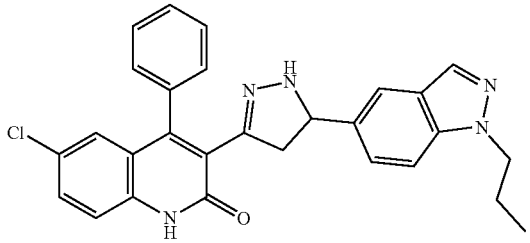 [SMILES: CCCn1ncc2cc(C3CC(c4c(-c5ccccc5)c5cc(Cl)ccc5[nH]c4=O)=NN3)ccc21]

Compound c.17 was synthesized following the general procedure C using b.17 (395 mg, 0.84 mmol). Purification by normal phase flash column chromatography (solvent A: DCM, solvent B: EtOH—gradient: 0-10% solvent B) yielded title compound (381 mg, yield 94%). $^1$H NMR (400 MHz, DMSO-d$_6$) δ 12.19 (s, 1H), 8.00-7.91 (m, 1H), 7.59-7.45 (m, 6H), 7.42 (d, J=8.7 Hz, 2H), 7.38-7.31 (m, 1H), 7.24 (dd, J=6.8, 1.9 Hz, 1H), 7.12 (dd, J=8.7, 1.6 Hz, 1H), 6.90 (d, J=2.3 Hz, 1H), 4.70 (t, J=10.3 Hz, 1H), 4.33 (t, J=6.9 Hz, 2H), 3.25 (dd, J=16.5, 11.1 Hz, 1H), 2.62 (dd, J=16.5, 9.5 Hz, 1H), 1.88-1.77 (m, 2H), 0.81 (t, J=7.4 Hz, 3H). R$_t$ 2.34 min (generic method). ESI-MS for C$_{28}$H$_{24}$ClN$_5$O: calculated 481.2, found m/z 482.2 [M+H]$^+$, 480.2 [M−H]$^-$.

Step 4. Synthesis of 4-[5-(6-chloro-2-oxo-4-phenyl-1H-quinolin-3-yl)-3-(1-propylindazol-5-yl)-3,4-di-hydropyrazol-2-yl]-4-oxo-butanoic acid (d.33)

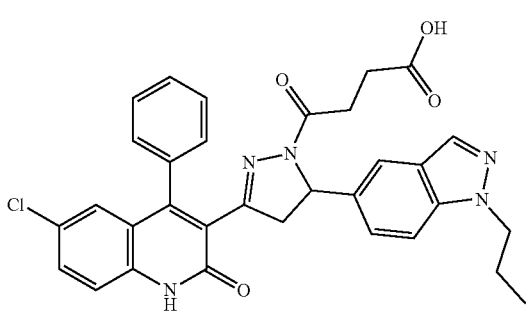 [SMILES: CCCn1ncc2cc(C3CC(c4c(-c5ccccc5)c5cc(Cl)ccc5[nH]c4=O)=NN3C(=O)CCC(=O)O)ccc21]

Compound d.33 was synthesized following the general procedure D1 using c.17 (176 mg, 0.36 mmol) with succinic anhydride (120° C., 200 W). Purification by normal phase flash column chromatography (solvent A: DCM, solvent B: EtOH—gradient: 0-25% solvent B) yielded title compound (178 mg, yield 86%). $^1$H NMR (400 MHz, DMSO-d$_6$) δ 12.36 (s, 1H), 12.05 (s, 1H), 7.97 (d, J=0.9 Hz, 1H), 7.62 (dd, J=8.8, 2.4 Hz, 1H), 7.57 (qd, J=4.0, 1.0 Hz, 2H), 7.53-7.47 (m, 2H), 7.47-7.41 (m, 2H), 7.30-7.25 (m, 1H), 7.16-7.11 (m, 1H), 6.94 (d, J=2.3 Hz, 1H), 6.84 (dd, J=8.8, 1.6 Hz, 1H), 5.42 (dd, J=12.0, 4.6 Hz, 1H), 4.33 (t, J=6.9 Hz, 2H), 3.78 (dd, J=18.5, 12.0 Hz, 1H), 2.85 (dd, J=18.5, 4.6 Hz, 1H), 2.54-2.48 (m, 2H), 2.28 (t, J=6.9 Hz, 2H), 1.83 (h, J=7.2 Hz, 2H), 0.83 (t, J=7.4 Hz, 3H). R$_t$ 2.06 min (generic method). ESI-MS for C$_{32}$H$_{28}$ClN$_5$O$_4$: calculated 581.2, found m/z 582.2 [M+H]$^+$, 580.2 [M−H]$^-$.

Example d.34. 3-[2-acetyl-3-(1-propylindazol-5-yl)-3,4-dihydropyrazol-5-yl]-6-chloro-4-phenyl-1H-quinolin-2-one

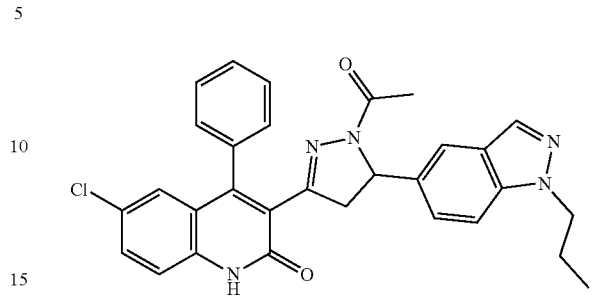

Compound d.36 was synthesized following the general procedure D1 using c.17 (188 mg, 0.39 mmol) with acetic anhydride (165° C., 200 W). Purification by normal phase flash column chromatography (solvent A: DCM, solvent B: EtOH—gradient: 0-10% solvent B) yielded title compound (184 mg, yield 90%). $^1$H NMR (400 MHz, DMSO-d$_6$) δ 12.37 (s, 1H), 7.99 (d, J=0.9 Hz, 1H), 7.65-7.57 (m, 3H), 7.56-7.50 (m, 2H), 7.47-7.41 (m, 2H), 7.36-7.25 (m, 1H), 7.17-7.09 (m, 1H), 6.94 (d, J=2.3 Hz, 1H), 6.85 (dd, J=8.8, 1.7 Hz, 1H), 5.41 (dd, J=12.0, 4.6 Hz, 1H), 4.33 (t, J=6.9 Hz, 2H), 3.78 (dd, J=18.5, 12.0 Hz, 1H), 2.89 (dd, J=18.5, 4.6 Hz, 1H), 1.90-1.77 (m, 5H), 0.82 (t, J=7.4 Hz, 3H). R$_t$ 1.21 min (generic method). ESI-MS for C$_{30}$H$_{26}$ClN$_5$O$_2$: calculated 523.2, found m/z 524.2 [M+H]$^+$, 522.2 [M−H]$^-$.

Example d.35. 4-[5-(6-chloro-2-oxo-4-phenyl-1H-quinolin-3-yl)-3-(2-propylindazol-5-yl)-3,4-dihydro-pyrazol-2-yl]-4-oxo-butanoic acid Step 1. Synthesis of 6-chloro-4-phenyl-3-[(E)-3-(2-propylindazol-5-yl)prop-2-enoyl]-1H-quinolin-2-one (b.18)

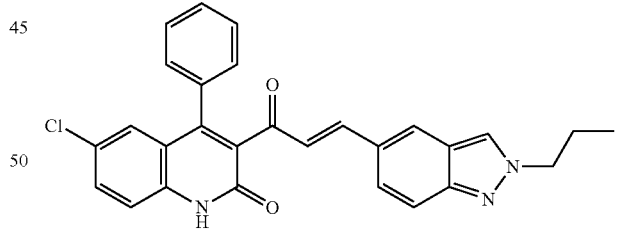

Compound b.18 was synthesized following the general procedure B using a.1 (292 mg, 0.98 mmol) and 2-Propyl-indazole-5-carbaldehyde. Purification by normal phase flash column chromatography (solvent A: DCM, solvent B: EtOH—gradient: 0-7% solvent B) yielded title compound (372 mg, yield 81%). $^1$H NMR (400 MHz, DMSO-d$_6$) δ 12.33 (s, 1H), 8.47 (s, 1H), 8.04-8.00 (m, 1H), 7.65 (dd, J=8.8, 2.3 Hz, 1H), 7.60-7.51 (m, 3H), 7.47 (d, J=8.8 Hz, 1H), 7.44-7.38 (m, 3H), 7.36-7.32 (m, 2H), 6.97 (d, J=2.3 Hz, 1H), 6.68 (d, J=16.2 Hz, 1H), 4.36 (t, J=6.9 Hz, 2H), 1.92 (h, J=7.2 Hz, 2H), 0.83 (t, J=7.4 Hz, 3H). R$_t$ 2.37 min (generic method). ESI-MS for C$_{28}$H$_{22}$ClN$_3$O$_2$: calculated 467.1, found m/z 468.1 [M+H]$^+$, 466.1 [M−H]$^-$.

Step 2. Synthesis of 6-chloro-4-phenyl-3-[5-(2-propylindazol-5-yl)-4,5-dihydro-1H-pyrazol-3-yl]-1H-quinolin-2-one (c.18)

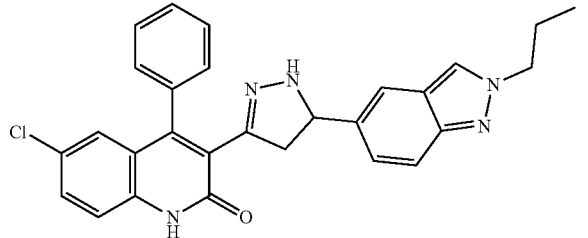 [SMILES: CCCn1cc2cc(C3CC(c4c(-c5ccccc5)c5cc(Cl)ccc5[nH]c4=O)=NN3)ccc2n1]

Compound c.18 was synthesized following the general procedure C using b.18 (342 mg, 0.73 mmol). Purification by normal phase flash column chromatography (solvent A: DCM, solvent B: EtOH—gradient: 0-10% solvent B) yielded title compound (316 mg, yield 89%). $^1$H NMR (400 MHz, DMSO-$d_6$) δ 12.19 (s, 1H), 8.27 (d, J=0.9 Hz, 1H), 7.57 (dd, J=8.8, 2.3 Hz, 1H), 7.55-7.44 (m, 4H), 7.41 (d, J=8.8 Hz, 1H), 7.38-7.33 (m, 2H), 7.24 (dt, J=6.6, 1.9 Hz, 1H), 7.08 (d, J=3.2 Hz, 1H), 6.92 (dd, J=8.9, 1.6 Hz, 1H), 6.90 (d, J=2.4 Hz, 1H), 4.70-4.59 (m, 1H), 4.35 (t, J=6.9 Hz, 2H), 3.24 (dd, J=16.5, 11.1 Hz, 1H), 2.60 (dd, J=16.4, 9.6 Hz, 1H), 1.91 (h, J=7.2 Hz, 2H), 0.82 (t, J=7.4 Hz, 3H). $R_t$ 2.23 min (generic method). ESI-MS for $C_{28}H_{24}ClN_5O$: calculated 481.2, found m/z 482.2 [M+H]$^+$, 480.2 [M−H]$^−$.

Step 3. Synthesis of 4-[5-(6-chloro-2-oxo-4-phenyl-1H-quinolin-3-yl)-3-(2-propylindazol-5-yl)-3,4-dihydropyrazol-2-yl]-4-oxo-butanoic acid (d.35)

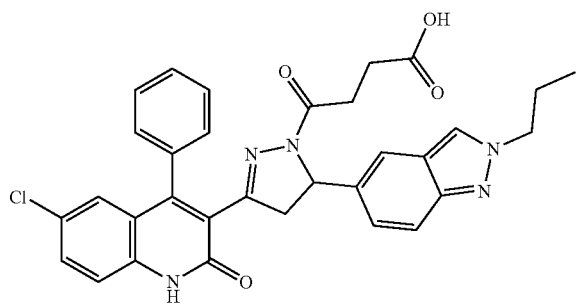 [SMILES: CCCn1cc2cc(C3CC(c4c(-c5ccccc5)c5cc(Cl)ccc5[nH]c4=O)=NN3C(=O)CCC(=O)O)ccc2n1]

Compound d.35 was synthesized following the general procedure $D_1$ using c.18 (173 mg, 0.36 mmol) with succinic anhydride (120° C., 200 W). Purification by normal phase flash column chromatography (solvent A: DCM, solvent B: EtOH—gradient: 0-20% solvent B) yielded title compound (162 mg, yield 78%). $^1$H NMR (400 MHz, DMSO-$d_6$) δ 12.37 (os, 2H), 8.28 (d, J=0.9 Hz, 1H), 7.63-7.54 (m, 3H), 7.50 (td, J=6.6, 5.5, 3.3 Hz, 1H), 7.47-7.40 (m, 3H), 7.30-7.24 (m, 1H), 7.08 (t, J=1.2 Hz, 1H), 6.93 (d, J=2.4 Hz, 1H), 6.62 (dd, J=8.9, 1.7 Hz, 1H), 5.36 (dd, J=12.0, 4.6 Hz, 1H), 4.35 (t, J=6.9 Hz, 2H), 3.77 (dd, J=18.5, 12.0 Hz, 1H), 2.83 (dd, J=18.5, 4.6 Hz, 1H), 2.54-2.50 (m, 2H), 2.29 (t, J=6.9 Hz, 2H), 1.91 (h, J=7.2 Hz, 2H), 0.83 (t, J=7.4 Hz, 3H). $R_t$ 2.00 min (generic method). ESI-MS for $C_{32}H_{28}ClN_5O_4$: calculated 581.2, found m/z 582.2 [M+H]$^+$, 580.2 [M−H]$^−$.

Example d.36. 4-[5-(6-chloro-2-oxo-4-phenyl-1H-quinolin-3-yl)-3-[4-(4-fluorophenyl)phenyl]-3,4-dihydropyrazol-2-yl]-4-oxo-butanoic acid Step 1. Synthesis of 4-(4-fluorophenyl)benzaldehyde

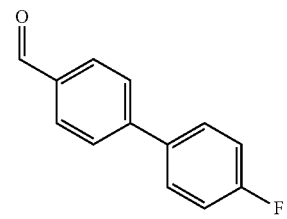 [SMILES: O=Cc1ccc(-c2ccc(F)cc2)cc1]

In a screw capped pressure tube 4-iodobenzaldehyde (255 mg, 1.1 mmol), (4-fluorophenyl)boronic acid (231 mg, 1.5 mmol) and anhydrous sodium carbonate (350 mg, 3.3 mmol) were added. The tube was deoxygenated with three cycles vacuum/Ar, then DMF (2 ml) and $H_2O$ (400 µl) were added. The solution was stirred at rt, under Ar flux, for 15 minutes. Tetrakis(triphenylphosphine)palladium(0) (185 mg, 0.16 mmol) was thus added, the mixture was heated to 110° C. and stirred for 20 hours. The crude was then diluted with DCM and washed three times with water. The solvent was then removed under reduced pressure. Purification by normal phase flash column chromatography (solvent A: CHX, solvent B: EtOAc—gradient: 0-7% solvent B) yielded title compound (226 mg, yield 66%). $^1$H NMR (400 MHz, DMSO-$d_6$) δ 10.06 (s, 1H), 8.03-7.97 (m, 2H), 7.94-7.88 (m, 2H), 7.87-7.81 (m, 2H), 7.40-7.32 (m, 2H). $R_t$ 2.30 min (generic method).

Step 2. Synthesis of 6-chloro-3-[(E)-3-[4-(4-fluorophenyl)phenyl]prop-2-enoyl]-4-phenyl-1H-quinolin-2-one (b.19)

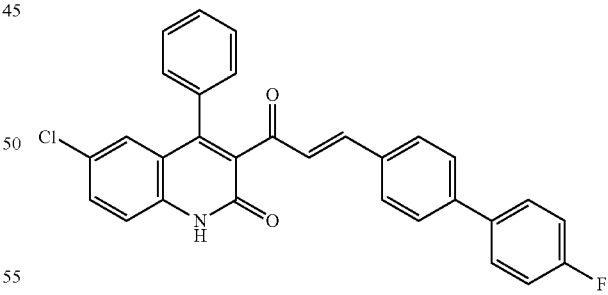

Compound b.19 was synthesized following the general procedure B using a.1 (214 mg, 0.72 mmol) and 4'-Fluoro-[1,1'-biphenyl]-4-carbaldehyde. Purification by normal phase flash column chromatography (solvent A: CHCl$_3$, solvent B: EtOH—gradient: 0-7% solvent B) yielded title compound (305 mg, yield 89%). $^1$H NMR (400 MHz, DMSO-$d_6$) δ 12.35 (s, 1H), 7.82-7.62 (m, 7H), 7.57-7.40 (m, 5H), 7.36-7.26 (m, 4H), 6.98 (d, J=2.3 Hz, 1H), 6.80 (d, J=16.4 Hz, 1H). $R_t$ 1.90 min (apolar method). ESI-MS for $C_{30}H_{19}ClFNO_2$: calculated 479.1, found m/z 480.1 [M+H]$^+$.

Step 3. Synthesis of 6-chloro-3-[5-[4-(4-fluorophenyl)phenyl]-4,5-dihydro-1H-pyrazol-3-yl]-4-phenyl-1H-quinolin-2-one (c.19)

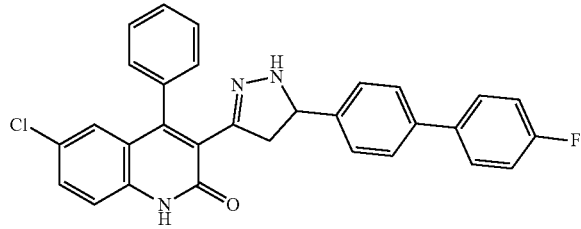 [SMILES: O=c1[nH]c2ccc(Cl)cc2c(-c2ccccc2)c1C1=NNC(c2ccc(-c3ccc(F)cc3)cc2)C1]

Compound c.19 was synthesized following the general procedure C using b.19 (273 mg, 0.57 mmol). Purification by normal phase flash column chromatography (solvent A: DCM, solvent B: EtOH—gradient: 0-10% solvent B. Yielding title compound 188 mg, 67%. $^1$H NMR (400 MHz, DMSO-$d_6$) δ 12.18 (s, 1H), 7.71-7.64 (m, 2H), 7.60-7.46 (m, 6H), 7.42 (d, J=8.8 Hz, 1H), 7.37-7.32 (m, 1H), 7.31-7.21 (m, 3H), 7.19-7.13 (m, 3H), 6.90 (d, J=2.3 Hz, 1H), 4.67-4.57 (m, 1H), 3.26 (dd, J=16.6, 11.1 Hz, 1H), 2.60 (dd, J=16.4, 9.5 Hz, 1H). $R_t$ 1.72 min (apolar method). ESI-MS for $C_{30}H_{21}ClFN_3O$: calculated 493.1, found m/z 494 [M+H]$^+$, 492.1 [M–H]$^-$.

Step 4. Synthesis of 4-[5-(6-chloro-2-oxo-4-phenyl-1H-quinolin-3-yl)-3-[4-(4-fluorophenyl)phenyl]-3,4-dihydropyrazol-2-yl]-4-oxo-butanoic acid (d.36)

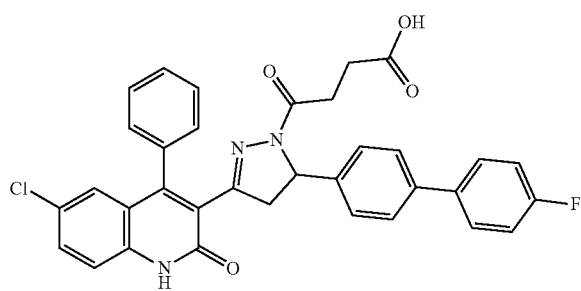 [SMILES: O=C(O)CCC(=O)N1N=C(c2c(-c3ccccc3)c3cc(Cl)ccc3[nH]c2=O)CC1c1ccc(-c2ccc(F)cc2)cc1]

Compound d.36 was synthesized following the general procedure D1 using c.19 (171 mg, 0.35 mmol) with succinic anhydride (120° C., 200 W). Purification by normal phase flash column chromatography (solvent A: DCM, solvent B: EtOH—gradient: 0-10% solvent B) yielded title compound (167 mg, yield 80%). $^1$H NMR (400 MHz, DMSO-$d_6$) δ 12.38 (s, 1H), 12.08 (s, 1H), 7.71-7.61 (m, 3H), 7.55 (ddt, J=10.6, 9.5, 4.0 Hz, 3H), 7.50-7.40 (m, 4H), 7.33-7.25 (m, 3H), 6.94 (d, J=2.3 Hz, 1H), 6.87 (d, J=8.3 Hz, 2H), 5.35 (dd, J=12.0, 4.6 Hz, 1H), 3.77 (dd, J=18.5, 12.1 Hz, 1H), 2.84 (dd, J=18.4, 4.7 Hz, 1H), 2.57-2.44 (m, 2H), 2.30 (t, J=6.8 Hz, 2H). ESI-MS for $C_{34}H_{25}ClFN_3O_4$: calculated 593.2, found m/z 594.2 [M+H]$^+$, 592.2 [M–H]$^-$.

Example d.37. 4-[5-(6-chloro-2-oxo-4-phenyl-1H-quinolin-3-yl)-3-[4-(4-chlorophenyl)phenyl]-3,4-dihydropyrazol-2-yl]-4-oxo-butanoic acid Step 1. Synthesis of 6-chloro-3-[(E)-3-[4-(4-chlorophenyl)phenyl]prop-2-enoyl]-4-phenyl-1H-quinolin-2-one (b.20)

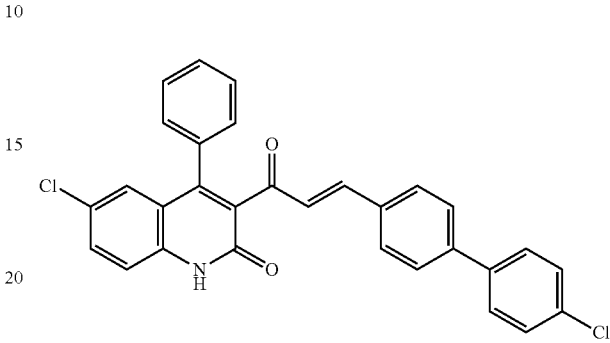

Compound b.20 was synthesized following the general procedure B using a.1 (339 mg, 1.1 mmol) and 4'-chloro-[1,1'-biphenyl]-4-carbaldehyde. Purification by normal phase flash column chromatography (solvent A: DCM, solvent B: EtOH—gradient: 0-5% solvent B) yielded title compound (567 mg, quantitative yield). $^1$H NMR (400 MHz, DMSO-$d_6$) δ 12.35 (s, 1H), 7.78-7.68 (m, 6H), 7.65 (dd, J=8.8, 2.4 Hz, 1H), 7.57-7.48 (m, 3H), 7.48-7.40 (m, 4H), 7.34 (dd, J=7.8, 1.8 Hz, 2H), 6.99 (d, J=2.3 Hz, 1H), 6.81 (d, J=16.4 Hz, 1H). $R_t$ 2.16 min (apolar method). ESI-MS for $C_{30}H_{19}Cl_2NO_2$: calculated 495.1, found m/z 496.1 [M+H]$^+$, 494.1 [M–H]$^-$.

Step 2. Synthesis of 6-chloro-3-[5-[4-(4-chlorophenyl)phenyl]-4,5-dihydro-1H-pyrazol-3-yl]-4-phenyl-1H-quinolin-2-one (c.20)

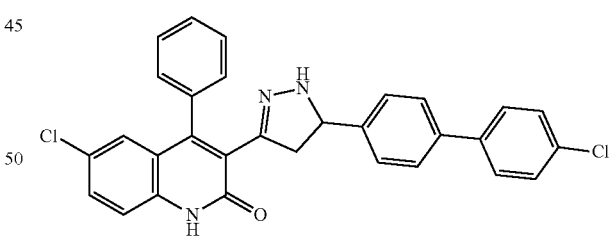

Compound c.20 was synthesized following the general procedure C using b.20 (558 mg, 1.1 mmol). Purification by normal phase flash column chromatography (solvent A: DCM, solvent B: EtOH—gradient: 0-15% solvent B) yielded title compound (501 mg, yield 87%). $^1$H NMR (400 MHz, DMSO-$d_6$) δ 12.20 (s, 1H), 7.69-7.63 (m, 2H), 7.59-7.46 (m, 8H), 7.41 (d, J=8.7 Hz, 1H), 7.37-7.31 (m, 1H), 7.26-7.20 (m, 1H), 7.17 (d, J=8.3 Hz, 2H), 6.90 (d, J=2.3 Hz, 1H), 4.63 (ddd, J=11.3, 9.5, 3.0 Hz, 1H), 3.27 (dd, J=16.4, 11.1 Hz, 1H), 2.60 (dd, J=16.4, 9.4 Hz, 1H). $R_t$ 1.99 min (apolar method). ESI-MS for $C_{30}H_{21}Cl_2N_3O$: calculated 509.1, found m/z 510.1 [M+H]$^+$, 508.1 [M–H]$^-$.

Step 3. Synthesis of 4-[5-(6-chloro-2-oxo-4-phenyl-1H-quinolin-3-yl)-3-[4-(4-chlorophenyl)phenyl]-3,4-dihydropyrazol-2-yl]-4-oxo-butanoic acid (d.37)

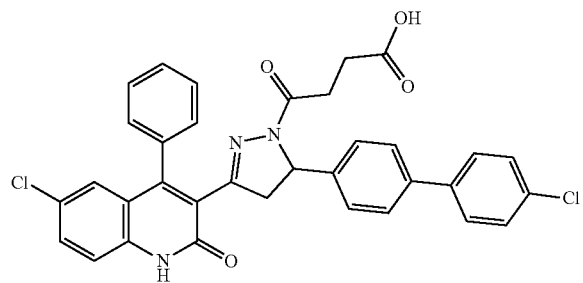 [SMILES: O=C(O)CCC(=O)N1N=C(c2c(-c3ccccc3)c3cc(Cl)ccc3[nH]c2=O)CC1c1ccc(-c2ccc(Cl)cc2)cc1]

Compound d.37 was synthesized following the general procedure D1 using c.20 (227 mg, 0.44 mmol) with succinic anhydride (120° C., 200 W). Purification by normal phase flash column chromatography (solvent A: DCM, solvent B: EtOH—gradient: 0-10% solvent B) yielded title compound (205 mg, yield 77%). $^1$H NMR (400 MHz, DMSO-$d_6$) δ 12.38 (s, 1H), 12.04 (s, 1H), 7.67 (d, J=8.6 Hz, 2H), 7.63 (dd, J=8.8, 2.4 Hz, 1H), 7.59-7.48 (m, 7H), 7.47-7.39 (m, 2H), 7.29 (dd, J=6.5, 2.0 Hz, 1H), 6.94 (d, J=2.4 Hz, 1H), 6.88 (d, J=8.3 Hz, 2H), 5.35 (dd, J=12.0, 4.6 Hz, 1H), 3.77 (dd, J=18.5, 12.1 Hz, 1H), 2.84 (dd, J=18.5, 4.6 Hz, 1H), 2.50 (m, 2H), 2.29 (t, J=6.8 Hz, 2H). $R_t$ 2.51 min (generic method). ESI-MS for $C_{34}H_{25}Cl_2N_3O_4$: calculated 609.1, found m/z 610.1 [M+H]$^+$, 608.1 [M−H]$^−$.

Example d.38. 3-[2-acetyl-3-[4-(4-chlorophenyl)phenyl]-3,4-dihydropyrazol-5-yl]-6-chloro-4-phenyl-1H-quinolin-2-one

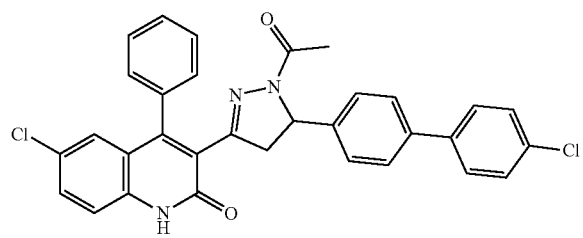 [SMILES: CC(=O)N1N=C(c2c(-c3ccccc3)c3cc(Cl)ccc3[nH]c2=O)CC1c1ccc(-c2ccc(Cl)cc2)cc1]

Compound d.38 was synthesized following the general procedure D1 using c.20 (224 mg, 0.44 mmol) with acetic anhydride (165° C., 200 W). Purification by normal phase flash column chromatography (solvent A: DCM, solvent B: EtOH—gradient: 0-10% solvent B) yielded title compound (245 mg, quantitative yield). $^1$H NMR (400 MHz, DMSO-$d_6$) δ 12.37 (s, 1H), 7.71-7.48 (m, 10H), 7.48-7.39 (m, 2H), 7.29 (dt, J=5.2, 2.0 Hz, 1H), 6.94 (d, J=2.4 Hz, 1H), 6.90 (d, J=8.3 Hz, 2H), 5.35 (dd, J=12.1, 4.6 Hz, 1H), 3.78 (dd, J=18.4, 12.1 Hz, 1H), 2.88 (dd, J=18.5, 4.6 Hz, 1H), 1.88 (s, 3H). $R_t$ 2.00 min (apolar method). ESI-MS for $C_{32}H_{23}Cl_2N_3O_2$: calculated 551.1, found m/z 552.1 [M+H]$^+$, 550.1 [M−H]$^−$.

Example d.39. 4-[3-[4-(4-bromophenyl)phenyl]-5-(6-chloro-2-oxo-4-phenyl-1H-quinolin-3-yl)-3,4-dihydropyrazol-2-yl]-4-oxo-butanoic acid Step 1. Synthesis of 3-[(E)-3-[4-(4-bromophenyl)phenyl]prop-2-enoyl]-6-chloro-4-phenyl-1H-quinolin-2-one (b.21)

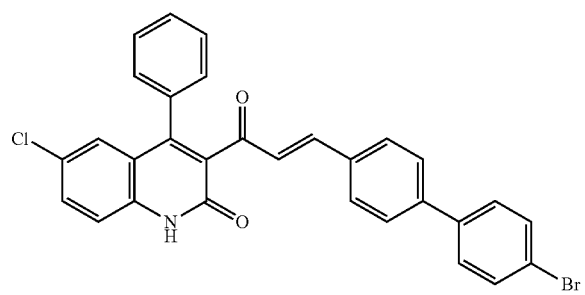 [SMILES: O=C(/C=C/c1ccc(-c2ccc(Br)cc2)cc1)c1c(-c2ccccc2)c2cc(Cl)ccc2[nH]c1=O]

Compound b.21 was synthesized following the general procedure B using a.1 (337 mg, 1.1 mmol) and 4'-bromo-[1,1'-biphenyl]-4-carbaldehyde. Purification by normal phase flash column chromatography (solvent A: DCM, solvent B: EtOH—gradient: 0-5% solvent B) yielded title compound (576 mg, yield 89%). $^1$H NMR (400 MHz, DMSO-$d_6$) δ 12.35 (s, 1H), 7.80-7.68 (m, 4H), 7.68-7.62 (m, 5H), 7.57-7.39 (m, 5H), 7.34 (dd, J=7.7, 1.8 Hz, 2H), 6.99 (d, J=2.3 Hz, 1H), 6.81 (d, J=16.4 Hz, 1H). $R_t$ 2.20 min (apolar method). ESI-MS for $C_{30}H_{19}BrClNO_2$: calculated 538.0/540.0, found m/z 539.0/541.0 [M+H]$^+$, 537.0/539.0 [M−H]$^−$.

Step 2. Synthesis of 3-[5-[4-(4-bromophenyl)phenyl]-4,5-dihydro-1H-pyrazol-3-yl]-6-chloro-4-phenyl-1H-quinolin-2-one (c.21)

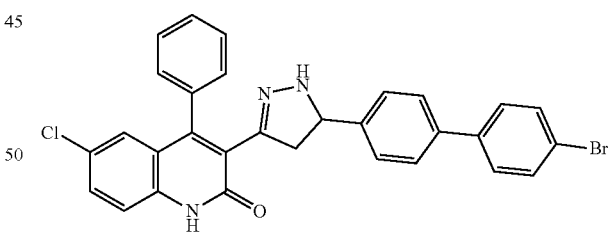

Compound c.21 was synthesized following the general procedure C using b.21 (570 mg, 1.0 mmol). Purification by normal phase flash column chromatography (solvent A: DCM, solvent B: EtOH—gradient: 0-10% solvent B) yielded title compound (472 mg, yield 81%). $^1$H NMR (400 MHz, DMSO-$d_6$) δ 12.20 (s, 1H), 7.68-7.46 (m, 10H), 7.41 (d, J=8.8 Hz, 1H), 7.37-7.33 (m, 1H), 7.26-7.21 (m, 1H), 7.19-7.15 (m, 3H), 6.90 (d, J=2.4 Hz, 1H), 4.63 (ddd, J=11.3, 9.5, 3.1 Hz, 1H), 3.27 (dd, J=16.4, 11.0 Hz, 1H), 2.60 (dd, J=16.4, 9.4 Hz, 1H). $R_t$ 2.05 min (apolar method). ESI-MS for $C_{30}H_{21}BrClN_3O$: calculated 552.1/554.1, found m/z 553.1/555.1 [M+H]$^+$.

Step 3. Synthesis of 4-[3-[4-(4-bromophenyl)phenyl]-5-(6-chloro-2-oxo-4-phenyl-1H-quinolin-3-yl)-3,4-dihydropyrazol-2-yl]-4-oxo-butanoic acid (d.39)

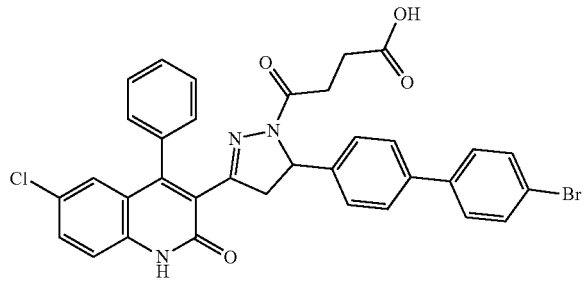 [SMILES: O=C(O)CCC(=O)N1N=C(c2c(-c3ccccc3)c3cc(Cl)ccc3[nH]c2=O)CC1c1ccc(-c2ccc(Br)cc2)cc1]

Compound d.39 was synthesized following the general procedure D1 using c.21 (214 mg, 0.38 mmol) with succinic anhydride (120° C., 200 W). Purification by normal phase flash column chromatography (solvent A: DCM, solvent B: EtOH—gradient: 0-20% solvent B) yielded title compound (197 mg, yield 79%). $^1$H NMR (400 MHz, DMSO-$d_6$) δ 12.37 (s, 1H), 12.08 (s, 1H), 7.68-7.38 (m, 12H), 7.30-7.26 (m, 1H), 6.94 (d, J=2.4 Hz, 1H), 6.89 (d, J=8.4 Hz, 2H), 5.35 (dd, J=12.0, 4.6 Hz, 1H), 3.78 (dd, J=18.5, 12.1 Hz, 1H), 2.84 (dd, J=18.5, 4.7 Hz, 1H), 2.58-2.43 (m, J=3.7 Hz, 2H), 2.30 (t, J=6.9 Hz, 2H). $R_t$ 2.52 min (generic method). ESI-MS for $C_{34}H_{25}BrClN_3O_4$: calculated 652.1/654.1, found m/z 653.1/655.1 [M+H]$^+$, 651.1/653.1 [M–H]$^-$.

Example d.40. 3-[2-acetyl-3-[4-(4-bromophenyl)phenyl]-3,4-dihydropyrazol-5-yl]-6-chloro-4-phenyl-1H-quinolin-2-one

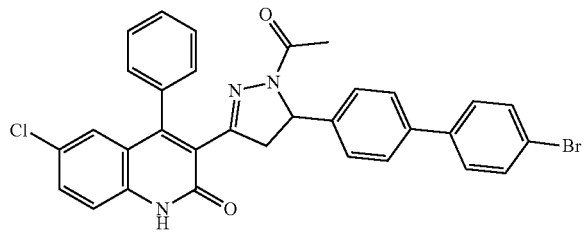 [SMILES: CC(=O)N1N=C(c2c(-c3ccccc3)c3cc(Cl)ccc3[nH]c2=O)CC1c1ccc(-c2ccc(Br)cc2)cc1]

Compound d.40 was synthesized following the general procedure D1 using c.21 (203 mg, 0.36 mmol) with acetic anhydride (165° C., 200 W). Purification by normal phase flash column chromatography: solvent A: DCM, solvent B: EtOH—gradient: 0-10% solvent B. Yielding title compound 175 mg, 80%. $^1$H NMR (400 MHz, DMSO-$d_6$) δ 12.37 (s, 1H), 7.66-7.36 (m, 12H), 7.32-7.24 (m, 1H), 6.98-6.85 (m, 3H), 5.35 (dd, J=12.0, 4.6 Hz, 1H), 3.78 (dd, J=18.4, 12.1 Hz, 1H), 2.90 (dd, J=18.4, 4.6 Hz, 1H), 1.88 (s, 3H). $R_t$ 2.52 min (apolar method). ESI-MS for $C_{32}H_{23}BrClN_3O_2$: calculated 594.1/596.1, found m/z 595.1/597.1 [M+H]$^+$, 593.1/595.1 [M–H]$^-$.

Example d.41. 4-[5-(6-chloro-2-oxo-4-phenyl-1H-quinolin-3-yl)-3-[4-(4-methoxyphenyl)phenyl]-3,4-dihydropyrazol-2-yl]-4-oxo-butanoic acid Step 1. Synthesis of 6-chloro-3-[(E)-3-[4-(4-methoxyphenyl)phenyl]prop-2-enoyl]-4-phenyl-1H-quinolin-2-one (b.22)

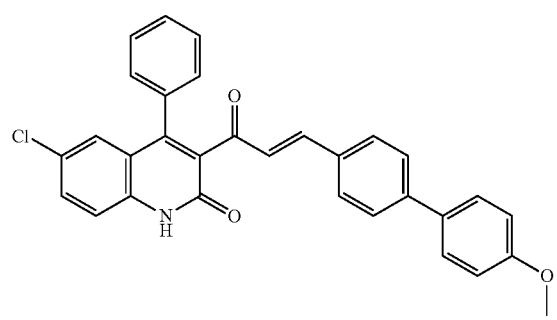 [SMILES: COc1ccc(-c2ccc(/C=C/C(=O)c3c(-c4ccccc4)c4cc(Cl)ccc4[nH]c3=O)cc2)cc1]

Compound b.22 was synthesized following the general procedure B using a.1 (430 mg, 1.4 mmol) and 4'-methoxy-[1,1'-biphenyl]-4-carbaldehyde. Purification by normal phase flash column chromatography (solvent A: DCM, solvent B: EtOH—gradient: 0-10% solvent B) yielded title compound (528 mg, yield 74%). $^1$H NMR (400 MHz, DMSO-$d_6$) δ 12.35 (s, 1H), 7.75-7.62 (m, 6H), 7.55-7.40 (m, 6H), 7.33 (ddt, J=6.7, 3.2, 1.8 Hz, 2H), 7.05-7.00 (m, 2H), 6.98 (d, J=2.4 Hz, 1H), 6.77 (d, J=16.4 Hz, 1H), 3.79 (s, 3H). $R_t$ 1.81 min (apolar method). ESI-MS for $C_{31}H_{22}ClNO_3$: calculated 491.1, found m/z 492.1 [M+H]$^+$, 490.1 [M–H]$^-$.

Step 2. Synthesis of 6-chloro-3-[5-[4-(4-methoxyphenyl)phenyl]-4,5-dihydro-1H-pyrazol-3-yl]-4-phenyl-1H-quinolin-2-one (c.22)

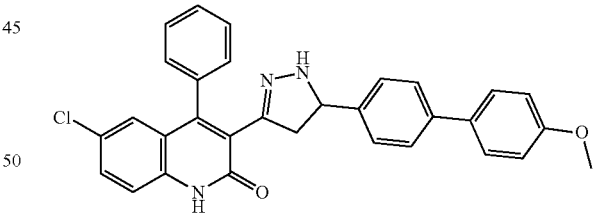

Compound c.22 was synthesized following the general procedure C using b.22 (522 mg, 1.1 mmol). Purification by normal phase flash column chromatography (solvent A: DCM, solvent B: EtOH—gradient: 0-10% solvent B) yielded title compound (412 mg, yield 77%). $^1$H NMR (400 MHz, DMSO-$d_6$) δ 12.20 (s, 1H), 7.57 (dd, J=8.9, 2.4 Hz, 3H), 7.54-7.44 (m, 5H), 7.41 (d, J=8.8 Hz, 1H), 7.38-7.31 (m, 1H), 7.24 (td, J=4.2, 3.7, 1.8 Hz, 1H), 7.16-7.11 (m, 3H), 7.01 (d, J=8.8 Hz, 2H), 6.90 (d, J=2.3 Hz, 1H), 4.60 (ddd, J=11.0, 9.5, 3.1 Hz, 1H), 3.79 (s, 3H), 3.25 (dd, J=16.4, 11.0 Hz, 1H), 2.60 (dd, J=16.4, 9.5 Hz, 1H). $R_t$ 2.60 min (generic method). ESI-MS for $C_{31}H_{24}ClN_3O_2$: calculated 505.2, found m/z 506.2 [M+H]$^+$, 504.2 [M–H]$^-$.

Step 3. Synthesis of 4-[5-(6-chloro-2-oxo-4-phenyl-1H-quinolin-3-yl)-3-[4-(4-methoxyphenyl)phenyl]-3,4-dihydropyrazol-2-yl]-4-oxo-butanoic acid (d.41)

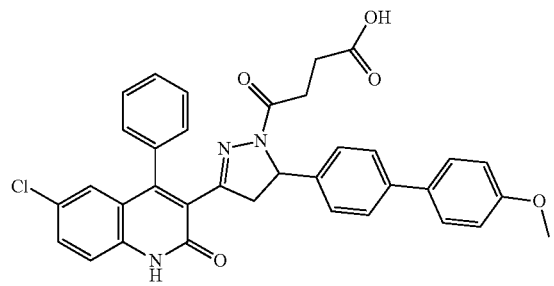 [SMILES: COc1ccc(-c2ccc(C3CC(c4c(-c5ccccc5)c5cc(Cl)ccc5[nH]c4=O)=NN3C(=O)CCC(=O)O)cc2)cc1]

Compound d.41 was synthesized following the general procedure D1 using c.22 (545 mg, 1.1 mmol) with succinic anhydride (120° C., 200 W). Purification by normal phase flash column chromatography (solvent A: DCM, solvent B: EtOH—gradient: 0-10% solvent B) yielded title compound (359 mg, yield 55%). $^1$H NMR (400 MHz, DMSO-$d_6$) δ 12.38 (s, 1H), 12.03 (s, 1H), 7.67-7.50 (m, 6H), 7.44 (dt, J=7.7, 5.9 Hz, 4H), 7.29 (dd, J=6.7, 2.1 Hz, 1H), 7.02 (d, J=8.8 Hz, 2H), 6.94 (d, J=2.3 Hz, 1H), 6.84 (d, J=8.3 Hz, 2H), 5.33 (dd, J=12.0, 4.6 Hz, 1H), 3.79 (s, 4H), 2.84 (dd, J=18.4, 4.6 Hz, 1H), 2.50 (p, J=1.9 Hz, 2H), 2.30 (t, J=6.9 Hz, 2H). $R_t$ 2.30 min (generic method). ESI-MS for $C_{35}H_{28}ClN_3O_5$: calculated 605.2, found m/z 606.2 [M+H]$^+$, 604.2 [M−H]$^−$.

Example d.42. 3-[2-acetyl-3-[4-(4-methoxyphenyl)phenyl]-3,4-dihydropyrazol-5-yl]-6-chloro-4-phenyl-1H-quinolin-2-one

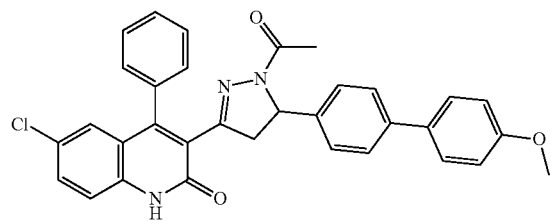 [SMILES: COc1ccc(-c2ccc(C3CC(c4c(-c5ccccc5)c5cc(Cl)ccc5[nH]c4=O)=NN3C(C)=O)cc2)cc1]

Compound d.42 was synthesized following the general procedure D1 using c.22 (179 mg, 0.35 mmol) with acetic anhydride (165° C., 200 W). Purification by normal phase flash column chromatography (solvent A: DCM, solvent B: EtOH—gradient: 0-8% solvent B) yielded title compound (158 mg, yield 83%). $^1$H NMR (600 MHz, DMSO-$d_6$) δ 12.39 (s, 1H), 7.63 (dd, J=8.8, 2.4 Hz, 1H), 7.60-7.53 (m, 5H), 7.45 (d, J=8.5 Hz, 3H), 7.43-7.39 (m, 1H), 7.31-7.27 (m, 1H), 7.03-6.99 (m, 2H), 6.94 (d, J=2.4 Hz, 1H), 6.86 (d, J=8.3 Hz, 2H), 5.33 (dd, J=12.1, 4.6 Hz, 1H), 3.79 (s, 4H), 2.88 (dd, J=18.5, 4.6 Hz, 1H), 1.88 (s, 3H). $R_t$ 1.65 min (apolar method). ESI-MS for $C_{33}H_{26}ClN_3O_3$: calculated 547.2, found m/z 548 [M+H]$^+$, 546 [M−H]$^−$.

Example d.43 4-[5-(6-chloro-2-oxo-4-phenyl-1H-quinolin-3-yl)-3-[4-(1-propylpyrazol-4-yl)phenyl]-3,4-dihydropyrazol-2-yl]-4-oxo-butanoic acid (d.46)

Step 1. Synthesis of 4-(1-propylpyrazol-4-yl)benzaldehyde

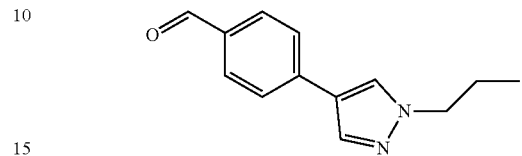

In a Schlenk tube 4-iodobenzaldehyde (326 mg, 1.4 mmol), (1-propyl-pyrazol-4-yl)boronic acid (323 mg, 2.1 mmol) and anhydrous sodium carbonate (445 mg, 4.2 mmol) were added. The tube was deoxygenated with three cycles vacuum/Ar, then anhydrous DMF (1.1 ml) and H$_2$O (300 μl) were added. The solution was stirred at rt, under Ar flux, for 15 minutes. Tetrakis(triphenylphosphine)palladium(0) (243 mg, 0.2 mmol) was thus added, the mixture was heated to 110° C. and stirred for 18 hours. The reaction mixture was diluted with DCM and washed three times with water; the solvent was thus removed under reduced pressure. Purification by normal phase flash column chromatography (solvent A: CHX, solvent B: EtOAc—gradient: 0-30% solvent B) yielded title compound (238 mg, yield 97%). $^1$H NMR (400 MHz, DMSO-$d_6$) δ 9.95 (s, 1H), 8.37 (s, 1H), 8.03 (s, 1H), 7.94-7.75 (m, 4H), 4.10 (t, J=6.9 Hz, 2H), 1.83 (h, J=7.2 Hz, 2H), 0.85 (t, J=7.4 Hz, 3H). $R_t$ 1.86 min (generic method). ESI-MS for $C_{13}H_{14}N_2O$: calculated 214.1, found m/z 215 [M+H]$^+$.

Step 2. Synthesis of 6-chloro-4-phenyl-3-[(E)-3-[4-(1-propylpyrazol-4-yl)phenyl]prop-2-enoyl]-1H-quinolin-2-one (b.23)

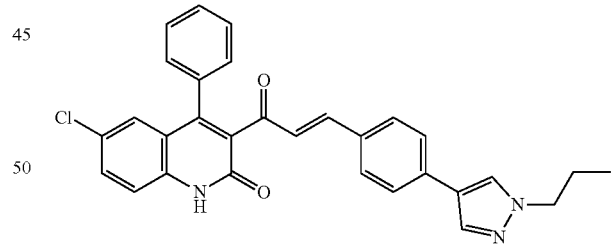

Compound b.23 was synthesized following the general procedure B using a.1 (324 mg, 1.1 mmol) and 4-(1-Propyl-1H-pyrazol-4-yl)benzaldehyde. Purification by normal phase flash column chromatography (solvent A: DCM, solvent B: EtOH—gradient: 0-8% solvent B) yielded title compound (387 mg, yield 72%). $^1$H NMR (400 MHz, DMSO-$d_6$) δ 12.33 (s, 1H), 8.26 (d, J=0.8 Hz, 1H), 7.94 (d, J=0.8 Hz, 1H), 7.68-7.55 (m, 5H), 7.50-7.38 (m, 5H), 7.33 (dd, J=7.7, 1.8 Hz, 2H), 6.98 (d, J=2.3 Hz, 1H), 6.73 (d, J=16.4 Hz, 1H), 4.06 (t, J=7.0 Hz, 2H), 1.81 (h, J=7.3 Hz, 2H), 0.84 (t, J=7.4 Hz, 3H). $R_t$ 2.46 min (generic method). ESI-MS for $C_{30}H_{24}ClN_3O_2$: calculated 493.2, found m/z 494.2 [M+H]$^+$, 492.2 [M−H]$^−$.

Step 3. Synthesis of 6-chloro-4-phenyl-3-[5-[4-(1-propylpyrazol-4-yl)phenyl]-4,5-dihydro-1H-pyrazol-3-yl]-1H-quinolin-2-one (c.23)

Example d.44. 3-[2-acetyl-3-[4-(1-propylpyrazol-4-yl)phenyl]-3,4-dihydropyrazol-5-yl]-6-chloro-4-phenyl-1H-quinolin-2-one

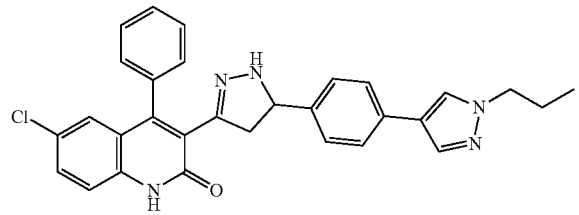 [SMILES: CCCn1cc(-c2ccc(C3CC(c4c(-c5ccccc5)c5cc(Cl)ccc5[nH]c4=O)=NN3)cc2)cn1]

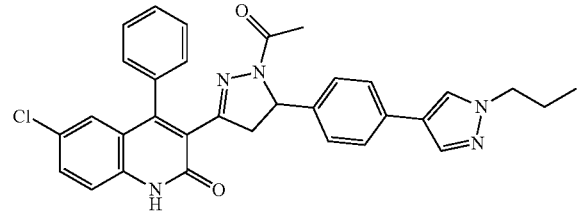

Compound c.23 was synthesized following the general procedure C using b.23 (358 mg, 0.72 mmol). Purification by normal phase flash column chromatography (solvent A: DCM, solvent B: EtOH—gradient: 0-10% solvent B) yielded title compound (326 mg, yield 89%). $^1$H NMR (400 MHz, DMSO-$d_6$) δ 12.18 (s, 1H), 8.13 (d, J=0.8 Hz, 1H), 7.83 (d, J=0.8 Hz, 1H), 7.57 (dd, J=8.8, 2.4 Hz, 1H), 7.51 (tdd, J=6.6, 3.8, 1.8 Hz, 3H), 7.42 (dd, J=8.5, 6.2 Hz, 3H), 7.34 (dt, J=6.8, 1.7 Hz, 1H), 7.26-7.22 (m, 1H), 7.09 (d, J=3.2 Hz, 1H), 7.08-7.03 (m, 2H), 6.90 (d, J=2.3 Hz, 1H), 4.61-4.49 (m, 1H), 4.06 (t, J=7.0 Hz, 2H), 3.22 (dd, J=16.4, 11.0 Hz, 1H), 2.56 (dd, J=16.4, 9.6 Hz, 1H), 1.81 (h, J=7.3 Hz, 2H), 0.85 (t, J=7.4 Hz, 3H). $R_t$ 2.34 min (generic method). ESI-MS for $C_{30}H_{26}ClN_5O$: calculated 507.2, found m/z 508.2 [M+H]$^+$, 506.2 [M−H]$^−$.

Compound d.44 was synthesized following the general procedure D1 using c.23 (146 mg, 0.31 mmol) with acetic anhydride (165° C., 200 W). Purification by normal phase flash column chromatography (solvent A: DCM, solvent B: EtOH—gradient: 0-8% solvent B) yielded title compound (138 mg, yield 81%). $^1$H NMR (400 MHz, DMSO-$d_6$) δ 12.36 (s, 1H), 8.13 (s, 1H), 7.83 (d, J=0.7 Hz, 1H), 7.62 (dd, J=8.8, 2.4 Hz, 1H), 7.60-7.52 (m, 3H), 7.45 (d, J=8.8 Hz, 1H), 7.43-7.38 (m, 3H), 7.30 (dt, J=6.2, 1.7 Hz, 1H), 6.94 (d, J=2.3 Hz, 1H), 6.79 (d, J=8.3 Hz, 2H), 5.28 (dd, J=12.0, 4.5 Hz, 1H), 4.07 (t, J=7.0 Hz, 2H), 3.75 (dd, J=18.4, 12.0 Hz, 1H), 2.86 (dd, J=18.4, 4.6 Hz, 1H), 1.91-1.75 (m, 5H), 0.85 (t, J=7.4 Hz, 3H). $R_t$ 1.22 min (apolar method). ESI-MS for $C_{32}H_{28}ClN_5O_2$: calculated 549.2, found m/z 550.2 [M+H]$^+$, 548.2 [M−H]$^−$.

Example d.45. 4-[5-(6-chloro-2-oxo-4-phenyl-1H-quinolin-3-yl)-3-[4-(1-ethylindazol-5-yl)phenyl]-3,4-dihydropyrazol-2-yl]-4-oxo-butanoic acid Step 1. Synthesis of 4-(1-ethylindazol-5-yl)benzaldehyde and 4-(2-ethylindazol-5-yl)benzaldehyde Step 4. Synthesis of 4-[5-(6-chloro-2-oxo-4-phenyl-1H-quinolin-3-yl)-3-[4-(1-propylpyrazol-4-yl)phenyl]-3,4-dihydropyrazol-2-yl]-4-oxo-butanoic acid (d.43)

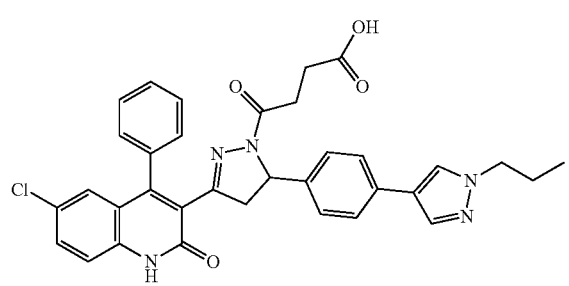 [SMILES: CCCn1cc(-c2ccc(C3CC(c4c(-c5ccccc5)c5cc(Cl)ccc5[nH]c4=O)=NN3C(=O)CCC(=O)O)cc2)cn1]

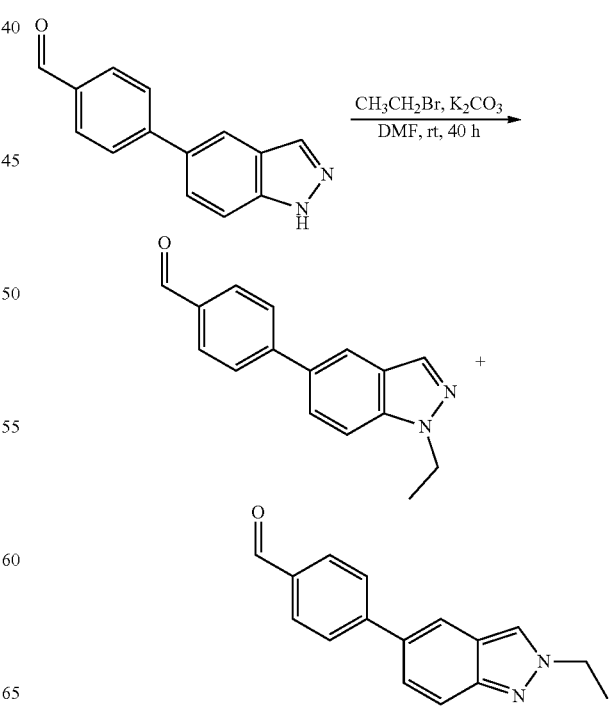

Compound d.43 was synthesized following the general procedure D1 using c.23 (155 mg, 0.30 mmol) with succinic anhydride (120° C., 200 W). Purification by normal phase flash column chromatography (solvent A: DCM, solvent B: EtOH—gradient: 0-30% solvent B) yielded title compound (189 mg, quantitative yield). $^1$H NMR (400 MHz, DMSO-$d_6$) δ 12.37 (s, 1H), 12.10 (s, 1H), 8.14 (s, 1H), 7.84 (s, 1H), 7.62 (dd, J=8.8, 2.4 Hz, 1H), 7.59-7.50 (m, 3H), 7.48-7.36 (m, 4H), 7.31-7.25 (m, 1H), 6.94 (d, J=2.3 Hz, 1H), 6.77 (d, J=8.0 Hz, 2H), 5.28 (dd, J=12.0, 4.6 Hz, 1H), 4.07 (t, J=7.0 Hz, 2H), 3.75 (dd, J=18.4, 12.1 Hz, 1H), 2.82 (dd, J=18.5, 4.6 Hz, 1H), 2.48-2.41 (m, 1H), 2.28 (t, J=6.9 Hz, 1H), 1.81 (h, J=7.2 Hz, 2H), 0.85 (t, J=7.3 Hz, 3H). $R_t$ 2.09 min (generic method). ESI-MS for $C_{34}H_{30}ClN_5O_4$: calculated 607.2, found m/z 608.2 [M+H]$^+$, 606.2 [M−H]$^−$.

In a screw capped pressure tube 4-(1H-indazol-5-yl)benzaldehyde (204 mg, 0.92 mmol) was dissolved with 1.0 ml of anhydrous DMF then potassium carbonate (254 mg, 1.8 mmol) was added and the mixture kept under stirring for 15 minutes at rt. Ethyl bromide (172 µl, 2.3 mmol) was then added. The reaction was thus stirred at rt for 40 hours. The crude mixture was diluted with DCM and washed three times with water. The organic layer was dried through a phase separator and the solvent removed under reduced pressure. Purification by normal phase flash column chromatography (solvent A: DCM, solvent B: DCM/EtOH 9:1 v/v—gradient: 0-50% solvent B) yielded both title compounds separately. Mono- and bi-dimensional 1H- and 13C-NMR analyses confirmed the structure of the title compounds named 4-(1-ethylindazol-5-yl)benzaldehyde and 4-(2-ethylindazol-5-yl)benzaldehyde.

4-(1-ethylindazol-5-yl)benzaldehyde: 125 mg, yield 54%. $^1$H NMR (400 MHz, DMSO-$d_6$) δ 10.05 (s, 1H), 8.17 (t, J=1.3 Hz, 1H), 8.15 (s, 1H), 8.02-7.94 (m, 4H), 7.80 (d, J=1.3 Hz, 2H), 4.48 (q, J=7.2 Hz, 2H), 1.42 (t, J=7.2 Hz, 3H). $^{13}$C NMR (101 MHz, DMSO-$d_6$) δ 192.65, 146.47, 138.64, 134.57, 133.34, 131.34, 130.17, 127.36, 125.54, 124.24, 119.64, 110.32, 43.20, 14.93. $R_t$ 2.19 min (generic method). ESI-MS for $C_{16}H_{14}N_2O$: calculated 250.1, found m/z 251.1 [M+H]$^+$.

4-(2-ethylindazol-5-yl)benzaldehyde: 82 mg, yield 39%. $^1$H NMR (400 MHz, DMSO-$d_6$) δ 10.05 (s, 1H), 8.49 (d, J=0.9 Hz, 1H), 8.13 (dd, J=1.8, 0.9 Hz, 1H), 8.02-7.91 (m, 4H), 7.78-7.60 (m, 2H), 4.49 (q, J=7.3 Hz, 2H), 1.53 (t, J=7.3 Hz, 3H). $^{13}$C NMR (101 MHz, DMSO-$d_6$) δ 192.63, 147.68, 146.74, 134.52, 131.49, 130.14, 127.19, 124.97, 124.34, 121.86, 119.45, 117.72, 47.88, 15.72. $R_t$ 1.97 min (generic method). ESI-MS for $C_{16}H_{14}N_2O$: calculated 250.1, found m/z 251.1 [M+H]$^+$.

Step 2. Synthesis of 6-chloro-3-[(E)-3-[4-(1-ethylindazol-5-yl)phenyl]prop-2-enoyl]-4-phenyl-1H-quinolin-2-one (b.24)

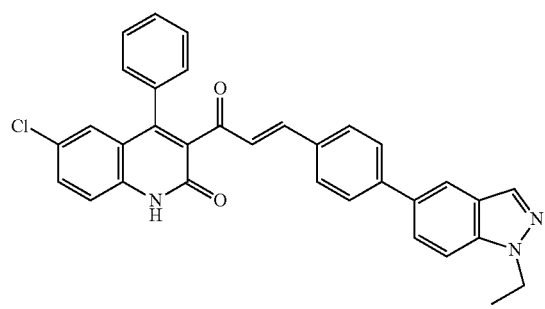 [SMILES: CCn1ncc2cc(-c3ccc(/C=C/C(=O)c4c(-c5ccccc5)c5cc(Cl)ccc5[nH]c4=O)cc3)ccc21]

Compound b.24 was synthesized following the general procedure B using a.1 (137 mg, 0.46 mmol) and 4-(1-ethylindazol-5-yl)benzaldehyde. Purification by normal phase flash column chromatography (solvent A: DCM, solvent B: EtOH—gradient: 0-2% solvent B) yielded title compound (244 mg, quantitative yield). $^1$H NMR (400 MHz, DMSO-$d_6$) δ 12.35 (s, 1H), 8.10 (d, J=7.3 Hz, 2H), 7.74 (s, 5H), 7.65 (dd, J=8.8, 2.4 Hz, 1H), 7.59-7.39 (m, 6H), 7.34 (dd, J=7.8, 1.8 Hz, 2H), 6.99 (d, J=2.4 Hz, 1H), 6.80 (d, J=16.3 Hz, 1H), 4.46 (q, J=7.2 Hz, 2H), 1.40 (t, J=7.2 Hz, 3H). $R_t$ 2.64 min (generic method). ESI-MS for $C_{33}H_{24}ClN_3O_2$: calculated 529.2, found m/z 530.2 [M+H]$^+$, 528.2 [M−H]$^-$.

Step 3. Synthesis of 6-chloro-3-[5-[4-(1-ethylindazol-5-yl)phenyl]-4,5-dihydro-1H-pyrazol-3-yl]-4-phenyl-1H-quinolin-2-one (c.24)

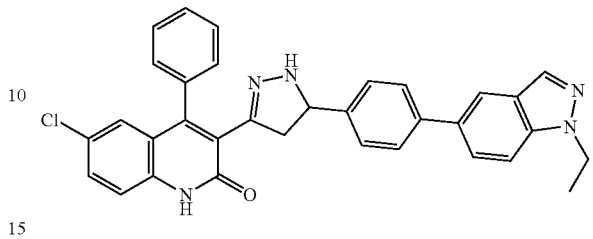

Compound c.24 was synthesized following the general procedure C using b.24 (233 mg, 0.44 mmol). Purification by normal phase flash column chromatography (solvent A: DCM, solvent B: EtOH—gradient: 0-8% solvent B) yielded title compound (181 mg, yield 75%). $^1$H NMR (400 MHz, DMSO-$d_6$) δ 12.20 (s, 1H), 8.10 (d, J=0.9 Hz, 1H), 7.98 (t, J=1.2 Hz, 1H), 7.74 (d, J=8.8 Hz, 1H), 7.67 (dd, J=8.8, 1.7 Hz, 1H), 7.60-7.47 (m, 6H), 7.42 (d, J=8.8 Hz, 1H), 7.36 (dt, J=6.4, 1.8 Hz, 1H), 7.28-7.24 (m, 1H), 7.20-7.14 (m, 3H), 6.90 (d, J=2.4 Hz, 1H), 4.63 (td, J=10.9, 10.3, 3.2 Hz, 1H), 4.46 (q, J=7.2 Hz, 2H), 3.29-3.20 (m, 1H), 2.62 (dd, J=16.4, 9.4 Hz, 1H), 1.41 (t, J=7.2 Hz, 3H). $R_t$ 1.49 min (apolar method). ESI-MS for $C_{33}H_{26}ClN_5O$: calculated 543.2, found m/z 544.2 [M+H]$^+$, 542.2 [M−H]$^-$.

Step 4. Synthesis of 4-[5-(6-chloro-2-oxo-4-phenyl-1H-quinolin-3-yl)-3-[4-(1-ethylindazol-5-yl)phenyl]-3,4-dihydropyrazol-2-yl]-4-oxo-butanoic acid (d.45)

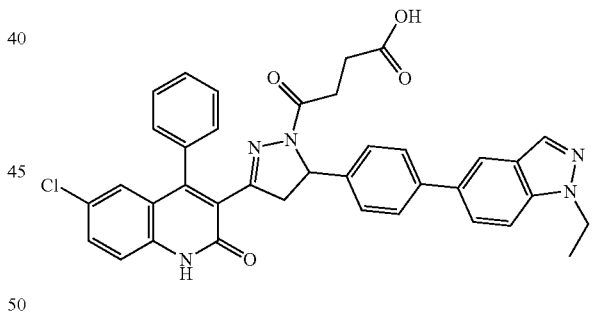

Compound d.45 was synthesized following the general procedure D1 using c.24 (170 mg, 0.31 mmol) with succinic anhydride (120° C., 200 W). Purification by normal phase flash column chromatography (solvent A: DCM, solvent B: EtOH—gradient: 0-20% solvent B) yielded title compound (163 mg, yield 81%). $^1$H NMR (400 MHz, DMSO-$d_6$) δ 12.38 (s, 1H), 12.07 (s, 1H), 8.10 (d, J=0.8 Hz, 1H), 7.99 (d, J=1.6 Hz, 1H), 7.74 (d, J=8.8 Hz, 1H), 7.67 (dd, J=8.8, 1.7 Hz, 1H), 7.63 (dd, J=8.8, 2.4 Hz, 1H), 7.60-7.51 (m, 5H), 7.48-7.40 (m, 2H), 7.30 (dd, J=5.9, 1.8 Hz, 1H), 6.94 (d, J=2.3 Hz, 1H), 6.89 (d, J=8.3 Hz, 2H), 5.35 (dd, J=12.0, 4.6 Hz, 1H), 4.46 (q, J=7.2 Hz, 2H), 3.78 (dd, J=18.5, 12.1 Hz, 1H), 2.86 (dd, J=18.5, 4.6 Hz, 1H), 2.59-2.44 (m, 2H), 2.31 (t, J=6.8 Hz, 2H), 1.41 (t, J=7.2 Hz, 3H). $R_t$ 2.24 min (generic method). ESI-MS for $C_{37}H_{30}ClN_5O_4$: calculated 643.2, found m/z 644.2 [M+H]$^+$, 642.2 [M−H]$^-$.

Example d.46. 4-[5-(6-chloro-2-oxo-4-phenyl-1H-quinolin-3-yl)-3-[4-(2-ethylindazol-5-yl)phenyl]-3,4-dihydropyrazol-2-yl]-4-oxo-butanoic acid Step 1. Synthesis of 6-chloro-3-[(E)-3-[4-(2-ethylindazol-5-yl)phenyl]prop-2-enoyl]-4-phenyl-1H-quinolin-2-one (b.25)

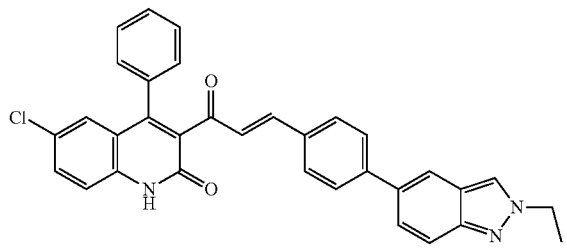 [SMILES: CCn1cc2cc(-c3ccc(/C=C/C(=O)c4c(-c5ccccc5)c5cc(Cl)ccc5[nH]c4=O)cc3)ccc2n1]

Compound b.25 was synthesized following the general procedure B using a.1 (92 mg, 0.31 mmol) and 4-(2-ethylindazol-5-yl)benzaldehyde. Purification by normal phase flash column chromatography (solvent A: DCM, solvent B: EtOH—gradient: 0-10% solvent B) yielded title compound (150 mg, yield 91%). $^1$H NMR (400 MHz, DMSO-$d_6$) δ 12.35 (s, 1H), 8.44 (d, J=0.8 Hz, 1H), 8.04 (t, J=1.3 Hz, 1H), 7.73 (s, 4H), 7.70-7.63 (m, 2H), 7.59 (dd, J=9.1, 1.8 Hz, 1H), 7.57-7.42 (m, 5H), 7.34 (dd, J=7.8, 1.8 Hz, 2H), 6.99 (d, J=2.3 Hz, 1H), 6.79 (d, J=16.4 Hz, 1H), 4.47 (q, J=7.3 Hz, 2H), 1.52 (t, J=7.3 Hz, 3H). $R_t$ 2.48 min (generic method). ESI-MS for $C_{33}H_{24}ClN_3O_2$: calculated 529.2, found m/z 530.2 [M+H]$^+$, 528.2 [M−H]$^−$.

Step 2. Synthesis of 6-chloro-3-[5-[4-(2-ethylindazol-5-yl)phenyl]-4,5-dihydro-1H-pyrazol-3-yl]-4-phenyl-1H-quinolin-2-one (c.25)

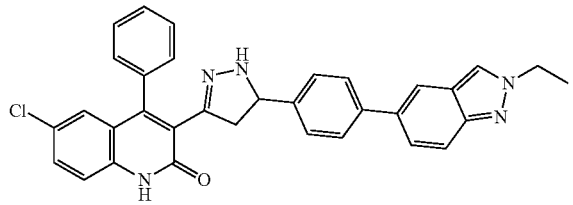 [SMILES: CCn1cc2cc(-c3ccc(C4CC(c5c(-c6ccccc6)c6cc(Cl)ccc6[nH]c5=O)=NN4)cc3)ccc2n1]

Compound c.25 was synthesized following the general procedure C using b.25 (141 mg, 0.27 mmol). Purification by normal phase flash column chromatography (solvent A: DCM, solvent B: EtOH—gradient: 0-15% solvent B) yielded title compound (123 mg, yield 83%). $^1$H NMR (400 MHz, DMSO-$d_6$) δ 8.41 (d, J=0.9 Hz, 1H), 7.92-7.88 (m, 1H), 7.67 (d, J=9.0 Hz, 1H), 7.59-7.48 (m, 7H), 7.42 (d, J=8.8 Hz, 1H), 7.37-7.33 (m, 1H), 7.25 (dq, J=4.9, 1.9 Hz, 1H), 7.16 (dd, J=9.3, 2.7 Hz, 3H), 6.90 (d, J=2.4 Hz, 1H), 4.62 (ddd, J=10.9, 9.4, 3.1 Hz, 1H), 4.47 (q, J=7.3 Hz, 2H), 3.27 (dd, J=16.5, 11.1 Hz, 1H), 2.62 (dd, J=16.4, 9.5 Hz, 1H), 1.52 (t, J=7.3 Hz, 3H). $R_t$ 2.35 min (generic method). ESI-MS for $C_{33}H_{26}ClN_5O$: calculated 543.2, found m/z 544.2 [M+H]$^+$, 542.2 [M−H]$^−$.

Step 3. Synthesis of 4-[5-(6-chloro-2-oxo-4-phenyl-1H-quinolin-3-yl)-3-[4-(2-ethylindazol-5-yl)phenyl]-3,4-dihydropyrazol-2-yl]-4-oxo-butanoic acid (d.46)

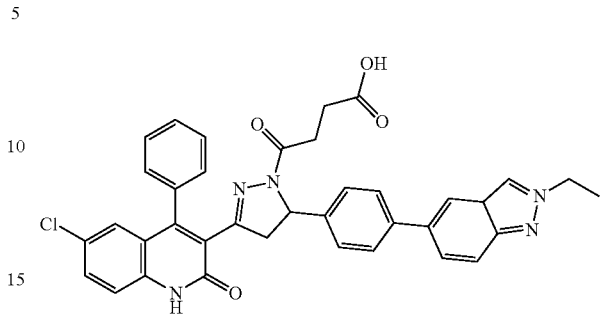

Compound d.46 was synthesized following the general procedure D1 using c.25 (117 mg, 0.21 mmol) with succinic anhydride (120° C., 200 W). Purification by normal phase flash column chromatography (solvent A: DCM, solvent B: EtOH—gradient: 0-20% solvent B) yielded title compound (66 mg, yield 49%). $^1$H NMR (400 MHz, DMSO-$d_6$) δ 12.38 (s, 1H), 12.15 (s, 1H), 8.42 (d, J=0.9 Hz, 1H), 7.92 (t, J=1.3 Hz, 1H), 7.68 (d, J=8.9 Hz, 1H), 7.63 (dd, J=8.8, 2.4 Hz, 1H), 7.60-7.50 (m, 6H), 7.48-7.41 (m, 2H), 7.30 (dd, J=6.1, 1.9 Hz, 1H), 6.94 (d, J=2.3 Hz, 1H), 6.87 (d, J=8.4 Hz, 2H), 5.35 (dd, J=12.0, 4.6 Hz, 1H), 4.47 (q, J=7.3 Hz, 2H), 3.78 (dd, J=18.5, 12.1 Hz, 1H), 2.86 (dd, J=18.5, 4.7 Hz, 1H), 2.57-2.43 (m, 2H), 2.30 (t, J=6.9 Hz, 2H), 1.52 (t, J=7.3 Hz, 3H $R_t$ 2.10 min (generic method). ESI-MS for $C_{37}H_{30}ClN_5O_4$: calculated 643.2, found m/z 644.2 [M+H]$^+$, 642.2 [M−H]$^−$.

Example d.47. 3-(2-acetyl-3-phenyl-3,4-dihydropyrazol-5-yl)-6-chloro-4-phenyl-1H-quinolin-2-one Step 1. Synthesis of 6-chloro-4-phenyl-3-[(E)-3-phenylprop-2-enoyl]-1H-quinolin-2-one (b.26)

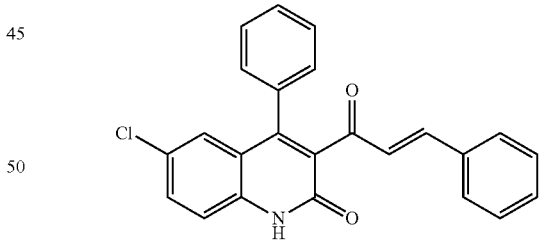

In a round bottom flask, 3-acetyl-6-chloro-4-phenylquinolin-2(1H)-one (1.5 g, 5.04 mmol) was suspended in a mixture of ethanol and water (4:3) (100.0 ml), cooled at 0° C. and potassium hydroxide (7.07 g, 126.0 mmol) was added. After stirring at 0° C. for 45 minutes, benzaldehyde (1.02 ml, 10.08 mmol) was added and the reaction mixture stirred at room temperature for 16 h. After cooling down to 0° C., acetic acid (7.2 ml, 126.0 mmol) was added and the mixture stirred for 30 minutes. Resulting yellow solid was recovered by filtration under vacuum, dissolved in dichloromethane, the organic phase dried over $Na_2SO_4$ and evaporated to dryness to give title compound as a yellow solid (1.93 g, yield 99%). $^1$H NMR (400 MHz, DMSO-$d_6$) δ 12.38

(s, 1H), 7.68 (dd, J=2.0, 8.0 Hz, 2H), 7.54-7.39 (m, 7H), 7.35 (dd, J=2.0, 8.0 Hz, 2H), 7.00 (d, J=2.0 Hz, 1H), 6.78 (d, J=16.0 Hz, 1H).

Step 2. Synthesis of 6-chloro-4-phenyl-3-(5-phenyl-4,5-dihydro-1H-pyrazol-3-yl)-1H-quinolin-2-one (c.26)

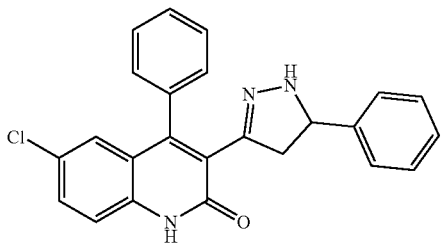

In appropriately sized microwaveable vessel, b.26 (1.90 g, 4.92 mmol) was suspended in ethanol (9 ml), and then hydrazine hydrate (431 μL, 8.86 mmol) was added. The reaction mixture was microwaved at 110° C. for 25 minutes, then title compound was recovered by filtration under vacuum at room temperature as a yellow solid (1.53 g, yield 78%). $^1$H NMR (400 MHz, CDCl$_3$) δ 12.56 (s, 1H), 7.54-7.48 (m, 3H), 7.41 (dd, J=4.0, 12.0 Hz, 1H), 7.33 (s, 1H), 7.32-7.31 (m, 1H), 7.30-7.28 (m, 4H), 7.20-7.17 (m, 3H), 5.81 (s, 1H), 4.75 (dd, J=8.0, 12.0 Hz, 1H), 3.23 (dd, J=12.0, 20.0 Hz, 1H), 2.86 (dd, J=8.0, 16.0 Hz, 1H).

Step 3. Synthesis of 3-(2-acetyl-3-phenyl-3,4-dihydropyrazol-5-yl)-6-chloro-4-phenyl-1H-quinolin-2-one (d.47)

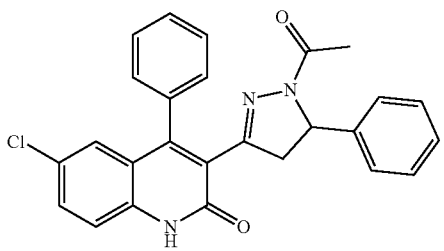 [SMILES: CC(=O)N1N=C(c2c(-c3ccccc3)c3cc(Cl)ccc3[nH]c2=O)CC1c1ccccc1]

In appropriately-sized microwaveable vessel, c.26 (400 mg, 1.00 mmol) was suspended in anhydrous tetrahydrofuran (2 ml) in presence of 4 Å molecular sieves. Acetic anhydride (113 μL, 1.20 mmol) was added and the reaction mixture was microwaved at 165° C. for 25 minutes. After cooling down to rt, the mixture was diluted with dichloromethane (7 ml) and the organic phase was washed with water (2×5 ml), dried over Na$_2$SO$_4$ and evaporated to dryness. The crude product was purified by flash silica gel chromatography (methanol:dichloromethane gradient up to 2:8) to obtain title compound as a yellow solid (365 mg, yield 83%). $^1$H NMR (400 MHz, DMSO-d$_6$) δ 12.39 (s, 1H), 7.62 (d, J=8.0 Hz, 1H), 7.57-7.55 (m, 2H), 7.52-7.49 (m, 1H), 7.44 (d, J=8.0 Hz, 1H), 7.40 (d, J=4.0 Hz, 1H), 7.27 (d, J=8.0 Hz, 1H), 7.22-7.19 (m, 3H), 6.93 (d, J=4.0 Hz, 1H), 6.79 (d, J=8.0 Hz, 2H), 5.29 (dd, J=4.0, 12.0 Hz, 1H), 3.75 (dd, J=12.0, 20.0 Hz, 1H), 2.83 (dd, J=4.0, 20.0 Hz, 1H), 1.87 (s, 3H). R$_t$ 2.40 min (generic method). ESI-MS for C$_{26}$H$_{20}$ClN$_3$O$_2$: calculated 441.1, found 442.0 [M+H]$^+$.

Example d.48. 6-chloro-4-phenyl-3-(3-phenyl-2-propanoyl-3,4-dihydropyrazol-5-yl)-1H-quinolin-2-one

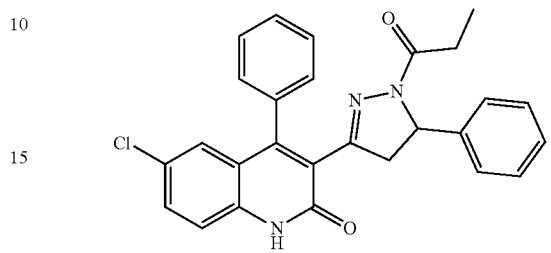

Compound d.48 was synthesized following the general procedure D2 using c.26 (400 mg, 1.00 mmol). Purification by normal phase flash column chromatography (solvent A: DCM, solvent B: MeOH—gradient: 0-2% solvent B) yielded title compound (70 mg, yield 15%). $^1$H NMR (400 MHz, DMSO-d$_6$) δ 12.34 (s, 1H), 7.64-7.61 (m, 1H), 7.58-7.52 (m, 2H), 7.51-7.48 (m, 1H), 7.44 (d, J=8.0 Hz, 1H), 7.41-7.39 (m, 1H), 7.26 (d, J=8.0 Hz, 1H), 7.24-7.19 (m, 3H), 6.91 (d, J=2.0 Hz, 1H), 6.80-6.78 (m, 2H), 5.28 (dd, J=12.0, 4.8 Hz, 1H), 3.74 (dd, J=20.0, 12.0 Hz, 1H), 2.80 (dd, J=20.0, 4.8 Hz, 1H), 2.28-2.18 (m, 2H), 0.83 (t, J=7.4 Hz, 3H). R$_t$ 2.52 min (generic method). ESI-MS for C$_{27}$H$_{22}$ClN$_3$O$_2$: calculated 455.1, found m/z 456.1 [M+H]$^+$, 454.1 [M−H]$^-$.

Example d.49. 3-[2-acetyl-3-(p-tolyl)-3,4-dihydropyrazol-5-yl]-6-chloro-4-phenyl-1H-quinolin-2-one Step 1. Synthesis of 6-chloro-4-phenyl-3-[(E)-3-(p-tolyl)prop-2-enoyl]-1H-quinolin-2-one (b.27)

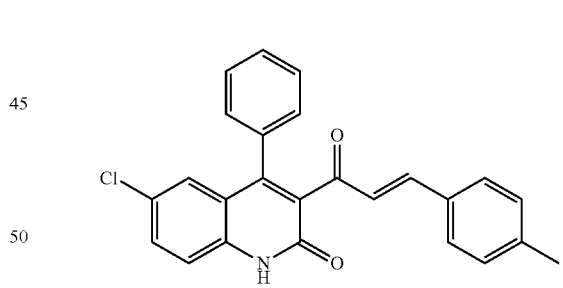

In round bottom flask, 3-acetyl-6-chloro-4-phenylquinolin-2 (1H)-one (1.0 g, 3.36 mmol) was suspended in a mixture of ethanol and water (4:3) (67.0 ml), cooled at 0° C. and potassium hydroxide (4.70 g, 84.0 mmol) was added. After stirring at 0° C. for 45 minutes, p-tolualdehyde (792 μL, 6.72 mmol) was added and the reaction was stirred at room temperature for 16 h. After cooling down to 0° C., acetic acid (4.8 mL, 84.0 mmol) was added and the mixture stirred for 30 minutes. Resulting yellow solid was recovered by filtration under vacuum at room temperature, solved in dichloromethane, the organic phase dried over Na$_2$SO$_4$ and evaporated to dryness. Final normal flash silica gel chromatography purification (methanol:dichloromethane gradient up 1:9) yielded title compound as a yellow solid (1.18 g, yield 88%). ¹H NMR (400 MHz, CDCl₃) δ 12.72 (s, 1H), 7.42-7.40 (m, 5H), 7.34 (d, J=16.0 Hz, 1H), 7.33-7.28 (m, 4H), 7.26-7.25 (m, 1H), 7.15 (d, J=8.0 Hz, 2H), 6.70 (d, J=16.0 Hz, 1H), 2.36 (s, 3H).

Step 2. Synthesis of 6-chloro-4-phenyl-3-[5-(p-tolyl)-4,5-dihydro-1H-pyrazol-3-yl]-1H-quinolin-2-one (c.27)

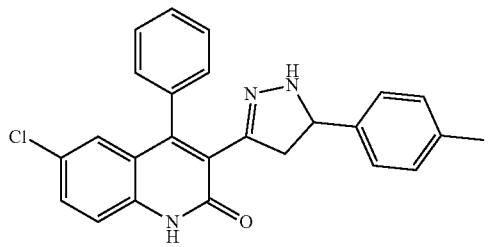 [SMILES: Cc1ccc(C2CC(c3c(-c4ccccc4)c4cc(Cl)ccc4[nH]c3=O)=NN2)cc1]

In appropriately sized microwaveable vessel, b.27 (1.16 g, 2.90 mmol) was suspended in ethanol (8 ml), and then hydrazine hydrate (254 μl, 5.22 mmol) was added. The reaction mixture was microwaved at 110° C. for 30 minutes, then title compound was recovered by filtration under vacuum at room temperature as a yellow solid (750 mg, yield 63%). ¹H NMR (400 MHz, CDCl₃) δ 12.36 (s, 1H), 7.52-7.49 (m, 3H), 7.41 (dd, J=2.0, 8.0 Hz, 1H), 7.33-7.31 (m, 2H), 7.30-7.27 (m, 1H), 7.17 (d, J=2.0 Hz, 1H), 7.08 (dd, J=8.4, 10.8 Hz, 4H), 4.70 (dd, J=8.0, 12.0 Hz, 1H), 3.21 (dd, J=8.0, 16.0 Hz, 1H), 2.82 (dd, J=8.0, 20.0 Hz, 1H), 2.34 (s, 3H).

Step 3. Synthesis of 3-[2-acetyl-3-(p-tolyl)-3,4-dihydropyrazol-5-yl]-6-chloro-4-phenyl-1H-quinolin-2-one

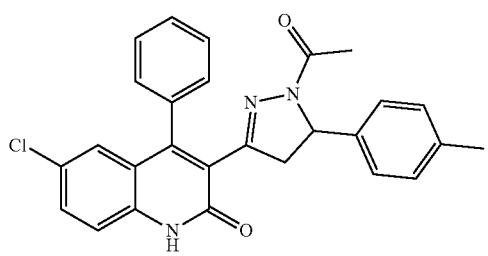 [SMILES: CC(=O)N1N=C(c2c(-c3ccccc3)c3cc(Cl)ccc3[nH]c2=O)CC1c1ccc(C)cc1]

In appropriately-sized microwaveable vessel, c.27 (350 mg, 0.85 mmol) was suspended in anhydrous tetrahydrofuran (2 ml) in presence of 4 Å molecular sieves. Acetic anhydride (96 μL, 1.01 mmol) was added and the reaction mixture was microwaved at 165° C. for 25 minutes. After cooling down to rt, the mixture was diluted with dichloromethane (5 ml) and the organic phase was washed with water (2×5 ml), dried over Na₂SO₄ and evaporated to dryness. The crude product was purified by flash silica gel chromatography (methanol:dichloromethane gradient up to 1.5:8.5) yielding title compound as yellow solid (258 mg, yield 67%). ¹H NMR (400 MHz, DMSO-d₆) δ 12.38 (s, 1H), 7.63 (dd, J=8.0, 16.0 Hz, 1H), 7.59-7.50 (m, 3H), 7.44 (d, J=8.0 Hz, 1H), 7.41-7.40 (m, 1H), 7.28 (d, J=8.0 Hz, 1H), 7.01 (d, J=8.0 Hz, 2H), 6.93 (d, J=2.0 Hz, 1H), 6.67 (d, J=8.0 Hz, 2H), 5.24 (dd, J=4.0, 12.0 Hz, 1H), 3.72 (dd, J=12.0, 20.0 Hz, 1H), 2.80 (dd, J=4.0, 16.0 Hz, 1H), 2.24 (s, 3H), 1.86 (s, 3H). R$_t$ 2.51 min (generic method). ESI-MS for C₂₇H₂₂ClN₃O₂: calculated 455.1, found 456.1 [M+H]⁺.

Example d.50. 4-[5-(4-benzyl-6-chloro-2-oxo-1H-quinolin-3-yl)-3-(4-fluorophenyl)-3,4-dihydropyrazol-2-yl]-4-oxo-butanoic acid Step 1. Synthesis of 1-(2-amino-5-chloro-phenyl)-2-phenyl-ethanone

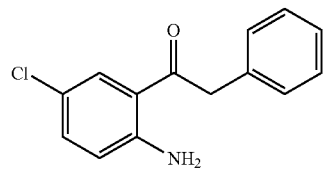 [SMILES: Nc1ccc(Cl)cc1C(=O)Cc1ccccc1]

Title compound was synthesized following the procedure described by Patterson S. et al (J. Med. Chem. 2011, 54, 6514-6530):

In a dried three-neck round-bottom flask, 2-amino-5-chlorobenzonitrile (3.0 g, 19.66 mmol) was suspended in anhydrous diethyl ether (9.8 ml) under nitrogen atmosphere. The mixture was cooled to 0° C., and then benzyl magnesium chloride was added dropwise as 2 M solution in anhydrous tetrahydrofuran (28 ml, 56.00 mmol). After stirring for 6 hours at room temperature, the reaction was cooled to −60° C. and 6 N HCl (15 ml) was added while stirring vigorously. After 1 hour at room temperature, the mixture was diluted with ethyl acetate (50 ml), the aqueous layer extracted with ethyl acetate (3×50 ml), the combined organic phases were dried over Na₂SO₄ and evaporated to dryness. Purification by normal phase chromatography (solvent A: petroleum ether, solvent B: ethyl acetate—gradient: 0-4% solvent B) yielded title compound (4.22 g, yield 87%). ¹H NMR (400 MHz, CDCl₃) 7.80 (d, J=2.4 Hz, 1H), 7.35 (t, J=8.0 Hz, 2H), 7.29-7.23 (m, 3H), 7.20 (dd, J=2.4, 9.2 Hz, 1H), 6.61 (d, J=9.2 Hz, 1H) 6.29 (br, 2H), 4.23 (s, 2H).

Step 1. Synthesis of 3-acetyl-4-benzyl-6-chloro-1H-quinolin-2-one (e.1)

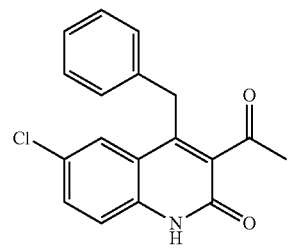 [SMILES: CC(=O)c1c(Cc2ccccc2)c2cc(Cl)ccc2[nH]c1=O]

In dried microwaveable vessel, 1-(2-amino-5-chloro-phenyl)-2-phenyl-ethanone (1.75 g, 7.12 mmol) was dissolved in anhydrous tetrahydrofuran (11 ml) in presence of 4 Å molecular sieves. Then ethyl acetoacetate (2.3 mL, 17.8 mmol) was added. The reaction mixture was microwaved at 140° C. (200 W) for 75 minutes, cooled at room temperature, resulting white-off solid filtered and rinsed with cold tetrahydrofuran to finally yield title compound (1.06 g, yield 48%). $^1$H NMR (400 MHz, DMSO-$d_6$) δ 12.52 (s, 1H), 7.69 (d, J=2.0 Hz, 1H), 7.55 (dd, J=2.0, 8.8 Hz, 1H), 7.35 (d, J=8.8 Hz, 1H), 7.30-7.24 (m, 4H), 7.19 (t, J=6.8 Hz, 1H), 4.14 (s, 2H), 2.42 (s, 3H).

Step 2. Synthesis of 4-benzyl-6-chloro-3-[(E)-3-(4-fluorophenyl)prop-2-enoyl]-1H-quinolin-2-one (f.1)

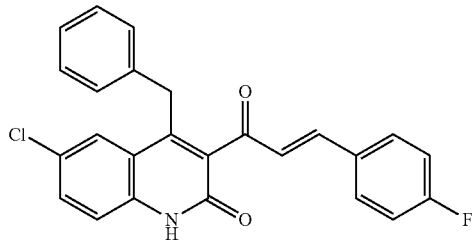 [SMILES: O=C(/C=C/c1ccc(F)cc1)c1c(Cc2ccccc2)c2cc(Cl)ccc2[nH]c1=O]

In a round-bottom flask, e.1 (1.06 g, 3.40 mmol) was suspended in a 4:3 mixture of ethanol (39.0 ml) and water (29.0 ml). The mixture was cooled to 0° C. and potassium hydroxide (4.80 g, 85.0 mmol) was added. After stirring for 45 minutes at 0° C., 4-fluorobenzaldehyde (657 μL, 6.12 mmol) was added. The reaction was stirred at room temperature for 16 hours, afterwards acetic acid (4.9 ml, 85.0 mmol) was added at 0° C., resulting white-off solid filtered and purified by gravity silica gel chromatography (solvent A: dichloromethane, solvent B: methanol—isocratic 5% solvent B) to finally yield title compound as a white solid (1.08 g, yield 76%). $^1$H NMR (400 MHz, DMSO-$d_6$) δ 12.14 (s, 1H), 7.81 (dd, J=5.6, 8.4 Hz, 2H), 7.64 (d, J=1.6 Hz, 1H), 7.59-7.55 (m, 2H), 7.39 (d, J=8.4 Hz, 1H), 7.27-7.24 (m, 6H), 7.14 (t, J=6.8 Hz, 1H), 7.05 (d, J=16.4 Hz, 1H), 4.13 (s, 2H).

Step 3. Synthesis of 4-benzyl-6-chloro-3-[5-(4-fluorophenyl)-4,5-dihydro-1H-pyrazol-3-yl]-1H-quinolin-2-one (g.1)

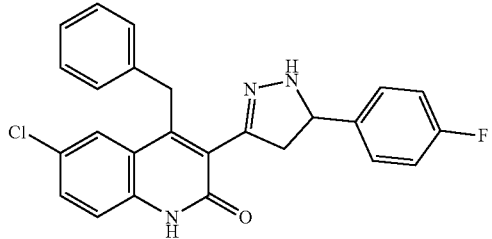 [SMILES: O=c1[nH]c2ccc(Cl)cc2c(Cc2ccccc2)c1C1=NNC(c2ccc(F)cc2)C1]

In appropriately sized microwaveable vessel, f.1 (1.0 g, 2.39 mmol) was suspended in ethanol (5.0 ml), then hydrazine hydrate (198 μL, 4.07 mmol) added, the reaction mixture microwaved at 110° C. (200 W) for 20 minutes, cooled at room temperature and resulting yellow solid filtered to yield title compound (855 mg, yield 83%). $^1$H NMR (400 MHz, DMSO-$d_6$) δ 11.98 (s, 1H), 7.66 (d, J=2.0 Hz, 1H), 7.52-7.47 (m, 2H), 7.42 (dd, J=6.0, 8.0 Hz, 2H), 7.33 (d, J=8.4 Hz, 1H), 7.25 (d, J=4.4 Hz, 4H), 7.17-7.09 (m, 3H), 4.80 (dd, J=4.0, 8.0 Hz, 1H), 4.43 (d, J=12.0 Hz, 1H), 4.40 (d, J=12.0 Hz, 1H), 3.44 (dd, J=8.0, 12.0 Hz, 1H), 2.84 (dd, J=12.0, 16.0 Hz, 1H).

Step 4. Synthesis of 4-[5-(4-benzyl-6-chloro-2-oxo-1H-quinolin-3-yl)-3-(4-fluorophenyl)-3,4-dihydropyrazol-2-yl]-4-oxo-butanoic acid (d.50)

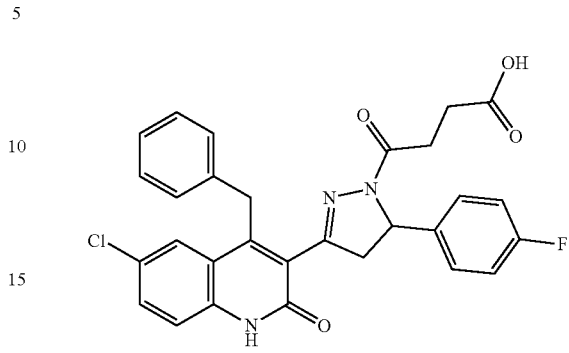

Compound d.50 was synthesized following the general procedure D1 using g.1 (300 mg, 0.69 mmol) with succinic anhydride (90.4 mg, 0.90 mmol) at 165° C. for 20 minutes. Purification by normal phase flash column chromatography (solvent A: DCM, solvent B: MeOH—gradient: 0-2% solvent B) yielded title compound as a white solid (155 mg, yield 42%). $^1$H NMR (400 MHz, DMSO-$d_6$) δ 12.21 (s, 1H), 12.03 (br, 1H), 7.77 (d, J=2.4 Hz, 1H), 7.56 (dd, J=4.0, 8.0 Hz, 1H), 7.38 (d, J=8.0 Hz, 1H), 7.27-7.24 (m, 6H), 7.21-7.15 (m, 1H), 7.09 (t, J=8.0 Hz, 2H), 5.45 (dd, J=4.8, 11.6 Hz, 1H), 4.46 (d, J=16.0 Hz, 1H), 4.39 (d, J=16.0 Hz, 1H), 3.70 (dd, J=12.0, 18.4 Hz, 1H), 3.08 (dd, J=4.8, 18.4 Hz, 1H), 3.65-2.58 (m, 2H), 2.32 (t, J=8.0H, 2H). $R_t$ 2.05 min (generic method). ESI-MS for $C_{29}H_{23}ClFN_3O_4$: calculated 531.1, found m/z 532.1 [M+H]$^+$, 530.1 [M−H]$^-$.

Example d.51. 3-[2-acetyl-3-(4-fluorophenyl)-3,4-dihydropyrazol-5-yl]-4-benzyl-6-chloro-1H-quinolin-2-one

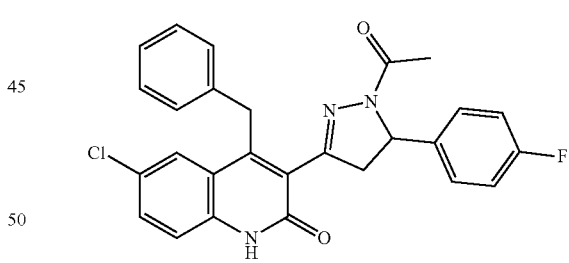

Compound d.51 was synthesized following the general procedure D1 using g.1 (300 mg, 0.69 mmol) with acetic anhydride (85 μL, 0.90 mmol) at 165° C. for 20 minutes. Purification by normal phase flash column chromatography (solvent A: DCM, solvent B: MeOH—gradient: 0-20% solvent B) yielded title compound as a white solid (245 mg, yield 75%). $^1$H NMR (400 MHz, DMSO-$d_6$) δ 12.19 (s, 1H), 7.35 (d, J=1.6 Hz, 1H), 7.55 (dd, J=2.2, 9.0 Hz, 1H), 7.37 (d, J=8.4 Hz, 1H), 7.28-7.24 (m, 6H), 7.17 (t, J=4.4 Hz, 1H), 7.12-7.07 (m, 2H), 5.46 (dd, J=4.7, 11.9 Hz, 1H), 4.42 (d, J=15.6 Hz, 1H), 4.39 (d, J=15.6 Hz, 1H), 3.72 (dd, J=18.3, 12.0 Hz, 1H), 3.12 (dd, J=18.3, 4.8 Hz, 1H), 1.96 (s, 3H). $R_t$ 2.37 min (generic method). ESI-MS for $C_{27}H_{21}ClFN_3O_2$: calculated 473.1, found m/z 474.1 [M+H]$^+$, 472.1 [M−H]$^-$.

Example d.52. 3-[2-acetyl-3-(4-methoxyphenyl)-3,4-dihydropyrazol-5-yl]-4-benzyl-6-chloro-1H-quinolin-2-one Step 1. Synthesis of 4-benzyl-6-chloro-3-[(E)-3-(4-methoxyphenyl)prop-2-enoyl]-1H-quinolin-2-one (f.2)

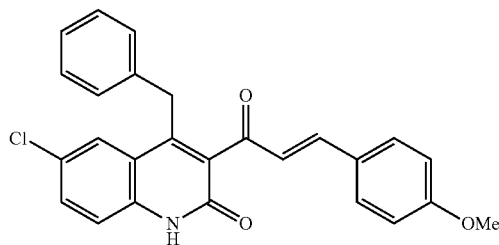 [SMILES: COc1ccc(/C=C/C(=O)c2c(Cc3ccccc3)c3cc(Cl)ccc3[nH]c2=O)cc1]

In a round-bottom flask, e.1 (1.06 g, 3.40 mmol) was suspended in a 4:3 mixture of ethanol (65.7 ml) and water (49.3 ml). The mixture was cooled to 0° C. and potassium hydroxide (8.01 g, 142.75 mmol) was added. After stirring for 45 minutes at 0° C., 4-methoxybenzaldehyde (1.39 mL, 11.42 mmol) was added. The reaction was stirred at room temperature for 16 hours, afterwards acetic acid (8.17 mL, 142.75 mmol) was added at 0° C., resulting yellow solid filtered and purified by normal phase chromatography (solvent A: dichloromethane, solvent B: methanol—gradient: 0-3% solvent B) to finally yield title compound as a white-yellow solid (1.62 g, yield 66%). $^1$H NMR (400 MHz, DMSO-$d_6$) δ 12.19 (s, 1H), 7.68 (d, J=8.4 Hz, 2H), 7.62 (d, J=2.0 Hz, 1H), 7.55 (dd, J=2.0, 9.0 Hz, 1H), 7.51 (d, J=16.4 Hz, 1H), 7.38 (d, J=9.0 Hz, 1H), 7.29-7.22 (m, 4H), 7.14 (t, J=6.8 Hz, 1H), 6.98-6.92 (m, 3H), 4.12 (s, 2H), 3.80 (s, 3H).

Step 2. Synthesis of 4-benzyl-6-chloro-3-[5-(4-methoxyphenyl)-4,5-dihydro-1H-pyrazol-3-yl]-1H-quinolin-2-one (g.2)

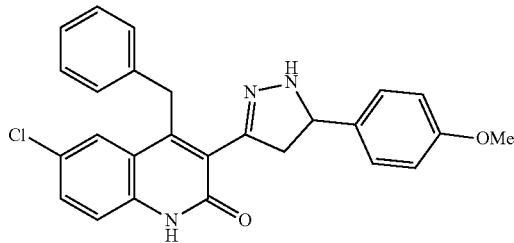 [SMILES: COc1ccc(C2CC(c3c(Cc4ccccc4)c4cc(Cl)ccc4[nH]c3=O)=NN2)cc1]

In appropriately sized microwaveable vessel, f.2 (1.6 g, 3.72 mmol) was suspended in ethanol (5.0 ml), then hydrazine hydrate (308 µL, 6.32 mmol) added, the reaction mixture microwaved at 110° C. (200 W) for 25 minutes, cooled at room temperature and resulting yellow solid filtered to yield title compound (1.385 g, yield 84%). $^1$H NMR (400 MHz, DMSO-$d_6$) δ 12.01 (s, 1H), 7.65 (d, J=2.0 Hz, 1H), 7.49 (dd, J=2.0, 8.8 Hz, 1H), 7.41 (d, J=3.2 Hz, 1H), 7.34-7.25 (m, 7H), 7.20-7.15 (m, 1H), 6.85 (d, J=8.4 Hz, 2H), 4.74 (dd, J=4.0, 12.0 Hz, 1H), 4.44 (d, J=16.0 Hz, 1H), 4.40 (d, J=16.0 Hz, 1H), 3.72 (s, 3H), 3.34-3.27 (m, 1H), 2.84 (dd, J=8.0, 16.0 Hz, 1H).

Step 4. Synthesis of 3-[2-acetyl-3-(4-methoxyphenyl)-3,4-dihydropyrazol-5-yl]-4-benzyl-6-chloro-1H-quinolin-2-one (d.52)

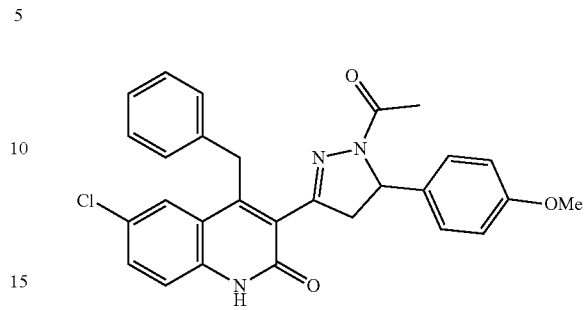

Compound d.52 was synthesized following the general procedure D1 using g.1 (300 mg, 0.69 mmol) with acetic anhydride (85 µL, 0.90 mmol) at 165° C. for 20 minutes. Purification by normal phase flash column chromatography (solvent A: DCM, solvent B: MeOH—gradient: 0-20% solvent B) yielded title compound as a white solid (245 mg, yield 75%). $^1$H NMR (400 MHz, DMSO-$d_6$) δ 12.20 (s, 1H), 7.73 (d, J=2.2 Hz, 1H), 7.56 (dd, J=8.8, 2.2 Hz, 1H), 7.38 (d, J=8.8 Hz, 1H), 7.28 (d, J=4.4 Hz, 4H), 7.19 (dd, J=9.0, 4.8 Hz, 1H), 7.15 (d, J=8.7 Hz, 2H), 6.83 (d, J=8.7 Hz, 2H), 5.40 (dd, J=11.9, 4.6 Hz, 1H), 4.44 (d, J=15.5 Hz, 1H), 4.39 (d, J=15.5 Hz, 1H), 3.78-3.65 (m, 4H), 3.12 (dd, J=18.3, 4.6 Hz, 1H), 1.95 (s, 3H). $R_t$ 2.36 min (generic method). ESI-MS for $C_{28}H_{24}ClN_3O_3$: calculated 485.1, found m/z 486.2 [M+H]$^+$, 484.3 [M−H]$^-$.

Example d.53. 4-benzyl-6-chloro-3-[3-(4-methoxyphenyl)-2-propanoyl-3,4-dihydropyrazol-5-yl]-1H-quinolin-2-one

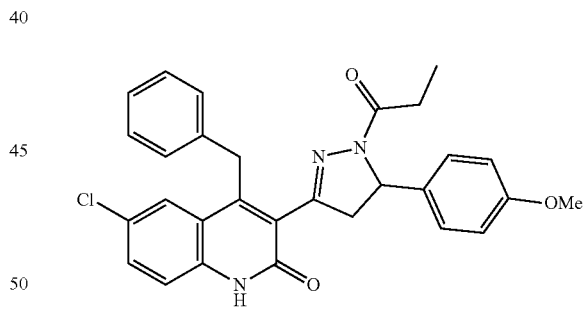

Compound d.53 was synthesized following the general procedure D2 using g.1 (450 mg, 1.01 mmol). Purification by normal phase flash column chromatography (solvent A: DCM, solvent B: MeOH—gradient: 0-1.5% solvent B) yielded title compound as a yellow solid (260 mg, yield 51%). $^1$H NMR (400 MHz, DMSO-$d_6$) δ 12.20 (s, 1H), 7.72 (d, J=1.9 Hz, 1H), 7.56 (dd, J=8.8, 1.9 Hz, 1H), 7.38 (d, J=8.8 Hz, 1H), 7.28 (d, J=4.1 Hz, 3H), 7.24-7.17 (m, 2H), 7.15 (d, J=8.6 Hz, 2H), 6.84 (d, J=8.5 Hz, 2H), 5.40 (dd, J=11.8, 4.5 Hz, 1H), 4.46 (d, J=15.6 Hz, 1H), 4.39 (d, J=15.6 Hz, 1H), 3.81-3.63 (m, 4H), 3.12 (dd, J=18.3, 4.5 Hz, 1H), 2.39-2.21 (m, 2H), 0.83 (t, J=7.5 Hz, 3H). $R_t$ 2.42 min (generic method). ESI-MS for $C_{29}H_{26}ClN_3O_3$: calculated 499.2, found m/z 500.3 [M+H]$^+$, 498.4 [M−H]$^-$.

Example d.54. 4-benzyl-6-chloro-3-[3-(4-fluorophenyl)-2-propanoyl-3,4-dihydropyrazol-5-yl]-1H-quinolin-2-one

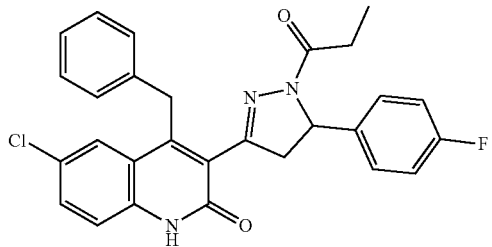 [SMILES: CCC(=O)N1N=C(c2c(Cc3ccccc3)c3cc(Cl)ccc3[nH]c2=O)CC1c1ccc(F)cc1]

Compound d.54 was synthesized following the general procedure D2 using g.1 (100 mg, 0.23 mmol). Purification by normal phase flash column chromatography (solvent A: DCM, solvent B: MeOH—gradient: 2-3% solvent B) yielded title compound as a solid (80 mg, yield 70%). $^1$H NMR (400 MHz, DMSO-$d_6$) δ 12.20 (s, 1H), 7.73 (d, J=2.3 Hz, 1H), 7.56 (dd, J=8.8, 2.2 Hz, 1H), 7.38 (d, J=8.8 Hz, 1H), 7.33-7.21 (m, 6H), 7.25-7.16 (m, 1H), 7.19-7.06 (m, 2H), 5.46 (dd, J=11.9, 4.8 Hz, 1H), 4.49-4.35 (m, 2H), 3.73 (dd, J=18.3, 12.0 Hz, 1H), 3.13 (dd, J=18.3, 4.8 Hz, 1H), 2.40-2.27 (m, 2H), 0.84 (t, J=7.5 Hz, 3H). $R_t$ 2.46 min (generic method). ESI-MS for $C_{28}H_{23}ClFN_3O_2$: calculated 487.1, found m/z 488.2/490.2 [M+H]$^+$.

Example d.55. 4-[5-(4-benzyl-6-chloro-2-oxo-1H-quinolin-3-yl)-3-(4-chlorophenyl)-3,4-dihydropyrazol-2-yl]-4-oxo-butanoic acid Step 1. Synthesis of 4-benzyl-6-chloro-3-[(E)-3-(4-chlorophenyl)prop-2-enoyl]-1H-quinolin-2-one (f.3)

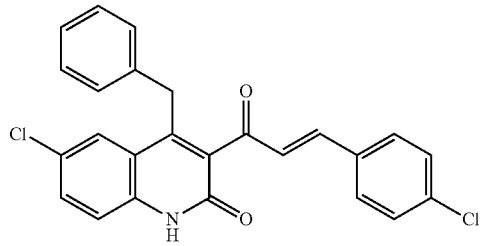 [SMILES: O=C(/C=C/c1ccc(Cl)cc1)c1c(Cc2ccccc2)c2cc(Cl)ccc2[nH]c1=O]

In a round-bottom flask, e.1 (380 mg, 1.22 mmol) was suspended in a 4:3 mixture of ethanol (13.9 ml) and water (10.5 ml). The mixture was cooled to 0° C. and potassium hydroxide (1.71 g, 30.5 mmol) was added. After stirring for 45 minutes at 0° C., 4-chlorobenzaldehyde (309 mg, 2.20 mmol) was added. The reaction was stirred at room temperature for 16 hours, afterwards acetic acid (1.76 mL, 30.5 mmol) was added at 0° C., resulting solid filtered, washed with ethanol (20 mL), the solid was dissolved in $CH_2Cl_2$ (50 mL), washed with water (3×50 mL) and brine, concentrated to dryness in vacuum to finally yield the title compound as a yellow solid (458 mg, yield 86%). $^1$H NMR (400 MHz, DMSO-$d_6$) δ 12.28 (s, 1H), 7.75 (d, J=8.6 Hz, 2H), 7.64 (d, J=2.3 Hz, 1H), 7.60-7.51 (m, 2H), 7.47 (d, J=8.6 Hz, 2H), 7.39 (d, J=8.8 Hz, 1H), 7.30-7.20 (m, 4H), 7.18-7.05 (m, 2H), 4.12 (s, 2H). $R_t$ 2.53 min (generic method). ESI-MS for $C_{25}H_{17}Cl_2NO_2$: calculated 433.1, found m/z 434.1/436.0/438.1.

Step 2. Synthesis of 4-benzyl-6-chloro-3-[5-(4-chlorophenyl)-4,5-dihydro-1H-pyrazol-3-yl]-1H-quinolin-2-one (g.3)

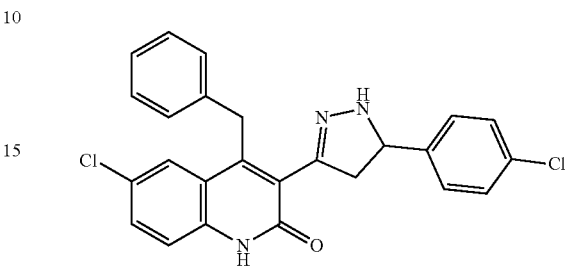

In appropriately sized microwaveable vessel, f.3 (442 mg, 1.02 mmol) was suspended in ethanol (4 ml), then hydrazine hydrate (84 μL, 1.73 mmol) added, the reaction mixture microwaved at 110° C. (200 W) for 25 minutes, cooled at room temperature and resulting solid filtered to yield title compound as a yellow solid (361 mg, yield 79%). $^1$H NMR (400 MHz, DMSO-$d_6$) δ 12.04 (s, 1H), 7.66 (d, J=2.3 Hz, 1H), 7.54 (d, J=3.5 Hz, 1H), 7.49 (dd, J=8.8, 2.2 Hz, 1H), 7.41 (d, J=8.6 Hz, 2H), 7.37-7.30 (m, 3H), 7.30-7.22 (m, 4H), 7.21-7.12 (m, 1H), 4.80 (td, J=10.7, 3.6 Hz, 1H), 4.51-4.35 (m, 2H), 3.36 (dd, J=16.4, 10.6 Hz, 1H), 2.84 (dd, J=16.3, 10.7 Hz, 1H). ESI-MS for $C_{25}H_{19}Cl_2N_3O$: calculated 447.1, found m/z 448.1/450.0/452.1 [M+H]$^+$.

Step 3. Synthesis of 4-[5-(4-benzyl-6-chloro-2-oxo-1H-quinolin-3-yl)-3-(4-chlorophenyl)-3,4-dihydropyrazol-2-yl]-4-oxo-butanoic acid (d.55)

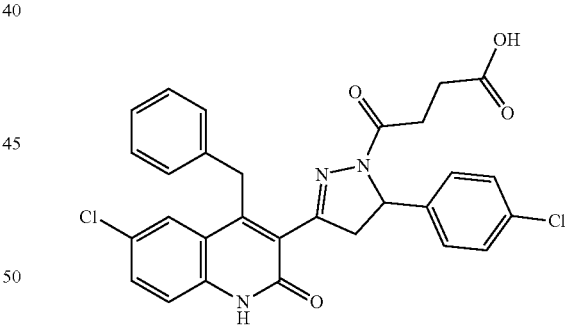

Compound d.55 was synthesized following the general procedure D1 using g.3 (100 mg, 0.22 mmol) with succinic anhydride (165° C., 200 W). Purification by normal phase flash column chromatography (solvent A: DCM, solvent B: MeOH—gradient: 0-5% solvent B) yielded title compound (71 mg, yield 63%). $^1$H NMR (400 MHz, DMSO-$d_6$) δ 12.21 (s, 1H), 12.09 (s, 1H), 7.77 (d, J=2.3 Hz, 1H), 7.56 (dd, J=8.8, 2.2 Hz, 1H), 7.38 (d, J=8.8 Hz, 1H), 7.32 (d, J=8.5 Hz, 2H) 7.28-7.21 (m, 6H), 7.20-7.15 (m, 1H), 5.45 (dd, J=12.0, 4.9 Hz, 1H), 4.47 (d, J=15.6 Hz, 1H), 4.39 (d, J=15.6 Hz, 1H), 3.71 (dd, J=18.4, 12.0 Hz, 1H), 3.08 (dd, J=18.4, 4.9 Hz, 1H), 2.73-2.54 (m, 2H), 2.38-2.27 (m, 2H). $R_t$ 2.09 min (generic method). ESI-MS for $C_{29}H_{23}Cl_2N_3O_4$: calculated 547.1. found m/z 548.1/550.1/552.1 [M+H]$^+$.

Example d.56. 3-[2-acetyl-3-(4-chlorophenyl)-3,4-dihydropyrazol-5-yl]-4-benzyl-6-chloro-1H-quinolin-2-one

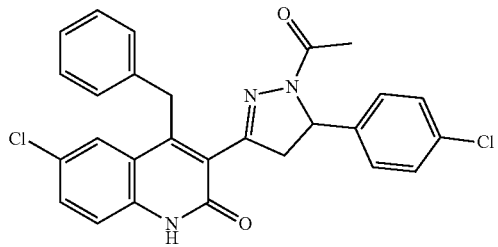 [SMILES: CC(=O)N1N=C(c2c(Cc3ccccc3)c3cc(Cl)ccc3[nH]c2=O)CC1c1ccc(Cl)cc1]

Compound d.56 was synthesized following the general procedure D1 using g.3 (100 mg, 0.22 mmol) with anhydrous THF (0.6 mL) and acetic anhydride (42 µL, 0.44 mmol) at 165° C. for 20 minutes. The THF was removed under vacuum, and the crude dissolved in $CH_2C_{12}$, washed three times with aqueous HCl (1 M, pH 2) and brine. The organic phase was dried over $Na_2SO_4$ and evaporated in vacuo. Purification by normal phase flash column chromatography (solvent A: DCM, solvent B: MeOH—gradient: 0-5% solvent B) yielded title compound as a white solid (95 mg, yield 88%). $^1$H NMR (400 MHz, DMSO-$d_6$) δ 12.21 (s, 1H), 7.74 (d, J=2.3 Hz, 1H), 7.55 (dd, J=8.8, 2.2 Hz, 1H), 7.40-7.32 (m, 3H), 7.31-7.23 (m, 6H), 7.23-7.16 (m, 1H), 5.46 (dd, J=12.0, 4.8 Hz, 1H), 4.45 (d, J=15.6 Hz, 1H), 4.39 (d, J=15.6 Hz, 1H), 3.74 (dd, J=18.4, 12.0 Hz, 1H), 3.12 (dd, J=18.3, 4.9 Hz, 1H), 1.97 (s, 3H). $R_t$ 1.29 min (apolar method). ESI-MS for $C_{27}H_{21}C_{12}N_3O_2$: calculated 489.1, found m/z 490.1/492.2/494.1 $[M+H]^+$.

Example d.57. 4-benzyl-6-chloro-3-[3-(4-chlorophenyl)-2-propanoyl-3,4-dihydropyrazol-5-yl]-1H-quinolin-2-one

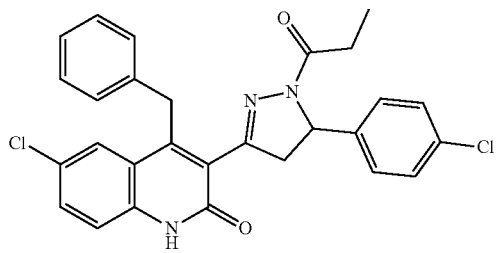 [SMILES: CCC(=O)N1N=C(c2c(Cc3ccccc3)c3cc(Cl)ccc3[nH]c2=O)CC1c1ccc(Cl)cc1]

Compound d.57 was synthesized following the general procedure D2 using g.3 (100 mg, 0.22 mmol). Purification by normal phase flash column chromatography (solvent A: DCM, solvent B: MeOH—gradient: 0-5% solvent B) yielded title compound as a yellow solid (55 mg, yield 50%). $^1$H NMR (400 MHz, DMSO-$d_6$) δ 12.21 (s, 1H), 7.74 (d, J=2.3 Hz, 1H), 7.57 (dd, J=8.8, 2.2 Hz, 1H), 7.42-7.33 (m, 3H), 7.32-7.17 (m, 7H), 5.46 (dd, J=12.0, 4.9 Hz, 1H), 4.50-4.33 (m, 2H), 3.74 (dd, J=18.3, 12.0 Hz, 1H), 3.13 (dd, J=18.3, 4.9 Hz, 1H), 2.43-2.24 (m, 2H), 0.85 (t, J=7.5 Hz, 3H). $R_t$ 2.53 min (generic method). ESI-MS for $C_{28}H_{23}C_{12}N_3O_2$: calculated 503.1, found m/z 504.1/506.0/508.0 $[M+H]^+$.

Example d.58. 4-[5-(4-benzyl-6-chloro-2-oxo-1H-quinolin-3-yl)-3-(4-bromophenyl)-3,4-dihydropyrazol-2-yl]-4-oxo-butanoic acid Step 1. Synthesis of 4-benzyl-3-[(E)-3-(4-bromophenyl)prop-2-enoyl]-6-chloro-1H-quinolin-2-one (f.4)

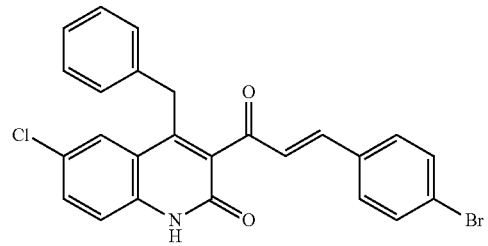 [SMILES: O=C(/C=C/c1ccc(Br)cc1)c1c(Cc2ccccc2)c2cc(Cl)ccc2[nH]c1=O]

In a round-bottom flask, e.1 (330 mg, 1.10 mmol) was suspended in a 4:3 mixture of ethanol (12.6 ml) and water (9.4 ml). The mixture was cooled to 0° C. and potassium hydroxide (1.54 g, 27.5 mmol) was added. After stirring for 45 minutes at 0° C., 4-bromobenzaldehyde (366 mg, 1.98 mmol) was added. The reaction was stirred at room temperature for 16 hours, afterwards acetic acid (1.59 mL, 27.5 mmol) was added at 0° C., resulting solid was dissolved in $CH_2Cl_2$ (50 mL), washed with water (3×50 mL) and brine. The solvent was evaporated in vacuo to yield the title compound as an orange solid (438 mg, yield 83%). $^1$H NMR (400 MHz, DMSO-$d_6$) δ 12.22 (s, 1H), 7.70-7.59 (m, 5H), 7.59-7.52 (m, 2H), 7.39 (d, J=8.8 Hz, 1H), 7.30-7.22 (m, 4H), 7.18-7.07 (m, 2H), 4.12 (s, 2H). $R_t$ 2.57 min (generic method). ESI-MS for $C_{25}H_{17}BrClNO_2$: calculated 477.0, found m/z 478.0/480.0/482.0 $[M+H]^+$, 476.3/478.1/480.1 $[M-H]^-$.

Step 2. Synthesis of 4-benzyl-3-[5-(4-bromophenyl)-4,5-dihydro-1H-pyrazol-3-yl]-6-chloro-1H-quinolin-2-one (g.4)

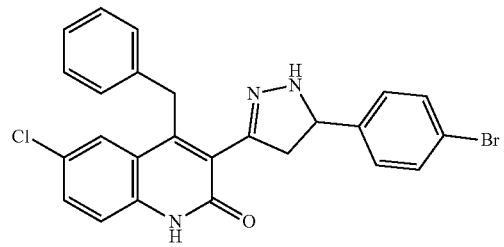 [SMILES: O=c1[nH]c2ccc(Cl)cc2c(Cc2ccccc2)c1C1=NNC(c2ccc(Br)cc2)C1]

In appropriately sized microwaveable vessel, f.4 (424 mg, 0.89 mmol) was suspended in ethanol (4 ml), then hydrazine hydrate (73 µL, 1.51 mmol) added, the reaction mixture microwaved at 110° C. (200 W) for 25 minutes, cooled at room temperature and resulting yellow solid filtered to yield title compound (310 mg, yield 71%). $^1$H NMR (400 MHz, DMSO-$d_6$) δ 11.99 (s, 1H), 7.66 (d, J=2.3 Hz, 1H), 7.54 (d, J=3.5 Hz, 1H), 7.54-7.46 (m, 3H), 7.37-7.31 (m, 3H), 7.26 (d, J=5.3 Hz, 4H), 7.20-7.12 (m, 1H), 4.79 (td, J=10.7, 3.5 Hz, 1H), 4.48-4.35 (m, 2H), 3.42-3.26 (m, 1H), 2.83 (dd, J=16.4, 10.6 Hz, 1H). $R_t$ 2.47 min (generic method). ESI-MS for $C_{25}H_{19}BrClN_3O$: calculated 491.0, found m/z 492.0/494.0/496.1 [M+H]$^+$.

Step 3. Synthesis of 4-[5-(4-benzyl-6-chloro-2-oxo-1H-quinolin-3-yl)-3-(4-bromophenyl)-3,4-dihydro-pyrazol-2-yl]-4-oxo-butanoic acid (d.58)

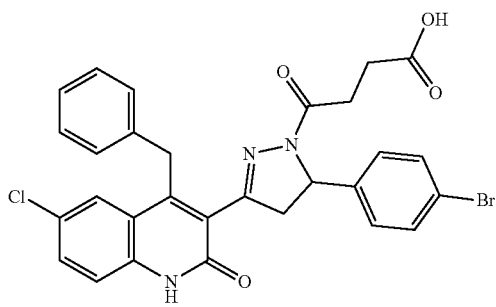 [SMILES: O=C(O)CCC(=O)N1N=C(c2c(Cc3ccccc3)c3cc(Cl)ccc3[nH]c2=O)CC1c1ccc(Br)cc1]

Compound d.58 was synthesized following the general procedure D1 using g.4 (100 mg, 0.2 mmol) with succinic anhydride (165° C., 200 W). Purification by normal phase flash column chromatography (solvent A: DCM, solvent B: MeOH—gradient: 0-5% solvent B) yielded title compound (53 mg, yield 45%). $^1$H NMR (400 MHz, DMSO-$d_6$) δ 12.22 (s, 2H), 7.77 (d, J=2.3 Hz, 1H), 7.56 (dd, J=8.8, 2.2 Hz, 1H), 7.46 (d, J=8.4 Hz, 2H), 7.38 (d, J=8.8 Hz, 1H), 7.30-7.23 (m, 4H), 7.21-7.13 (m, 3H), 5.43 (dd, J=12.0, 4.9 Hz, 1H), 4.47 (d, J=15.6 Hz, 1H), 4.39 (d, J=15.5 Hz, 1H), 3.71 (dd, J=18.3, 12.0 Hz, 1H), 3.08 (dd, J=18.3, 4.9 Hz, 1H), 2.74-2.53 (m, 2H), 2.33 (t, J=6.7 Hz, 2H). $R_t$ 2.11 min (generic method). ESI-MS for $C_{29}H_{23}BrClN_3O_4$: calculated 591.1, found m/z 592.1/594.0.

Example d.59. 3-[2-acetyl-3-(4-bromophenyl)-3,4-dihydropyrazol-5-yl]-4-benzyl-6-chloro-1H-quinolin-2-one

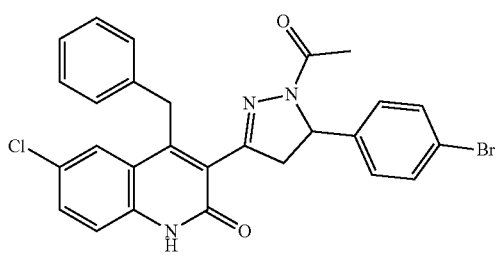 [SMILES: CC(=O)N1N=C(c2c(Cc3ccccc3)c3cc(Cl)ccc3[nH]c2=O)CC1c1ccc(Br)cc1]

Compound d.59 was synthesized following the general procedure D1 using g.4 (86 mg, 0.17 mmol) with acetic anhydride (33 µL, 0.35 mmol) at 165° C. for 20 minutes. The THF was removed under vacuum, and the crude dissolved in $CH_2Cl_2$ (50 mL), washed (3×50 mL) with aqueous HCl (1 M, pH 2) and brine. The organic phase was dried over $Na_2SO_4$, evaporated in vacuo and the resulting solid triturated with $Et_2O$ (10 mL) to yield the title compound as a white solid. (65 mg, yield 71%). $^1$H NMR (400 MHz, DMSO-$d_6$) δ 12.21 (s, 1H), 7.74 (d, J=2.3 Hz, 1H), 7.55 (dd, J=8.8, 2.3 Hz, 1H), 7.48 (d, J=8.4 Hz, 2H), 7.38 (d, J=8.8 Hz, 1H), 7.30-7.23 (m, 4H), 7.23-7.14 (m, 3H), 5.44 (dd, J=12.0, 4.9 Hz, 1H), 4.49-4.34 (m, 2H), 3.73 (dd, J=18.3, 12.0 Hz, 1H), 3.12 (dd, J=18.3, 4.9 Hz, 1H), 1.97 (s, 3H). $R_t$ 2.52 min (generic method). ESI-MS for $C_{27}H_{21}BrClN_3O$: calculated 533.1, found m/z 534.1/536.2/538.1 [M+H]$^+$.

Example d.60. 4-benzyl-3-[3-(4-bromophenyl)-2-propanoyl-3,4-dihydropyrazol-5-yl]-6-chloro-1H-quinolin-2-one

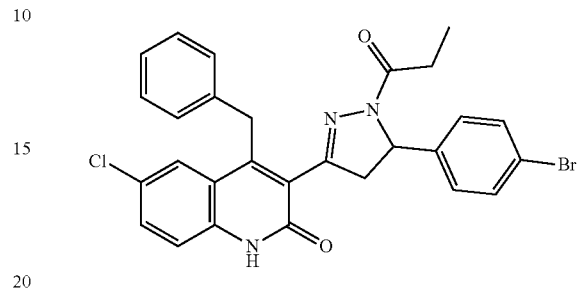

Compound d.60 was synthesized following the general procedure D2 using g.4 (97 mg, 0.20 mmol). Purification by normal phase flash column chromatography (solvent A: DCM, solvent B: MeOH—gradient: 0-5% solvent B) yielded title compound as a yellow solid (53 mg, yield 48%). $^1$H NMR (400 MHz, DMSO-$d_6$) δ 12.20 (s, 1H), 7.73 (d, J=2.3 Hz, 1H), 7.56 (dd, J=8.8, 2.2 Hz, 1H), 7.48 (d, J=8.4 Hz, 2H), 7.38 (d, J=8.8 Hz, 1H), 7.32-7.24 (m, 4H), 7.24-7.13 (m, 3H), 5.44 (dd, J=12.0, 4.9 Hz, 1H), 4.49-4.35 (m, 2H), 3.73 (dd, J=18.3, 12.0 Hz, 1H), 3.12 (dd, J=18.3, 4.9 Hz, 1H), 2.43-2.23 (m, 2H), 0.84 (t, J=7.5 Hz, 3H). $R_t$ 1.53 min (apolar method). ESI-MS for $C_{28}H_{23}BrClN_3O_2$: calculated 547.1, found m/z 548.0/550.0/552.0 [M+H]$^+$.

Example d.61. 4-[5-(4-benzyl-6-chloro-2-oxo-1H-quinolin-3-yl)-3-(4-methoxyphenyl)-3,4-dihydropyrazol-2-yl]-4-oxo-butanoic acid

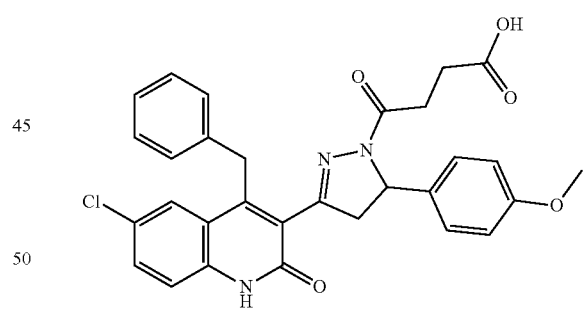

Compound d.61 was synthesized following the general procedure D1 using g.2 (104 mg, 0.23 mmol) with succinic anhydride (165° C., 200 W). THF was evaporated and the resulted solid was triturated in MeOH (10 mL), $CH_2Cl_2$ (10 mL), cold $CHCl_3$ (10 mL), $Et_2O$ (10 mL), cyclohexane (10 mL), and petroleum ether (10 mL) to obtain the title product as an off-white solid (82 mg, yield 66%). $^1$H NMR (400 MHz, DMSO-$d_6$) δ 12.20 (s, 1H), 12.00 (s, 1H), 7.76 (d, J=2.3 Hz, 1H), 7.56 (dd, J=8.8, 2.2 Hz, 1H), 7.38 (d, J=8.8 Hz, 1H), 7.31-7.23 (m, 4H), 7.21-7.16 (m, 1H), 7.14 (d, J=8.7 Hz, 2H), 6.81 (d, J=8.7 Hz, 2H), 5.39 (dd, J=11.8, 4.7 Hz, 1H), 4.47 (d, J=15.5 Hz, 1H), 4.39 (d, J=15.5 Hz, 1H), 3.72 (s, 3H), 3.69-3.61 (m, 1H), 3.08 (dd, J=18.3, 4.7 Hz, 1H), 2.70-2.56 (m, 2H), 2.31 (t, J=6.7 Hz, 2H). $R_t$ 1.97 min (Generic method). ESI-MS for C$_{30}$H$_{26}$ClN$_3$O$_5$: calculated 543.2, found m/z 544.2/546.2 [M+H]$^+$.

Example d.62. 4-[5-(4-benzyl-6-chloro-2-oxo-1H-quinolin-3-yl)-3-[4-(trifluoromethyl)phenyl]-3,4-dihydropyrazol-2-yl]-4-oxo-butanoic acid Step 1. Synthesis of 4-benzyl-6-chloro-3-[(E)-3-[4-(trifluoromethyl)phenyl]prop-2-enoyl]-1H-quinolin-2-one (f.5)

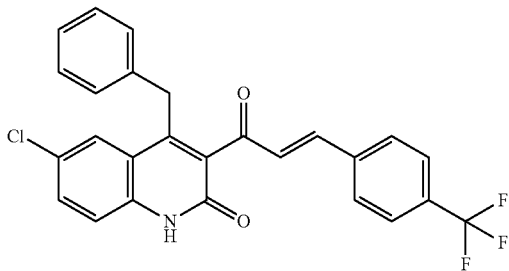 [SMILES: O=C(/C=C/c1ccc(C(F)(F)F)cc1)c1c(Cc2ccccc2)c2cc(Cl)ccc2[nH]c1=O]

In a round-bottom flask, e.1 (350 mg, 1.12 mmol) was suspended in a 4:3 mixture of ethanol (12.8 ml) and water (9.6 ml). The mixture was cooled to 0° C. and potassium hydroxide (1.573 g, 28.1 mmol) was added. After stirring for 45 minutes at 0° C., 4-(trifluoromethyl)benzaldehyde (275 µL, 2.02 mmol) was added. The reaction was stirred at room temperature for 16 hours, afterwards acetic acid (1.62 mL, 28.1 mmol) was added at 0° C., resulting yellow solid filtered The solid was dissolved in CH$_2$Cl$_2$ (50 mL), washed with water (50 mL) and brine (50 mL). The solvent was evaporated in vacuo to yield the title compound as a yellow solid. (453 mg, yield 86%). $^1$H NMR (400 MHz, DMSO-d$_6$) δ 12.25 (s, 1H), 7.94 (d, J=8.1 Hz, 2H), 7.76 (d, J=8.2 Hz, 2H), 7.70-7.61 (m, 2H), 7.57 (dd, J=8.8, 2.3 Hz, 1H), 7.40 (d, J=8.8 Hz, 1H), 7.31-7.19 (m, 5H), 7.17-7.11 (m, 1H), 4.14 (s, 2H). R$_t$ 2.55 min (generic method). ESI-MS for C$_{26}$H$_{17}$ClF$_3$NO$_2$: calculated 467.1, found m/z 468.1/470.1 [M+H]$^+$.

Step 2. Synthesis of 4-benzyl-6-chloro-3-[5-[4-(trifluoromethyl)phenyl]-4,5-dihydro-1H-pyrazol-3-yl]-1H-quinolin-2-one (g.5)

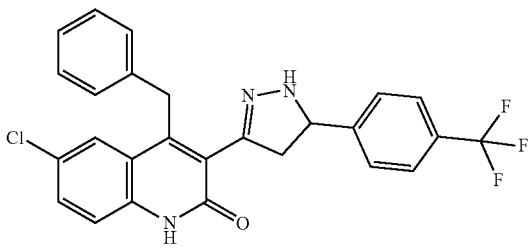 [SMILES: O=c1[nH]c2ccc(Cl)cc2c(Cc2ccccc2)c1C1=NNC(c2ccc(C(F)(F)F)cc2)C1]

In appropriately sized microwaveable vessel, f.5 (430 mg, 0.92 mmol) was suspended in ethanol (5 ml), then hydrazine hydrate (76 µL, 1.56 mmol) added, the reaction mixture microwaved at 110° C. (200 W) for 20 minutes, cooled at room temperature and the solvent evaporated in vacuo. The crude was diluted with CHCl$_3$ (50 mL), washed with H$_2$O (50 mL) and brine (50 mL), dried over Na$_2$SO$_4$ and the solvent removed under pressure to yield the title compound as a yellow solid (321 mg, yield 72%). $^1$H NMR (400 MHz, DMSO-d$_6$) δ 12.07 (s, 1H), 7.72-7.58 (m, 6H), 7.50 (dd, J=8.7, 2.3 Hz, 1H), 7.33 (d, J=8.8 Hz, 1H), 7.30-7.23 (m, 4H), 7.20-7.13 (m, 1H), 4.90 (td, J=10.7, 3.6 Hz, 1H), 4.51-4.37 (m, 2H), 3.43 (dd, J=16.4, 10.7 Hz, 1H), 2.87 (dd, J=16.4, 10.6 Hz, 1H). R$_t$ 2.46 min (generic method). ESI-MS for C$_{26}$H$_{19}$ClF$_3$N$_3$O: calculated 481.1, found m/z 482.2/484.1 [M+H]$^+$.

Step 3. Synthesis of 4-[5-(4-benzyl-6-chloro-2-oxo-1H-quinolin-3-yl)-3-[4-(trifluoromethyl)phenyl]-3,4-dihydropyrazol-2-yl]-4-oxo-butanoic acid (d.62)

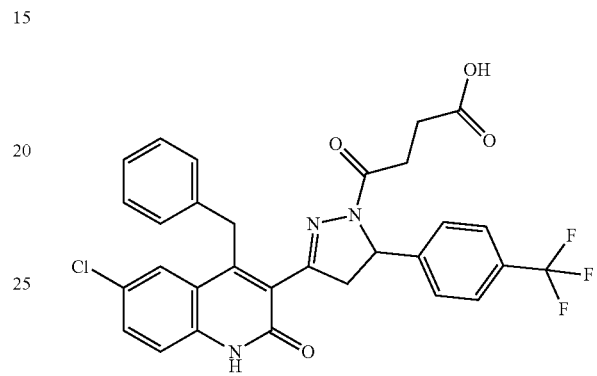

Compound d.62 was synthesized following the general procedure D1 using g.5 (168 mg, 0.35 mmol) with succinic anhydride (120° C., 200 W). Purification by normal phase flash column chromatography (solvent A: CH$_2$C$_{12}$, solvent B: MeOH—gradient: 0-5% solvent B) yielded title compound as a yellow-orange solid (65 mg, yield 32%). $^1$H NMR (400 MHz, DMSO-d$_6$) δ 12.22 (s, 1H), 12.06 (s, 1H), 7.78 (d, J=2.3 Hz, 1H), 7.64 (d, J=8.1 Hz, 2H), 7.57 (dd, J=8.8, 2.3 Hz, 1H), 7.42 (d, J=8.1 Hz, 2H), 7.38 (d, J=8.8 Hz, 1H), 7.29-7.23 (m, 4H), 7.21-7.14 (m, 1H), 5.55 (dd, J=12.1, 5.0 Hz, 1H), 4.49 (d, J=15.6 Hz, 1H), 4.41 (d, J=15.6 Hz, 1H), 3.76 (dd, J=18.4, 12.1 Hz, 1H), 3.09 (dd, J=18.4, 5.1 Hz, 1H), 2.81-2.53 (m, 2H), 2.40-2.29 (m, 2H). R$_t$ 1.08 min (apolar method). ESI-MS for C$_{30}$H$_{23}$ClF$_3$N$_3$O: calculated 581.1, found m/z 582.2/584.2 [M+H]$^+$.

Example d.63. 3-[2-acetyl-3-[4-(trifluoromethyl)phenyl]-3,4-dihydropyrazol-5-yl]-4-benzyl-6-chloro-1H-quinolin-2-one

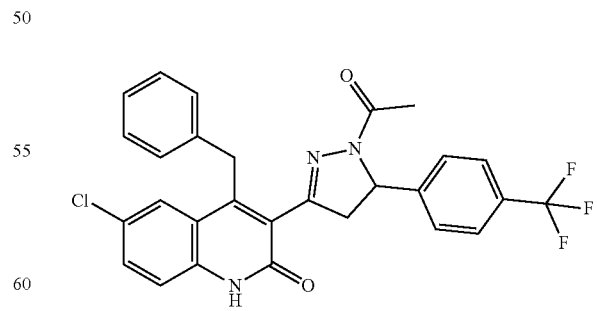

Compound d.63 was synthesized following the general procedure D1 using g.5 (136 mg, 0.28 mmol) with acetic anhydride (53 µL, 0.56 mmol) at 165° C. for 20 minutes. Purification by normal phase flash column chromatography (solvent A: DCM, solvent B: MeOH—gradient: 0-2% solvent B) yielded title compound as a yellow solid (74 mg, yield 50%). $^1$H NMR (400 MHz, DMSO-$d_6$) δ 12.21 (s, 1H), 7.75 (d, J=2.3 Hz, 1H), 7.66 (d, J=8.1 Hz, 2H), 7.56 (dd, J=8.8, 2.2 Hz, 1H), 7.44 (d, J=8.1 Hz, 2H), 7.38 (d, J=8.8 Hz, 1H), 7.30-7.25 (m, 4H), 7.21-7.15 (m, 1H), 5.55 (dd, J=12.1, 5.0 Hz, 1H), 4.47 (d, J=15.6 Hz, 1H), 4.40 (d, J=15.6 Hz, 1H), 3.78 (dd, J=18.4, 12.1 Hz, 1H), 3.14 (dd, J=18.3, 5.0 Hz, 1H), 1.99 (s, 3H). $R_t$ 1.50 min (apolar method). ESI-MS for $C_{28}H_{21}ClF_3N_3O_2$: calculated 523.1, found m/z 524.2/526.2 [M+H]$^+$.

Example d.65. 3-[2-acetyl-3-(4-tert-butylphenyl)-3,4-dihydropyrazol-5-yl]-4-benzyl-6-chloro-1H-quinolin-2-one Step 1. Synthesis of 4-benzyl-3-[(E)-3-(4-tert-butylphenyl)prop-2-enoyl]-6-chloro-1H-quinolin-2-one (f.6)

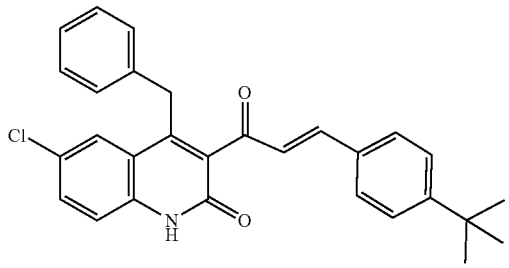 [SMILES: CC(C)(C)c1ccc(/C=C/C(=O)c2c(Cc3ccccc3)c3cc(Cl)ccc3[nH]c2=O)cc1]

In a round-bottom flask, e.1 (150 mg, 0.48 mmol) was suspended in a 4:3 mixture of ethanol (5.5 ml) and water (4.1 ml). The mixture was cooled to 0° C. and potassium hydroxide (673 mg, 12 mmol) was added. After stirring for 45 minutes at 0° C., 4-tert-butylbenzaldehyde (144 µL, 0.86 mmol) was added. The reaction was stirred at room temperature for 16 hours, afterwards acetic acid (692 µL, 12 mmol) was added at 0° C., resulting in a precipitate that was filtered and washed with ethanol (20 mL) and water (20 mL). The solid was dissolved in $CH_2Cl_2$ (50 mL), washed with water (50 mL) and brine (50 mL). The solvent was evaporated in vacuo to yield the title compound as a yellow solid (121 mg, yield 55%). $^1$H NMR (400 MHz, DMSO-$d_6$) δ 12.21 (s, 1H), 7.67-7.61 (m, 3H), 7.59-7.51 (m, 2H), 7.45-7.36 (m, 3H), 7.31-7.23 (m, 4H), 7.19-7.13 (m, 1H), 7.03 (d, J=16.3 Hz, 1H), 4.13 (s, 2H), 1.28 (s, 9H). $R_t$ 2.04 min (apolar method). ESI-MS for $C_{29}H_{26}ClNO_2$: calculated 455.17, found m/z 456.3/458.2 [M+H]$^+$.

Step 2. Synthesis of 4-benzyl-3-[5-(4-tert-butylphenyl)-4,5-dihydro-1H-pyrazol-3-yl]-6-chloro-1H-quinolin-2-one (g.6)

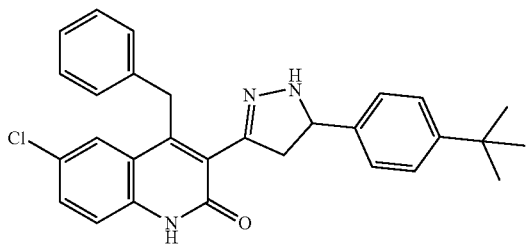 [SMILES: CC(C)(C)c1ccc(C2CC(c3c(Cc4ccccc4)c4cc(Cl)ccc4[nH]c3=O)=NN2)cc1]

In appropriately sized microwaveable vessel, f.6 (111 mg, 0.24 mmol) was suspended in ethanol (0.5 ml), then hydrazine hydrate (20 µL, 0.41 mmol) added, the reaction mixture microwaved at 110° C. (200 W) for 20 minutes, cooled at room temperature and resulting yellow solid filtered to yield title compound (83 mg, yield 74%). $^1$H NMR (400 MHz, DMSO-$d_6$) δ 12.03 (s, 1H), 7.65 (d, J=2.3 Hz, 1H), 7.49 (dd, J=8.8, 2.3 Hz, 1H), 7.44 (d, J=3.3 Hz, 1H), 7.33 (d, J=8.8 Hz, 1H), 7.31-7.25 (m, 8H), 7.21-7.14 (m, 1H), 4.75 (td, J=10.6, 3.3 Hz, 1H), 4.47 (d, J=15.3 Hz, 1H), 4.40 (d, J=15.2 Hz, 1H), 3.38-3.33 (m, 1H), 2.87 (dd, J=16.3, 10.6 Hz, 1H), 1.26 (s, 9H). $R_t$ 1.97 min (apolar method). ESI-MS for $C_{29}H_{28}ClN_3O$: calculated 469.2, found m/z 470.2/472.3 [M+H]$^+$.

Step 3. Synthesis of 3-[2-acetyl-3-(4-tert-butylphenyl)-3,4-dihydropyrazol-5-yl]-4-benzyl-6-chloro-1H-quinolin-2-one (d.65)

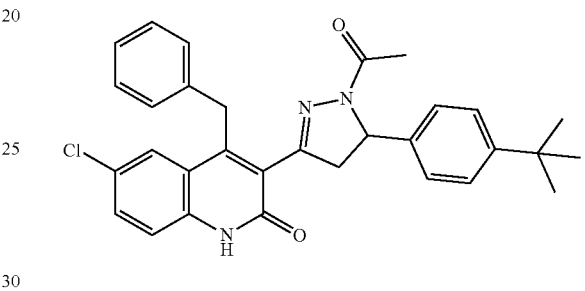

Compound d.65 was synthesized following the general procedure D1 using g.6 (111 mg, 0.24 mmol) with acetic anhydride (29 µL, 0.30 mmol) at 165° C. for 20 minutes. Purification by normal phase flash column chromatography (solvent A: DCM, solvent B: MeOH—gradient: 0-5% solvent B) yielded title compound as a yellow solid (68 mg, yield 78%). $^1$H NMR (400 MHz, DMSO-$d_6$) δ 12.19 (s, 1H), 7.73 (d, J=2.3 Hz, 1H), 7.56 (dd, J=8.8, 2.2 Hz, 1H), 7.38 (d, J=8.8 Hz, 1H), 7.32-7.25 (m, 6H), 7.23-7.16 (m, 1H), 7.13 (d, J=8.3 Hz, 2H), 5.41 (dd, J=11.9, 4.7 Hz, 1H), 4.46 (d, J=15.6 Hz, 1H), 4.39 (d, J=15.5 Hz, 1H), 3.73 (dd, J=18.3, 12.0 Hz, 1H), 3.11 (dd, J=18.3, 4.7 Hz, 1H), 1.97 (s, 3H), 1.25 (s, 9H). $R_t$ 1.87 min (apolar method). ESI-MS for $C_{31}H_{30}ClN_3O_2$: calculated 511.2, found m/z 512.1/514.2 [M+H]$^+$.

Example d.66. 4-[5-(4-benzyl-6-chloro-2-oxo-1H-quinolin-3-yl)-3-(3-fluoro-4-methoxy-phenyl)-3,4-dihydropyrazol-2-yl]-4-oxo-butanoic acid Step 1. Synthesis of 4-benzyl-6-chloro-3-[(E)-3-(3-fluoro-4-methoxy-phenyl)prop-2-enoyl]-1H-quinolin-2-one (f.7)

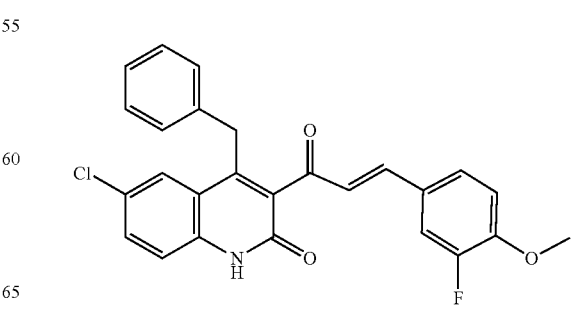

In a round-bottom flask, e.1 (157 mg, 0.5 mmol) was suspended in a 4:3 mixture of ethanol (5.7 ml) and water (4.3 ml). The mixture was cooled to 0° C. and potassium hydroxide (706 mg, 12.6 mmol) was added. After stirring for 45 minutes at 0° C., 3-fluoro-4-methoxybenzaldehyde (139 mg, 0.9 mmol) was added. The reaction was stirred at room temperature for 16 hours, afterwards acetic acid (0.726 mL, 12.6 mmol) was added at 0° C., and washed with ethanol (20 mL). The solid was diluted in $CH_2Cl_2$ (50 mL), washed with water and brine. The solvent was evaporated in vacuo to yield the title compound as a yellow solid (168 mg, yield 75%). $^1$H NMR (400 MHz, DMSO-$d_6$) 12.20 (s, 1H), 7.69 (dd, J=12.7, 2.0 Hz, 1H), 7.63 (d, J=2.3 Hz, 1H), 7.61-7.45 (m, 3H), 7.39 (d, J=8.8 Hz, 1H), 7.31-7.15 (m, 5H), 7.19-7.10 (m, 1H), 7.00 (d, J=16.3 Hz, 1H), 4.11 (s, 2H), 3.88 (s, 3H) $R_t$ 2.45 min (Generic method). ESI-MS for $C_{26}H_{19}ClFNO_3$: calculated 447.1, found m/z 448.1/450.2 [M+H]$^+$.

Step 2. Synthesis of 4-benzyl-6-chloro-3-[5-(3-fluoro-4-methoxy-phenyl)-4,5-dihydro-1H-pyrazol-3-yl]-1H-quinolin-2-one (g.7)

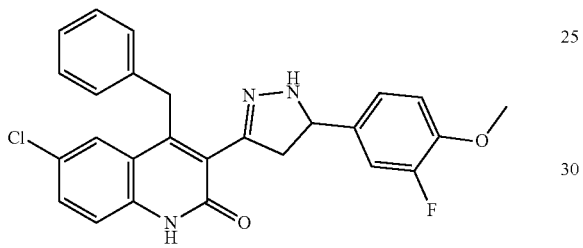

In appropriately sized microwaveable vessel, f.7 (152 mg, 0.34 mmol) was suspended in ethanol (0.7 ml), then hydrazine hydrate (28 µL, 0.58 mmol) added, the reaction mixture microwaved at 110° C. (200 W) for 20 minutes, cooled at room temperature and resulting yellow solid filtered to yield title compound (133 g, yield 85%). $^1$H NMR (400 MHz, DMSO-$d_6$) δ 12.05 (s, 1H), 7.66 (d, J=2.3 Hz, 1H), 7.53-7.45 (m, 2H), 7.33 (d, J=8.8 Hz, 1H), 7.31-7.21 (m, 5H), 7.21-7.04 (m, 3H), 4.75 (td, J=10.4, 3.4 Hz, 1H), 4.47-4.36 (m, 2H), 3.81 (s, 3H), 3.36-3.27 (m, 1H), 2.85 (dd, J=16.3, 10.2 Hz, 1H) $R_t$ 2.35 min (Generic method). ESI-MS for $C_{26}H_{21}ClFN_3O_2$: calculated 461.1, found m/z 462.2/464.2 [M+H]$^+$.

Step 3. Synthesis of 4-[5-(4-benzyl-6-chloro-2-oxo-1H-quinolin-3-yl)-3-(3-fluoro-4-methoxy-phenyl)-3,4-dihydropyrazol-2-yl]-4-oxo-butanoic acid (d.66)

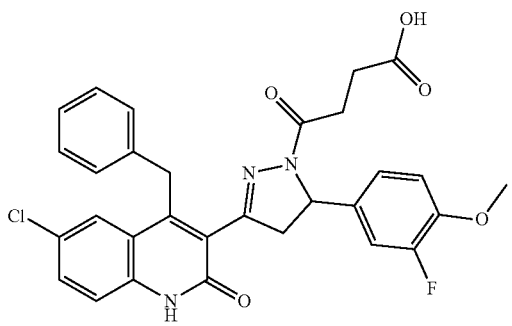 [SMILES: COc1ccc(C2CC(c3c(Cc4ccccc4)c4cc(Cl)ccc4[nH]c3=O)=NN2C(=O)CCC(=O)O)cc1F]

Compound d.66 was synthesized following the general procedure D1 using g.7 (119 mg, 0.26 mmol) with succinic anhydride (165° C., 200 W). The THF was removed under vacuum, and the crude suspended in $CHCl_3$ (10 mL), filtered and washed with MeOH (3×10 mL) to yield the title compound as an off-white solid (47 mg, yield 32%). $^1$H NMR (400 MHz, DMSO-$d_6$) δ 12.21 (s, 1H), 12.00 (s, 1H), 7.77 (d, J=2.4 Hz, 1H), 7.56 (dd, J=8.8, 2.3 Hz, 1H), 7.38 (d, J=8.8 Hz, 1H), 7.31-7.22 (m, 4H), 7.22-7.16 (m, 1H), 7.14-6.98 (m, 3H), 5.41 (dd, J=11.9, 4.6 Hz, 1H), 4.45 (d, J=15.5 Hz, 1H), 4.38 (d, J=15.6 Hz, 1H), 3.80 (s, 3H), 3.65 (dd, J=18.3, 11.8 Hz, 1H), 3.11 (dd, J=18.3, 4.7 Hz, 1H), 2.75-2.52 (m, 2H), 2.43-2.28 (m, 2H). $R_t$ 1.96 min (Generic method). ESI-MS for $C_{30}H_{25}ClFN_3O_5$: calculated 561.1, found m/z 562.1/564.2 [M+H]$^+$.

Example d.69. 4-[5-(4-benzyl-6-chloro-2-oxo-1H-quinolin-3-yl)-3-(1-methylindol-5-yl)-3,4-dihydro-pyrazol-2-yl]-4-oxo-butanoic acid Step 1. Synthesis of 4-benzyl-6-chloro-3-[(E)-3-(1-methylindol-5-yl)prop-2-enoyl]-1H-quinolin-2-one (f.8)

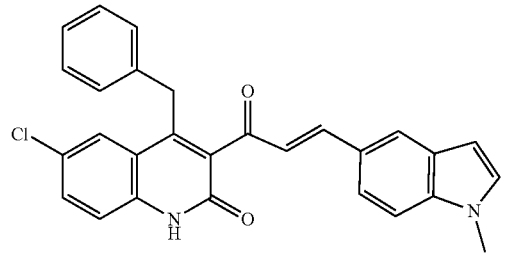 [SMILES: Cn1ccc2cc(/C=C/C(=O)c3c(Cc4ccccc4)c4cc(Cl)ccc4[nH]c3=O)ccc21]

In a round-bottom flask, e.1 (350 g, 1.12 mmol) was suspended in a 4:3 mixture of ethanol (13 ml) and water (10 ml). The mixture was cooled to 0° C. and potassium hydroxide (1.571 g, 28 mmol) was added. After stirring for 45 minutes at 0° C., 1-methyl-1H-indole-5-carbaldehyde (322 mg, 2.02 mmol) was added. The reaction was stirred at room temperature for 16 hours, afterwards acetic acid (1.614 mL, 28 mmol) was added at 0° C., resulting in a precipitate that was filtered and washed with ethanol (20 mL) and water (20 mL). The solid was dissolved in $CH_2Cl_2$ (50 mL) and washed with brine (50 mL). The solvent was evaporated in vacuo to yield the title compound as an orange solid (407 g, yield 80%). $^1$H NMR (400 MHz, DMSO-$d_6$) δ 12.19 (s, 1H), 7.90 (d, J=1.6 Hz, 1H), 7.69-7.62 (m, 2H), 7.59-7.53 (m, 2H), 7.47 (d, J=8.7 Hz, 1H), 7.41-7.36 (m, 2H), 7.32-7.21 (m, 4H), 7.18-7.11 (m, 1H), 7.00 (d, J=16.2 Hz, 1H), 6.46 (dd, J=3.2, 0.8 Hz, 1H), 4.14 (s, 2H), 3.80 (s, 3H). $R_t$ 2.43 min (Generic method). ESI-MS for $C_{28}H_{21}ClN_2O_2$: calculated 452.1, found m/z 453.1/455.1 [M+H]$^+$.

Step 2 Synthesis of 4-benzyl-6-chloro-3-[5-(1-methylindol-5-yl)-4,5-dihydro-1H-pyrazol-3-yl]-1H-quinolin-2-one (g.8)

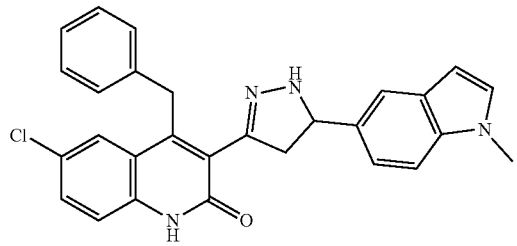 [SMILES: Cn1ccc2cc(C3CC(c4c(Cc5ccccc5)c5cc(Cl)ccc5[nH]c4=O)=NN3)ccc21]

In appropriately sized microwaveable vessel, f.8 (390 g, 0.86 mmol) was suspended in ethanol (2 ml), then hydrazine hydrate (71 μL, 1.46 mmol) added, the reaction mixture microwaved at 110° C. (200 W) for 20 minutes, cooled at room temperature and resulting solid filtered and washed with ethanol (20 mL) to yield title compound as an orange solid (298 mg, yield 72%). $^1$H NMR (400 MHz, DMSO-d$_6$) δ 12.04 (s, 1H), 7.66 (d, J=2.3 Hz, 1H), 7.56-7.45 (m, 2H), 7.41 (d, J=3.4 Hz, 1H), 7.38-7.32 (m, 2H), 7.31-7.24 (m, 5H), 7.22-7.13 (m, 2H), 6.33 (d, J=3.0 Hz, 1H), 4.88 (td, J=10.7, 3.4 Hz, 1H), 4.54-4.36 (m, 2H), 3.76 (s, 3H), 3.44-3.33 (m, 1H), 2.93 (dd, J=16.3, 10.9 Hz, 1H). R$_t$ 2.36 min (Generic method). ESI-MS for C$_{28}$H$_{23}$ClN$_4$O: calculated 466.2, found m/z 467.2/469.3 [M+H]$^+$.

Step 3. Synthesis of 4-[5-(4-benzyl-6-chloro-2-oxo-1H-quinolin-3-yl)-3-(1-methylindol-5-yl)-3,4-dihydropyrazol-2-yl]-4-oxo-butanoic acid (d.69)

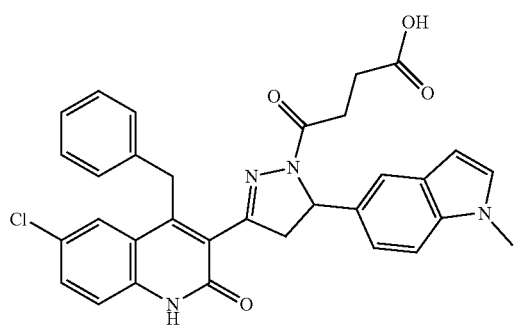 [SMILES: Cn1ccc2cc(C3CC(c4c(Cc5ccccc5)c5cc(Cl)ccc5[nH]c4=O)=NN3C(=O)CCC(=O)O)ccc21]

Compound d.69 was synthesized following the general procedure D1 using g.8 (150 mg, 0.32 mmol) with succinic anhydride (165° C., 200 W). The THF was removed under vacuum, and the crude triturated in CH$_2$Cl$_2$ (10 mL) and MeOH (10 mL), filtered and washed with petroleum ether (10 mL) to obtain the title compound as a red solid (115 mg, yield 63%). $^1$H NMR (400 MHz, DMSO-d$_6$) δ 12.20 (s, 1H), 11.97 (s, 1H), 7.76 (d, J=2.3 Hz, 1H), 7.56 (dd, J=8.8, 2.2 Hz, 1H), 7.41-7.36 (m, 2H), 7.34-7.24 (m, 6H), 7.22-7.15 (m, 1H), 7.03 (dd, J=8.5, 1.7 Hz, 1H), 6.29 (d, J=3.0 Hz, 1H), 5.51 (dd, J=11.9, 4.7 Hz, 1H), 4.49 (d, J=15.5 Hz, 1H), 4.41 (d, J=15.6 Hz, 1H), 3.79-3.70 (m, 4H), 3.16 (dd, J=18.3, 4.7 Hz, 1H), 2.62 (t, J=6.7 Hz, 2H), 2.30 (t, J=6.7 Hz, 2H). R$_t$ 2.08 min (Generic method). ESI-MS for C$_{32}$H$_{27}$ClN$_4$O$_4$: calculated 566.2, found m/z 567.2/569.3 [M+H]$^+$.

Example d.70. 3-[2-acetyl-3-(1-methylindol-5-yl)-3,4-dihydropyrazol-5-yl]-4-benzyl-6-chloro-1H-quinolin-2-one

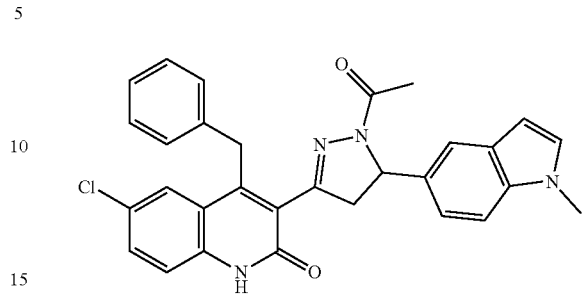

Compound d.70 was synthesized following the general procedure D1 using g.8 (135 mg, 0.29 mmol) with acetic anhydride (55 μL, 0.58 mmol) at 165° C. for 20 minutes. Purification by normal phase flash column chromatography (solvent A: DCM, solvent B: MeOH—gradient: 0-5% solvent B) yielded title compound as a white solid (91 mg, yield 62%). $^1$H NMR (400 MHz, DMSO-d$_6$) δ 12.20 (s, 1H), 7.73 (d, J=2.3 Hz, 1H), 7.55 (dd, J=8.8, 2.3 Hz, 1H), 7.41-7.35 (m, 2H), 7.35-7.25 (m, 6H), 7.24-7.15 (m, 1H), 7.04 (dd, J=8.5, 1.7 Hz, 1H), 6.31 (dd, J=3.1, 0.8 Hz, 1H), 5.53 (dd, J=12.0, 4.6 Hz, 1H), 4.47 (d, J=15.6 Hz, 1H), 4.40 (d, J=15.5 Hz, 1H), 3.77 (dd, J=18.3, 11.9 Hz, 1H), 3.76 (s, 3H), 3.19 (dd, J=18.3, 4.7 Hz, 1H), 1.96 (s, 3H). R$_t$ 2.34 min (generic method). ESI-MS for C$_{30}$H$_{25}$ClN$_4$O$_2$: calculated 508.2, found m/z 509.2/511.2 [M+H]$^+$.

Example d.73. 4-[5-(4-benzyl-6-chloro-2-oxo-1H-quinolin-3-yl)-3-(1-methylindazol-5-yl)-3,4-dihydropyrazol-2-yl]-4-oxo-butanoic acid Step 1. Synthesis of 4-benzyl-6-chloro-3-[(E)-3-(1-methylindazol-5-yl)prop-2-enoyl]-1H-quinolin-2-one (f.9)

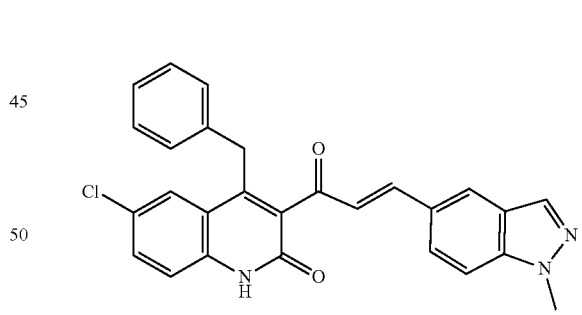

In a round-bottom flask, e.1 (300 ma, 0.96 mmol) was suspended in a 4:3 mixture of ethanol (11 ml) and water (8 ml). The mixture was cooled to 0° C. and potassium hydroxide (1.35 g, 24.06 mmol) was added. After stirring for 45 minutes at 0° C., 1-methyl-1H-indazole-5-carbaldehyde (277 mg, 1.73 mmol) was added. The reaction was stirred at room temperature for 16 hours, afterwards acetic acid (1.387 mL, 24.06 mmol) was added at 0° C., resulting in a precipitate that was filtered and washed with ethanol (20 mL) and water (20 mL). The solid was dissolved in CH$_2$Cl$_2$ (50 mL), washed with water (50 mL) and brine (50 mL). The solvent was evaporated in vacuo to yield the title compound as a yellow solid. (274 mg, yield 57%). $^1$H NMR (400 MHz, DMSO-d$_6$) δ 12.21 (s, 1H), 8.16-8.08 (m, 2H), 7.82 (dd, J=9.0, 1.6 Hz, 1H), 7.73-7.62 (m, 3H), 7.56 (dd, J=8.8, 2.3 Hz, 1H), 7.40 (d, J=8.8 Hz, 1H), 7.33-7.21 (m, 4H), 7.16-7.12 (m, 1H), 7.08 (d, J=16.3 Hz, 1H), 4.14 (s, 2H), 4.05 (s, 3H). R$_t$ 2.28 min (Generic method). ESI-MS for C$_{27}$H$_{20}$ClN$_3$O$_2$: calculated 453.1, found m/z 454.1/456.1 [M+H]$^+$.

Step 2. Synthesis of 4-benzyl-6-chloro-3-[5-(1-methylindazol-5-yl)-4,5-dihydro-1H-pyrazol-3-yl]-1H-quinolin-2-one (g.9)

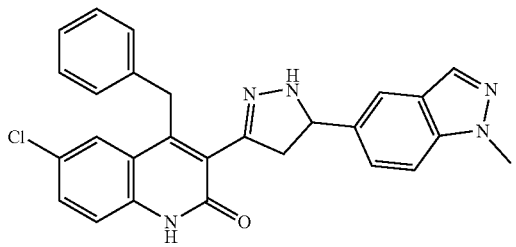 [SMILES: Cn1ncc2cc(C3CC(c4c(Cc5ccccc5)c5cc(Cl)ccc5[nH]c4=O)=NN3)ccc21]

In appropriately sized microwaveable vessel, f.9 (230 mg, 0.51 mmol) was suspended in ethanol (1.1 ml), then hydrazine hydrate (42 μL, 0.86 mmol) added, the reaction mixture microwaved at 110° C. (200 W) for 20 minutes, cooled at room temperature and resulting yellow solid filtered and washed with ethanol (20 mL) to yield title compound as an off-white solid (166 mg, yield 70%). $^1$H NMR (400 MHz, DMSO-d$_6$) δ 12.00 (s, 1H), 7.94 (s, 1H), 7.73-7.65 (m, 2H), 7.57 (d, J=8.7 Hz, 1H), 7.53-7.43 (m, 3H), 7.33 (d, J=8.8 Hz, 1H), 7.30-7.23 (m, 4H), 7.20-7.14 (m, 1H), 4.92 (td, J=10.6, 3.5 Hz, 1H), 4.51-4.39 (m, 2H), 4.02 (s, 3H), 3.38 (dd, J=16.4, 10.6 Hz, 1H), 2.92 (dd, J=16.3, 10.7 Hz, 1H). R$_t$ 2.17 min (Generic method). ESI-MS for C$_{27}$H$_{22}$ClN$_5$O: calculated 467.2, found m/z 468.2/470.2 [M+H]$^+$.

Step 3. Synthesis of 4-[5-(4-benzyl-6-chloro-2-oxo-1H-quinolin-3-yl)-3-(1-methylindazol-5-yl)-3,4-dihydropyrazol-2-yl]-4-oxo-butanoic acid (d.73)

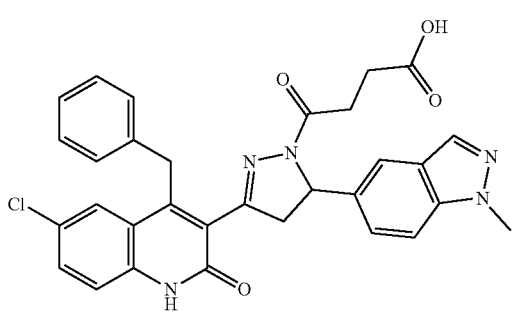 [SMILES: Cn1ncc2cc(C3CC(c4c(Cc5ccccc5)c5cc(Cl)ccc5[nH]c4=O)=NN3C(=O)CCC(=O)O)ccc21]

Compound d.73 was synthesized following the general procedure D1 using g.9 (75 mg, 0.16 mmol) with succinic anhydride (165° C., 200 W). The THF was removed under vacuum, and the crude dissolved in CH$_2$Cl$_2$ (50 mL), washed three times (3×50 mL) with aqueous HCl (1 M, pH 2) and brine. The organic phase was dried over Na$_2$SO$_4$ and evaporated in vacuo. The crude was then precipitated in CH$_2$Cl$_2$, filtered and washed with CH$_2$Cl$_2$ (10 mL) and Et$_2$O (10 mL) to obtain the title product as a white solid (46 mg, yield 84%). $^1$H NMR (400 MHz, DMSO-d$_6$) δ 12.21 (s, 1H), 12.00 (s, 1H), 7.92 (d, J=0.9 Hz, 1H), 7.77 (d, J=2.3 Hz, 1H), 7.59-7.51 (m, 3H), 7.38 (d, J=8.8 Hz, 1H), 7.33-7.23 (m, 5H), 7.22-7.15 (m, 1H), 5.56 (dd, J=11.9, 4.8 Hz, 1H), 4.49 (d, J=15.6 Hz, 1H), 4.41 (d, J=15.6 Hz, 1H), 4.01 (s, 3H), 3.74 (dd, J=18.3, 11.9 Hz, 1H), 3.16 (dd, J=18.3, 4.8 Hz, 1H), 2.70-2.54 (m, 2H), 2.31 (t, J=6.7 Hz, 2H). R$_t$ 1.86 min (Generic method). ESI-MS for C$_{31}$H$_{26}$ClN$_5$O$_4$: calculated 567.2, found m/z 568.3/570.2 [M+H]$^+$.

Example d.74. 3-[2-acetyl-3-(1-methylindazol-5-yl)-3,4-dihydropyrazol-5-yl]-4-benzyl-6-chloro-1H-quinolin-2-one

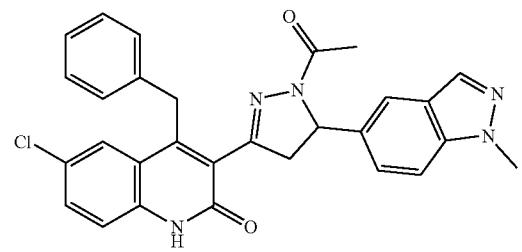 [SMILES: CC(=O)N1N=C(c2c(Cc3ccccc3)c3cc(Cl)ccc3[nH]c2=O)CC1c1ccc2c(cnn2C)c1]

Compound d.74 was synthesized following the general procedure D1 using g.9 (79 mg, 0.17 mmol) with acetic anhydride (32 μL, 0.34 mmol) at 165° C. for 20 minutes. The white precipitate was filtered and washed with MeOH (10 mL) and Et$_2$O (10 mL) to yield the title compound as a white solid (63 mg, yield 73%). $^1$H NMR (400 MHz, DMSO-d$_6$) δ 12.21 (s, 1H), 7.94 (d, J=0.9 Hz, 1H), 7.74 (d, J=2.3 Hz, 1H), 7.60-7.53 (m, 3H), 7.38 (d, J=8.8 Hz, 1H), 7.33-7.26 (m, 5H), 7.23-7.16 (m, 1H), 5.57 (dd, J=11.9, 4.7 Hz, 1H), 4.50-4.38 (m, 2H), 4.01 (s, 3H), 3.77 (dd, J=18.3, 11.9 Hz, 1H), 3.20 (dd, J=18.3, 4.7 Hz, 1H), 1.97 (s, 3H). R$_t$ 2.14 min (generic method). ESI-MS for C$_{29}$H$_{24}$ClN$_5$O$_2$: calculated 509.2, found m/z 510.2/512.1 [M+H]$^+$.

Example d.75. 4-[5-(4-benzyl-6-chloro-2-oxo-1H-quinolin-3-yl)-3-(2-methylindazol-5-yl)-3,4-dihydropyrazol-2-yl]-4-oxo-butanoic acid Step 1. Synthesis of 4-benzyl-6-chloro-3-[(E)-3-(2-methylindazol-5-yl)prop-2-enoyl]-1H-quinolin-2-(f.10)

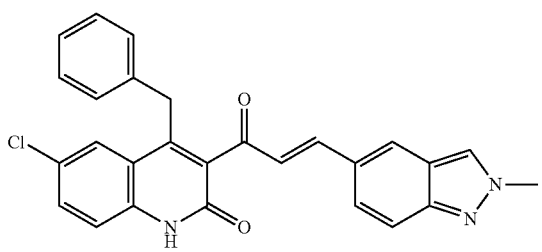 [SMILES: Cn1cc2cc(/C=C/C(=O)c3c(Cc4ccccc4)c4cc(Cl)ccc4[nH]c3=O)ccc2n1]

In a round-bottom flask, e.1 (130 mg, 0.42 mmol) was suspended in a 4:3 mixture of ethanol (5 ml) and water (4 ml). The mixture was cooled to 0° C. and potassium hydroxide (590 mg, 10.5 mmol) was added. After stirring for 45 minutes at 0° C., 2-methylindazole-5-carbaldehyde (100 mg, 0.63 mmol) was added. The reaction was stirred at room temperature for 16 hours, afterwards acetic acid (606 μL, 10.5 mmol) was added at 0° C., resulting in a precipitate that was filtered and washed with ethanol (20 mL). The solid was dissolved in $CH_2Cl_2$ (50 mL) and washed with water (50 mL) and brine (50 mL). The solvent was evaporated in vacuo to yield the title compound as a yellow/orange solid (137 mg, yield 72%). $^1$H NMR (400 MHz, DMSO-$d_6$) δ 12.20 (s, 1H), 8.44 (s, 1H), 8.04 (s, 1H), 7.68-7.61 (m, 3H), 7.61-7.52 (m, 2H), 7.40 (d, J=8.8 Hz, 1H), 7.33-7.20 (m, 4H), 7.18-7.10 (m, 1H), 7.01 (d, J=16.2 Hz, 1H), 4.18-4.12 (m, 5H). $R_t$ 2.04 min (generic method). ESI-MS for $C_{27}H_{20}ClN_3O_2$: calculated 453.1, found m/z 452.3/454.2 [M+H]$^+$.

Step 2. Synthesis of 4-benzyl-6-chloro-3-[5-(2-methylindazol-5-yl)-4,5-dihydro-1H-pyrazol-3-yl]-1H-quinolin-2-one (g.10)

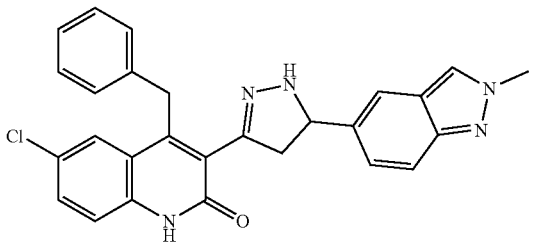 [SMILES: Cn1cc2cc(C3CC(c4c(Cc5ccccc5)c5cc(Cl)ccc5[nH]c4=O)=NN3)ccc2n1]

In appropriately sized microwaveable vessel, f.10 (136 g, 0.3 mmol) was suspended in ethanol (3 ml), then hydrazine hydrate (25 μL, 0.51 mmol) added, the reaction mixture microwaved at 110° C. (200 W) for 20 minutes, cooled at room temperature and resulting yellow solid filtered to yield title compound (98 mg, yield 70%). $^1$H NMR (400 MHz, DMSO-$d_6$) 12.05 (s, 1H), 8.23 (s, 1H), 7.66 (d, J=2.3 Hz, 1H), 7.62 (d, J=1.4 Hz, 1H), 7.55-7.45 (m, 3H), 7.33 (d, J=8.8 Hz, 1H), 7.30-7.22 (m, 5H), 7.21-7.13 (m, 1H), 4.86 (td, J=10.8, 3.5 Hz, 1H), 4.52-4.38 (m, 2H), 4.14 (s, 3H), 3.36 (dd, J=16.4, 10.6 Hz, 1H), 2.92 (dd, J=16.3, 11.0 Hz, 1H). $R_t$ 1.91 min (generic method). ESI-MS for $C_{27}H_{22}ClN_5O$: calculated 467.2, found m/z 468.2/470.2 [M+H]$^+$.

Step 3. Synthesis of 4-[5-(4-benzyl-6-chloro-2-oxo-1H-quinolin-3-yl)-3-(2-methylindazol-5-yl)-3,4-dihydropyrazol-2-yl]-4-oxo-butanoic acid (d.75)

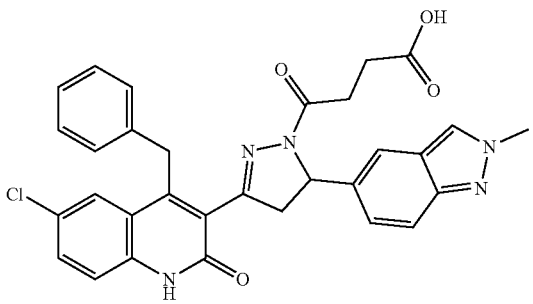 [SMILES: Cn1cc2cc(C3CC(c4c(Cc5ccccc5)c5cc(Cl)ccc5[nH]c4=O)=NN3C(=O)CCC(=O)O)ccc2n1]

Compound d.75 was synthesized following the general procedure D1 using g.10 (83 mg, 0.18 mmol) with succinic anhydride (120° C., 200 W). THF was evaporated and the resulted crude solid was triturated in $CH_2Cl_2$ (10 mL) and cold MeOH (10 mL), filtered and washed with diethyl ether (10 mL) to obtain the title compound as an off-white solid. (38 mg, yield 37%). $^1$H NMR (400 MHz, DMSO-$d_6$) δ 12.20 (s, 1H), 12.02 (s, 1H), 8.22 (s, 1H), 7.76 (d, J=2.3 Hz, 1H), 7.56 (dd, J=8.8, 2.3 Hz, 1H), 7.51-7.43 (m, 2H), 7.38 (d, J=8.8 Hz, 1H), 7.32-7.23 (m, 4H), 7.21-7.13 (m, 1H), 7.08 (dd, J=9.1, 1.6 Hz, 1H), 5.50 (dd, J=11.9, 4.8 Hz, 1H), 4.49 (d, J=15.6 Hz, 1H), 4.41 (d, J=15.6 Hz, 1H), 4.14 (s, 3H), 3.74 (dd, J=18.4, 11.9 Hz, 1H), 3.14 (dd, J=18.4, 4.8 Hz, 1H), 2.73-2.57 (m, 2H), 2.32 (t, J=6.7 Hz, 2H). $R_t$ 1.81 min (generic method). ESI-MS for $C_{31}H_{26}ClN_5O_4$: calculated 567.2, found m/z 568.3/570.3 [M+H]$^+$.

Example d.83. 4-[5-(4-benzyl-6-chloro-2-oxo-1H-quinolin-3-yl)-3-[4-(4-fluorophenyl)phenyl]-3,4-dihydropyrazol-2-yl]-4-oxo-butanoic acid Step 1. Synthesis of 4-benzyl-6-chloro-3-[(E)-3-[4-(4-fluorophenyl)phenyl]prop-2-enoyl]-1H-quinolin-2-one (f.11)

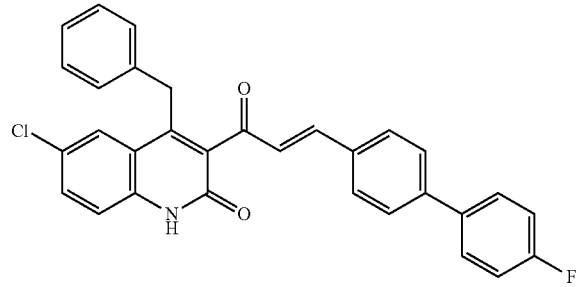 [SMILES: O=C(/C=C/c1ccc(-c2ccc(F)cc2)cc1)c1c(Cc2ccccc2)c2cc(Cl)ccc2[nH]c1=O]

In a round-bottom flask, e.1 (119 g, 0.38 mmol) was suspended in a 4:3 mixture of ethanol (4.3 ml) and water (3.3 ml). The mixture was cooled to 0° C. and potassium hydroxide (533 mg, 9.5 mmol) was added. After stirring for 45 minutes at 0° C., 4-(4-fluorophenyl)benzaldehyde (137 mg, 0.68 mmol) was added. The reaction was stirred at room temperature for 16 hours, afterwards acetic acid (0.548 mL, 9.5 mmol) was added at 0° C., resulting off-white solid filtered and washed with ethanol (20 mL) and water (20 mL). The solid was dissolved in $CH_2Cl_2$ (50 mL), washed with water (3×50 mL) and brine. The solvent was evaporated in vacuo to yield the title compound as a yellow solid. (170 mg, yield 89%). $^1$H NMR (400 MHz, DMSO-$d_6$) δ 12.23 (s, 1H), 7.84-7.75 (m, 4H), 7.72 (d, J=8.4 Hz, 2H), 7.66-7.55 (m, 3H), 7.40 (d, J=8.8 Hz, 1H), 7.33-7.23 (m, 6H), 7.19-7.11 (m, 2H), 4.15 (s, 2H). $R_t$ 1.81 min (Apolar method). ESI-MS for $C_{31}H_{21}ClFNO_2$: calculated 493.1, found m/z 494.1/496.1.

Step 2. Synthesis of 4-benzyl-6-chloro-3-[5-[4-(4-fluorophenyl)phenyl]-4,5-dihydro-1H-pyrazol-3-yl]-1H-quinolin-2-one (g.11)

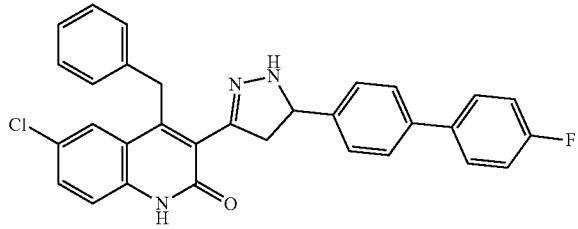 [SMILES: O=c1[nH]c2ccc(Cl)cc2c(Cc2ccccc2)c1C1=NNC(c2ccc(-c3ccc(F)cc3)cc2)C1]

In appropriately sized microwaveable vessel, f.11 (156 mg, 0.32 mmol) was suspended in ethanol (0.7 ml), then hydrazine hydrate (26 μL, 0.54 mmol) added, the reaction mixture microwaved at 110° C. (200 W) for 20 minutes, cooled at room temperature and resulting grey solid filtered to yield title compound (107 mg, yield 71%). $^1$H NMR (400 MHz, DMSO-$d_6$) δ 12.06 (s, 1H), 7.71-7.65 (m, 3H), 7.59-7.53 (m, 3H), 7.51-7.45 (m, 3H), 7.36-7.25 (m, 7H), 7.21-7.14 (m, 1H), 4.85 (td, J=10.6, 3.5 Hz, 1H), 4.53-4.37 (m, 2H), 3.39 (dd, J=16.4, 10.6 Hz, 1H), 2.91 (dd, J=16.3, 10.7 Hz, 1H). $R_t$ 1.68 min (Apolar method). ESI-MS for $C_{31}H_{23}ClFN_3O$: calculated 507.2, found m/z 508.3/510.2 [M+H]$^+$.

Step 3. Synthesis of 4-[5-(4-benzyl-6-chloro-2-oxo-1H-quinolin-3-yl)-3-[4-(4-fluorophenyl)phenyl]-3,4-dihydropyrazol-2-yl]-4-oxo-butanoic acid (d.83)

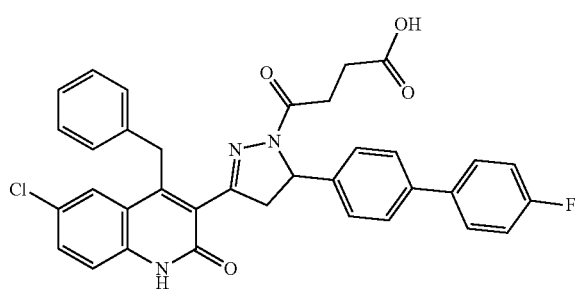 [SMILES: O=C(O)CCC(=O)N1N=C(c2c(Cc3ccccc3)c3cc(Cl)ccc3[nH]c2=O)CC1c1ccc(-c2ccc(F)cc2)cc1]

Compound d.83 was synthesized following the general procedure D1 using g.11 (100 mg, 0.20 mmol) with succinic anhydride (165° C., 200 W). Purification by normal phase flash column chromatography (solvent A: $CH_2Cl_2$, solvent B: MeOH—gradient: 0-5% solvent B) yielded title compound (45 mg, yield 45%). $^1$H NMR (400 MHz, DMSO-$d_6$) δ 12.21 (s, 1H), 12.00 (s, 1H), 7.78 (d, J=2.3 Hz, 1H), 7.72-7.62 (m, 2H), 7.60-7.51 (m, 3H), 7.38 (d, J=8.8 Hz, 1H), 7.33-7.22 (m, 8H), 7.22-7.13 (m, 1H), 5.49 (dd, J=11.9, 4.9 Hz, 1H), 4.50 (d, J=15.6 Hz, 1H), 4.41 (d, J=15.5 Hz, 1H), 3.75 (dd, J=18.3, 12.0 Hz, 1H), 3.14 (dd, J=18.3, 4.9 Hz, 1H), 2.74-2.56 (m, 2H), 2.34 (t, J=6.7 Hz, 2H). $R_t$ 2.24 min (Generic method). ESI-MS for $C_{35}H_{27}ClFN_3O_4$: calculated 607.2, found m/z 608.1/610.1 [M+H]$^+$.

Example d.84. 4-[5-(4-benzyl-6-chloro-2-oxo-1H-quinolin-3-yl)-3-[4-(4-chlorophenyl)phenyl]-3,4-dihydropyrazol-2-yl]-4-oxo-butanoic acid Step 1. Synthesis of 4-benzyl-6-chloro-3-[(E)-3-[4-(4-chlorophenyl)phenyl]prop-2-enoyl]-1H-quinolin-2-one (f.12)

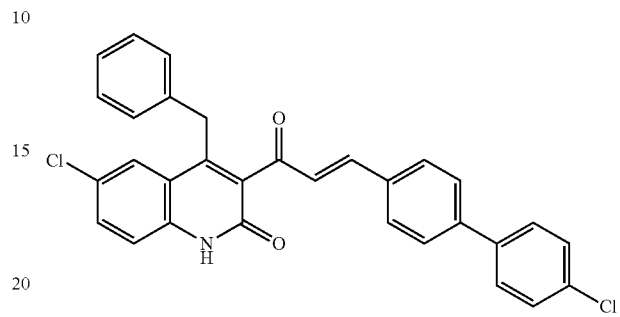

In a round-bottom flask, e.1 (300 mg, 0.96 mmol) was suspended in a 4:3 mixture of ethanol (11 ml) and water (8 ml). The mixture was cooled to 0° C. and potassium hydroxide (1.350 g, 24.06 mmol) was added. After stirring for 45 minutes at 0° C., 4'-chloro-biphenyl-4-carbaldehyde (374 mg, 1.73 mmol) was added. The reaction was stirred at room temperature for 3 hours, afterwards acetic acid (1.387 mL, 24.06 mmol) was added at 0° C., resulting solid filtered and washed with ethanol (20 mL) and water (20 mL). The solid was dissolved in $CH_2Cl_2$ (50 mL), washed with water (50 mL) and brine (50 mL). The solvent was evaporated in vacuo to yield the title compound as a yellow solid (322 mg, yield 66%). $^1$H NMR (400 MHz, DMSO-$d_6$) δ 12.23 (s, 1H), 7.82 (d, J=8.5 Hz, 2H), 7.80-7.72 (m, 4H), 7.68-7.50 (m, 5H), 7.39 (d, J=8.8 Hz, 1H), 7.31-7.22 (m, 4H), 7.18-7.10 (m, 2H), 4.15 (s, 2H). $R_t$ 2.06 min (Apolar method). ESI-MS for $C_{31}H_{21}Cl_2NO_2$: calculated 509.10, found m/z 510.2/512.0 [M+H]$^+$.

Step 2. Synthesis of 4-benzyl-6-chloro-3-[5-[4-(4-chlorophenyl)phenyl]-4,5-dihydro-1H-pyrazol-3-yl]-1H-quinolin-2-one (g.12)

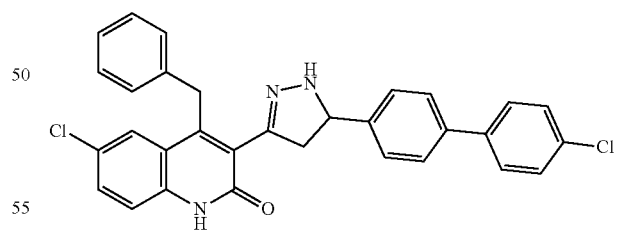

In appropriately sized microwaveable vessel, f.12 (310 mg, 0.61 mmol) was suspended in ethanol (1.3 ml), then hydrazine hydrate (50 μL, 1.03 mmol) added, the reaction mixture microwaved at 110° C. (200 W) for 20 minutes, cooled at room temperature, resulting solid filtered and washed with ethanol (20 mL) to yield title compound as a grey solid (280 g, yield 88%). $^1$H NMR (400 MHz, DMSO-$d_6$) δ 12.04 (s, 1H), 7.71-7.64 (m, 3H), 7.61 (d, J=8.3 Hz, 2H), 7.55 (d, J=3.4 Hz, 1H), 7.54-7.47 (m, 5H), 7.34 (d, J=8.8 Hz, 1H), 7.30-7.25 (m, 4H), 7.21-7.16 (m, 1H), 4.85

(td, J=10.7, 3.5 Hz, 1H), 4.51-4.37 (m, 2H), 3.39 (dd, J=16.3, 10.6 Hz, 1H), 2.91 (dd, J=16.3, 10.7 Hz, 1H). $R_t$ 2.09 min (Apolar method). ESI-MS for $C_{31}H_{23}Cl_2N_3O$: calculated 523.1, found m/z 524.2/526.2/528.0 [M+H]$^+$.

Step 3. Synthesis of 4-[5-(4-benzyl-6-chloro-2-oxo-1H-quinolin-3-yl)-3-[4-(4-chlorophenyl)phenyl]-3,4-dihydropyrazol-2-yl]-4-oxo-butanoic acid (d.84)

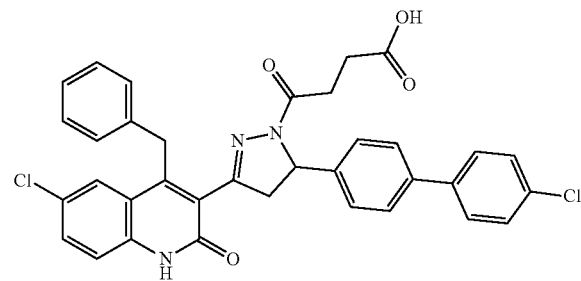 [SMILES: O=C(O)CCC(=O)N1N=C(c2c(Cc3ccccc3)c3cc(Cl)ccc3[nH]c2=O)CC1c1ccc(-c2ccc(Cl)cc2)cc1]

Compound d.84 was synthesized following the general procedure D1 using g.12 (134 mg, 0.26 mmol) with succinic anhydride (165° C., 200 W). The precipitate formed was triturated with MeOH (10 mL) and Et$_2$O (10 mL) to obtain the title compound as a white solid (134 mg, yield 83). $^1$H NMR (400 MHz, DMSO-d$_6$) δ 12.21 (s, 1H), 12.00 (s, 1H), 7.78 (d, J=2.3 Hz, 1H), 7.66 (d, J=8.6 Hz, 2H), 7.57 (d, J=8.2 Hz, 3H), 7.51 (d, J=8.6 Hz, 2H), 7.38 (d, J=8.8 Hz, 1H), 7.33-7.24 (m, 6H), 7.21-7.15 (m, 1H), 5.49 (dd, J=11.9, 4.9 Hz, 1H), 4.49 (d, J=15.5 Hz, 1H), 4.41 (d, J=15.6 Hz, 1H), 3.75 (dd, J=18.4, 12.0 Hz, 1H), 3.14 (dd, J=18.4, 4.9 Hz, 1H), 2.74-2.55 (m, 2H), 2.34 (t, J=6.7 Hz, 2H). $R_t$ 2.42 min (Generic method). ESI-MS for $C_{35}H_{27}Cl_2N_3O_4$: calculated 623.1, found m/z 624.1/626.1/628.1 [M+H]$^+$.

Example d.85. 3-[2-acetyl-3-[4-(4-chlorophenyl)phenyl]-3,4-dihydropyrazol-5-yl]-4-benzyl-6-chloro-1H-quinolin-2-one

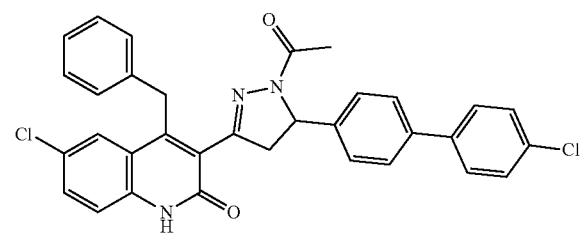 [SMILES: CC(=O)N1N=C(c2c(Cc3ccccc3)c3cc(Cl)ccc3[nH]c2=O)CC1c1ccc(-c2ccc(Cl)cc2)cc1]

Compound d.85 was synthesized following the general procedure D1 using g.12 (135 mg, 0.26 mmol) with acetic anhydride (49 μL, 0.52 mmol) at 165° C. for 20 minutes. The THF was removed under vacuum, and the crude triturated with MeOH (10 mL) and Et$_2$O (10 mL) to yield the title compound as a white solid (72 mg, yield 49%). $^1$H NMR (400 MHz, DMSO-d$_6$) δ 12.21 (s, 1H), 7.75 (d, J=2.3 Hz, 1H), 7.67 (d, J=8.6 Hz, 2H), 7.62-7.53 (m, 3H), 7.51 (d, J=8.5 Hz, 2H), 7.38 (d, J=8.8 Hz, 1H), 7.34-7.25 (m, 6H), 7.23-7.14 (m, 1H), 5.50 (dd, J=11.9, 4.8 Hz, 1H), 4.47 (d, J=15.6 Hz, 1H), 4.40 (d, J=15.6 Hz, 1H), 3.77 (dd, J=18.3, 12.0 Hz, 1H), 3.18 (dd, J=18.4, 4.9 Hz, 1H), 1.99 (s, 3H). $R_t$ 1.83 min (apolar method). ESI-MS for $C_{33}H_{25}Cl_2N_3O_2$: calculated 565.1, found m/z 566.1/568.2/570.4 [M+H]$^+$.

Example d.88. 4-[5-(4-benzyl-6-chloro-2-oxo-1H-quinolin-3-yl)-3-[4-(4-methoxyphenyl)phenyl]-3,4-dihydropyrazol-2-yl]-4-oxo-butanoic acid Step 1. Synthesis of 4-benzyl-6-chloro-3-[(E)-3-[4-(4-methoxyphenyl)phenyl]prop-2-enoyl]-1H-quinolin-2-one (f.13)

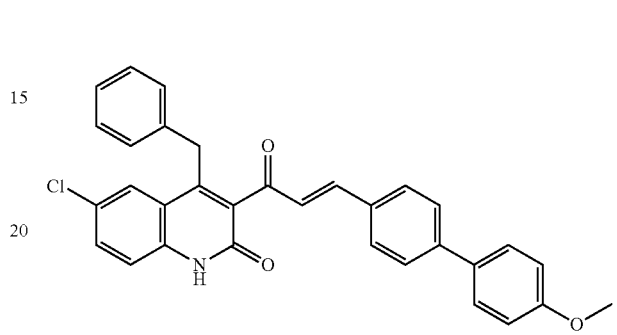

In a round-bottom flask, e.1 (350 mg, 1.12 mmol) was suspended in a 4:3 mixture of ethanol (13 ml) and water (10 ml). The mixture was cooled to 0° C. and potassium hydroxide (1.574 g, 28 mmol) was added. After stirring for 45 minutes at 0° C., 4'-methoxybiphenyl-4-carbaldehyde (428 mg, 2.02 mmol) was added. The reaction was stirred at room temperature for 16 hours, afterwards acetic acid (1.614 mL, 28 mmol) was added at 0° C., resulting in a precipitate that was filtered and washed with ethanol (20 mL) and water (20 mL). The solid was dissolved in CH$_2$Cl$_2$ (50 mL), washed with water (50 mL) and the solvent evaporated in vacuo to yield the title compound as a yellow/orange solid (529 mg, yield 93%). $^1$H NMR (400 MHz, DMSO-d$_6$) δ 12.22 (s, 1H), 7.77 (d, J=8.4 Hz, 2H), 7.72-7.63 (m, 5H), 7.63-7.53 (m, 2H), 7.39 (d, J=8.8 Hz, 1H), 7.32-7.25 (m, 2H), 7.29-7.21 (m, 2H), 7.20-6.96 (m, 4H), 4.15 (s, 2H), 3.80 (s, 3H). $R_t$ 1.77 min (Apolar method). ESI-MS for $C_{32}H_{24}ClNO_3$: calculated 505.1, found m/z 506.2/508.2 [M+H]$^+$.

Step 2. Synthesis of 4-benzyl-6-chloro-3-[5-[4-(4-methoxyphenyl)phenyl]-4,5-dihydro-1H-pyrazol-3-yl]-1H-quinolin-2-one (g.13)

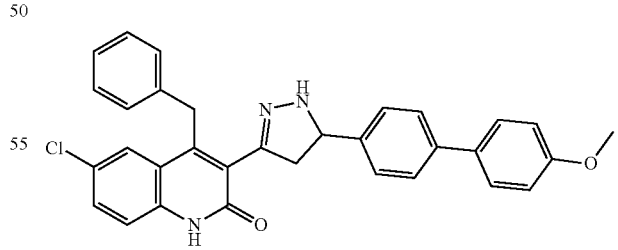

In appropriately sized microwaveable vessel, f.13 (511 mg, 1.01 mmol) was suspended in ethanol (2 ml), then hydrazine hydrate (83 μL, 1.72 mmol) added, the reaction mixture microwaved at 110° C. (200 W) for 20 minutes, cooled at room temperature, resulting solid filtered and washed with ethanol (20 mL) to yield title compound as a yellow solid (496 mg, yield 94%). $^1$H NMR (400 MHz, DMSO-d$_6$) δ 12.06 (s, 1H), 7.67 (d, J=2.3 Hz, 1H), 7.62-7.48 (m, 6H), 7.43 (d, J=8.3 Hz, 2H), 7.34 (d, J=8.8 Hz, 1H), 7.31-7.23 (m, 4H), 7.23-7.13 (m, 1H), 7.01 (d, J=8.8 Hz, 2H), 4.83 (td, J=10.7, 3.4 Hz, 1H), 4.52-4.35 (m, 2H), 3.79 (s, 3H), 3.38 (dd, J=16.4, 10.6 Hz, 1H), 2.91 (dd, J=16.4, 10.7 Hz, 1H).

Step 3. Synthesis of 4-[5-(4-benzyl-6-chloro-2-oxo-1H-quinolin-3-yl)-3-[4-(4-methoxyphenyl)phenyl]-3,4-dihydropyrazol-2-yl]-4-oxo-butanoic acid (d.88)

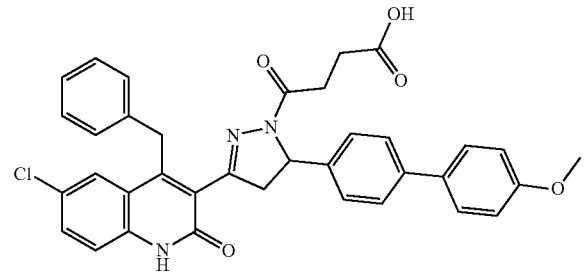 [SMILES: COc1ccc(-c2ccc(C3CC(c4c(Cc5ccccc5)c5cc(Cl)ccc5[nH]c4=O)=NN3C(=O)CCC(=O)O)cc2)cc1]

Compound d.88 was synthesized following the general procedure D1 using g.13 (100 mg, 0.19 mmol) with succinic anhydride (120° C., 200 W). The resulted solid was triturated in MeOH (10 mL), CH$_2$Cl$_2$ (10 mL), and Et$_2$O (10 mL) to obtain the title product as a white solid (80 mg, yield 68%). $^1$H NMR (400 MHz, DMSO-d$_6$) δ 12.21 (s, 1H), 12.00 (s, 1H), 7.77 (d, J=2.3 Hz, 1H), 7.61-7.53 (m, 3H), 7.50 (d, J=8.4 Hz, 2H), 7.38 (d, J=8.8 Hz, 1H), 7.31-7.23 (m, 6H), 7.21-7.15 (m, 1H), 7.02 (d, J=8.8 Hz, 2H), 5.47 (dd, J=11.9, 4.8 Hz, 1H), 4.49 (d, J=15.6 Hz, 1H), 4.41 (d, J=15.5 Hz, 1H), 3.79 (s, 3H), 3.78-3.69 (m, 1H), 3.13 (dd, J=18.3, 4.9 Hz, 1H), 2.74-2.56 (m, 2H), 2.34 (t, J=6.7 Hz, 2H). R$_t$ 2.21 min (Generic method). ESI-MS for C$_{36}$H$_{30}$ClN$_3$O$_5$: calculated 619.2, found m/z 620.3/622.2 [M+H]$^+$.

Example d.89. 3-[2-acetyl-3-[4-(4-methoxyphenyl)phenyl]-3,4-dihydropyrazol-5-yl]-4-benzyl-6-chloro-1H-quinolin-2-one

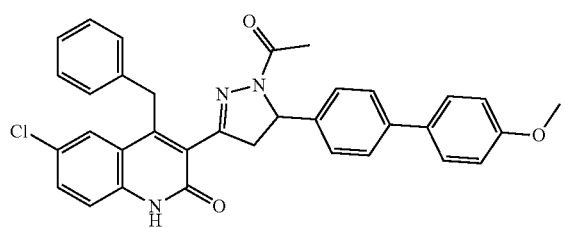 [SMILES: COc1ccc(-c2ccc(C3CC(c4c(Cc5ccccc5)c5cc(Cl)ccc5[nH]c4=O)=NN3C(C)=O)cc2)cc1]

Compound d.89 was synthesized following the general procedure D1 using g.13 (100 mg, 0.19 mmol) with acetic anhydride (39 mg, 0.38 mmol) at 165° C. for 20 minutes. The resulted solid was filtrated and washed with MeOH (10 mL), CH$_2$Cl$_2$ (10 mL), and E$_{t2}$O (10 mL) to obtain the title product as a white solid (63 mg, yield 59%). $^1$H NMR (400 MHz, DMSO-d$_6$) δ 12.20 (s, 1H), 7.74 (d, J=2.3 Hz, 1H), 7.62-7.49 (m, 5H), 7.38 (d, J=8.8 Hz, 1H), 7.33-7.24 (m, 6H), 7.23-7.15 (m, 1H), 7.02 (d, J=8.8 Hz, 2H), 5.48 (dd, J=12.0, 4.8 Hz, 1H), 4.48 (d, J=15.6 Hz, 1H), 4.40 (d, J=15.6 Hz, 1H), 3.79 (s, 3H), 3.78-3.71 (m, 1H), 3.17 (dd, J=18.3, 4.8 Hz, 1H), 1.99 (s, 3H). R$_t$ 2.48 min (generic method). ESI-MS for C$_{34}$H$_{28}$ClN$_3$O$_3$: calculated 561.2, found m/z 562.3/564.3 [M+H]$^+$.

Example d.90. 4-[5-(4-benzyl-6-chloro-2-oxo-1H-quinolin-3-yl)-3-[4-(1-propylpyrazol-4-yl)phenyl]-3,4-dihydropyrazol-2-yl]-4-oxo-butanoic acid Step 1. Synthesis of 4-benzyl-6-chloro-3-[(E)-3-[4-(1-propylpyrazol-4-yl)phenyl]prop-2-enoyl]-1H-quinolin-2-one (f.14)

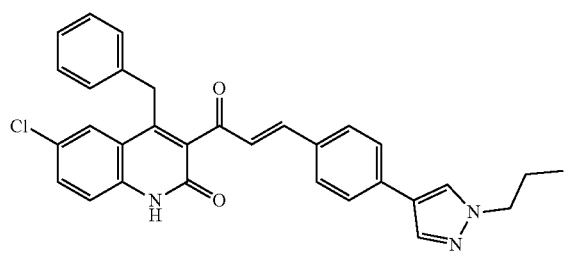 [SMILES: CCCn1cc(-c2ccc(/C=C/C(=O)c3c(Cc4ccccc4)c4cc(Cl)ccc4[nH]c3=O)cc2)cn1]

In a round-bottom flask, e.1 (165 mg, 0.53 mmol) was suspended in a 4:3 mixture of ethanol (6 ml) and water (4.5 ml). The mixture was cooled to 0° C. and potassium hydroxide (743 g, 13.25 mmol) was added. After stirring for 45 minutes at 0° C., 4-(1-propylpyrazol-4-yl)benzaldehyde (206 mg, 0.96 mmol) was added. The reaction was stirred at room temperature for 16 hours, afterwards acetic acid (0.746 mL, 13.25 mmol) was added at 0° C., resulting in a precipitate that was filtered and washed with ethanol (20 mL) and water (20 mL). The solid was dissolved in CH$_2$Cl$_2$ (50 mL) and washed with water and brine. The solvent was evaporated in vacuo to yield the title compound as a yellow solid (225 g, yield 84%). $^1$H NMR (400 MHz, DMSO-d$_6$) δ 12.21 (s, 1H), 8.29 (s, 1H), 7.96 (d, J=0.8 Hz, 1H), 7.70 (d, J=8.5 Hz, 2H), 7.66-7.60 (m, 3H), 7.58-7.50 (m, 2H), 7.39 (d, J=8.8 Hz, 1H), 7.31-7.22 (m, 4H), 7.18-7.12 (m, 1H), 7.05 (d, J=16.3 Hz, 1H), 4.14 (s, 2H), 4.07 (t, J=7.0 Hz, 2H), 1.87-1.76 (m, 2H), 0.85 (t, J=7.4 Hz, 3H). R$_t$ 2.45 min (generic method). ESI-MS for C$_{31}$H$_{26}$ClN$_3$O: calculated 507.2, found m/z 508.3/510.3 [M+H]$^+$.

Step 2. Synthesis of 4-benzyl-6-chloro-3-[5-[4-(1-propylpyrazol-4-yl)phenyl]-4,5-dihydro-1H-pyrazol-3-yl]-1H-quinolin-2-one (g.14)

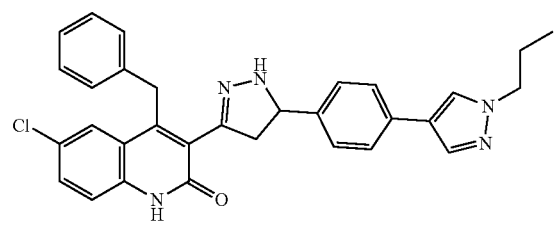 [SMILES: CCCn1cc(-c2ccc(C3CC(c4c(Cc5ccccc5)c5cc(Cl)ccc5[nH]c4=O)=NN3)cc2)cn1]

In appropriately sized microwaveable vessel, f.14 (220 g, 0.43 mmol) was suspended in ethanol (4 ml), then hydrazine hydrate (36 μL, 0.74 mmol) added, the reaction mixture microwaved at 110° C. (200 W) for 20 minutes, cooled at room temperature and resulting green/grey solid filtered to yield title compound (192 g, yield 86%). $^1$H NMR (400

MHz, DMSO-d$_6$) 12.05 (s, 1H), 8.14 (s, 1H), 7.83 (d, J=0.9 Hz, 1H), 7.66 (d, J=2.3 Hz, 1H), 7.53-7.46 (m, 4H), 7.40-7.32 (m, 3H), 7.31-7.24 (m, 4H), 7.22-7.15 (m, 1H), 4.78 (td, J=10.7, 3.4 Hz, 1H), 4.51-4.37 (m, 2H), 4.06 (t, J=7.0 Hz, 2H), 3.41-3.34 (m, 1H), 2.88 (dd, J=16.3, 10.8 Hz, 1H), 1.81 (h, J=7.3 Hz, 2H), 0.85 (t, J=7.4 Hz, 3H). R$_t$ 2.32 min (generic method). ESI-MS for C$_{31}$H$_{28}$ClN$_5$O: calculated 521.2, found m/z 522.3/524.3 [M+H]$^+$.

Step 3. Synthesis of 4-[5-(4-benzyl-6-chloro-2-oxo-1H-quinolin-3-yl)-3-[4-(1-propylpyrazol-4-yl)phenyl]-3,4-dihydropyrazol-2-yl]-4-oxo-butanoic acid (d.90)

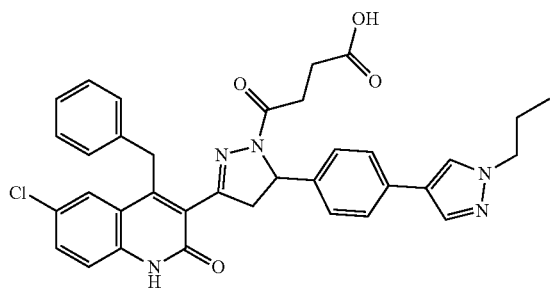 [SMILES: CCCn1cc(-c2ccc(C3CC(c4c(Cc5ccccc5)c5cc(Cl)ccc5[nH]c4=O)=NN3C(=O)CCC(=O)O)cc2)cn1]

Compound d.90 was synthesized following the general procedure D1 using g.14 (92 mg, 0.18 mmol) with succinic anhydride (120° C., 200 W). THF was evaporated and the resulted solid was triturated in MeOH (10 mL), CH$_2$Cl$_2$ (10 mL), and Et$_2$O (10 mL) to obtain the title product as a white solid (65 mg, yield 58%). $^1$H NMR (400 MHz, DMSO-d$_6$) δ 12.20 (s, 1H), 11.99 (s, 1H), 8.12 (s, 1H), 7.82 (s, 1H), 7.77 (d, J=2.3 Hz, 1H), 7.56 (dd, J=8.8, 2.2 Hz, 1H), 7.46 (d, J=8.0 Hz, 2H), 7.38 (d, J=8.8 Hz, 1H), 7.31-7.24 (m, 4H), 7.22-7.14 (m, 3H), 5.43 (dd, J=12.0, 4.8 Hz, 1H), 4.48 (d, J=15.6 Hz, 1H), 4.39 (d, J=15.5 Hz, 1H), 4.06 (t, J=7.0 Hz, 2H), 3.71 (dd, J=18.3, 12.0 Hz, 1H), 3.11 (dd, J=18.3, 4.8 Hz, 1H), 2.72-2.55 (m, 2H), 2.33 (t, J=6.7 Hz, 2H), 1.81 (h, J=7.3 Hz, 2H), 0.84 (t, J=7.4 Hz, 3H). R$_t$ 2.05 min (generic method). ESI-MS for C$_{35}$H$_{32}$ClN$_5$O$_4$: calculated 621.2, found m/z 622.2/624.2 [M+H]$^+$.

Example d.91. 3-[2-acetyl-3-[4-(1-propylpyrazol-4-yl)phenyl]-3,4-dihydropyrazol-5-yl]-4-benzyl-6-chloro-1H-quinolin-2-one

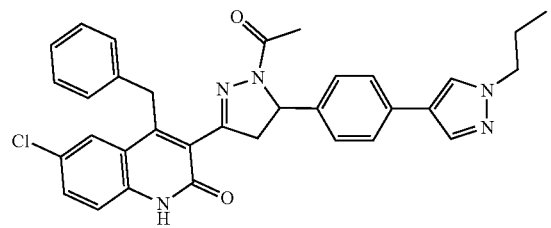 [SMILES: CCCn1cc(-c2ccc(C3CC(c4c(Cc5ccccc5)c5cc(Cl)ccc5[nH]c4=O)=NN3C(C)=O)cc2)cn1]

Compound d.91 was synthesized following the general procedure D1 using g.14 (93 mg, 0.18 mmol) with acetic anhydride (37 mg, 0.34 mmol) at 165° C. for 20 minutes. Purification by normal phase flash column chromatography (solvent A: DCM, solvent B: MeOH—gradient: 0-3% solvent B) yielded title compound as a white solid (84 mg, yield 82%). $^1$H NMR (400 MHz, DMSO-d$_6$) δ 12.20 (s, 1H), 8.13 (d, J=0.8 Hz, 1H), 7.83 (d, J=0.8 Hz, 1H), 7.74 (d, J=2.3 Hz, 1H), 7.56 (dd, J=8.8, 2.3 Hz, 1H), 7.47 (d, J=8.3 Hz, 2H), 7.38 (d, J=8.8 Hz, 1H), 7.33-7.25 (m, 4H), 7.25-7.14 (m, 3H), 5.43 (dd, J=11.9, 4.7 Hz, 1H), 4.46 (d, J=15.6 Hz, 1H), 4.39 (d, J=15.6 Hz, 1H), 4.07 (t, J=7.0 Hz, 2H), 3.73 (dd, J=18.3, 12.0 Hz, 1H), 3.15 (dd, J=18.3, 4.7 Hz, 1H), 1.97 (s, 3H), 1.81 (h, J=7.3 Hz, 2H), 0.85 (t, J=7.4 Hz, 3H). R$_t$ 2.32 min (generic method). ESI-MS for C$_{33}$H$_{30}$ClN$_5$O$_2$: calculated 563.2, found m/z 564.2/566.3 [M+H]$^+$.

Example d.92. 4-[5-(4-benzyl-6-chloro-2-oxo-1H-quinolin-3-yl)-3-[4-(1-ethylindazol-5-yl)phenyl]-3,4-dihydropyrazol-2-yl]-4-oxo-butanoic acid Step 1. Synthesis of 4-benzyl-6-chloro-3-[(E)-3-[4-(1-ethylindazol-5-yl)phenyl]prop-2-enoyl]-1H-quinolin-2-one (f.15)

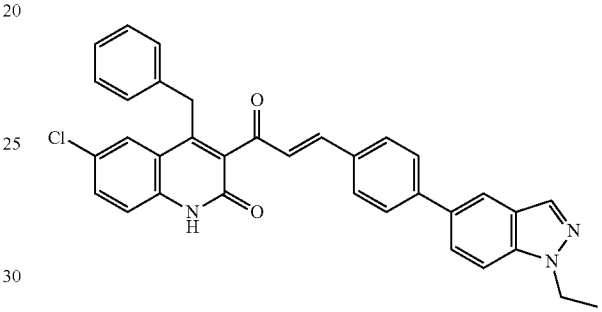

In a round-bottom flask, e.1 (73 mg, 0.24 mmol) was suspended in a 4:3 mixture of ethanol (3 ml) and water (2 ml). The mixture was cooled to 0° C. and potassium hydroxide (337 mg, 6 mmol) was added. After stirring for 45 minutes at 0° C., 4-(1-ethylindazol-5-yl)benzaldehyde (106 mg, 0.42 mmol) was added. The reaction was stirred at room temperature for 16 hours, afterwards acetic acid (0.346 mL, 6 mmol) was added at 0° C., resulting in a precipitate that was filtered and washed with ethanol (20 mL) and water (20 mL). The solid was dissolved in CH$_2$Cl$_2$ (50 mL) and washed with brine. The solvent was evaporated in vacuo to yield the title compound as a yellow solid (114 mg, yield 87%). $^1$H NMR (400 MHz, DMSO-d$_6$) δ 12.23 (s, 1H), 8.14-8.10 (m, 2H), 7.84-7.75 (m, 6H), 7.68-7.53 (m, 3H), 7.40 (d, J=8.8 Hz, 1H), 7.32-7.23 (m, 4H), 7.20-7.10 (m, 2H), 4.47 (q, J=7.1 Hz, 2H), 4.15 (s, 2H), 1.41 (t, J=7.2 Hz, 3H). R$_t$ 2.64 min (generic method). ESI-MS for C$_{34}$H$_{26}$ClN$_3$O$_2$: calculated 543.2, found m/z 544.3/546.2 [M+H]$^+$.

Step 2. Synthesis of 4-benzyl-6-chloro-3-[5-[4-(1-ethylindazol-5-yl)phenyl]-4,5-dihydro-1H-pyrazol-3-yl]-1H-quinolin-2-one (g.15)

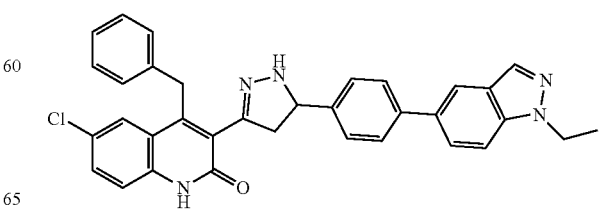

In appropriately sized microwaveable vessel, f.15 (114 mg, 0.21 mmol) was suspended in ethanol (3 ml), then hydrazine hydrate (17 µL, 0.36 mmol) added, the reaction mixture microwaved at 110° C. (200 W) for 20 minutes, cooled at room temperature and resulting solid filtered and washed with ethanol (20 mL) to yield title compound as a green/grey solid (92 mg, yield 79%). $^1$H NMR (400 MHz, DMSO-$d_6$) δ 12.06 (s, 1H), 8.10 (d, J=0.9 Hz, 1H), 7.99 (dd, J=1.7, 0.8 Hz, 1H), 7.75 (d, J=8.7 Hz, 1H), 7.71-7.60 (m, 4H), 7.56-7.44 (m, 4H), 7.34 (d, J=8.8 Hz, 1H), 7.31-7.26 (m, 4H), 7.21-7.14 (m, 1H), 4.85 (td, J=10.6, 3.4 Hz, 1H), 4.52-4.41 (m, 4H), 3.40 (dd, J=16.4, 10.6 Hz, 1H), 2.93 (dd, J=16.3, 10.7 Hz, 1H), 1.41 (t, J=7.2 Hz, 3H). $R_t$ 2.52 min (generic method). ESI-MS for $C_{34}H_{28}ClN_5O$: calculated 557.2, found m/z 558.3/559.9 [M+H]$^+$.

Step 3. Synthesis of 4-[5-(4-benzyl-6-chloro-2-oxo-1H-quinolin-3-yl)-3-[4-(1-ethylindazol-5-yl)phenyl]-3,4-dihydropyrazol-2-yl]-4-oxo-butanoic acid (d.92)

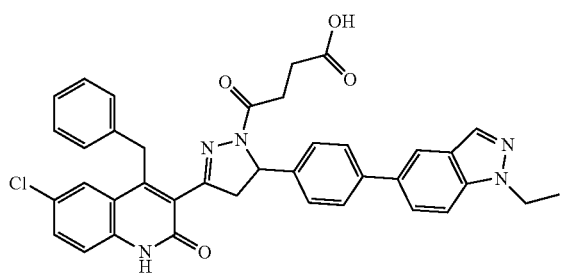 [SMILES: CCn1ncc2cc(-c3ccc(C4CC(c5c(Cc6ccccc6)c6cc(Cl)ccc6[nH]c5=O)=NN4C(=O)CCC(=O)O)cc3)ccc21]

Compound d.92 was synthesized following the general procedure D1 using g.15 (84 mg, 0.15 mmol) with succinic anhydride (120° C., 200 W The resulted crude solid was triturated in CH$_2$Cl$_2$ (10 mL) and MeOH (10 mL), filtered and washed with diethyl ether (10 mL) to obtain the title compound as a grey-green solid (63 mg, yield 64%). $^1$H NMR (400 MHz, DMSO-$d_6$) δ 12.21 (s, 1H), 12.01 (s, 1H), 8.10 (d, J=0.9 Hz, 1H), 7.98 (d, J=1.7 Hz, 1H), 7.78 (d, J=2.3 Hz, 1H), 7.75 (d, J=8.8 Hz, 1H), 7.67 (dd, J=8.8, 1.7 Hz, 1H), 7.63-7.54 (m, 3H), 7.39 (d, J=8.8 Hz, 1H), 7.33-7.23 (m, 6H), 7.23-7.14 (m, 1H), 5.50 (dd, J=11.9, 4.9 Hz, 1H), 4.55-4.38 (m, 4H), 3.76 (dd, J=18.3, 12.0 Hz, 1H), 3.16 (dd, J=18.3, 4.9 Hz, 1H), 2.75-2.57 (m, 2H), 2.35 (t, J=6.7 Hz, 2H), 1.41 (t, J=7.2 Hz, 3H). $R_t$ 2.18 min (Generic method). ESI-MS for $C_{38}H_{32}ClN_5O_4$: calculated 657.2, found m/z 658.2/660.2 [M+H]$^+$.

Example d.93. 4-[5-(4-benzyl-6-chloro-2-oxo-1H-quinolin-3-yl)-3-[4-(2-ethylindazol-5-yl)phenyl]-3,4-dihydropyrazol-2-yl]-4-oxo-butanoic acid Step 1. Synthesis of 4-benzyl-6-chloro-3-[(E)-3-[4-(2-ethylindazol-5-yl)phenyl]prop-2-enoyl]-1H-quinolin-2-one (f.16)

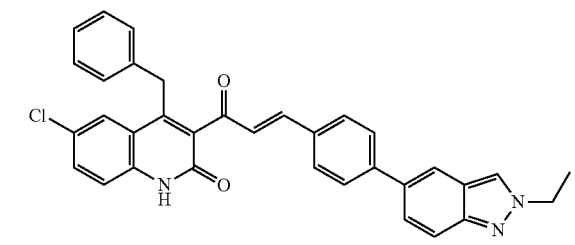 [SMILES: CCn1cc2cc(-c3ccc(/C=C/C(=O)c4c(Cc5ccccc5)c5cc(Cl)ccc5[nH]c4=O)cc3)ccc2n1]

In a round-bottom flask, e.1 (80 mg, 0.25 mmol) was suspended in a 4:3 mixture of ethanol (3 ml) and water (2 ml). The mixture was cooled to 0° C. and potassium hydroxide (351 g, 6.25 mmol) was added. After stirring for 45 minutes at 0° C., 4-(2-ethylindazol-5-yl)benzaldehyde (71 mg, 0.28 mmol) was added. The reaction was stirred at room temperature for 16 hours, afterwards acetic acid (0.36 mL, 6.25 mmol) was added at 0° C., resulting precipitate was filtered and washed with ethanol (20 mL) and water (20 mL). The solid was dissolved in CH$_2$Cl$_2$ (50 mL) and washed with water (50 mL) and brine (50 mL). The solvent was evaporated in vacuo to yield the title compound as a yellow solid (119 mg, yield 87%). $^1$H NMR (400 MHz, DMSO-$d_6$) δ 12.25 (s, 1H), 8.45 (s, 1H), 8.06 (s, 1H), 7.83-7.74 (m, 4H), 7.72-7.54 (m, 5H), 7.40 (d, J=8.8 Hz, 1H), 7.32-7.23 (m, 4H), 7.19-7.07 (m, 2H), 4.47 (q, J=7.3 Hz, 2H), 4.15 (s, 2H), 1.52 (t, J=7.3 Hz, 3H). $R_t$ 2.44 min (Generic method). ESI-MS for $C_{34}H_{26}ClN_3O_2$: calculated 543.2, found m/z 544.2/546.3 [M+H]$^+$.

Step 2. Synthesis of 4-benzyl-6-chloro-3-[5-[4-(2-ethylindazol-5-yl)phenyl]-4,5-dihydro-1H-pyrazol-3-yl]-1H-quinolin-2-one (g.16)

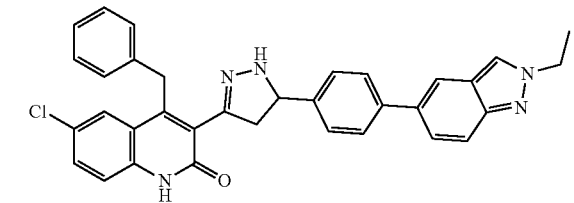 [SMILES: CCn1cc2cc(-c3ccc(C4CC(c5c(Cc6ccccc6)c6cc(Cl)ccc6[nH]c5=O)=NN4)cc3)ccc2n1]

In appropriately sized microwaveable vessel, f.16 (117 mg, 0.22 mmol) was suspended in ethanol (3 ml), then hydrazine hydrate (18 µL, 0.37 mmol) added, the reaction mixture microwaved at 110° C. (200 W) for 20 minutes, cooled at room temperature and resulting solid filtered and washed with ethanol (20 mL) to yield title compound as a green/grey solid (103 mg, yield 84%). $^1$H NMR (400 MHz, DMSO-$d_6$) δ 12.06 (s, 1H), 8.42 (s, 1H), 7.93 (s, 1H), 7.71-7.59 (m, 4H), 7.56-7.44 (m, 5H), 7.34 (d, J=8.8 Hz, 1H), 7.32-7.25 (m, 4H), 7.22-7.14 (m, 1H), 4.85 (td, J=10.7, 3.3 Hz, 1H), 4.53-4.40 (m, 4H), 3.40 (dd, J=16.4, 10.6 Hz, 1H), 2.93 (dd, J=16.3, 10.7 Hz, 1H), 1.52 (t, J=7.3 Hz, 3H). $R_t$ 2.33 min (Generic method). ESI-MS for $C_{34}H_{28}ClN_5O$: calculated 557.2, found m/z 558.3/560.3 [M+H]$^+$.

Step 3. Synthesis of 4-[5-(4-benzyl-6-chloro-2-oxo-1H-quinolin-3-yl)-3-[4-(2-ethylindazol-5-yl)phenyl]-3,4-dihydropyrazol-2-yl]-4-oxo-butanoic acid (d.93)

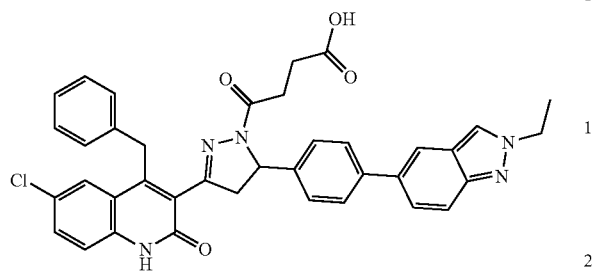

Compound d.93 was synthesized following the general procedure D1 using g.16 (95 mg, 0.17 mmol) with succinic anhydride (165° C., 200 W). THF was evaporated and the resulted crude solid was triturated in $CH_2Cl_2$ (10 mL) and MeOH (10 mL), filtered and washed with diethyl ether (10 mL) to obtain the title compound as a grey solid (98 mg, yield 88%). $^1$H NMR (400 MHz, DMSO-d$_6$) δ 12.22 (s, 1H), 12.01 (s, 1H), 8.42 (s, 1H), 7.91 (s, 1H), 7.78 (d, J=2.3 Hz, 1H), 7.67 (d, J=9.0 Hz, 1H), 7.63-7.50 (m, 4H), 7.39 (d, J=8.8 Hz, 1H), 7.33-7.24 (m, 6H), 7.23-7.13 (m, 1H), 5.49 (dd, J=11.9, 4.9 Hz, 1H), 4.55-4.38 (m, 4H), 3.76 (dd, J=18.4, 12.0 Hz, 1H), 3.15 (dd, J=18.3, 4.9 Hz, 1H), 2.73-2.59 (m, 2H), 2.35 (t, J=6.7 Hz, 2H), 1.52 (t, J=7.3 Hz, 3H). $R_t$ 0.75 min (Apolar method). ESI-MS for $C_{38}H_{32}ClN_5O_4$: calculated 657.2, found m/z 658.3/660.2 [M+H]$^+$.

Example d.96. 3-[2-acetyl-3-(p-tolyl)-3,4-dihydropyrazol-5-yl]-4-benzyl-6-chloro-1H-quinolin-2-one Step 1. Synthesis of 4-benzyl-6-chloro-3-[(E)-3-(p-tolyl)prop-2-enoyl]-1H-quinolin-2-one (f.17)

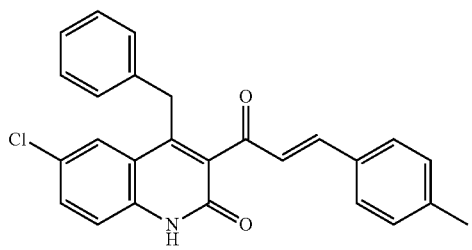 [SMILES: Cc1ccc(/C=C/C(=O)c2c(Cc3ccccc3)c3cc(Cl)ccc3[nH]c2=O)cc1]

In a round-bottom flask, e.1 (192 mg, 0.62 mmol) was suspended in a 4:3 mixture of ethanol (12 ml) and water (9 ml). The mixture was cooled to 0° C. and potassium hydroxide (870 mg, 15.5 mmol) was added. After stirring for 45 minutes at 0° C., p-tolualdehyde (131 µL, 1.11 mmol) was added. The reaction was stirred at room temperature for 16 hours, afterwards acetic acid (0.894 mL, 15.5 mmol) was added at 0° C., resulting in an off-white solid that filtered and washed with ethanol (20 mL). The solid was dissolved in $CH_2Cl_2$ (50 mL), washed with water and brine. The solvent was evaporated in vacuo to yield the title compound as a yellow solid (225 mg, yield 87%). $^1$H NMR (400 MHz, DMSO-d$_6$) δ 12.17 (s, 1H), 7.63 (d, J=2.3 Hz, 1H), 7.62-7.58 (m, 2H), 7.57-7.49 (m, 2H), 7.38 (d, J=8.8 Hz, 1H), 7.29-7.20 (m, 6H), 7.18-7.11 (m, 1H), 7.01 (d, J=16.3 Hz, 1H), 4.12 (s, 2H), 2.32 (s, 3H). $R_t$ 2.53 min (generic method). ESI-MS for $C_{26}H_{20}ClNO_2$: calculated 413.1, found m/z 414.1/416.1 [M+H]$^+$.

Step 2. Synthesis of 4-benzyl-6-chloro-3-[5-(p-tolyl)-4,5-dihydro-1H-pyrazol-3-yl]-1H-quinolin-2-one (g.17)

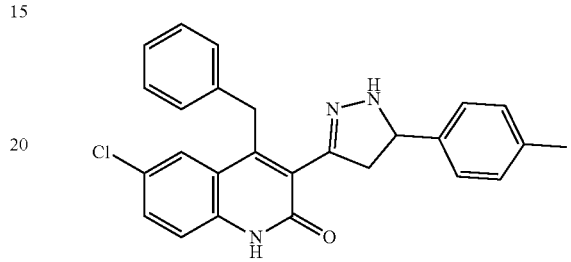

In appropriately sized microwaveable vessel, f.17 (210 mg, 0.51 mmol) was suspended in ethanol (2 ml), then hydrazine hydrate (42 µL, 0.86 mmol) added, the reaction mixture microwaved at 110° C. (200 W) for 20 minutes, cooled at room temperature and resulting yellow solid filtered to yield title compound (155 mg, yield 71%). $^1$H NMR (400 MHz, DMSO-d$_6$) δ 12.05 (s, 1H), 7.66 (d, J=2.3 Hz, 1H), 7.49 (dd, J=8.8, 2.2 Hz, 1H), 7.44 (d, J=3.4 Hz, 1H), 7.33 (d, J=8.8 Hz, 1H), 7.30-7.22 (m, 5H), 7.22-7.13 (m, 1H), 7.10 (d, J=7.8 Hz, 2H), 4.75 (td, J=10.7, 3.5 Hz, 1H), 4.49-4.35 (m, 2H), 3.39-3.26 (m, 1H), 2.84 (dd, J=16.3, 10.9 Hz, 1H), 2.27 (s, 3H). $R_t$ 2.44 min (generic method). ESI-MS for $C_{26}H_{22}ClN_3O$: calculated 427.1, found m/z 428.2/430.1 [M+H]$^+$.

Step 3. Synthesis of 3-[2-acetyl-3-(p-tolyl)-3,4-dihydropyrazol-5-yl]-4-benzyl-6-chloro-1H-quinolin-2-one (d.96)

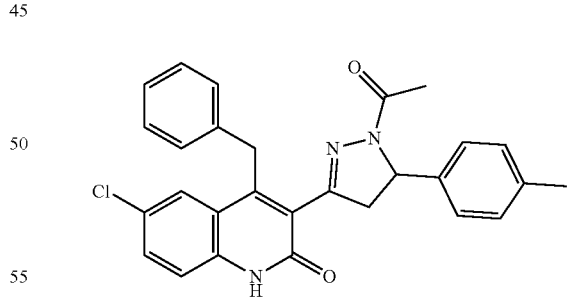

Compound d.96 was synthesized following the general procedure D1 using g.17 (148 mg, 0.35 mmol) with acetic anhydride (65 µL, 0.69 mmol) at 165° C. for 20 minutes. Purification by normal phase flash column chromatography (solvent A: DCM, solvent B: MeOH—gradient: 0-5% solvent B) yielded title compound as a white solid (80 mg, yield 49%). $^1$H NMR (400 MHz, DMSO-d$_6$) δ 12.19 (s, 1H), 7.73 (d, J=2.3 Hz, 1H), 7.55 (dd, J=8.8, 2.2 Hz, 1H), 7.38 (d, J=8.8 Hz, 1H), 7.28 (d, J=4.3 Hz, 4H), 7.24-7.16 (m, 1H), 7.14-7.06 (m, 4H), 5.41 (dd, J=11.9, 4.7 Hz, 1H), 4.45 (d, J=15.6 Hz, 1H), 4.37 (d, J=15.5 Hz, 1H), 3.73 (dd, J=18.3, 11.9 Hz, 1H), 3.10 (dd, J=18.3, 4.7 Hz, 1H), 2.26 (s, 3H), 1.96 (s, 3H). $R_t$ 2.36 min (generic method). ESI-MS for $C_{28}H_{24}ClN_3O_2$: calculated 469.2, found m/z 470.1/472.1 $[M+H]^+$.

Example d.97. 3-(1-acetyl-5-(pyridin-4-yl)-4,5-dihydro-1H-pyrazol-3-yl)-6-chloro-4-phenylquinolin-2(1H)-one Step 1. Synthesis of (E)-6-chloro-4-phenyl-3-(3-(pyridin-4-yl)acryloyl)quinolin-2(1H)-one (b.28)

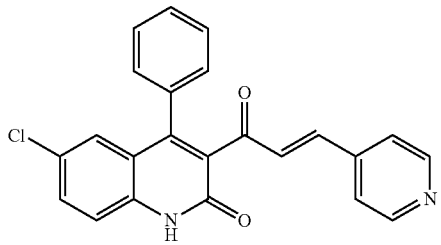 [SMILES: O=C(/C=C/c1ccncc1)c1c(-c2ccccc2)c2cc(Cl)ccc2[nH]c1=O]

In a round-bottomed flask, the appropriate 3-acetyl-6-chloro-4-phenylquinolin-2 (1H)-one (2.1 g, 7.05 mmol) and potassium hydroxide (9.89 g, 176.33 mmol) were stirred in EtOH/H$_2$O (4:3 v/v, 0.05 M) at 0° C. for 45 min prior to the addition of 4-pyridine carboxaldehyde (1.2 mL, 12.69 mmol). The reaction mixture was stirred for 6 h as it gradually reached room temperature. EtOH was removed under reduced pressure and the aqueous phase was extracted with DCM (3×60 mL), the organic layer was then dried over Na$_2$SO$_4$, and solvent removed under reduced pressure. Final normal flash silica gel chromatography purification (solvent A: DCM, solvent B: MeOH—gradient: 1-5% solvent B) yielded title compound as a yellow solid (2.02 g, yield 74%). $^1$H NMR (400 MHz, CDCl$_3$) δ 12.40 (s, 1H), 8.60 (dd, J=4.5, 1.5 Hz, 2H), 7.68 (dd, J=8.8, 2.4 Hz, 1H), 7.61 (dd, J=4.6, 1.5 Hz, 2H), 7.54-7.38 (m, 5H), 7.33 (dd, J=7.7, 1.7 Hz, 2H), 6.99 (dd, J=9.4, 7.1 Hz, 2H).

Step 2. Synthesis of 6-chloro-4-phenyl-3-(5-(pyridin-4-yl)-4,5-dihydro-1H-pyrazol-3-yl)quinolin-2(1H)-one (c.28)

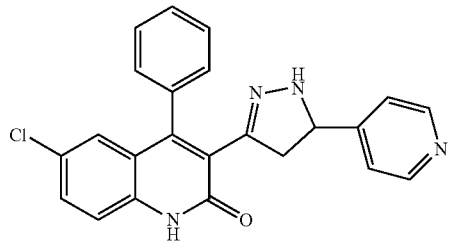 [SMILES: O=c1[nH]c2ccc(Cl)cc2c(-c2ccccc2)c1C1=NNC(c2ccncc2)C1]

In appropriately sized microwaveable vessel, b.28 (2.01 g, 5.20 mmol) was suspended in ethanol (10 ml), and then hydrazine hydrate (379 µl, 7.79 mmol) was added. The reaction mixture was microwaved at 110° C. for 45 minutes, then the EtOH was removed under reduced pressure, diethyl ether was added to the white residue and the filtration of the precipitated afforded the titled compound as yellow solid (1.64 g, yield 79%). $^1$H NMR (400 MHz, DMSO-d$_6$) δ 12.21 (s, 1H), 8.41 (dd, J=4.4, 1.6 Hz, 2H), 7.57 (dd, J=8.8, 2.4 Hz, 1H), 7.54-7.37 (m, 4H), 7.35-7.31 (m, 1H), 7.28 (d, J=2.9 Hz, 1H), 7.22-7.16 (m, 1H), 7.03 (dd, J=4.6, 1.5 Hz, 2H), 6.88 (d, J=2.3 Hz, 1H), 4.59 (ddd, J=11.4, 8.8, 2.9 Hz, 1H), 3.28 (d, J=5.3 Hz, 1H), 2.58-2.51 (m, 1H).

Step 3. Synthesis of 3-(1-acetyl-5-(pyridin-4-yl)-4,5-dihydro-1H-pyrazol-3-yl)-6-chloro-4-phenylquinolin-2 (1H)-one (d.97)

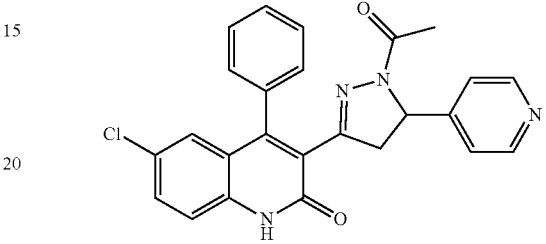

In appropriately-sized microwaveable vessel, c.28 (300 mg, 0.75 mmol) was suspended in anhydrous tetrahydrofuran (1.5 ml). Acetic anhydride (85 µL, 0.90 mmol) was added and the reaction mixture was microwaved at 165° C. for 25 minutes. After cooling down to rt, THF was removed under reduced pressure, and the organic residue suspended in MeOH. The filtration of resulting solid afforded title compound as white powder (192 mg, yield 59%). $^1$H NMR (400 MHz, DMSO-d$_6$) δ 12.39 (s, 1H), 8.43 (dd, J=4.5, 1.4 Hz, 2H), 7.64 (dd, J=8.8, 2.3 Hz, 1H), 7.61-7.54 (m, 2H), 7.54-7.47 (m, 1H), 7.47-7.38 (m, 2H), 7.26 (d, J=7.5 Hz, 1H), 6.93 (d, J=2.3 Hz, 1H), 6.77 (d, J=6.0 Hz, 2H), 5.34 (dd, J=12.1, 4.5 Hz, 1H), 3.78 (dd, J=18.5, 12.2 Hz, 1H), 2.82 (dd, J=18.5, 4.6 Hz, 1H), 1.91 (s, 3H). ESI-MS for $C_{25}H_{19}ClN_4O_2$: calculated 442.1, found 443.0 $[M+H]^+$.

Example d.98. 4-(3-(6-chloro-2-oxo-4-phenyl-1,2-dihydroquinolin-3-yl)-5-(pyridin-3-yl)-4,5-dihydro-1H-pyrazol-1-yl)-4-oxobutanoic acid Step 1. Synthesis of (E)-6-chloro-4-phenyl-3-(3-(pyridin-3-yl)acryloyl)quinolin-2(1H)-one (b.29)

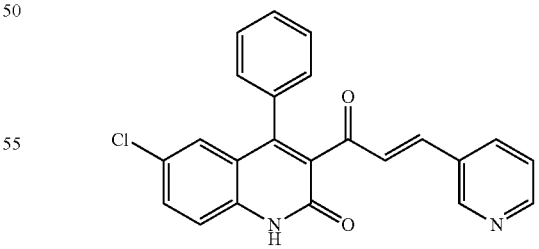

In a round-bottomed flask, the appropriate 3-acetyl-6-chloro-4-phenylquinolin-2 (1H)-one (500 mg, 3.36 mmol) and potassium hydroxide (2.4 g, 42.0 mmol) were stirred in EtOH/H$_2$O (4:3 v/v, 0.05 M) at 0° C. for 45 min prior to the addition of 3-pyridine carboxaldehyde (0.237 mL, 2.52 mmol). The reaction mixture was stirred for 16 h as it gradually reached room temperature. EtOH was removed under reduced pressure and the aqueous phase was extracted with DCM (3×15 mL), the organic layer was then dried over Na₂SO₄, and solvent removed under reduced pressure. Final normal flash silica gel chromatography purification (solvent A: DCM, solvent B: MeOH—gradient: 5-10% solvent B) yielded title compound as a yellow solid (670 mg, yield 99%). $^1$H NMR (400 MHz, CDCl₃) δ 12.62 (s, 1H), 8.53-8.38 (m, 2H), 7.60 (d, J=8.0 Hz, 1H), 7.35-7.27 (m, 5H), 7.27-7.19 (m, 1H), 7.19-7.11 (m, 4H), 6.66 (d, J=16.3 Hz, 1H).

Step 2. Synthesis of 6-chloro-4-phenyl-3-(5-(pyridin-3-yl)-4,5-dihydro-1H-pyrazol-3-yl)quinolin-2(1H)-one (c.29)

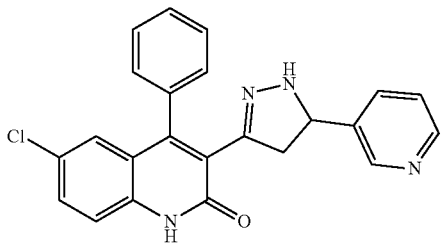 [SMILES: O=c1[nH]c2ccc(Cl)cc2c(-c2ccccc2)c1C1=NNC(c2cccnc2)C1]

In appropriately sized microwaveable vessel, b.29 (650 mg, 1.68 mmol) was suspended in ethanol (4.0 ml), and then hydrazine hydrate (147 µl, 3.02 mmol) was added. The reaction mixture was microwaved at 110° C. for 45 minutes, then the EtOH was removed under reduced pressure, diethyl ether was added to the white residue and the filtration of the precipitated afforded the titled compound as yellow solid (550 mg, yield 82%). $^1$H NMR (400 MHz, CDCl₃) δ 11.88 (s, 1H), 8.52-8.40 (m, 2H), 7.52-7.36 (m, 5H), 7.29-7.18 (m, 4H), 7.18-7.09 (m, 2H), 4.78-4.62 (m, 1H), 3.19 (dd, J=16.7, 10.9 Hz, 1H), 2.75 (dd, J=16.7, 7.2 Hz, 1H).

Step 3. Synthesis of 4-(3-(6-chloro-2-oxo-4-phenyl-1,2-dihydroquinolin-3-yl)-5-(pyridin-3-yl)-4,5-dihydro-1H-pyrazol-1-yl)-4-oxobutanoic acid (d.98)

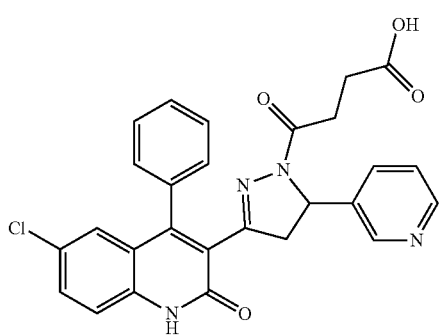 [SMILES: O=C(O)CCC(=O)N1N=C(c2c(-c3ccccc3)c3cc(Cl)ccc3[nH]c2=O)CC1c1cccnc1]

Compound d.98 was synthesized following the general procedure D1 using c.29 (73 mg, 0.18 mmol) with succinic anhydride (120° C., 200 W). THF was removed under reduced pressure, the organic residue suspended in MeOH and the resulting solid filtered to afford the title compound as yellowish powder (25 mg, yield 27%). $^1$H NMR (400 MHz, DMSO-d₆) δ 12.40 (s, 1H), 11.97 (s, 1H), 8.42 (d, J=4.8 Hz, 1H), 8.23 (s, 1H), 7.64 (d, J=8.9 Hz, 1H), 7.58-7.37 (m, 5H), 7.32-7.19 (m, 2H), 7.04 (d, J=7.7 Hz, 1H), 6.94 (s, 1H), 5.38 (dd, J=11.7, 4.3 Hz, 1H), 3.74 (dd, J=18.6, 11.9 Hz, 1H), 2.88 (dd, J=18.4, 4.3 Hz, 1H), 2.44 (d, J=6.4 Hz, 2H), 2.28 (t, J=6.7 Hz, 2H). ESI-MS for C₂₇H₂₁ClN₄O₄: calculated 500.1, found m/z 501.2 [M+H]⁺.

Example d.99. 4-(3-(6-chloro-2-oxo-4-phenyl-1,2-dihydroquinolin-3-yl)-5-(pyridin-2-yl)-4,5-dihydro-1H-pyrazol-1-yl)-4-oxobutanoic acid Step 1. Synthesis of (E)-6-chloro-4-phenyl-3-(3-(pyridin-2-yl)acryloyl)quinolin-2(1H)-one (b.30)

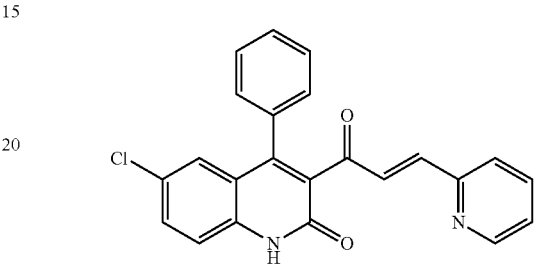

In a round-bottomed flask, the appropriate 3-acetyl-6-chloro-4-phenylquinolin-2(1H)-one (1.0 g, 3.36 mmol) and potassium hydroxide (4.7 g, 84.0 mmol) were stirred in EtOH/H₂O (4:3 v/v, 0.05 M) at 0° C. for 45 min prior to the addition of 2-pyridine carboxaldehyde (0.576 mL, 6.05 mmol). The reaction mixture was stirred for 16 h as it gradually reached room temperature. EtOH was removed under reduced pressure and the aqueous phase was extracted with DCM (3×20 mL), the organic layer was then dried over Na₂SO₄, and solvent removed under reduced pressure. Final normal flash silica gel chromatography purification (solvent A: DCM, solvent B: MeOH—gradient: 1-3% solvent B) yielded title compound as a yellow solid (753 mg, yield 58%). $^1$H NMR (400 MHz, CDCl₃) δ 12.42 (s, 1H), 8.61 (d, J=3.9 Hz, 1H), 7.83 (dd, J=7.7, 1.8 Hz, 1H), 7.73-7.62 (m, 2H), 7.54-7.36 (m, 6H), 7.32 (dd, J=7.6, 1.8 Hz, 2H), 7.01 (dd, J=17.2, 9.2 Hz, 2H).

Step 2. Synthesis of 6-chloro-4-phenyl-3-(5-(pyridin-2-yl)-4,5-dihydro-1H-pyrazol-3-yl)quinolin-2(1H)-one (c.30)

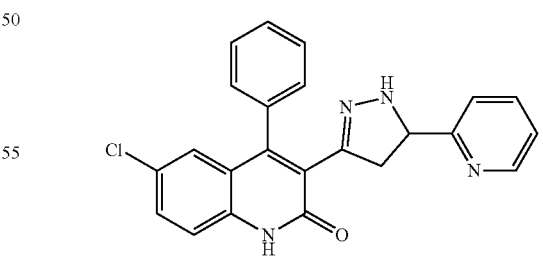

In appropriately sized microwaveable vessel, b.30 (655 mg, 1.69 mmol) was suspended in ethanol (3.5 ml), and then hydrazine hydrate (124 µl, 2.54 mmol) was added. The reaction mixture was microwaved at 110° C. for 45 minutes, then the EtOH was removed under reduced pressure, diethyl ether was added to the white residue and the filtration of the precipitated afforded the titled compound as yellow solid (345 g, yield 51%). ¹H NMR (400 MHz, DMSO-d₆) δ 12.19 (s, 1H), 8.43 (d, J=4.0 Hz, 1H), 7.69 (td, J=7.7, 1.8 Hz, 1H), 7.57 (dd, J=8.8, 2.4 Hz, 1H), 7.54-7.35 (m, 4H), 7.29 (dd, J=13.7, 5.2 Hz, 2H), 7.26-7.20 (m, 1H), 7.18 (d, J=7.4 Hz, 1H), 7.09 (d, J=7.9 Hz, 1H), 6.89 (d, J=2.3 Hz, 1H), 4.77-4.50 (m, 1H), 3.27-3.08 (m, 1H), 2.77 (dd, J=16.5, 8.8 Hz, 1H).

Step 3. Synthesis of 4-(3-(6-chloro-2-oxo-4-phenyl-1,2-dihydroquinolin-3-yl)-5-(pyridin-2-yl)-4,5-dihydro-1H-pyrazol-1-yl)-4-oxobutanoic acid (d.99)

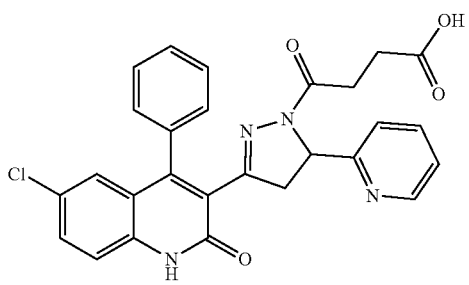 [SMILES: O=C(O)CCC(=O)N1N=C(c2c(-c3ccccc3)c3cc(Cl)ccc3[nH]c2=O)CC1c1ccccn1]

Compound d.99 was synthesized following the general procedure D1 using c.30 (150 mg, 0.37 mmol) with succinic anhydride (120° C., 200 W). THF was removed under reduced pressure, the organic residue suspended in MeOH and the resulting solid filtered to afford the title compound as white powder (130 mg, yield 70%). ¹H NMR (400 MHz, DMSO-d₆) δ 12.36 (s, 1H), 12.04 (s, 1H), 8.45 (d, J=4.1 Hz, 1H), 7.69-7.56 (m, 2H), 7.54-7.38 (m, 4H), 7.36 (d, J=7.2 Hz, 1H), 7.26-7.19 (m, 2H), 6.93 (d, J=2.3 Hz, 1H), 6.66 (d, J=7.9 Hz, 1H), 5.33 (dd, J=12.1, 4.9 Hz, 1H), 3.71 (dd, J=18.3, 12.1 Hz, 1H), 3.01 (dd, J=18.3, 4.9 Hz, 1H), 2.44-2.34 (m, 2H), 2.33-2.26 (m, 2H). ESI-MS for C₂₇H₂₁ClN₄O₄: calculated 500.1, found m/z 501.2 [M+H]⁺.

Example d.100. 4-[5-(4-benzyl-6-chloro-2-oxo-1H-quinolin-3-yl)-3-(3-pyridyl)-3,4-dihydropyrazol-2-yl]-4-oxo-butanoic acid Step 1. Synthesis of 4-benzyl-6-chloro-3-[(E)-3-(3-pyridyl)prop-2-enoyl]-1H-quinolin-2-one (f.18)

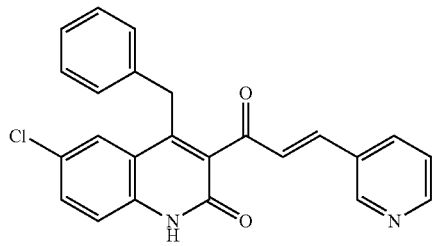 [SMILES: O=C(/C=C/c1cccnc1)c1c(Cc2ccccc2)c2cc(Cl)ccc2[nH]c1=O]

In a round-bottom flask, e.1 (200 mg, 0.64 mmol) was suspended in a 4:3 mixture of ethanol (7 ml) and water (5 ml). The mixture was cooled to 0° C. and potassium hydroxide (898 mg, 16 mmol) was added. After stirring for 45 minutes at 0° C., 3-pyridinecarbaldehyde (108 µL, 1.15 mmol) was added. The reaction was stirred at room temperature for 16 hours, afterwards acetic acid (0.923 mL, 16 mmol) was added at 0° C., the solid was dissolved in CH₂Cl₂ (50 mL) and washed with brine (50 mL). The solvent was evaporated in vacuo to yield the title compound as a white solid. (209 mg, yield 81%). ¹H NMR (400 MHz, DMSO-d₆) δ 12.24 (s, 1H), 8.84 (d, J=2.2 Hz, 1H), 8.58 (dd, J=4.8, 1.6 Hz, 1H), 8.17 (dt, J=8.0, 2.0 Hz, 1H), 7.67 (d, J=2.3 Hz, 1H), 7.64-7.51 (m, 2H), 7.44 (dd, J=8.1, 4.8 Hz, 1H), 7.40 (d, J=8.8 Hz, 1H), 7.30-7.18 (m, 5H), 7.18-7.10 (m, 1H), 4.14 (s, 2H). R_t 2.21 min (generic method). ESI-MS for C₂₄H₁₇ClN₂O₂: calculated 400.1, found m/z 401.0/403.0 [M+H]⁺.

Step 2. Synthesis of 4-benzyl-6-chloro-3-[5-(3-pyridyl)-4,5-dihydro-1H-pyrazol-3-yl]-1H-quinolin-2-one. (g.18)

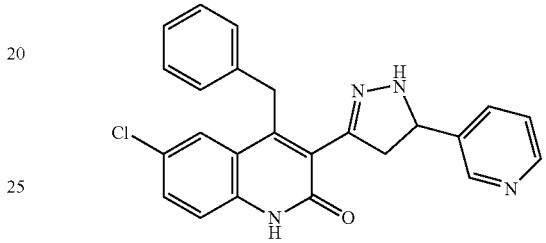

In appropriately sized microwaveable vessel, f.18 (197 mg, 0.49 mmol) was suspended in ethanol (4 ml), then hydrazine hydrate (41 µL, 0.84 mmol) added, the reaction mixture microwaved at 110° C. (200 W) for 20 minutes, cooled at room temperature and resulting yellow solid filtered and washed with EtOH (20 mL) to yield title compound (140 mg, yield 66%). ¹H NMR (400 MHz, DMSO-d₆) δ 12.07 (s, 1H), 8.59 (d, J=2.3 Hz, 1H), 8.47 (dd, J=4.8, 1.6 Hz, 1H), 7.80 (dt, J=8.0, 2.0 Hz, 1H), 7.67 (d, J=2.3 Hz, 1H), 7.59 (d, J=3.4 Hz, 1H), 7.50 (dd, J=8.8, 2.2 Hz, 1H), 7.38-7.31 (m, 2H), 7.30-7.23 (m, 4H), 7.21-7.14 (m, 1H), 4.85 (td, J=10.5, 3.4 Hz, 1H), 4.47-4.38 (m, 2H), 3.44-3.33 (m, 1H), 2.92 (dd, J=16.4, 10.3 Hz, 1H). R_t 1.98 min (generic method). ESI-MS for C₂₄H₁₉ClN₄O: calculated 414.1, found m/z 415.2/417.2 [M+H]⁺.

Step 3. Synthesis of 4-[5-(4-benzyl-6-chloro-2-oxo-1H-quinolin-3-yl)-3-(3-pyridyl)-3,4-dihydropyrazol-2-yl]-4-oxo-butanoic acid (d.100)

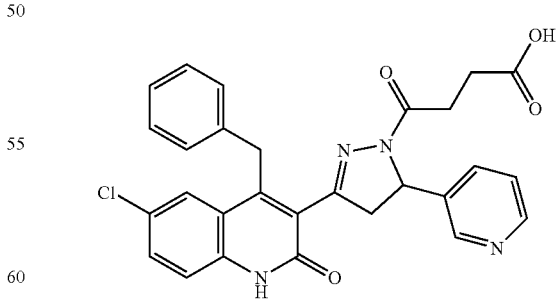

Compound d.100 was synthesized following the general procedure D1 using g.18 (120 mg, 0.29 mmol) with succinic anhydride (120° C., 200 W). Purification by normal phase flash column chromatography (solvent A: CH₂Cl₂, solvent B: MeOH—gradient: 0-10% solvent B) yielded title compound (70 mg, yield 47%). $^1$H NMR (400 MHz, DMSO-d$_6$) δ 12.21 (s, 2H), 8.51 (d, J=2.3 Hz, 1H), 8.45 (dd, J=4.8, 1.6 Hz, 1H), 7.79 (d, J=2.3 Hz, 1H), 7.61 (dt, J=7.9, 2.0 Hz, 1H), 7.57 (dd, J=8.8, 2.2 Hz, 1H), 7.39 (d, J=8.8 Hz, 1H), 7.34-7.23 (m, 5H), 7.21-7.15 (m, 1H), 5.51 (dd, J=12.0, 4.9 Hz, 1H), 4.53-4.33 (m, 2H), 3.72 (dd, J=18.4, 12.1 Hz, 1H), 3.16 (dd, J=18.4, 4.9 Hz, 1H), 2.73-2.52 (m, 2H), 2.33 (t, J=6.8 Hz, 2H). R$_t$ 1.78 min (generic method). ESI-MS for C$_{28}$H$_{23}$ClN$_4$O$_4$: calculated 514.1, found m/z 515.2/517.3 [M+H]$^+$.

Example d.101. 4-[5-(4-benzyl-6-chloro-2-oxo-1H-quinolin-3-yl)-3-(2-methylindazol-5-yl)-3,4-dihydro-pyrazol-2-yl]-4-oxo-butanoic acid Step 1. Synthesis of 4-benzyl-6-chloro-3-[(E)-3-(2-methylindazol-5-yl)prop-2-enoyl]-1H-quinolin-2-one (f.19)

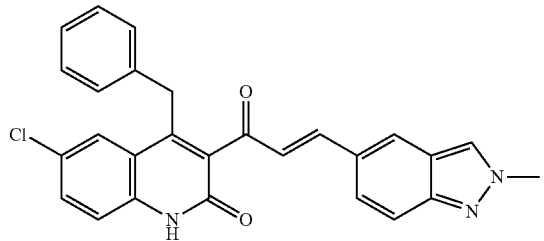 [SMILES: Cn1cc2cc(/C=C/C(=O)c3c(Cc4ccccc4)c4cc(Cl)ccc4[nH]c3=O)ccc2n1]

In a round-bottom flask, e.1 (130 mg, 0.42 mmol) was suspended in a 4:3 mixture of ethanol (5 ml) and water (4 ml). The mixture was cooled to 0° C. and potassium hydroxide (590 mg, 10.5 mmol) was added. After stirring for 45 minutes at 0° C., 2-methylindazole-5-carbaldehyde (100 mg, 0.63 mmol) was added. The reaction was stirred at room temperature for 16 hours, afterwards acetic acid (0.606 mL, 10.5 mmol) was added at 0° C., resulting precipitate filtered, washed with ethanol (20 mL), dissolved in CH$_2$Cl$_2$ (50 mL), washed with water (50 mL) and brine (50 mL). The solvent was evaporated in vacuo to yield the title compound as a yellow/orange solid (137 mg, yield 72%). $^1$H NMR (400 MHz, DMSO-d$_6$) δ 12.20 (s, 1H), 8.44 (s, 1H), 8.04 (s, 1H), 7.68-7.61 (m, 3H), 7.61-7.52 (m, 2H), 7.40 (d, J=8.8 Hz, 1H), 7.33-7.20 (m, 4H), 7.18-7.10 (m, 1H), 7.01 (d, J=16.2 Hz, 1H), 4.18-4.12 (m, 5H). R$_t$ 2.04 min (generic method). ESI-MS for C$_{27}$H$_{20}$ClN$_3$O$_2$: calculated 453.1, found m/z 452.3/454.2 [M+H]$^+$.

Step 2. Synthesis of 4-benzyl-6-chloro-3-[5-(2-methylindazol-5-yl)-4,5-dihydro-1H-pyrazol-3-yl]-1H-quinolin-2-one (g.19)

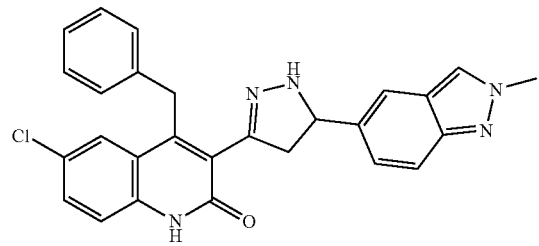 [SMILES: Cn1cc2cc(C3CC(c4c(Cc5ccccc5)c5cc(Cl)ccc5[nH]c4=O)=NN3)ccc2n1]

In appropriately sized microwaveable vessel, f.19 (136 mg, 0.30 mmol) was suspended in ethanol (3 ml), then hydrazine hydrate (25 μL, 0.51 mmol) added, the reaction mixture microwaved at 110° C. (200 W) for 20 minutes, cooled at room temperature and resulting yellow solid filtered filtered and washed with ethanol (20 mL) to yield title compound as an orange solid (98 g, yield 70%). $^1$H NMR (400 MHz, DMSO-d$_6$) δ 12.05 (s, 1H), 8.23 (s, 1H), 7.66 (d, J=2.3 Hz, 1H), 7.62 (d, J=1.4 Hz, 1H), 7.55-7.45 (m, 3H), 7.33 (d, J=8.8 Hz, 1H), 7.30-7.22 (m, 5H), 7.21-7.13 (m, 1H), 4.86 (td, J=10.8, 3.5 Hz, 1H), 4.52-4.38 (m, 2H), 4.14 (s, 3H), 3.36 (dd, J=16.4, 10.6 Hz, 1H), 2.92 (dd, J=16.3, 11.0 Hz, 1H). R$_t$ 1.91 min (Generic method). ESI-MS for C$_{27}$H$_{22}$ClN$_5$O: calculated 467.2, found m/z 468.2/470.2 [M+H]$^+$.

Step 3. Synthesis of 4-[5-(4-benzyl-6-chloro-2-oxo-1H-quinolin-3-yl)-3-(2-methylindazol-5-yl)-3,4-dihydropyrazol-2-yl]-4-oxo-butanoic acid. (d.101)

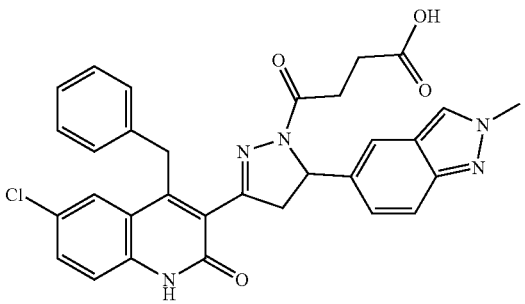 [SMILES: Cn1cc2cc(C3CC(c4c(Cc5ccccc5)c5cc(Cl)ccc5[nH]c4=O)=NN3C(=O)CCC(=O)O)ccc2n1]

Compound d.101 was synthesized following the general procedure D1 using g.19 (83 mg, 0.18 mmol) with succinic anhydride (120° C., 200 W). THF was evaporated and the resulted crude solid was triturated in CH$_2$Cl$_2$ (10 mL) and cold MeOH (10 mL), filtered and washed with diethyl ether (10 mL) to obtain the title compound as an off-white solid (38 mg, yield 37%). $^1$H NMR (400 MHz, DMSO-d$_6$) δ 12.20 (s, 1H), 12.02 (s, 1H), 8.22 (s, 1H), 7.76 (d, J=2.3 Hz, 1H), 7.56 (dd, J=8.8, 2.3 Hz, 1H), 7.51-7.43 (m, 2H), 7.38 (d, J=8.8 Hz, 1H), 7.32-7.23 (m, 4H), 7.21-7.13 (m, 1H), 7.08 (dd, J=9.1, 1.6 Hz, 1H), 5.50 (dd, J=11.9, 4.8 Hz, 1H), 4.49 (d, J=15.6 Hz, 1H), 4.41 (d, J=15.6 Hz, 1H), 4.14 (s, 3H), 3.74 (dd, J=18.4, 11.9 Hz, 1H), 3.14 (dd, J=18.4, 4.8 Hz, 1H), 2.73-2.57 (m, 2H), 2.32 (t, J=6.7 Hz, 2H). R$_t$ 1.81 min (Generic method). ESI-MS for C$_{31}$H$_{26}$ClN$_5$O$_4$: calculated 567.2, found m/z 568.3/570.3 [M+H]$^+$.

Example d.102. 4-[5-(4-benzyl-6-chloro-2-oxo-1H-quinolin-3-yl)-3-(1-methylindol-3-yl)-3,4-dihydropyrazol-2-yl]-4-oxo-butanoic acid Step 1. Synthesis of 4-benzyl-6-chloro-3-[(E)-3-(1-methylindol-3-yl)prop-2-enoyl]-1H-quinolin-2-one (f.20)

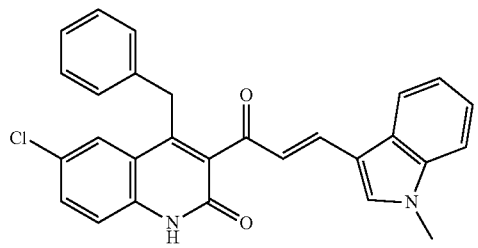 [SMILES: Cn1cc(/C=C/C(=O)c2c(Cc3ccccc3)c3cc(Cl)ccc3[nH]c2=O)c2ccccc21]

In a round-bottom flask, e.1 (0.2 g, 0.64 mmol) was suspended in a 4:3 mixture of ethanol (7 ml) and water (5 ml). The mixture was cooled to 0° C. and potassium hydroxide (1.346 g, 24 mmol) was added. After stirring for 45 minutes at 0° C., 1-methylindole-3-carbaldehyde (183 mg, 1.15 mmol) was added. The reaction was stirred for 16 h at room temperature and then at 40° C. for 16 hours. Afterwards acetic acid (1.384 mL, 24 mmol) was added at 0° C., resulting in a solid that was filtered and washed with water (20 mL) and ethanol (20 mL). The solid was dissolved in $CH_2Cl_2$ (50 mL) and washed with water (50 mL×3), the organic solvent evaporated in vacuo to finally yield title compound as a brown solid (0.190 g, yield 66%). $^1$H NMR (600 MHz, DMSO-$d_6$) δ 12.17 (s, 1H), 7.98 (s, 1H), 7.89 (dd, J=8.0, 1.1 Hz, 1H), 7.73 (d, J=16.1 Hz, 1H), 7.61 (d, J=2.3 Hz, 1H), 7.57-7.51 (m, 2H), 7.38 (d, J=8.8 Hz, 1H), 7.33-7.27 (m, 3H), 7.27-7.19 (m, 3H), 7.17-7.13 (m, 1H), 6.88 (d, J=16.1 Hz, 1H), 4.16 (s, 2H), 3.81 (s, 3H). $R_t$ 2.35 min (generic method). ESI-MS for $C_{28}H_{21}ClN_2O_2$: calculated 452.1, found m/z 453.1/455.2 [M+H]$^+$.

Step 2. Synthesis of 4-benzyl-6-chloro-3-[5-(1-methylindol-3-yl)-4,5-dihydro-1H-pyrazol-3-yl]-1H-quinolin-2-one (g.20)

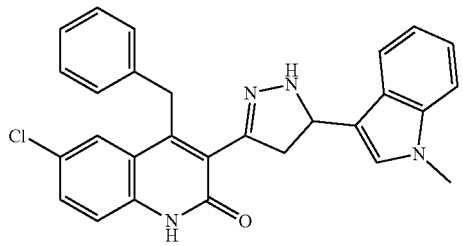 [SMILES: Cn1cc(C2CC(c3c(Cc4ccccc4)c4cc(Cl)ccc4[nH]c3=O)=NN2)c2ccccc21]

In appropriately sized microwaveable vessel, f.20 (0.117 g, 0.24 mmol) was suspended in ethanol (2.5 ml), then hydrazine hydrate (116 μL, 2.4 mmol) added, the reaction mixture microwaved at 110° C. (200 W) for 60 minutes, cooled at room temperature and resulting yellow solid filtered to yield title compound (0.98 g, yield 88%). $^1$H NMR (600 MHz, DMSO-$d_6$) δ 12.07 (s, 1H), 7.66 (d, J=2.3 Hz, 1H), 7.59 (dt, J=8.0, 1.0 Hz, 1H), 7.49 (dd, J=8.8, 2.3 Hz, 1H), 7.38 (dt, J=8.2, 0.9 Hz, 1H), 7.34 (d, J=8.8 Hz, 1H), 7.32-7.22 (m, 6H), 7.20-7.11 (m, 2H), 6.96 (ddd, J=8.0, 7.0, 1.0 Hz, 1H), 5.03 (td, J=10.5, 3.3 Hz, 1H), 4.51 (d, J=15.3 Hz, 1H), 4.44 (d, J=15.3 Hz, 1H), 3.69 (s, 3H), 3.31-3.28 (m, 1H), 3.08 (dd, 1H). $R_t$ 2.38 min (generic method). ESI-MS for $C_{28}H_{23}ClN_4O$: calculated 466.2, found m/z 467.3/469.1 [M+H]$^+$.

Step 3. Synthesis of 4-[5-(4-benzyl-6-chloro-2-oxo-1H-quinolin-3-yl)-3-(1-methylindol-3-yl)-3,4-dihydropyrazol-2-yl]-4-oxo-butanoic acid (d.102)

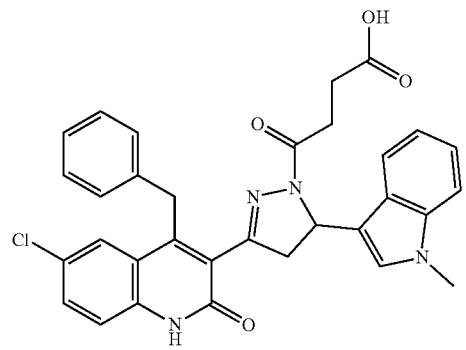 [SMILES: Cn1cc(C2CC(c3c(Cc4ccccc4)c4cc(Cl)ccc4[nH]c3=O)=NN2C(=O)CCC(=O)O)c2ccccc21]

Compound d.102 was synthesized following the general procedure D1 using g.20 (50 mg, 0.11 mmol) with succinic anhydride (120° C., 200 W). Purification by normal phase flash column chromatography (solvent A: DCM, solvent B: MeOH—gradient: 0-10% solvent B) yielded title compound (52 mg, yield 83%). $^1$H NMR (400 MHz, DMSO-$d_6$) δ 12.22 (s, 1H), 12.11 (s, 1H), 7.75 (d, J=2.3 Hz, 1H), 7.62-7.51 (m, 2H), 7.41-7.33 (m, 2H), 7.31-7.21 (m, 4H), 7.20-7.08 (m, 3H), 6.97-6.89 (m, 1H), 5.73 (dd, J=11.7, 4.8 Hz, 1H), 4.51 (d, J=15.6 Hz, 1H), 4.43 (d, J=15.5 Hz, 1H), 3.73 (dd, J=18.1, 11.8 Hz, 1H), 3.66 (s, 3H), 3.29 (dd, J=18.1, 4.9 Hz, 1H), 2.61 (t, J=6.8 Hz, 2H), 2.31 (t, J=6.7 Hz, 2H). $R_t$ 2.07 min (generic method). ESI-MS for $C_{32}H_{27}ClN_4O_4$: calculated 566.2, found m/z 567.2/569.2 [M+H]$^+$.

Example d.103. 4-benzyl-6-chloro-3-[3-(6-methoxy-3-pyridyl)-2-propanoyl-3,4-dihydropyrazol-5-yl]-1H-quinolin-2-one Step 1. Synthesis of 4-benzyl-6-chloro-3-[(E)-3-(6-methoxy-3-pyridyl)prop-2-enoyl]-1H-quinolin-2-one (f.21)

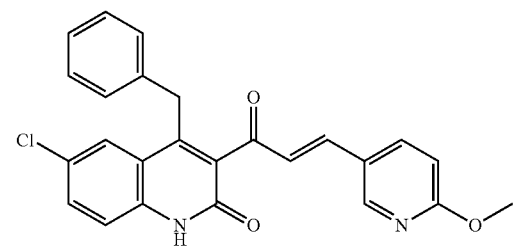 [SMILES: COc1ccc(/C=C/C(=O)c2c(Cc3ccccc3)c3cc(Cl)ccc3[nH]c2=O)cn1]

In a round-bottom flask, e.1 (0.200 g, 0.64 mmol) was suspended in a 4:3 mixture of ethanol (7 ml) and water (5 ml). The mixture was cooled to 0° C. and potassium hydroxide (0.898 g, 16 mmol) was added. After stirring for 45 minutes at 0° C., 6-methoxy-3-pyridinecarboxaldehyde (132 mg, 0.96 mmol) was added. The reaction was stirred at room temperature for 45 minutes, afterwards acetic acid (0.923 mL, 16 mmol) was added at 0° C., resulting in a solid that was filtered and washed with water (20 mL) and ethanol (20 mL). The solid was dissolved in CH$_2$Cl$_2$ (50 mL) and washed with water (50 mL×3), the organic solvent evaporated in vacuo to finally yield title compound as an off-white-yellow solid (0.405 g, yield quant.). $^1$H NMR (400 MHz, DMSO-d$_6$) δ 12.32 (s, 1H), 8.44 (d, J=2.4 Hz, 1H), 8.14 (dd, J=8.8, 2.4 Hz, 1H), 7.63 (d, J=2.3 Hz, 1H), 7.59-7.42 (m, 3H), 7.30-7.20 (m, 4H), 7.18-7.10 (m, 1H), 7.04 (d, J=16.3 Hz, 1H), 6.86 (d, J=8.7 Hz, 1H), 4.12 (s, 2H), 3.88 (s, 3H). R$_t$ 2.28 min (generic method). ESI-MS for C$_{25}$H$_{19}$ClN$_2$O$_3$: calculated 430.1, found m/z 431.2/433.2 [M+H]$^+$.

Step 2. Synthesis of 4-benzyl-6-chloro-3-[5-(6-methoxy-3-pyridyl)-4,5-dihydro-1H-pyrazol-3-yl]-1H-quinolin-2-one (g.21)

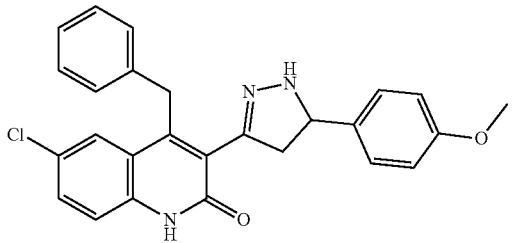 [SMILES: COc1ccc(C2CC(c3c(Cc4ccccc4)c4cc(Cl)ccc4[nH]c3=O)=NN2)cc1]

In appropriately sized microwaveable vessel, f.21 (0.400 g, 0.93 mmol) was suspended in ethanol (3 ml), then hydrazine hydrate (77 µL, 1.58 mmol) added, the reaction mixture microwaved at 110° C. (200 W) for 25 minutes, cooled at room temperature and resulting yellow solid filtered to yield title compound (0.352 g, yield 85%). $^1$H NMR (400 MHz, DMSO-d$_6$) δ 12.15 (s, 1H), 8.14 (d, J=2.4 Hz, 1H), 7.74 (dd, J=8.6, 2.5 Hz, 1H), 7.66 (d, J=2.2 Hz, 1H), 7.49 (dd, J=8.7, 2.2 Hz, 1H), 7.40 (d, J=8.8 Hz, 1H), 7.28-7.17 (m, 4H), 7.20-7.12 (m, 1H), 6.76 (d, J=8.6 Hz, 1H), 4.77 (t, J=10.3 Hz, 1H), 4.41 (s, 2H), 3.82 (s, 3H), 3.32-3.24 (m, 1H), 2.89 (dd, J=16.4, 10.2 Hz, 1H). R$_t$ 2.14 min (generic method). ESI-MS for C$_{25}$H$_{21}$ClN$_4$O$_2$: calculated 444.1, found m/z 445.3/447.2 [M+H]$^+$.

Step 3. Synthesis of 4-benzyl-6-chloro-3-[3-(6-methoxy-3-pyridyl)-2-propanoyl-3,4-dihydropyrazol-5-yl]-1H-quinolin-2-one (d.103)

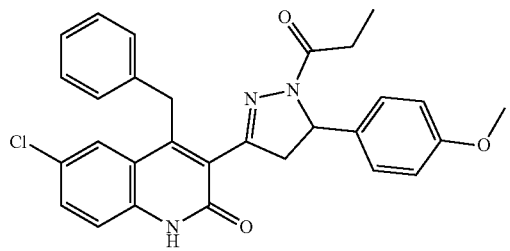 [SMILES: CCC(=O)N1N=C(c2c(Cc3ccccc3)c3cc(Cl)ccc3[nH]c2=O)CC1c1ccc(OC)cc1]

Compound d.103 was synthesized following the general procedure D2 using g.21 (111 mg, 0.25 mmol). Purification by normal phase flash column chromatography (solvent A: DCM, solvent B: MeOH—gradient: 0-10% solvent B) yielded title compound as a yellow solid (31 mg, yield 25%). $^1$H NMR (400 MHz, DMSO-d$_6$) δ 12.20 (s, 1H), 8.10 (d, J=2.5 Hz, 1H), 7.74 (d, J=2.3 Hz, 1H), 7.61-7.53 (m, 2H), 7.39 (d, J=8.8 Hz, 1H), 7.31-7.23 (m, 4H), 7.23-7.15 (m, 1H), 6.75 (d, J=8.5 Hz, 1H), 5.45 (dd, J=12.0, 4.6 Hz, 1H), 4.42 (s, 2H), 3.83 (s, 3H), 3.69 (dd, J=18.4, 12.0 Hz, 1H), 3.19 (dd, J=18.2, 4.7 Hz, 1H), 2.31 (qd, J=7.7, 4.7 Hz, 2H), 0.83 (t, J=7.5 Hz, 3H). R$_t$ 2.27 min (generic method). ESI-MS for C$_{28}$H$_{25}$ClN$_4$O$_3$: calculated 500.2, found m/z 501.3/503.2 [M+H]$^+$.

Example d.104. 4-[5-(4-benzyl-6-chloro-2-oxo-1H-quinolin-3-yl)-3-(6-methoxy-3-pyridyl)-3,4-dihydro-pyrazol-2-yl]-4-oxo-butanoic acid

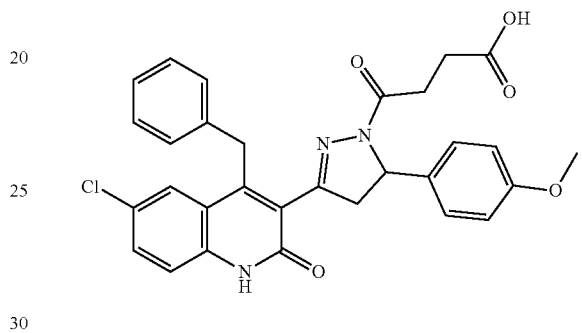

Compound d.104 was synthesized following the general procedure D1 using g.21 (116 mg, 0.26 mmol). THF was evaporated and crude dissolved in a mixture of DCM/CHCl$_3$ (50 mL) and washed with aq. HCl 0.1 (50 mL). Purification by normal phase flash column chromatography (solvent A: DCM, solvent B: MeOH—gradient: 0-10% solvent B) yielded title compound as a white solid (8 mg, yield 6%). $^1$H NMR (400 MHz, DMSO-d$_6$) δ 12.22 (s, 1H), 8.09 (d, J=2.5 Hz, 1H), 7.79 (d, J=2.3 Hz, 1H), 7.60-7.52 (m, 2H), 7.39 (d, J=8.8 Hz, 1H), 7.31-7.21 (m, 4H), 7.21-7.13 (m, 1H), 6.72 (d, J=8.7 Hz, 1H), 5.44 (dd, J=12.0, 4.6 Hz, 1H), 4.50-4.36 (m, 2H), 3.82 (s, 3H), 3.65 (dd, J=18.3, 11.9 Hz, 1H), 3.13 (dd, J=18.4, 4.6 Hz, 1H), 2.68-2.53 (m, 2H), 2.29 (t, J=6.8 Hz, 2H). R$_t$ 1.87 min (generic method). ESI-MS for C$_{29}$H$_{25}$ClN$_4$O$_5$: calculated 544.2, found m/z 545.1/547.2 [M+H]$^+$.

Example d.105. 4-[5-(4-benzyl-6-chloro-2-oxo-1H-quinolin-3-yl)-3-(2-chlorophenyl)-3,4-dihydropyrazol-2-yl]-4-oxo-butanoic acid Step 1. Synthesis of 4-benzyl-6-chloro-3-[(E)-3-(2-chlorophenyl)prop-2-enoyl]-1H-quinolin-2-one (f.22)

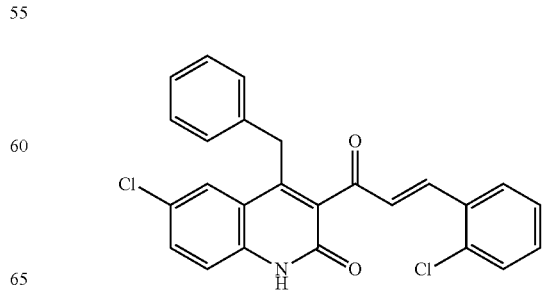

In a round-bottom flask, e.1 (300 mg, 0.96 mmol) was suspended in a 4:3 mixture of ethanol (11 ml) and water (8 ml). The mixture was cooled to 0° C. and potassium hydroxide (1.350 g, 24 mmol) was added. After stirring for 45 minutes at 0° C., 2-chlorobenzaldehyde (243 mg, 1.73 mmol) was added. The reaction was stirred at room temperature for 3 hours, afterwards acetic acid (1.384 mL, 24 mmol) was added at 0° C., resulting yellow solid filtered and washed with EtOH (20 mL). The solid was dissolved in $CH_2Cl_2$ (50 mL) and washed with water (50 mL), the organic solvent evaporated in vacuo, to finally yield title compound as a yellow solid (326 g, yield 78%). $^1$H NMR (400 MHz, DMSO-$d_6$) δ 12.30 (s, 1H), 7.95 (dd, J=7.8, 1.8 Hz, 1H), 7.76 (d, J=16.2 Hz, 1H), 7.71 (d, J=2.3 Hz, 1H), 7.58 (dd, J=8.8, 2.3 Hz, 1H), 7.54 (dd, J=8.0, 1.4 Hz, 1H), 7.50-7.38 (m, 3H), 7.29-7.24 (m, 4H), 7.21 (d, J=16.2 Hz, 1H), 7.18-7.12 (m, 1H), 4.18 (s, 2H). $R_t$ 2.62 min (generic method). ESI-MS for $C_{25}H_{17}C_{12}NO_2$: calculated 433.1, found m/z 434.1/436.1/438.2 [M+H]$^+$.

Step 2. Synthesis of 4-benzyl-6-chloro-3-[5-(2-chlorophenyl)-4,5-dihydro-1H-pyrazol-3-yl]-1H-quinolin-2-one (g.22)

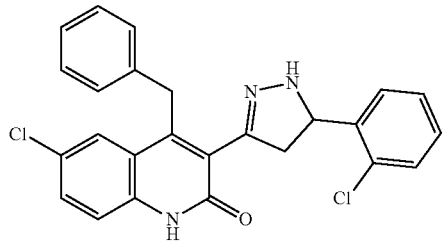 [SMILES: O=c1[nH]c2ccc(Cl)cc2c(Cc2ccccc2)c1C1=NNC(c2ccccc2Cl)C1]

In appropriately sized microwaveable vessel, f.22 (313.0 mg, 0.72 mmol) was suspended in ethanol (1.3 ml), then hydrazine hydrate (90 µL, 1.44 mmol) added, the reaction mixture microwaved at 110° C. (200 W) for 25 minutes, cooled at room temperature and resulting solid filtered to yield title compound (300 mg, yield 93%). $^1$H NMR (400 MHz, DMSO-$d_6$) 12.04 (s, 1H), 7.70-7.61 (m, 2H), 7.55 (d, J=3.6 Hz, 1H), 7.49 (dd, J=8.8, 2.2 Hz, 1H), 7.46-7.39 (m, 1H), 7.33 (d, J=8.7 Hz, 1H), 7.31-7.27 (m, 2H), 7.25 (s, 3H), 7.19-7.12 (m, 1H), 5.07 (td, J=10.6, 3.6 Hz, 1H), 4.45 (d, J=15.3 Hz, 1H), 4.38 (d, J=15.3 Hz, 1H), 3.51 (dd, J=16.5, 10.8 Hz, 1H), 2.71 (dd, J=16.5, 10.4 Hz, 1H). $R_t$ 1.41 min (apolar method). ESI-MS for $C_{25}H_{19}C_{12}N_3O$: calculated 447.1, found m/z 448.1/450.1/452.1 [M+H]$^+$.

Step 3. Synthesis of 4-[5-(4-benzyl-6-chloro-2-oxo-1H-quinolin-3-yl)-3-(2-chlorophenyl)-3,4-dihydropyrazol-2-yl]-4-oxo-butanoic acid (d.105)

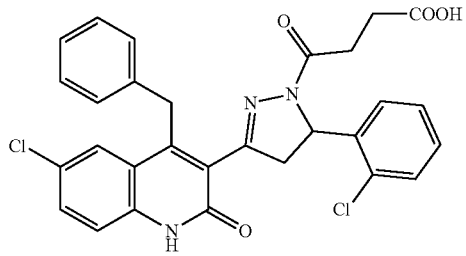 [SMILES: O=C(O)CCC(=O)N1N=C(c2c(Cc3ccccc3)c3cc(Cl)ccc3[nH]c2=O)CC1c1ccccc1Cl]

Compound d.105 was synthesized following the general procedure D1 using g.22 (100 mg, 0.22 mmol) with succinic anhydride (120° C., 200 W). THF was evaporated and the resulted crude solid was triturated in $CH_2Cl_2$ (2 mL) yielding title compound (102 mg, yield 83%). $^1$H NMR (400 MHz, DMSO-$d_6$) δ 12.20 (s, 1H), 7.78 (d, J=2.3 Hz, 1H), 7.56 (dd, J=8.8, 2.3 Hz, 1H), 7.46 (dd, J=7.8, 1.5 Hz, 1H), 7.37 (d, J=8.8 Hz, 1H), 7.33-7.21 (m, 6H), 7.21-7.12 (m, 1H), 7.08 (dd, J=7.6, 1.9 Hz, 1H), 5.66 (dd, J=12.0, 5.4 Hz, 1H), 4.49 (d, J=15.5 Hz, 1H), 4.39 (d, J=15.5 Hz, 1H), 3.82 (dd, J=18.2, 12.0 Hz, 1H), 2.99 (dd, J=18.2, 5.3 Hz, 1H), 2.78 (dt, J=17.0, 6.8 Hz, 1H), 2.65-2.54 (m, 1H), 2.45-2.29 (m, 2H). $R_t$ 0.80 min (Apolar method). ESI-MS for $C_{29}H_{23}C_{12}N_3O_4$: calculated 547.1, found m/z 548.1/550.1/560.1 [M+H]$^+$.

Example d.106. 4-[5-(4-benzyl-6-chloro-2-oxo-1H-quinolin-3-yl)-3-(3,4-dimethoxyphenyl)-3,4-dihydropyrazol-2-yl]-4-oxo-butanoic acid Step 1. Synthesis of 4-benzyl-6-chloro-3-[(E)-3-(3,4-dimethoxyphenyl)prop-2-enoyl]-1H-quinolin-2-one (f.23)

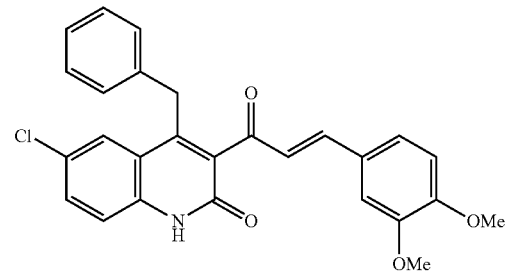 [SMILES: COc1ccc(/C=C/C(=O)c2c(Cc3ccccc3)c3cc(Cl)ccc3[nH]c2=O)cc1OC]

In a round-bottom flask, e.1 (300 mg, 0.96 mmol) was suspended in a 4:3 mixture of ethanol (11 ml) and water (8 ml). The mixture was cooled to 0° C. and potassium hydroxide (1.350 g, 24 mmol) was added. After stirring for 45 minutes at 0° C., 3,4-dimethoxybenzaldehyde (287 mL, 1.73 mmol) was added. The reaction was stirred at room temperature for 16 hours, afterwards acetic acid (1.384 mL, 24 mmol) was added at 0° C., resulting yellow solid filtered and washed with EtOH (20 mL). The solid was dissolved in $CH_2Cl_2$ (50 mL) and washed with water (50 mL), the organic solvent evaporated in vacuo, to finally yield title compound as a yellow solid (363 g, yield 82%). $^1$H NMR (400 MHz, DMSO-$d_6$) δ 12.18 (s, 1H), 7.62 (d, J=2.3 Hz, 1H), 7.55 (dd, J=8.8, 2.3 Hz, 1H), 7.48 (d, J=16.2 Hz, 1H), 7.38 (d, J=8.8 Hz, 1H), 7.33-7.22 (m, 6H), 7.19-7.11 (m, 1H), 7.04-6.94 (m, 2H), 4.12 (s, 2H), 3.82-3.74 (m, 6H). $R_t$ 2.29 min (generic method). ESI-MS for $C_{27}H_{22}ClNO_4$: calculated 459.1, found m/z 460.2/462.2 [M+H]$^+$.

135

Step 2. Synthesis of 4-benzyl-6-chloro-3-[5-(3,4-dimethoxyphenyl)-4,5-dihydro-1H-pyrazol-3-yl]-1H-quinolin-2-one (g.23)

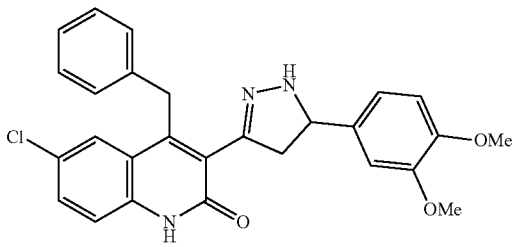 [SMILES: COc1ccc(C2CC(c3c(Cc4ccccc4)c4cc(Cl)ccc4[nH]c3=O)=NN2)cc1OC]

In appropriately sized microwaveable vessel, f.23 (353 mg, 0.77 mmol) was suspended in ethanol (1.4 ml), then hydrazine hydrate (96 μL, 1.54 mmol) added, the reaction mixture microwaved at 110° C. (200 W) for 25 minutes, cooled at room temperature and resulting yellow solid filtered to yield title compound (330 g, yield 91%). $^1$H NMR (400 MHz, DMSO-$d_6$) δ 12.08 (s, 1H), 7.66 (d, J=2.3 Hz, 1H), 7.50 (dd, J=8.8, 2.2 Hz, 1H), 7.38 (d, J=2.9 Hz, 1H), 7.34 (d, J=8.8 Hz, 1H), 7.31-7.21 (m, 4H), 7.24-7.12 (m, 1H), 7.07 (d, J=1.6 Hz, 1H), 6.92-6.80 (m, 2H), 4.74 (td, J=10.1, 2.9 Hz, 1H), 4.42 (s, 2H), 3.73 (s, 3H), 3.72 (s, 3H), 3.33-3.25 (m, 1H), 2.92 (dd, J=16.4, 9.6 Hz, 1H). $R_t$ 0.94 min (Apolar method). ESI-MS for $C_{27}H_{24}ClN_3O_3$: calculated 473.2, found m/z 474.1/476.1 [M+H]$^+$.

Step 3. Synthesis of 4-[5-(4-benzyl-6-chloro-2-oxo-1H-quinolin-3-yl)-3-(3,4-dimethoxyphenyl)-3,4-dihydropyrazol-2-yl]-4-oxo-butanoic acid (d.106)

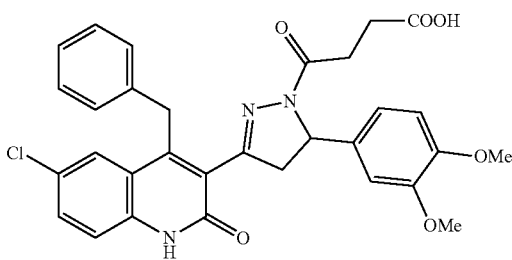 [SMILES: COc1ccc(C2CC(c3c(Cc4ccccc4)c4cc(Cl)ccc4[nH]c3=O)=NN2C(=O)CCC(=O)O)cc1OC]

Compound d.106 was synthesized following the general procedure D1 using g.23 (100 mg, 0.21 mmol) with succinic anhydride (120° C., 200 W). THF was evaporated and the resulted crude solid was triturated in $CH_2Cl_2$ (2 mL) yielding title compound (89 mg, yield 73%). $^1$H NMR (400 MHz, DMSO-$d_6$) 12.26 (s, 1H), 7.75 (d, J=2.3 Hz, 1H), 7.56 (dd, J=8.8, 2.2 Hz, 1H), 7.37 (d, J=8.8 Hz, 1H), 7.33-7.22 (m, 4H), 7.22-7.13 (m, 1H), 6.91 (d, J=2.0 Hz, 1H), 6.82 (d, J=8.3 Hz, 1H), 6.76 (dd, J=8.3, 2.0 Hz, 1H), 5.40 (dd, J=11.8, 4.2 Hz, 1H), 4.44 (d, J=15.5 Hz, 1H), 4.36 (d, J=15.5 Hz, 1H), 3.71 (s, 3H), 3.69-3.58 (m, 4H), 3.11 (dd, J=18.3, 4.3 Hz, 1H), 2.68 (dt, J=17.0, 6.8 Hz, 1H), 2.58 (dt, J=17.1, 6.5 Hz, 1H), 2.38-2.29 (m, 2H). $R_t$ 0.53 min (Apolar method). ESI-MS for $C_{31}H_{28}ClN_3O_6$: calculated 573.2, found m/z 574.1/576.1 [M+H]$^+$.

136

Example d.107. 4-[5-[6-chloro-2-oxo-4-(2-phenyl-ethyl)-1H-quinolin-3-yl]-3-(4-methoxyphenyl)-3,4-dihydropyrazol-2-yl]-4-oxo-butanoic acid

Step 1. Synthesis of 1-(2-amino-5-chloro-phenyl)-3-phenyl-propan-1-one

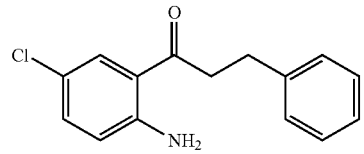 [SMILES: Nc1ccc(Cl)cc1C(=O)CCc1ccccc1]

In a dried three-neck round-bottom flask, 2-amino-5-chlorobenzonitrile (0.5 g, 3.28 mmol) was suspended in anhydrous diethyl ether (1.6 ml) under nitrogen atmosphere. The mixture was cooled to 0° C., and then Phenethylmagnesium chloride was added dropwise as solution 1.0 M in THF (9.3 ml, 9.3 mmol). After stirring for 16 hours at room temperature, the reaction was cooled to −60° C. and 6 N HCl (2.5 ml) was added while stirring vigorously. After 1 hour at room temperature, the mixture was diluted with ethyl acetate (50 ml), the aqueous layer extracted with ethyl acetate (3×25 ml), the combined organic phases were dried over $Na_2SO_4$ and evaporated to dryness. Purification by normal phase chromatography (solvent A: cyclohexane, solvent B: ethyl acetate—gradient: 0-5% solvent B) yielded title compound (623 mg, yield 73%). $^1$H NMR (400 MHz, DMSO-$d_6$) δ 7.78 (d, J=2.5 Hz, 1H), 7.39-7.22 (m, 7H), 7.21-7.12 (m, 1H), 6.79 (d, J=8.9 Hz, 1H), 3.29 (t, J=7.5 Hz, 2H), 2.90 (t, J=7.5 Hz, 2H). $R_t$ 1.61 min (Apolar method). ESI-MS for $C_{15}H_{14}ClNO$: calculated 259.1, found m/z 260.1/262.1 [M+H]$^+$.

Step 2. Synthesis of 3-acetyl-6-chloro-4-(2-phenyl-ethyl)-1H-quinolin-2-one (e.2)

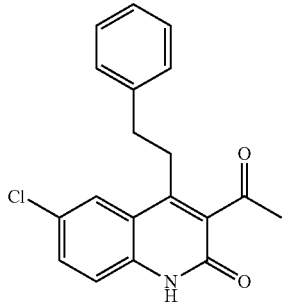 [SMILES: CC(=O)c1c(CCc2ccccc2)c2cc(Cl)ccc2[nH]c1=O]

In dried microwaveable vessel, 1-(2-amino-5-chloro-phenyl)-3-phenyl-propan-1-one (469 mg, 1.81 mmol) was dissolved in anhydrous tetrahydrofuran (2.8 ml) in presence of 4 Å molecular sieves. Then ethyl acetoacetate (1.2 mL, 9.0 mmol) was added. The reaction mixture was microwaved at 140° C. (200 W) for 75 minutes, cooled at room temperature, resulting white-off solid filtered and rinsed with cold tetrahydrofuran to finally yield title compound (358.1 mg, yield 61%). $^1$H NMR (400 MHz, DMSO-$d_6$) δ 12.24 (s, 1H), 7.69 (d, J=2.2 Hz, 1H), 7.55 (dd, J=8.8, 2.2 Hz, 1H), 7.35 (d, J=8.8 Hz, 1H), 7.27 (dt, J=13.0, 7.4 Hz, 4H), 7.19 (t, J=7.1 Hz, 1H), 4.14 (s, 2H), 2.42 (s, 3H). $R_t$ 1.05 min (Apolar method). ESI-MS for $C_{19}H_{16}ClNO_2$: calculated 325.1, found m/z 326.1/328.1 [M+H]$^+$, 324.1/326.1 [M−H]$^−$.

Step 3. Synthesis of 6-chloro-3-[(E)-3-(4-methoxyphenyl)prop-2-enoyl]-4-(2-phenylethyl)-1H-quinolin-2-one (f.24)

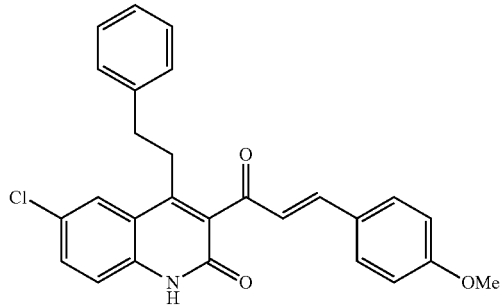 [SMILES: COc1ccc(/C=C/C(=O)c2c(CCc3ccccc3)c3cc(Cl)ccc3[nH]c2=O)cc1]

In a round-bottom flask, e.2 (268.3 mg, 0.82 mmol) was suspended in a 4:3 mixture of ethanol (9.4 ml) and water (7.1 ml). The mixture was cooled to 0° C. and potassium hydroxide (1.167 g, 20.59 mmol) was added. After stirring for 45 minutes at 0° C., para-anisaldehyde (0.10 mL, 0.82 mmol) was added. The reaction was stirred at room temperature for 16 hours, afterwards acetic acid (2.2 mL, 37.88 mmol) was added at 0° C., resulting yellow solid filtered, resulting solid was dissolved in $CH_2Cl_2$ (50 mL), washed with water (3×50 mL) and brine. The solvent was evaporated in vacuo to yield the title compound as an orange solid (250 mg, yield 68%). $^1$H NMR (400 MHz, DMSO-d$_6$) δ 12.13 (s, 1H), 7.92 (d, J=2.3 Hz, 1H), 7.75-7.67 (m, 2H), 7.63 (dd, J=8.8, 2.2 Hz, 1H), 7.49 (d, J=16.2 Hz, 1H), 7.41 (d, J=8.8 Hz, 1H), 7.28-7.13 (m, 5H), 7.02-6.96 (m, 2H), 6.93 (d, J=16.2 Hz, 1H), 3.81 (s, 3H), 3.03-2.94 (m, 2H), 2.88-2.79 (m, 2H). R$_t$ 1.48 min (Apolar method). ESI-MS for $C_{27}H_{22}ClNO_3$: calculated 443.1, found m/z 444.2/446.2 [M+H]$^+$, 442.3/444.3 [M−H]$^−$.

Step 4. Synthesis of 6-chloro-3-[5-(4-methoxyphenyl)-4,5-dihydro-1H-pyrazol-3-yl]-4-(2-phenylethyl)-1H-quinolin-2-one (g.24)

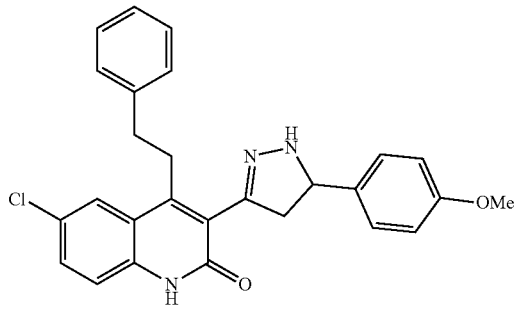 [SMILES: COc1ccc(C2CC(c3c(CCc4ccccc4)c4cc(Cl)ccc4[nH]c3=O)=NN2)cc1]

In appropriately sized microwaveable vessel, f.24 (243 mg, 0.55 mmol) was suspended in ethanol (1 ml), then hydrazine hydrate (68 μL, 1.09 mmol) added, the reaction mixture microwaved at 110° C. (200 W) for 25 minutes, cooled at room temperature and resulting yellow solid filtered to yield title compound (230 g, yield 92%). $^1$H NMR (400 MHz, DMSO-d$_6$) δ 11.97 (s, 1H), 7.87 (d, J=2.2 Hz, 1H), 7.57 (dd, J=8.8, 2.2 Hz, 1H), 7.47 (d, J=3.5 Hz, 1H), 7.42-7.25 (m, 7H), 7.21 (tt, J=6.0, 1.7 Hz, 1H), 6.93-6.84 (m, 2H), 4.75 (td, J=10.7, 3.4 Hz, 1H), 3.74 (s, 3H), 3.30-3.17 (m, 2H), 3.14 (dd, J=16.3, 10.5 Hz, 1H), 2.90 (t, J=8.1 Hz, 2H), 2.74 (dd, J=16.3, 10.9 Hz, 1H). R$_t$ 1.31 min (Apolar method). ESI-MS for $C_{27}H_{24}ClN_3O_2$: calculated 457.2, found m/z 458.2/460.2 [M+H]$^+$, 456.4/458.4 [M−H]$^−$.

Step 5. Synthesis of 4-[5-[6-chloro-2-oxo-4-(2-phenylethyl)-1H-quinolin-3-yl]-3-(4-methoxyphenyl)-3,4-dihydropyrazol-2-yl]-4-oxo-butanoic acid (d.107)

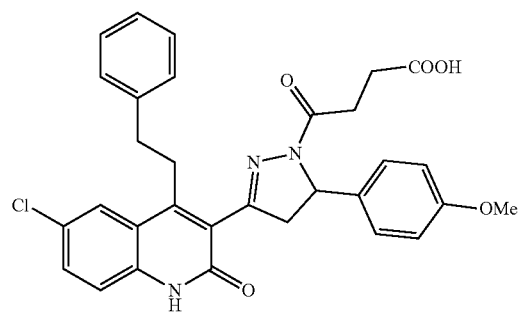 [SMILES: COc1ccc(C2CC(c3c(CCc4ccccc4)c4cc(Cl)ccc4[nH]c3=O)=NN2C(=O)CCC(=O)O)cc1]

Compound d.104 was synthesized following the general procedure D1 using g.22 (105 mg, 0.23 mmol) with succinic anhydride (120° C., 200 W). Trituration in $CH_2Cl_2$ (2 ml) and final purification by normal phase flash column chromatography (solvent A: $CH_2Cl_2$, solvent B: MeOH—gradient: 0-3% solvent B) yielded title compound (78.1 mg, yield 61). $^1$H NMR (400 MHz, DMSO-d$_6$) δ 12.13 (s, 1H), 7.92 (d, J=2.3 Hz, 1H), 7.62 (dd, J=8.8, 2.2 Hz, 1H), 7.40 (d, J=8.8 Hz, 1H), 7.32-7.26 (m, 2H), 7.23 (d, J=7.2 Hz, 3H), 7.17 (d, J=8.7 Hz, 2H), 6.85-6.77 (m, 2H), 5.40 (dd, J=11.9, 4.6 Hz, 1H), 3.72 (s, 3H), 3.48 (dd, J=18.3, 11.9 Hz, 1H), 3.33-3.13 (m, 2H), 3.05-2.76 (m, 5H), 2.44 (t, J=6.7 Hz, 2H). R$_t$ 0.90 min (Apolar method). ESI-MS for $C_{31}H_{28}ClN_3O_5$: calculated 557.2, found m/z 558.2/560.2 [M+H]$^+$.

Example d.108. Synthesis of 6-chloro-3-[3-(4-methoxyphenyl)-2-propanoyl-3,4-dihydropyrazol-5-yl]-4-(2-phenylethyl)-1H-quinolin-2-one

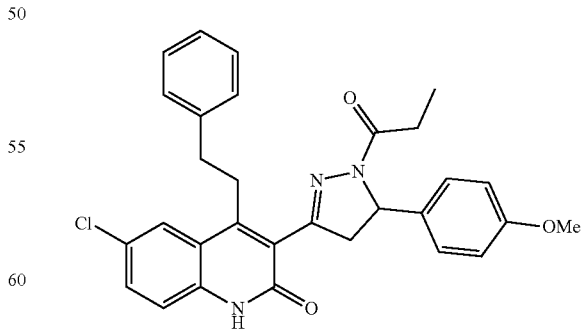

Compound d.108 was synthesized following the general procedure D2 using g.24 (100 mg, 0.22 mmol). Purification by normal phase flash column chromatography (solvent A: DCM, solvent B: MeOH—gradient: 0-4% solvent B)

yielded title compound as a white solid (80.3 mg, yield 72%). ¹H NMR (400 MHz, DMSO-d$_6$) δ 7.91 (d, J=2.3 Hz, 1H), 7.61 (dd, J=8.8, 2.2 Hz, 1H), 7.39 (d, J=8.8 Hz, 1H), 7.33-7.25 (m, 2H), 7.25-7.13 (m, 5H), 6.86-6.77 (m, 2H), 5.40 (dd, J=11.9, 4.6 Hz, 1H), 3.72 (s, 3H), 3.50 (dd, J=18.3, 12.0 Hz, 1H), 3.29-3.18 (m, 2H), 3.03-2.84 (m, 3H), 2.65-2.50 (m, 2H), 0.96 (t, J=7.5 Hz, 3H). R$_t$ 1.60 min (Apolar method). ESI-MS for C$_{30}$H$_{28}$ClN$_3$O$_3$: calculated 513.2, found m/z 514.2/516.2 [M+H]⁺.

Scheme of synthesis 3

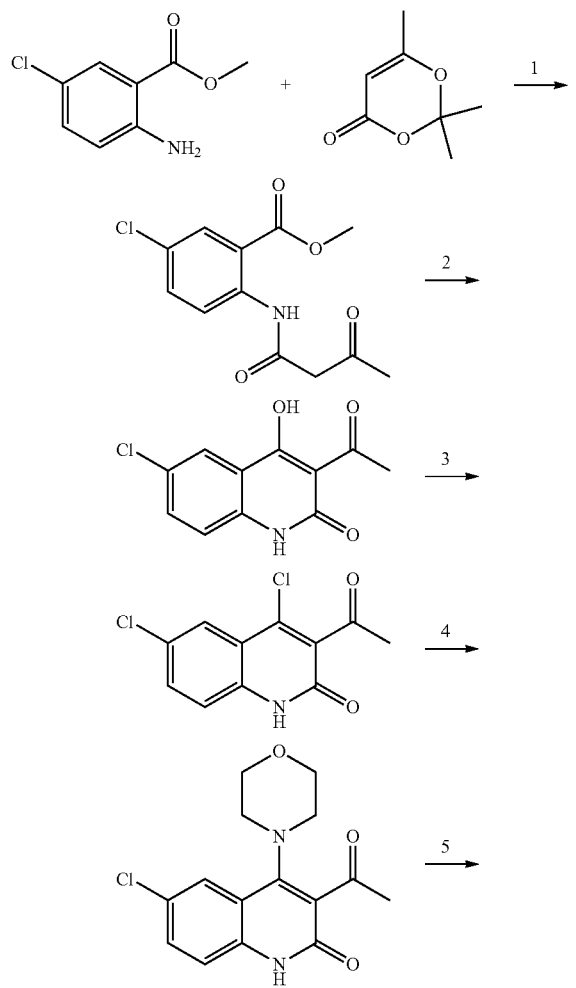

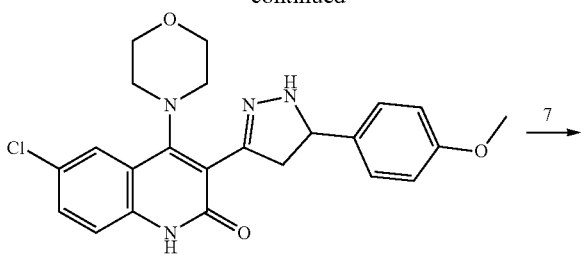

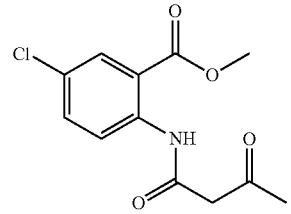 [SMILES: COC(=O)c1cc(Cl)ccc1NC(=O)CC(C)=O]

(1) Toluene, 110° C., 16 h, yield 77%; (2) MeONa, MeOH, 2 h, yield 90%; (3) POCl$_3$, reflux, 2 h, yield 74%; (4) Morpholine, Et$_3$N, ACN, 90° C., 2 h, yield 22%; (5) p-anisaldehyde, KOH, 4:3 EtOH/H$_2$O, 0° C. to rt, 16 h, yield 68%; (6) hydrazine monohydrate, EtOH, 110° C., 45 min, yield 36%; (7) Succinic anhydride, THF (dry), 165° C., 45 min, yield 49%.

Example d.109. 4-[5-(6-chloro-4-morpholino-2-oxo-1H-quinolin-3-yl)-3-(4-methoxyphenyl)-3,4-dihydropyrazol-2-yl]-4-oxo-butanoic acid Step 1. Synthesis of methyl 5-chloro-2-(3-oxobutanoylamino)benzoate

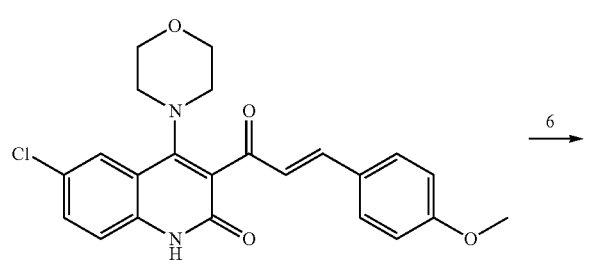

To a suspension of methyl 2-amino-5-chlorobenzoate (2.5 g, 13.5 mmol) in toluene (30 mL) was added 2,2,6-trimethyl-1,3-dioxin-4-one (2 mL, 14.8 mmol). The solution was refluxed for 16 hours (110° C.). Reaction was cooled to room temperature and solvent evaporated in vacuo. Purification by normal phase chromatography (solvent A: cyclohexane, solvent B: ethyl acetate—gradient: 0-100% solvent B) followed by trituration in MeOH yielded title compound as a white solid (2.80 g, yield 77%). ¹H NMR (400 MHz, DMSO-d$_6$) δ 10.61 (s, 1H), 8.16 (d, J=8.9 Hz, 1H), 7.85 (d, J=2.6 Hz, 1H), 7.68 (dd, J=8.9, 2.6 Hz, 1H), 3.85 (s, 3H), 3.68 (s, 2H), 2.22 (s, 3H). R$_t$ 2.11 min (generic method). ESI-MS for C$_{12}$H$_{12}$ClNO$_4$: calculated 269.0, found m/z 270.0/272.0 [M+H]⁺.

Step 2. Synthesis of 3-acetyl-6-chloro-4-hydroxy-1H-quinolin-2-one

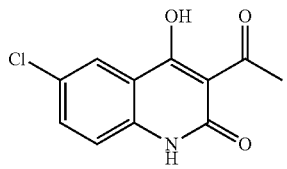 [SMILES: CC(=O)c1c(O)c2cc(Cl)ccc2[nH]c1=O]

To a suspension of methyl 5-chloro-2-(3-oxobutanoylamino)benzoate (1.7 g, 6.30 mmol) in MeOH (80 mL) was added sodium methoxide (1.36 g, 25.20 mmol), the reaction mixture was refluxed for 2 hours and until formation of a white slurry, which was concentrated under vacuum and the residue suspended in $H_2O$ (100 mL) and acidified to pH 2 with aq. HCl 0.1 M (20 mL). The formed precipitate was successively filtered, washed with $H_2O$ (50 mL), $Et_2O$ (50 mL) and dried to afford title product as a white solid (1.35 g, 90%). $^1$H NMR (400 MHz, DMSO-$d_6$) δ 11.64 (s, 1H), 7.93 (d, J=2.5 Hz, 1H), 7.72 (dd, J=8.8, 2.5 Hz, 1H), 7.31 (d, J=8.9 Hz, 1H), 2.71 (s, 3H). $R_t$ 2.09 min (generic method). ESI-MS for $C_{11}H_8ClNO_3$: calculated 237.0, found m/z 236.0/238.1 [M–H]$^-$.

Step 3. Synthesis of 3-acetyl-4,6-dichloro-1H-quinolin-2-one

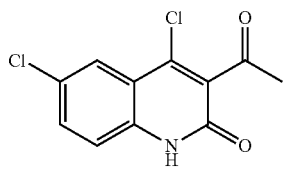 [SMILES: CC(=O)c1c(Cl)c2cc(Cl)ccc2[nH]c1=O]

In a round-bottom flask, 3-acetyl-6-chloro-4-hydroxy-1H-quinolin-2-one (100 mg, 0.42 mmol) was suspended in $POCl_3$ (6 mL) and reaction was heated at 110° C. for 2 hours. Solvent was evaporated in vacuo and the resulting dark crude was suspended in acetic acid (13 mL). Sodium acetate (38 mg, 0.46 mmol) was then added and the reaction was heated at 120° C. and left stirring overnight. Reaction was cooled to room temperature, poured into water (50 mL), and the solid formed filtered and washed with water (20 mL) to obtain title compound as a brown solid (80 mg, yield 74%) that was used in the next step without further purification. $^1$H NMR (400 MHz, DMSO-$d_6$) δ 12.52 (s, 1H), 7.90 (d, J=2.3 Hz, 1H), 7.73 (dd, J=8.8, 2.4 Hz, 1H), 7.42 (d, J=8.8 Hz, 1H), 2.48 (s, 2H). $R_t$ 1.97 min (generic method). ESI-MS for $C_{11}H_7Cl_2NO_2$: calculated 255.0, found m/z 254.0/255.9/258.3 [M–H]$^-$.

Step 4. Synthesis of 3-acetyl-6-chloro-4-morpholino-1H-quinolin-2-one

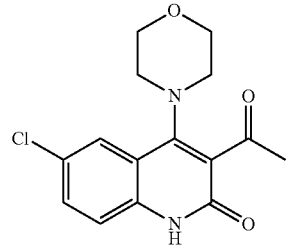 [SMILES: CC(=O)c1c(N2CCOCC2)c2cc(Cl)ccc2[nH]c1=O]

In a pressure tube, 3-acetyl-4,6-dichloro-1H-quinolin-2-one (300 mg, 1.17 mmol) was suspended in acetonitrile (3 mL). Triethylamine (327 µL, 2.34 mmol) and morpholine (113 µL, 1.29 mmol) were then added and the mixture was stirred at 90° C. for 2 hours. Solvent was evaporated in vacuo and crude purified by normal phase chromatography (solvent A: cyclohexane, solvent B: ethyl acetate—gradient: 0-50% solvent B) to yield title compound as a pale yellow solid (80 mg, yield 22%). $^1$H NMR (400 MHz, DMSO-$d_6$) δ 11.91 (s, 1H), 7.75 (d, J=2.4 Hz, 1H), 7.59 (dd, J=8.8, 2.3 Hz, 1H), 7.33 (d, J=8.8 Hz, 1H), 3.77 (t, J=4.5 Hz, 4H), 2.97 (t, J=4.5 Hz, 4H), 2.55 (s, 3H). tR 1.82 min (generic method). ESI-MS for $C_{15}H_{15}ClN_2O_3$: calculated 306.1, found m/z 307.0/309.0 [M+H]$^+$.

Step 5. Synthesis of 6-chloro-3-[(E)-3-(4-methoxyphenyl)prop-2-enoyl]-4-morpholino-1H-quinolin-2-one

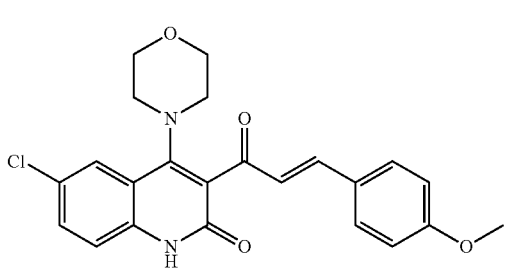 [SMILES: COc1ccc(/C=C/C(=O)c2c(N3CCOCC3)c3cc(Cl)ccc3[nH]c2=O)cc1]

In a round-bottom flask, 3-acetyl-6-chloro-4-morpholino-1H-quinolin-2-one (250 mg, 0.82 mmol) was suspended in a 4:3 mixture of ethanol (9 mL) and water (7 mL). The mixture was cooled to 0° C. and potassium hydroxide (1.14 g, 20.38 mmol) was added. After stirring for 45 minutes at 0° C., p-anisaldehyde (179 µL, 1.48 mmol) was added. The reaction was stirred overnight at room temperature, afterwards acetic acid (1.175 mL, 20.38 mmol) was added at 0° C., resulting in a precipitate that was filtered and washed with ethanol (20 mL). The solid was dissolved in $CH_2Cl_2$ (50 mL) and washed with water (50 mL) and brine (50 mL). The solvent was evaporated in vacuo to yield the title compound as a yellow solid (238 mg, Yield 68%). $^1$H NMR (400 MHz, DMSO-$d_6$) δ 11.86 (s, 1H), 7.76 (d, J=2.4 Hz, 1H), 7.70 (d, J=8.8 Hz, 2H), 7.60 (dd, J=8.8, 2.4 Hz, 1H), 7.50 (d, J=16.2 Hz, 1H), 7.35 (d, J=8.8 Hz, 1H), 7.04-6.95 (m, 3H), 3.80 (s, 3H), 3.72 (t, J=4.5 Hz, 4H), 2.99 (t, J=4.5 Hz, 4H). $R_t$ 2.17 min (generic method). ESI-MS for $C_{23}H_{21}ClN_2O_4$: calculated 424.1, found m/z 425.0/427.0 [M+H]$^+$.

Step 6. Synthesis of 6-chloro-3-[5-(4-methoxyphenyl)-4,5-dihydro-1H-pyrazol-3-yl]-4-morpholino-1H-quinolin-2-one

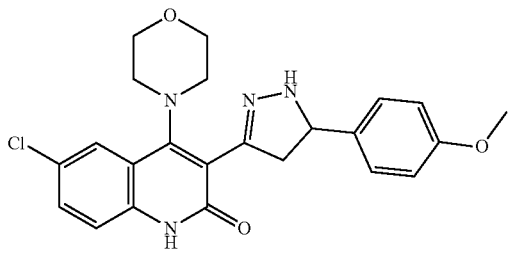 [SMILES: COc1ccc(C2CC(c3c(N4CCOCC4)c4cc(Cl)ccc4[nH]c3=O)=NN2)cc1]

In an appropriately sized microwaveable vessel, 6-chloro-3-[(E)-3-(4-methoxyphenyl)prop-2-enoyl]-4-morpholino-1H-quinolin-2-one (230 mg, 0.54 mmol) was suspended in ethanol (around 5 mL), then hydrazine hydrate (53 µL, 1.08 mmol) added, the reaction mixture microwaved at 110° C. (200 W) for 45 minutes, cooled at room temperature and resulting solid filtered and washed with ethanol (20 mL). Purification by normal phase chromatography (solvent A: dichloromethane, solvent B: ethanol—gradient: 0-100% solvent B) yielded title compound as an off-white solid. (85 mg, Yield 36%). $^1$H NMR (400 MHz, DMSO-d$_6$) δ 11.81 (s, 1H), 7.78 (d, J=2.3 Hz, 1H), 7.55 (dd, J=8.7, 2.3 Hz, 1H), 7.43-7.37 (m, 3H), 7.33 (d, J=8.7 Hz, 1H), 6.92 (d, J=8.6 Hz, 2H), 4.88-4.77 (m, 1H), 3.81-3.75 (m, 4H), 3.75 (s, 3H), 3.42-3.34 (m, 1H), 3.11-2.94 (m, 4H), 2.83 (dd, J=16.4, 11.7 Hz, 1H). R$_t$ 2.11 min (generic method). ESI-MS for C$_{23}$H$_{23}$ClN$_4$O$_3$: calculated 438.1, found m/z 439.1/441.1 [M+H]$^+$.

Step 7. Synthesis of 4-[5-(6-chloro-4-morpholino-2-oxo-1H-quinolin-3-yl)-3-(4-methoxyphenyl)-3,4-dihydropyrazol-2-yl]-4-oxo-butanoic acid

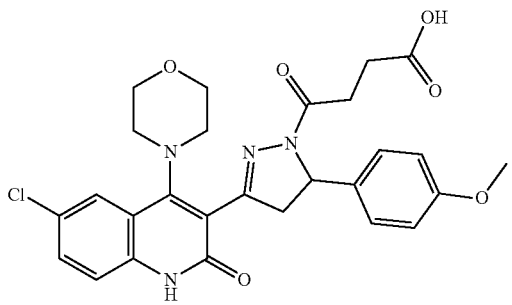 [SMILES: COc1ccc(C2CC(c3c(N4CCOCC4)c4cc(Cl)ccc4[nH]c3=O)=NN2C(=O)CCC(=O)O)cc1]

In an appropriately sized microwaveable vessel, 6-chloro-3-[5-(4-methoxyphenyl)-4,5-dihydro-1H-pyrazol-3-yl]-4-morpholino-1H-quinolin-2-one (13 mg, 0.03 mmol) was dissolved in anhydrous THF (1 mL). Succinic anhydride (6 mg, 0.06 mmol) was then added. The solution was microwaved at 165° C. (200 W) with stirring for 20 min. THF was evaporated and the resulted crude solid was triturated in CH$_2$Cl$_2$ (20 mL) and H$_2$O (20 mL), to obtain the title compound as a yellow solid. Purification by normal phase chromatography (solvent A: dichloromethane, solvent B: methanol—gradient: 0-10% solvent B) yielded title compound as a yellow solid (8 mg, Yield 49%). $^1$H NMR (400 MHz, DMSO-d$_6$) δ 11.97 (s, 2H), 7.79 (d, J=2.4 Hz, 1H), 7.59 (dd, J=8.7, 2.3 Hz, 1H), 7.36 (d, J=8.8 Hz, 1H), 7.27 (d, J=8.7 Hz, 2H), 6.89 (d, J=8.7 Hz, 2H), 5.49 (dd, J=12.1, 5.3 Hz, 1H), 3.83-3.71 (m, 8H), 3.27-3.16 (m, 1H), 3.11-2.99 (m, 4H), 2.93-2.71 (m, 2H), 2.36 (t, J=7.6 Hz, 2H). R$_t$ 1.85 min (generic method). ESI-MS for C$_{27}$H$_{27}$ClN$_4$O$_6$: calculated 538.2, found m/z 539.1/541.0 [M+H]$^+$.

2. Biophysical Assays

ELISA Assay

A competitive ELISA screening assay using biotinylated BRC4 peptide to disrupt the BRC4/RAD51 interaction was performed by modifying the method described by Rajendra et al. (Nucleic Acids Res. 38 (2010) 82-96). BRC4-biotinylated peptide (N-term BiotinKEPTLLGFH-TASGKKVKIAKESLDKVKNLFDEKEQ from Life Technologies) was used to coat 384-well plates (Nunc). After washing with PBS containing 0.05% Tween-20 (PBST), and blocking with the solution BSA 1%/PBST, overnight hybridization with human Rad51 protein (NP_002866 Creative Biomart, NY) was performed. Test compounds were added in dose-response from 0.01 to 100 mM in triplicate with constant DMSO 1%. Antibody raised against Rad51 (Millipore) and HRP-secondary antibody staining to develop the 3,30,5,50-tetramethyllbenzidine signal (Sigma) quenched with 1M HCl was used as the assay readout. Colorimetric measure was read on Victor5 (PerkinElmer) plate Reader. BRC4 and Rad51 were included in the assay as positive control. Results were analyzed using GraphPad Software.

3. Biological Assays

Cell Culture and Treatments

BxPC-3 cells were grown in RPMI 1640 containing 10% FBS, 100 U/ml penicillin/streptomycin, 2 mM glutamine. All media and supplements were from Sigma-Aldrich. Cultures were routinely tested for *Mycoplasma* contamination. Treatments (Olaparib and BRCA2-Rad51 disruptors) were administered in culture medium supplemented with 0.6% DMSO. The same amount of DMSO was added to the control, untreated cultures.

Homologous Recombination Assay (HR)

Homologous recombination (HR) was assessed by using a commercially available assay (Norgen). This assay is based on cell co-transfection with two plasmids that, upon cells entering, recombinate. The efficiency of HR can be assessed by real time PCR, using primer mixtures included in the assay kit. Different primer mixtures allow differentiation between the original plasmid backbones and their recombination product.

BxPC3 cells (2×10$^3$ per well) were seeded in a 24-well plate and allowed to adhere overnight. Co-transfection with the two plasmids was performed in Lipofectamine 2000 (Invitrogen) for 5 h, according to the manufacturer's instructions. During transfection cells were exposed at different doses of BRCA2-Rad51 disruptors, dissolved in RPMI without serum in the presence of 0.6% DMSO.

After washing with PBS, cells were harvested, and DNA was isolated using QIAamp® DNA Mini Kit (Qiagen). Sample concentration was measured using an ONDA Nano Genius photometer.

The thermal cycler (CFX96 ™ Real Time System, Bio-Rad) was programmed as follows: initial denaturation 95° C. for 3 min then 95° C. for 15 sec., 61° C. for 30 sec., 72° C. for 1 min and repeated for 40 cycles. Melt curve analysis was done. Samples were run in triplicate, in 10 µl reaction volume containing 25 ng of template.

In each DNA sample from control and treated cultures, the ΔCt between the recombination product and the backbone plasmids was calculated. HR efficiency was evaluated from the $2^{-\Delta\Delta_{Ct}}$ value obtained by comparing treated vs control samples.

Cell Viability Assay

Cell viability was assessed by CellTiter Glo, Luminescent Cell Viability Assay. Briefly, BxPC-3 cells (1×104/well) were plated in white 96-well plates with clear bottom and treated for 72 h with olaparib (10 µM) or with the BRCA2-Rad51 disruptors, given alone or in combination. After treatments, the plate was allowed to equilibrate at room temperature for 30 min and the CellTiter-Glo reactive was directly added to each well. The plate was kept on a shaker for 2 min to induce cell lysis and its luminescence was measured by using a Fluoroskan Ascent FL reader (Labsystems) using manufacturer's instructions.

Cytotoxicity Assay

Cell death was assessed by applying the CellTox™ Green Cytotoxicity assay (Promega). Briefly, BxPC-3 (1×104/well) were plated in black 96-well plates with clear bottom and treated for 72 h with olaparib (10 µM) or with the BRCA2-Rad51 disruptors, given alone or in combination. At the end of treatment, the CellTox™ dye was added to cell cultures and the green fluorescence signal, which is produced by the binding interaction with dead cell DNA, was measured following the manufacturer's instructions. The fluorescence signal was detected using the EnSpire 2300 Multilabel Reader (Perkin Elmer); for each sample, the obtained signal was normalized on the number of viable cells, detected by the CellTiterGlo reagent.

Table 1 provides a summary of ELISA and Biological assays results.

TABLE 1

| Compound number | Chemical structure | IUPAC name | ELISA and Biological tests results |
|---|---|---|---|
| d.1 | | 4-[5-(6-chloro-2-oxo-4-phenyl-1H-quinolin-3-yl)-3-(4-fluorophenyl)-3,4-dihydropyrazol-2-yl]-4-oxo-butanoic acid | ELISA assay: $EC_{50}$ 38 ± 4 µM Cell viability: $EC_{50}$ >50 µM |
| d.2 | | 3-[2-acetyl-3-(4-fluorophenyl)-3,4-dihydropyrazol-5-yl]-6-chloro-4-phenyl-1H-quinolin-2-one | ELISA assay: $EC_{50}$ 50 ± 10 µM Cell viability: $EC_{50}$ 37 µM |
| d.3 | | 6-chloro-3-[3-(4-fluorophenyl)-2-propanoyl-3,4-dihydropyrazol-5-yl]-4-phenyl-1H-quinolin-2-one | ELISA assay: $EC_{50}$ 34 ± 3 µM |
| d.4 | | 3-[2-(3-aminopropanoyl)-3-(4-fluorophenyl)-3,4-dihydropyrazol-5-yl]-6-chloro-4-phenyl-1H-quinolin-2-one | ELISA assay: >100 µM Cell viability: $EC_{50}$ 7.6 µM |

TABLE 1-continued

| Compound number | Chemical structure | IUPAC name | ELISA and Biological tests results |
|---|---|---|---|
| d.5 | | 4-[5-(6-chloro-2-oxo-4-phenyl-1H-quinolin-3-yl)-3-(4-chlorophenyl)-3,4-dihydropyrazol-2-yl]-4-oxo-butanoic acid | ELISA assay: $EC_{50}$ 50 μM<br>Cell viability: $EC_{50}$ >50 μM |
| d.6 | | 3-[2-acetyl-3-(4-chlorophenyl)-3,4-dihydropyrazol-5-yl]-6-chloro-4-phenyl-1H-quinolin-2-one | ELISA assay: $EC_{50}$ 20 μM<br>Cell viability: $EC_{50}$ 20 μM<br>HR inhibition: 24% at 10 μM |
| d.7 | | 6-chloro-3-[3-(4-chlorophenyl)-2-propanoyl-3,4-dihydropyrazol-5-yl]-4-phenyl-1H-quinolin-2-one | ELISA assay: $EC_{50}$ 20 μM<br>Cell viability: $EC_{50}$ 20 μM |
| d.8 | | 4-[3-(4-bromophenyl)-5-(6-chloro-2-oxo-4-phenyl-1H-quinolin-3-yl)-3,4-dihydropyrazol-2-yl]-4-oxo-butanoic acid | ELISA assay: $EC_{50}$ 16 ± 2 μM<br>Cell viability: $EC_{50}$ 48 μM |
| d.9 | | 3-[2-acetyl-3-(4-bromophenyl)-3,4-dihydropyrazol-5-yl]-6-chloro-4-phenyl-1H-quinolin-2-one | ELISA assay: $EC_{50}$ 38 ± 7 μM<br>Cell viability: $EC_{50}$ 18 μM |

TABLE 1-continued

| Compound number | Chemical structure | IUPAC name | ELISA and Biological tests results |
|---|---|---|---|
| d.10 | | 3-[3-(4-bromophenyl)-2-propanoyl-3,4-dihydropyrazol-5-yl]-6-chloro-4-phenyl-1H-quinolin-2-one | ELISA assay: $EC_{50}$ 19 ± 1 µM |
| d.11 | | 4-[5-(6-chloro-2-oxo-4-phenyl-1H-quinolin-3-yl)-3-(4-methoxyphenyl)-3,4-dihydropyrazol-2-yl]-4-oxo-butanoic acid | ELISA assay: >100 µM Cell viability: $EC_{50}$ >50 µM |
| d.12 | | 6-chloro-3-[3-(4-methoxyphenyl)-2-propanoyl-3,4-dihydropyrazol-5-yl]-4-phenyl-1H-quinolin-2-one | ELISA assay: $EC_{50}$ 19 ± 1 µM Cell viability: $EC_{50}$ 19 µM Olaparib Assoc.: synergy HR inhibition: IC50 18.39 µM |
| d.14 | | 4-[5-(6-chloro-2-oxo-4-phenyl-1H-quinolin-3-yl)-3-[4-(trifluoromethyl)phenyl]-3,4-dihydropyrazol-2-yl]-4-oxo-butanoic acid | ELISA assay: $EC_{50}$ 29 ± 2 µM Cell viability: $EC_{50}$ 50 µM |
| d.15 | | 3-[2-acetyl-3-[4-(trifluoromethyl)phenyl]-3,4-dihydropyrazol-5-yl]-6-chloro-4-phenyl-1H-quinolin-2-one | ELISA assay: >100 µM Cell viability: $EC_{50}$ 11.4 µM |

TABLE 1-continued

| Compound number | Chemical structure | IUPAC name | ELISA and Biological tests results |
|---|---|---|---|
| d.16 | 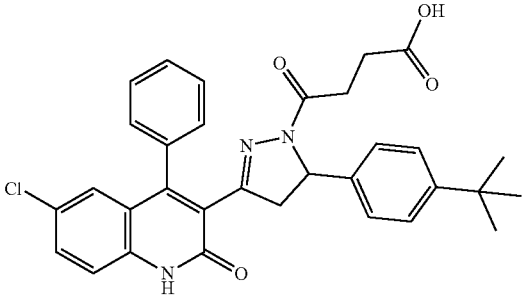 [SMILES: CC(C)(C)c1ccc(C2CC(c3c(-c4ccccc4)c4cc(Cl)ccc4[nH]c3=O)=NN2C(=O)CCC(=O)O)cc1] | 4-[3-(4-tert-butylphenyl)-5-(6-chloro-2-oxo-4-phenyl-1H-quinolin-3-yl)-3,4-dihydropyrazol-2-yl]-4-oxo-butanoic acid | ELISA assay: >100 µM Cell viability: $EC_{50}$ 71.2 µM |
| d.17 | 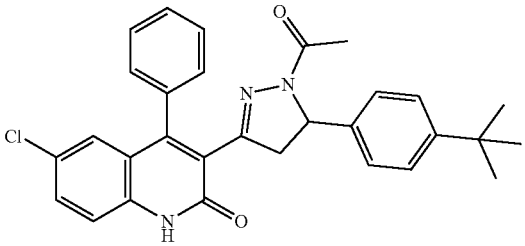 [SMILES: CC(=O)N1N=C(c2c(-c3ccccc3)c3cc(Cl)ccc3[nH]c2=O)CC1c1ccc(C(C)(C)C)cc1] | 3-[2-acetyl-3-(4-tert-butylphenyl)-3,4-dihydropyrazol-5-yl]-6-chloro-4-phenyl-1H-quinolin-2-one | ELISA assay: $EC_{50}$ 15 ± 4 µM Cell viability: $EC_{50}$ 15 µM |
| d.18 | 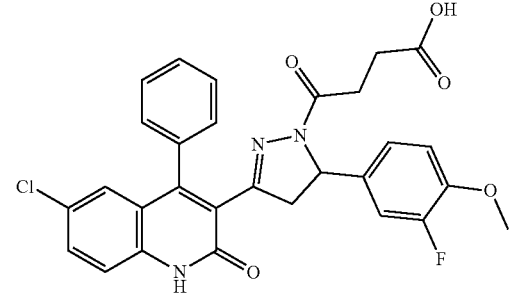 [SMILES: COc1ccc(C2CC(c3c(-c4ccccc4)c4cc(Cl)ccc4[nH]c3=O)=NN2C(=O)CCC(=O)O)cc1F] | 4-[5-(6-chloro-2-oxo-4-phenyl-1H-quinolin-3-yl)-3-(3-fluoro-4-methoxy-phenyl)-3,4-dihydropyrazol-2-yl]-4-oxo-butanoic acid | ELISA assay: >100 µM Cell viability: $EC_{50}$ 73 µM |
| d.19 | 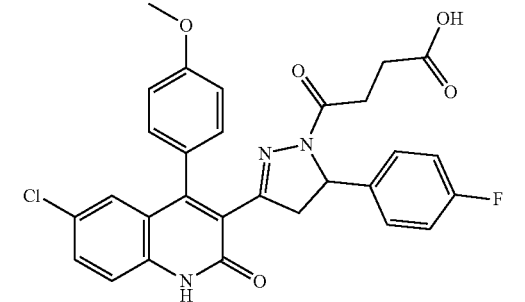 [SMILES: COc1ccc(-c2c(C3=NN(C(=O)CCC(=O)O)C(c4ccc(F)cc4)C3)c(=O)[nH]c3ccc(Cl)cc23)cc1] | 4-[5-[6-chloro-4-(4-methoxyphenyl)-2-oxo-1H-quinolin-3-yl]-3-(4-fluorophenyl)-3,4-dihydropyrazol-2-yl]-4-oxo-butanoic acid | ELISA assay: >100 µM Cell viability: $EC_{50}$ 76 µM |
| d.20 | 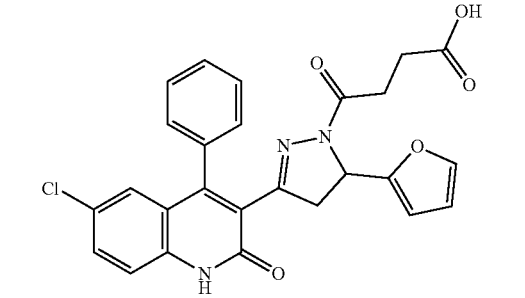 [SMILES: O=C(O)CCC(=O)N1N=C(c2c(-c3ccccc3)c3cc(Cl)ccc3[nH]c2=O)CC1c1ccco1] | 4-[5-(6-chloro-2-oxo-4-phenyl-1H-quinolin-3-yl)-3-(2-furyl)-3,4-dihydropyrazol-2-yl]-4-oxo-butanoic acid | ELISA assay: >100 µM Cell viability: $EC_{50}$ >100 µM |

TABLE 1-continued

| Compound number | Chemical structure | IUPAC name | ELISA and Biological tests results |
|---|---|---|---|
| d.21 | | 3-[2-acetyl-3-(2-furyl)-3,4-dihydropyrazol-5-yl]-6-chloro-4-phenyl-1H-quinolin-2-one | ELISA assay: >100 µM<br>Cell viability: $EC_{50}$ 23 µM |
| d.22 | | 4-[5-(6-chloro-2-oxo-4-phenyl-1H-quinolin-3-yl)-3-(1-methylindol-5-yl)-3,4-dihydropyrazol-2-yl]-4-oxo-butanoic acid | ELISA assay: $EC_{50}$ 2 ± 0.5 µM<br>Cell viability: $EC_{50}$ >20 µM<br>Olaparib Assoc.: synergy |
| d.23 | | 3-[2-acetyl-3-(1-methylindol-5-yl)-3,4-dihydropyrazol-5-yl]-6-chloro-4-phenyl-1H-quinolin-2-one | ELISA assay: $EC_{50}$ 18 ± 1 µM<br>Cell viability: $EC_{50}$ 4.8 µM |
| d.24 | | 4-[5-(6-chloro-2-oxo-4-phenyl-1H-quinolin-3-yl)-3-(1-ethylindol-5-yl)-3,4-dihydropyrazol-2-yl]-4-oxo-butanoic acid | ELISA assay: $EC_{50}$ 10 ± 2 µM<br>Cell viability: $EC_{50}$ >40 µM |
| d.25 | | 3-[2-acetyl-3-(1-ethylindol-5-yl)-3,4-dihydropyrazol-5-yl]-6-chloro-4-phenyl-1H-quinolin-2-one | ELISA assay: $EC_{50}$ 50 ± 15 µM |

TABLE 1-continued

| Compound number | Chemical structure | IUPAC name | ELISA and Biological tests results |
|---|---|---|---|
| d.26 | | 4-[5-(6-chloro-2-oxo-4-phenyl-1H-quinolin-3-yl)-3-(1-methylindazol-5-yl)-3,4-dihydropyrazol-2-yl]-4-oxo-butanoic acid | ELISA assay: $EC_{50}$ 13 ± 3 μM Cell viability: $EC_{50}$ >50 μM |
| d.27 | | 3-[2-acetyl-3-(1-methylindazol-5-yl)-3,4-dihydropyrazol-5-yl]-6-chloro-4-phenyl-1H-quinolin-2-one | ELISA assay: $EC_{50}$ 9 ± 2 μM Cell viability: $EC_{50}$ 21 μM |
| d.28 | | 4-[5-(6-chloro-2-oxo-4-phenyl-1H-quinolin-3-yl)-3-(2-methylindazol-5-yl)-3,4-dihydropyrazol-2-yl]-4-oxo-butanoic acid | ELISA assay: $EC_{50}$ >100 μM Cell viability: >100 μM |
| d.29 | | 4-[5-(6-chloro-2-oxo-4-phenyl-1H-quinolin-3-yl)-3-(2-ethylindazol-5-yl)-3,4-dihydropyrazol-2-yl]-4-oxo-butanoic acid | ELISA assay: $EC_{50}$ 28 ± 4 μM Cell viability: $EC_{50}$ >50 μM |
| d.30 | | 3-[2-acetyl-3-(2-ethylindazol-5-yl)-3,4-dihydropyrazol-5-yl]-6-chloro-4-phenyl-1H-quinolin-2-one | ELISA assay: >100 μM Cell viability: $EC_{50}$ 16.8 μM |

TABLE 1-continued

| Compound number | Chemical structure | IUPAC name | ELISA and Biological tests results |
|---|---|---|---|
| d.31 | | 4-[5-(6-chloro-2-oxo-4-phenyl-1H-quinolin-3-yl)-3-(1-ethylindazol-5-yl)-3,4-dihydropyrazol-2-yl]-4-oxo-butanoic acid | ELISA assay: >100 µM Cell viability: EC$_{50}$ >50 µM |
| d.32 | | 3-[2-acetyl-3-(1-ethylindazol-5-yl)-3,4-dihydropyrazol-5-yl]-6-chloro-4-phenyl-1H-quinolin-2-one | ELISA assay: EC$_{50}$ 40 ± 3 µM Cell viability: 27.0 µM |
| d.33 | | 4-[5-(6-chloro-2-oxo-4-phenyl-1H-quinolin-3-yl)-3-(1-propylindazol-5-yl)-3,4-dihydropyrazol-2-yl]-4-oxo-butanoic acid | ELISA assay: >100 µM Cell viability: EC$_{50}$ >100 µM |
| d.34 | | 3-[2-acetyl-3-(1-propylindazol-5-yl)-3,4-dihydropyrazol-5-yl]-6-chloro-4-phenyl-1H-quinolin-2-one | ELISA experiment: EC$_{50}$ 0.95 ± 0.05 µM Cell viability: EC$_{50}$ 11 µM HR inhibition: +83% at 5 µM |
| d.35 | | 4-[5-(6-chloro-2-oxo-4-phenyl-1H-quinolin-3-yl)-3-(2-propylindazol-5-yl)-3,4-dihydropyrazol-2-yl]-4-oxo-butanoic acid | ELISA assay: >100 µM Cell viability: EC$_{50}$ 62.6 µM |

TABLE 1-continued

| Compound number | Chemical structure | IUPAC name | ELISA and Biological tests results |
|---|---|---|---|
| d.36 | | 4-[5-(6-chloro-2-oxo-4-phenyl-1H-quinolin-3-yl)-3-[4-(4-fluorophenyl)phenyl]-3,4-dihydropyrazol-2-yl]-4-oxo-butanoic acid | ELISA assay: $EC_{50}$ 13 ± 1 μM<br>Cell viability: $EC_{50}$ 31 μM |
| d.37 | | 4-[5-(6-chloro-2-oxo-4-phenyl-1H-quinolin-3-yl)-3-[4-(4-chlorophenyl)phenyl]-3,4-dihydropyrazol-2-yl]-4-oxo-butanoic acid | ELISA assay: $EC_{ao}$ 25 ± 5 μM<br>Cell viability: 41.5 μM |
| d.38 | | 3-[2-acetyl-3-[4-(4-chlorophenyl)phenyl]-3,4-dihydropyrazol-5-yl]-6-chloro-4-phenyl-1H-quinolin-2-one | ELISA assay: $EC_{50}$ 45 ± 8 μM<br>Cell viability: 18.8 μM |
| d.39 | | 4-[3-[4-(4-bromophenyl)phenyl]-5-(6-chloro-2-oxo-4-phenyl-1H-quinolin-3-yl)-3,4-dihydropyrazol-2-yl]-4-oxo-butanoic acid | ELISA assay: $EC_{50}$ 20 ± 2 μM<br>Cell viability: $EC_{50}$ 43 μM |
| d.40 | | 3-[2-acetyl-3-[4-(4-bromophenyl)phenyl]-3,4-dihydropyrazol-5-yl]-6-chloro-4-phenyl-1H-quinolin-2-one | ELISA assay: $EC_{50}$ 45 ± 8 μM<br>Cell viability: $EC_{50}$ 28 μM |

TABLE 1-continued

| Compound number | Chemical structure | IUPAC name | ELISA and Biological tests results |
|---|---|---|---|
| d.41 | | 4-[5-(6-chloro-2-oxo-4-phenyl-1H-quinolin-3-yl)-3-[4-(4-methoxyphenyl)phenyl]-3,4-dihydropyrazol-2-yl]-4-oxo-butanoic acid | ELISA assay: $EC_{50}$ 20 ± 4 µM Cell viability: $EC_{50}$ 40.6 µM |
| d.42 | | 3-[2-acetyl-3-[4-(4-methoxyphenyl)phenyl]-3,4-dihydropyrazol-5-yl]-6-chloro-4-phenyl-1H-quinolin-2-one | ELISA assay: $EC_{50}$ 70 ± 6 µM |
| d.43 | | 4-[5-(6-chloro-2-oxo-4-phenyl-1H-quinolin-3-yl)-3-[4-(1-propylpyrazol-4-yl)phenyl]-3,4-dihydropyrazol-2-yl]-4-oxo-butanoic acid | ELISA assay: $EC_{50}$ 65 ± 5 µM Cell viability: 74.2 µM |
| d.44 | | 3-[2-acetyl-3-[4-(1-propylpyrazol-4-yl)phenyl]-3,4-dihydropyrazol-5-yl]-6-chloro-4-phenyl-1H-quinolin-2-one | ELISA assay: $EC_{50}$ 46 ± 9 µM |
| d.45 | | 4-[5-(6-chloro-2-oxo-4-phenyl-1H-quinolin-3-yl)-3-[4-(1-ethylindazol-5-yl)phenyl]-3,4-dihydropyrazol-2-yl]-4-oxo-butanoic acid | ELISA assay: $EC_{50}$ 15 ± 3 µM Cell |

TABLE 1-continued

| Compound number | Chemical structure | IUPAC name | ELISA and Biological tests results |
|---|---|---|---|
| d.46 | | 4-[5-(6-chloro-2-oxo-4-phenyl-1H-quinolin-3-yl)-3-[4-(2-ethylindazol-5-yl)phenyl]-3,4-dihydropyrazol-2-yl]-4-oxo-butanoic acid | ELISA assay: $EC_{50}$ 17 ± 4 µM Cell viability: $EC_{50}$ 44 µM Olaparib Assoc.: synergy HR inhibition: 91.7% at 40 µM |
| d.47 | | 3-(2-acetyl-3-phenyl-3,4-dihydropyrazol-5-yl)-6-chloro-4-phenyl-1H-quinolin-2-one | ELISA assay: $EC_{50}$ 19 ± 3 µM Cell viability: 29.7 µM |
| d.48 | | 6-chloro-4-phenyl-3-(3-phenyl-2-propanoyl-3,4-dihydropyrazol-5-yl)-1H-quinolin-2-one | ELISA assay: $EC_{50}$ 24 ± 4 µM Cell viability: 13.73 µM |
| d.49 | | 3-[2-acetyl-3-(p-tolyl)-3,4-dihydropyrazol-5-yl]-6-chloro-4-phenyl-1H-quinolin-2-one | ELISA assay: $EC_{50}$ 20 ± 1 µM Cell viability: $EC_{50}$ 15.2 µM |
| d.50 | | 4-[5-(4-benzyl-6-chloro-2-oxo-1H-quinolin-3-yl)-3-(4-fluorophenyl)-3,4-dihydropyrazol-2-yl]-4-oxo-butanoic acid | ELISA assay: $EC_{50}$ 40 ± 3 µM Cell viability: $EC_{50}$ 15.2 µM |

TABLE 1-continued

| Compound number | Chemical structure | IUPAC name | ELISA and Biological tests results |
|---|---|---|---|
| d.51 | | 3-[2-acetyl-3-(4-fluorophenyl)-3,4-dihydropyrazol-5-yl]-4-benzyl-6-chloro-1H-quinolin-2-one | ELISA assay: $EC_{50}$ 13 ± 4 µM Cell viability: $EC_{50}$ 15.2 µM |
| d.52 | | 3-[2-acetyl-3-(4-methoxyphenyl)-3,4-dihydropyrazol-5-yl]-4-benzyl-6-chloro-1H-quinolin-2-one | ELISA assay: $EC_{50}$ 20 ± 2 µM Cell viability: $EC_{50}$ 13.74 µM |
| d.53 | | 4-benzyl-6-chloro-3-[3-(4-methoxyphenyl)-2-propanoyl-3,4-dihydropyrazol-5-yl]-1H-quinolin-2-one | ELISA assay: $EC_{50}$ 20 ± 6 µM |
| d.54 | | 4-benzyl-6-chloro-3-[3-(4-fluorophenyl)-2-propanoyl-3,4-dihydropyrazol-5-yl]-1H-quinolin-2-one | ELISA assay: $EC_{50}$ 65 ± 10 µM |
| d.55 | | 4-[5-(4-benzyl-6-chloro-2-oxo-1H-quinolin-3-yl)-3-(4-chlorophenyl)-3,4-dihydropyrazol-2-yl]-4-oxo-butanoic acid | ELISA assay: $EC_{50}$ 70 ± 9 µM Cell viability: $EC_{50}$ 23.21 µM |

TABLE 1-continued

| Compound number | Chemical structure | IUPAC name | ELISA and Biological tests results |
|---|---|---|---|
| d.58 | | 4-[5-(4-benzyl-6-chloro-2-oxo-1H-quinolin-3-yl)-3-(4-bromophenyl)-3,4-dihydropyrazol-2-yl]-4-oxo-butanoic acid | ELISA assay: $EC_{50}$ 40 ± 5 µM Cell viability: $EC_{50}$ 23.64 µM |
| d.61 | | 4-[5-(4-benzyl-6-chloro-2-oxo-1H-quinolin-3-yl)-3-(4-methoxyphenyl)-3,4-dihydropyrazol-2-yl]-4-oxo-butanoic acid | ELISA assay: $EC_{50}$ >100 µM |
| d.66 | | 4-[5-(4-benzyl-6-chloro-2-oxo-1H-quinolin-3-yl)-3-(3-fluoro-4-methoxyphenyl)-3,4-dihydropyrazol-2-yl]-4-oxo-butanoic acid | ELISA assay: $EC_{50}$ 25 ± 5 µM Cell viability: $EC_{50}$ 79.23 µM HR inhibition: 6.15% at 20 µM |
| d.69 | | 4-[5-(4-benzyl-6-chloro-2-oxo-1H-quinolin-3-yl)-3-(1-methylindol-5-yl)-3,4-dihydropyrazol-2-yl]-4-oxo-butanoic acid | ELISA assay: $EC_{50}$ 10 ± 2 µM |
| d.73 | | 4-[5-(4-benzyl-6-chloro-2-oxo-1H-quinolin-3-yl)-3-(1-methylindazol-5-yl)-3,4-dihydropyrazol-2-yl]-4-oxo-butanoic acid | ELISA assay: $EC_{50}$ 40 ± 5 µM Cell viability: $EC_{50}$ 81.81 µM |

TABLE 1-continued

| Compound number | Chemical structure | IUPAC name | ELISA and Biological tests results |
|---|---|---|---|
| d.83 | | 4-[5-(4-benzyl-6-chloro-2-oxo-1H-quinolin-3-yl)-3-[4-(4-fluorophenyl)phenyl]-3,4-dihydropyrazol-2-yl]-4-oxo-butanoic acid | ELISA assay:<br>$EC_{50}$ 12 ± 2 µM |
| d.84 | | 4-[5-(4-benzyl-6-chloro-2-oxo-1H-quinolin-3-yl)-3-[4-(4-chlorophenyl)phenyl]-3,4-dihydropyrazol-2-yl]-4-oxo-butanoic acid | ELISA assay:<br>$EC_{50}$ 90 ± 5 µM<br>Cell viability:<br>$EC_{50}$ 28.41 µM<br>HR inhibition:<br>21.72% at 20 µM |
| d.89 | | 3-[2-acetyl-3-[4-(4-methoxyphenyl)phenyl]-3,4-dihydropyrazol-5-yl]-4-benzyl-6-chloro-1H-quinolin-2-one | ELISA assay:<br>$EC_{50}$ 105 ± 20 µM |
| d.93 | | 4-[5-(4-benzyl-6-chloro-2-oxo-1H-quinolin-3-yl)-3-[4-(2-ethylindazol-5-yl)phenyl]-3,4-dihydropyrazol-2-yl]-4-oxo-butanoic acid | ELISA assay:<br>$EC_{50}$ 53 ± 5 µM<br>Cell viability:<br>$EC_{50}$ 56.62 µM |
| d.97 | | 3-[2-acetyl-3-(4-pyridyl)-3,4-dihydropyrazol-5-yl]-6-chloro-4-phenyl-1H-quinolin-2-one | ELISA assay:<br>$EC_{50}$ 60 ± 7 µM<br>Cell viability:<br>$EC_{50}$ 24.33 µM |

TABLE 1-continued

| Compound number | Chemical structure | IUPAC name | ELISA and Biological tests results |
|---|---|---|---|
| d.98 | 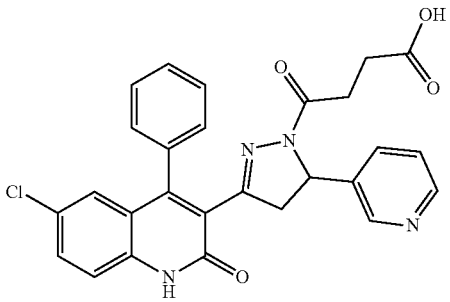 [SMILES: O=C(O)CCC(=O)N1N=C(c2c(-c3ccccc3)c3cc(Cl)ccc3[nH]c2=O)CC1c1cccnc1] | 4-[5-(6-chloro-2-oxo-4-phenyl-1H-quinolin-3-yl)-3-(3-pyridyl)-3,4-dihydropyrazol-2-yl]-4-oxo-butanoic acid | ELISA assay: $EC_{50}$ 75 ± 12 μM Cell viability: $EC_{50}$ 143.83 μM HR inhibition: 21.97 % at 20 μM |
| d.99 | 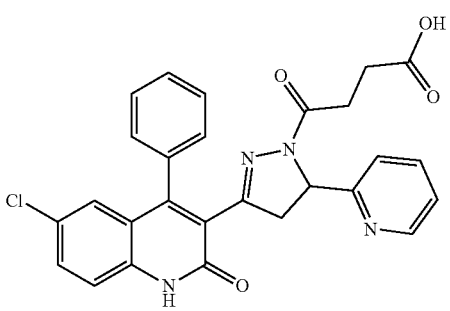 [SMILES: O=C(O)CCC(=O)N1N=C(c2c(-c3ccccc3)c3cc(Cl)ccc3[nH]c2=O)CC1c1ccccn1] | 4-[5-(6-chloro-2-oxo-4-phenyl-1H-quinolin-3-yl)-3-(2-pyridyl)-3,4-dihydropyrazol-2-yl]-4-oxo-butanoic acid | ELISA assay: $EC_{50}$ 190 ± 20 μM |
| d.100 | 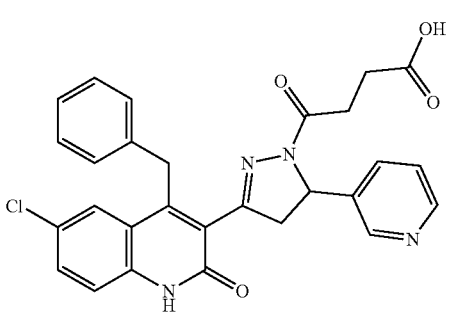 [SMILES: O=C(O)CCC(=O)N1N=C(c2c(Cc3ccccc3)c3cc(Cl)ccc3[nH]c2=O)CC1c1cccnc1] | 4-[5-(4-benzyl-6-chloro-2-oxo-1H-quinolin-3-yl)-3-(3-pyridyl)-3,4-dihydropyrazol-2-yl]-4-oxo-butanoic acid | ELISA assay: $EC_{50}$ 15 ± 5 μM |
| d.104 | 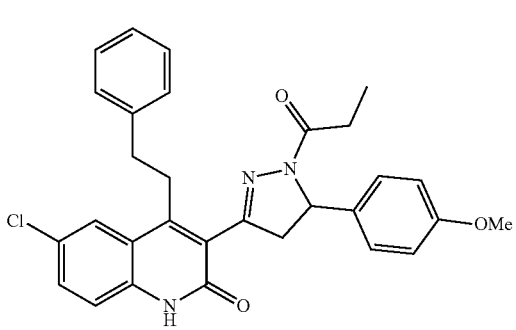 [SMILES: CCC(=O)N1N=C(c2c(CCc3ccccc3)c3cc(Cl)ccc3[nH]c2=O)CC1c1ccc(OC)cc1] | 6-chloro-3-[3-(4-methoxyphenyl)-2-propanoyl-3,4-dihydropyrazol-5-yl]-4-(2-phenylethyl)-1H-quinolin-2-one | ELISA assay: $EC_{50}$ 24 ± 6 μM Cell viability: $EC_{50}$ 53.00 μM |
| d.105 | 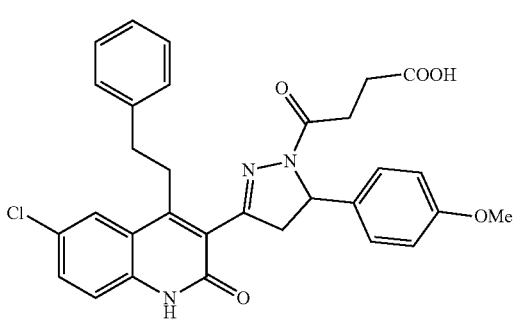 [SMILES: COc1ccc(C2CC(c3c(CCc4ccccc4)c4cc(Cl)ccc4[nH]c3=O)=NN2C(=O)CCC(=O)O)cc1] | 4-[5-[6-chloro-2-oxo-4-(2-phenylethyl)-1H-quinolin-3-yl]-3-(4-methoxyphenyl)-3,4-dihydropyrazol-2-yl]-4-oxo-butanoic acid | ELISA assay: $EC_{50}$ 20 ± 3 μM Cell viability: $EC_{50}$ 29.58 μM |

3. Pharmacokinetic Studies a. Animal Models

Male C57B6/J mice, 8 weeks old were used (Charles River). All procedures were performed in accordance with the Ethical Guidelines of European Communities Council (Directive 2010/63/EU of 22 Sep. 2010) and accepted by the Italian Ministry of Health. All efforts were made to minimize animal suffering and to use the minimal number of animals required to produce reliable results, according to the "3Rs concept". Animals were group-housed in ventilated cages and had free access to food and water. They were maintained under a 12-hour light/dark cycle (lights on at 8:00 am) at controlled temperature (21° C.±1° C.) and relative humidity (55%±10%).

b. Experimental Procedure

Compound d.12 was administered orally (PO), intraperitoneally (IP) and intravenously (IV) to C57B6/J male mice at 2 mg/kg/10 ml, 20 mg/kg/10 ml and 2 mg/kg/5 ml, respectively. Vehicle was composed by PEG400/Tween 80/Saline solution at 10/10/80% in volume, respectively for PO and IV administration. For IP administration, the same vehicle was used with the addition of 10% DMSO in final volume. Three animals per dose were treated. Blood samples at 0, 15, 30, 60, 120, 240, and 480 min after administration were collected for PO and IP arms. Blood samples at 0, 5, 15, 30, 60, 120 and 240 min after administration were collected for IV arm. Plasma was separated from blood by centrifugation for 15 min at 1500 rpm a 4° C., collected in a eppendorf tube and frozen (−80° C.). Control animals treated with vehicle only were also included in the experimental protocol.

c. Pharmacokinetic Measurement Compound d.12

Figure 2:
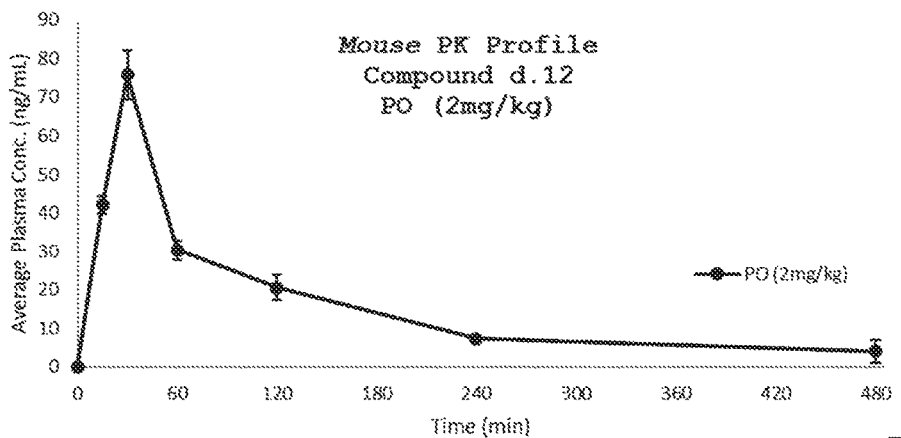
FIG. 2 illustrates the pharmacokinetic profile of compound d.12 administered orally.
Figure 3:
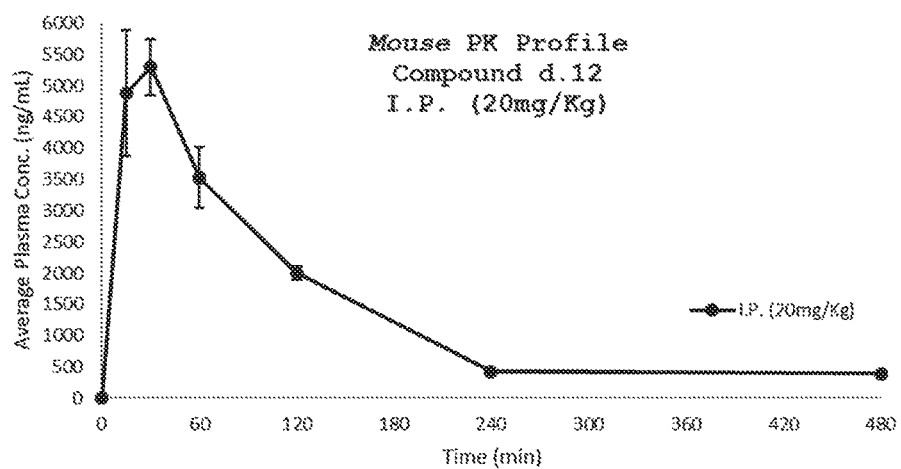
FIG. 3 illustrates the pharmacokinetic profile of compound d.12 administered intraperitoneally.

Plasma samples were centrifuged at 21.100×g for 15 min at 4° C. An aliquot of each plasma sample was extracted (1:3) with cold $CH_3CN$ containing 200 nM of d.48 as internal standard being a close analogue of the parent compound. A calibration curve was prepared in naïve mouse plasma over a 1 nM-10 µM range. Three quality control samples were prepared by spiking the parent compound in naïve mouse plasma to 20, 200 and 2000 nM as final concentrations. The calibrators and quality control samples were extracted (1:3) with the same extraction solution as the plasma samples. The plasma samples, calibrators and quality control samples were centrifuged at 3.270×g for 15 min at 4° C. The supernatants were further diluted (1:1) with $H_2O$, and analyzed by LC/MS-MS on a Waters ACQUITY UPLC/MS TQD system consisting of a Triple Quadrupole Detector (TQD) Mass Spectrometer equipped with an Electrospray Ionization interface and a Photodiode Array e, Detector from Waters Inc. (Milford, MA, USA). Electrospray ionization was applied in positive mode. Compound-dependent parameters as MRM transitions and collision energy were developed for the parent compound and the internal standard. The analyses were run on an ACQUITY UPLC BEH C18 (50×2.1 mmID, particle size 1.7 µm) with a VanGuard BEH C18 pre-column (5×2.1 mmID, particle size 1.7 µm) at 40° C., using $H_2O$+0.1% HCOOH (A) and $CH_3CN$+0.1% HCOOH (B) as mobile phase at 0.5 mL/min. A linear gradient was applied starting at 40% B with an initial hold for 0.2 min, then 40-100% B in 2 min, followed by a hold for 0.1 min at 100% B. All samples (plasma samples, calibrators and quality controls) were quantified by MRM peak area response factor in order to determine the levels of the parent compound in plasma. The plasma concentrations versus time were plotted and the profiles were fitted using PK Solutions Excel Application (Summit Research Service, USA) in order to determine the pharmacokinetic parameters. The results are reported in Tables 2 and 3 and in FIGS. 1, 2 and 3.

TABLE 2

| Time Points min | IV (2 mg/kg) | | PO (2 mg/kg) | |
|---|---|---|---|---|
| | Average conc. ng/mL | STD | Average conc. ng/mL | STD |
| 0 | — | — | 0 | 0 |
| 5 | 973 | 81 | — | — |
| 15 | 622 | 16 | 42 | 2 |
| 30 | 515 | 39 | 76 | 6 |
| 60 | 337 | 16 | 30 | 3 |
| 120 | 146 | 11 | 21 | 3 |
| 240 | 23 | 3 | 7 | 0 |
| 480 | — | — | 4 | 3 |

TABLE 3

| | | PK Parameters | | |
|---|---|---|---|---|
| Parameter | Unit | IV (2 mg/kg) | PO (2 mg/kg) | IP (20 mg/kg) |
| Cmax (obs) | ng/mL | 973 | 76 | 5304 |
| Tmax (obs) | min | 5 | 30 | 30 |
| AUC (calc) [1] | min*ng/mL | 53913 | 6000 | 557088 |
| $t_{1/2}$ (calc) | min | 47 | 281 | 175 |
| VD (calc) | mL/kg | 2199 | 90009 | 6701 |
| CL (calc) | mL/min/Kg | 33 | 222 | 27 |
| $F^2$ | % | | 11 | — |

BIBLIOGRAPHY (1) Nijman S M B. "Synthetic lethality: General principles, utility and detection using genetic screens in human cells." FEBS Lett. Federation of European Biochemical Societies (2011), 585, 1-6.

(2) Kaelin W G. "The concept of synthetic lethality in the context of anticancer therapy." Nat Rev Cancer 2005; 5:689-98.

(3) Deeks E D. "Olaparib: first global approval." Drugs (2015), 75, 231-40.

(4) Jdey W. et al. "Drug-Driven Synthetic Lethality: Bypassing Tumor Cell Genetics with a Combination of AsiDNA and PARP Inhibitors. Clin. Cancer Res. (2017), 23, 1001-1011.

(5) Roy R, Chun J, Powell S N. "BRCA1 and BRCA2: different roles in a common pathway of genome protection". Nat Rev Cancer Nature Publishing Group (2012), 12, 68-78.

(6) Falchi F. et al, "Synthetic Lethality Triggered by Combining Olaparib with BRCA2-Rad51 Disruptors." ACS Chem Biol. (2017), 12(10), 2491-2497.

(7) Roberti M. et al, "Rad51/BRCA2 disruptors inhibit homologous recombination and synergize with olaparib in pancreatic cancer cells", European Journal of Medicinal Chemistry (2019), 165, 80-92.

(8) Klein H L. "The consequences of Rad51 overexpression for normal and tumor cells". DNA Repair (Amst) (2008), 7,686-93.

The invention claimed is:

1. A compound of formula (Ia):

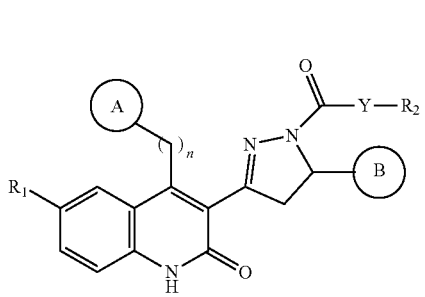

wherein $R_1$ is halogen;

$R_2$ is selected from the group consisting of hydrogen and COOH;

n is 1;

Y is $C_{1-4}$alkyl;

A is phenyl;

B is selected from the group consisting of

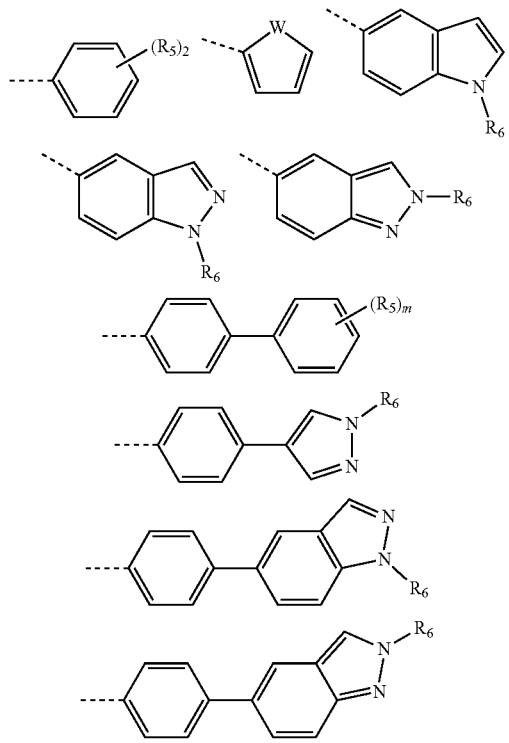

$R_5$ is hydrogen, halogen, linear or branched $C_{1-4}$alkyl, halo-$C_{1-4}$alkyl, O—$C_{1-4}$alkyl;

$R_6$ is selected from the group consisting of H and $C_{1-4}$alkyl;

m is 1 or 2; and

W is selected from the group consisting of O and NH;

or compounds of formula (Ia):

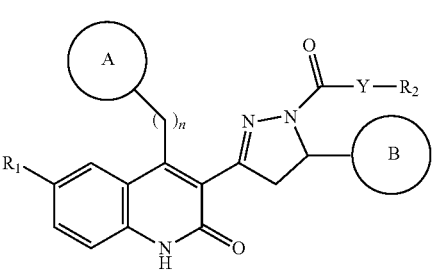

wherein $R_1$ is halogen;

$R_2$ is selected from the group consisting of hydrogen and COOH;

n is 0;

Y is selected from the group consisting of $C_{1-4}$alkyl;

A is morpholino;

B is

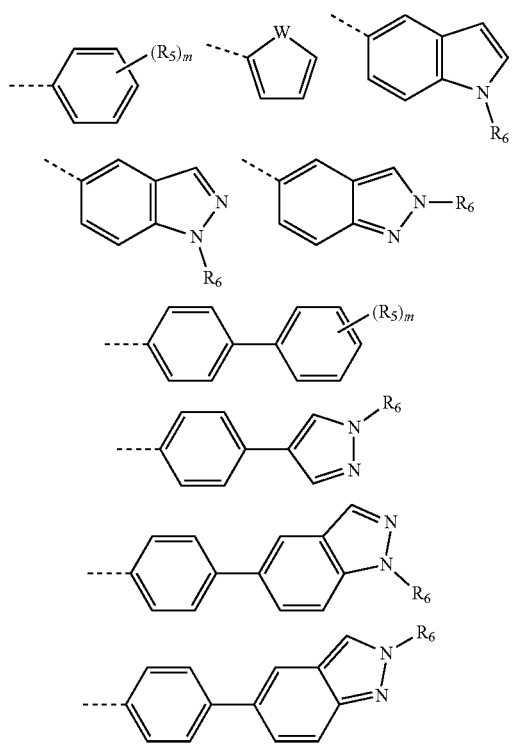

$R_5$ is hydrogen, halogen, linear or branched $C_{1-4}$alkyl, halo-$C_{1-4}$alkyl, O—$C_{1-4}$alkyl;

$R_6$ is selected from the group consisting of H and $C_{1-4}$alkyl;

m is 1 or 2; and

W is selected from the group consisting of O and NH, or their pharmaceutically acceptable salts or solvates or isomers thereof.

2. The compound according to claim 1 selected from the group consisting of:

| | |
|---|---|
| d.50 | 4-[5-(4-benzyl-6-chloro-2-oxo-1H-quinolin-3-yl)-3-(4-fluorophenyl)-3,4-dihydropyrazol-2-yl]-4-oxo-butanoic acid |
| d.51 | 3-[2-acetyl-3-(4-fluorophenyl)-3,4-dihydropyrazol-5-yl]-4-benzyl-6-chloro-1H-quinolin-2-one |
| d.52 | 3-[2-acetyl-3-(4-methoxyphenyl)-3,4-dihydropyrazol-5-yl]-4-benzyl-6-chloro-1H-quinolin-2-one |
| d.53 | 4-benzyl-6-chloro-3-[3-(4-methoxyphenyl)-2-propanoyl-3,4-dihydropyrazol-5-yl]-1H-quinolin-2-one |
| d.54 | 4-benzyl-6-chloro-3-[3-(4-fluorophenyl)-2-propanoyl-3,4-dihydropyrazol-5-yl]-1H-quinolin-2-one |
| d.55 | 4-[5-(4-benzyl-6-chloro-2-oxo-1H-quinolin-3-yl)-3-(4-chlorophenyl)-3,4-dihydropyrazol-2-yl]-4-oxo-butanoic acid |
| d.56 | 3-[2-acetyl-3-(4-chlorophenyl)-3,4-dihydropyrazol-5-yl]-4-benzyl-6-chloro-1H-quinolin-2-one |
| d.57 | 4-benzyl-6-chloro-3-[3-(4-chlorophenyl)-2-propanoyl-3,4-dihydropyrazol-5-yl]-1H-quinolin-2-one |
| d.58 | 4-[5-(4-benzyl-6-chloro-2-oxo-1H-quinolin-3-yl)-3-(4-bromophenyl)-3,4-dihydropyrazol-2-yl]-4-oxo-butanoic acid |
| d.59 | 3-[2-acetyl-3-(4-bromophenyl)-3,4-dihydropyrazol-5-yl]-4-benzyl-6-chloro-1H-quinolin-2-one |
| d.60 | 4-benzyl-3-[3-(4-bromophenyl)-2-propanoyl-3,4-dihydropyrazol-5-yl]-6-chloro-1H-quinolin-2-one |
| d.61 | 4-[5-(4-benzyl-6-chloro-2-oxo-1H-quinolin-3-yl)-3-(4-methoxyphenyl)-3,4-dihydropyrazol-2-yl]-4-oxo-butanoic acid |
| d.62 | 4-[5-(4-benzyl-6-chloro-2-oxo-1H-quinolin-3-yl)-3-[4-(trifluoromethyl)phenyl]-3,4-dihydropyrazol-2-yl]-4-oxo-butanoic acid |
| d.63 | 3-[2-acetyl-3-[4-(trifluoromethyl)phenyl]-3,4-dihydropyrazol-5-yl]-4-benzyl-6-chloro-1H-quinolin-2-one |
| d.64 | 4-[5-(4-benzyl-6-chloro-2-oxo-1H-quinolin-3-yl)-3-(4-tert-butylphenyl)-3,4-dihydropyrazol-2-yl]-4-oxo-butanoic acid |
| d.65 | 3-[2-acetyl-3-(4-tert-butylphenyl)-3,4-dihydropyrazol-5-yl]-4-benzyl-6-chloro-1H-quinolin-2-one |
| d.66 | 4-[5-(4-benzyl-6-chloro-2-oxo-1H-quinolin-3-yl)-3-(3-fluoro-4-methoxy-phenyl)-3,4-dihydropyrazol-2-yl]-4-oxo-butanoic acid |
| d.67 | 4-[5-(4-benzyl-6-chloro-2-oxo-1H-quinolin-3-yl)-3-(2-furyl)-3,4-dihydropyrazol-2-yl]-4-oxo-butanoic acid |
| d.68 | 3-[2-acetyl-3-(2-furyl)-3,4-dihydropyrazol-5-yl]-4-benzyl-6-chloro-1H-quinolin-2-one |
| d.69 | 4-[5-(4-benzyl-6-chloro-2-oxo-1H-quinolin-3-yl)-3-(1-methylindol-5-yl)-3,4-dihydropyrazol-2-yl]-4-oxo-butanoic acid |
| d.70 | 3-[2-acetyl-3-(1-methylindol-5-yl)-3,4-dihydropyrazol-5-yl]-4-benzyl-6-chloro-1H-quinolin-2-one |
| d.71 | 4-[5-(4-benzyl-6-chloro-2-oxo-1H-quinolin-3-yl)-3-(1-ethylindol-5-yl)-3,4-dihydropyrazol-2-yl]-4-oxo-butanoic acid |
| d.72 | 3-[2-acetyl-3-(1-ethylindol-5-yl)-3,4-dihydropyrazol-5-yl]-4-benzyl-6-chloro-1H-quinolin-2-one |
| d.73 | 4-[5-(4-benzyl-6-chloro-2-oxo-1H-quinolin-3-yl)-3-(1-methylindazol-5-yl)-3,4-dihydropyrazol-2-yl]-4-oxo-butanoic acid |
| d.74 | 3-[2-acetyl-3-(1-methylindazol-5-yl)-3,4-dihydropyrazol-5-yl]-4-benzyl-6-chloro-1H-quinolin-2-one |
| d.75 | 4-[5-(4-benzyl-6-chloro-2-oxo-1H-quinolin-3-yl)-3-(2-methylindazol-5-yl)-3,4-dihydropyrazol-2-yl]-4-oxo-butanoic acid |
| d.76 | 4-[5-(4-benzyl-6-chloro-2-oxo-1H-quinolin-3-yl)-3-(2-ethylindazol-5-yl)-3,4-dihydropyrazol-2-yl]-4-oxo-butanoic acid |
| d.77 | 3-[2-acetyl-3-(2-ethylindazol-5-yl)-3,4-dihydropyrazol-5-yl]-4-benzyl-6-chloro-1H-quinolin-2-one |
| d.78 | 4-[5-(4-benzyl-6-chloro-2-oxo-1H-quinolin-3-yl)-3-(1-ethylindazol-5-yl)-3,4-dihydropyrazol-2-yl]-4-oxo-butanoic acid |
| d.79 | 3-[2-acetyl-3-(1-ethylindazol-5-yl)-3,4-dihydropyrazol-5-yl]-4-benzyl-6-chloro-1H-quinolin-2-one |
| d.80 | 4-[5-(4-benzyl-6-chloro-2-oxo-1H-quinolin-3-yl)-3-(1-propylindazol-5-yl)-3,4-dihydropyrazol-2-yl]-4-oxo-butanoic acid |
| d.81 | 3-[2-acetyl-3-(1-propylindazol-5-yl)-3,4-dihydropyrazol-5-yl]-4-benzyl-6-chloro-1H-quinolin-2-one |
| d.82 | 4-[5-(4-benzyl-6-chloro-2-oxo-1H-quinolin-3-yl)-3-(2-propylindazol-5-yl)-3,4-dihydropyrazol-2-yl]-4-oxo-butanoic acid |
| d.83 | 4-[5-(4-benzyl-6-chloro-2-oxo-1H-quinolin-3-yl)-3-[4-(4-fluorophenyl)phenyl]-3,4-dihydropyrazol-2-yl]-4-oxo-butanoic acid |
| d.84 | 4-[5-(4-benzyl-6-chloro-2-oxo-1H-quinolin-3-yl)-3-[4-(4-chlorophenyl)phenyl]-3,4-dihydropyrazol-2-yl]-4-oxo-butanoic acid |
| d.85 | 3-[2-acetyl-3-[4-(4-chlorophenyl)phenyl]-3,4-dihydropyrazol-5-yl]-4-benzyl-6-chloro-1H-quinolin-2-one |
| d.86 | 4-[5-(4-benzyl-6-chloro-2-oxo-1H-quinolin-3-yl)-3-[4-(4-bromophenyl)phenyl]-3,4-dihydropyrazol-2-yl]-4-oxo-butanoic acid |
| d.87 | 3-[2-acetyl-3-[4-(4-bromophenyl)phenyl]-3,4-dihydropyrazol-5-yl]-4-benzyl-6-chloro-1H-quinolin-2-one |
| d.88 | 4-[5-(4-benzyl-6-chloro-2-oxo-1H-quinolin-3-yl)-3-[4-(4-methoxyphenyl)phenyl]-3,4-dihydropyrazol-2-yl]-4-oxo-butanoic acid |

-continued d.89 3-[2-acetyl-3-[4-(4-methoxyphenyl)phenyl]-3,4-dihydropyrazol-5-yl]-4-benzyl-6-chloro-1H-quinolin-2-one
d.90 4-[5-(4-benzyl-6-chloro-2-oxo-1H-quinolin-3-yl)-3-[4-(1-propylpyrazol-4-yl)phenyl]-3,4-dihydropyrazol-2-yl]-4-oxo-butanoic acid
d.91 3-[2-acetyl-3-[4-(1-propylpyrazol-4-yl)phenyl]-3,4-dihydropyrazol-5-yl]-4-benzyl-6-chloro-1H-quinolin-2-one
d.92 4-[5-(4-benzyl-6-chloro-2-oxo-1H-quinolin-3-yl)-3-[4-(1-ethylindazol-5-yl)phenyl]-3,4-dihydropyrazol-2-yl]-4-oxo-butanoic acid
d.93 4-[5-(4-benzyl-6-chloro-2-oxo-1H-quinolin-3-yl)-3-[4-(2-ethylindazol-5-yl)phenyl]-3,4-dihydropyrazol-2-yl]-4-oxo-butanoic acid
d.94 3-(2-acetyl-3-phenyl-3,4-dihydropyrazol-5-yl)-4-benzyl-6-chloro-1H-quinolin-2-one
d.95 4-benzyl-6-chloro-3-(3-phenyl-2-propanoyl-3,4-dihydropyrazol-5-yl)-1H-quinolin-2-one
d.96 3-[2-acetyl-3-(p-tolyl)-3,4-dihydropyrazol-5-yl]-4-benzyl-6-chloro-1H-quinolin-2-one
d.101 4-[5-(4-benzyl-6-chloro-2-oxo-1H-quinolin-3-yl)-3-(3-pyridyl)-3,4-dihydropyrazol-2-yl]-4-oxo-butanoic acid
d.105 4-[5-(4-benzyl-6-chloro-2-oxo-1H-quinolin-3-yl)-3-(2-chlorophenyl)-3,4-dihydropyrazol-2-yl]-4-oxo-butanoic acid
d.106 4-[5-(4-benzyl-6-chloro-2-oxo-1H-quinolin-3-yl)-3-(3,4-dimethoxyphenyl)-3,4-dihydropyrazol-2-yl]-4-oxo-butanoic acid
d.109 4-[5-(6-chloro-4-morpholino-2-oxo-1H-quinolin-3-yl)-3-(4-methoxyphenyl)-3,4-dihydropyrazol-2-yl]-4-oxo-butanoic acid.

3. A pharmaceutical composition comprising a compound according to claim 1 and at least one pharmaceutically acceptable carrier, stabilizer, diluent or excipient thereof.

4. A method of treating disease diseases or disorders wherein disrupting Rad51-BRCA2 interaction is beneficial, the method comprising administering a compound according to claim 1 to a subject in need thereof.

5. The method according to claim 4 wherein the disease or disorder is selected from the group consisting of primary and metastatic neoplastic diseases, hyperplasia, metaplasia, dysplasia, cancer, cancer metastasis, benign tumors, hyperproliferative disorders.

6. The method according to claim 4 wherein the disease or disorder is selected from the group consisting of ovarian, breast and pancreatic cancer.

7. The method according to claim 4, selected from the group consisting of:

d.50 4-[5-(4-benzyl-6-chloro-2-oxo-1H-quinolin-3-yl)-3-(4-fluorophenyl)-3,4-dihydropyrazol-2-yl]-4-oxo-butanoic acid
d.51 3-[2-acetyl-3-(4-fluorophenyl)-3,4-dihydropyrazol-5-yl]-4-benzyl-6-chloro-1H-quinolin-2-one
d.52 3-[2-acetyl-3-(4-methoxyphenyl)-3,4-dihydropyrazol-5-yl]-4-benzyl-6-chloro-1H-quinolin-2-one
d.53 4-benzyl-6-chloro-3-[3-(4-methoxyphenyl)-2-propanoyl-3,4-dihydropyrazol-5-yl]-1H-quinolin-2-one
d.54 4-benzyl-6-chloro-3-[3-(4-fluorophenyl)-2-propanoyl-3,4-dihydropyrazol-5-yl]-1H-quinolin-2-one
d.55 4-[5-(4-benzyl-6-chloro-2-oxo-1H-quinolin-3-yl)-3-(4-chlorophenyl)-3,4-dihydropyrazol-2-yl]-4-oxo-butanoic acid
d.56 3-[2-acetyl-3-(4-chlorophenyl)-3,4-dihydropyrazol-5-yl]-4-benzyl-6-chloro-1H-quinolin-2-one
d.57 4-benzyl-6-chloro-3-[3-(4-chlorophenyl)-2-propanoyl-3,4-dihydropyrazol-5-yl]-1H-quinolin-2-one
d.58 4-[5-(4-benzyl-6-chloro-2-oxo-1H-quinolin-3-yl)-3-(4-bromophenyl)-3,4-dihydropyrazol-2-yl]-4-oxo-butanoic acid
d.59 3-[2-acetyl-3-(4-bromophenyl)-3,4-dihydropyrazol-5-yl]-4-benzyl-6-chloro-1H-quinolin-2-one
d.60 4-benzyl-3-[3-(4-bromophenyl)-2-propanoyl-3,4-dihydropyrazol-5-yl]-6-chloro-1H-quinolin-2-one
d.61 4-[5-(4-benzyl-6-chloro-2-oxo-1H-quinolin-3-yl)-3-(4-methoxyphenyl)-3,4-dihydropyrazol-2-yl]-4-oxo-butanoic acid
d.62 4-[5-(4-benzyl-6-chloro-2-oxo-1H-quinolin-3-yl)-3-[4-(trifluoromethyl)phenyl]-3,4-dihydropyrazol-2-yl]-4-oxo-butanoic acid
d.63 3-[2-acetyl-3-[4-(trifluoromethyl)phenyl]-3,4-dihydropyrazol-5-yl]-4-benzyl-6-chloro-1H-quinolin-2-one
d.64 4-[5-(4-benzyl-6-chloro-2-oxo-1H-quinolin-3-yl)-3-(4-tert-butylphenyl)-3,4-dihydropyrazol-2-yl]-4-oxo-butanoic acid
d.65 3-[2-acetyl-3-(4-tert-butylphenyl)-3,4-dihydropyrazol-5-yl]-4-benzyl-6-chloro-1H-quinolin-2-one
d.66 4-[5-(4-benzyl-6-chloro-2-oxo-1H-quinolin-3-yl)-3-(3-fluoro-4-methoxyphenyl)-3,4-dihydropyrazol-2-yl]-4-oxo-butanoic acid
d.67 4-[5-(4-benzyl-6-chloro-2-oxo-1H-quinolin-3-yl)-3-(2-furyl)-3,4-dihydropyrazol-2-yl]-4-oxo-butanoic acid
d.68 3-[2-acetyl-3-(2-furyl)-3,4-dihydropyrazol-5-yl]-4-benzyl-6-chloro-1H-quinolin-2-one
d.69 4-[5-(4-benzyl-6-chloro-2-oxo-1H-quinolin-3-yl)-3-(1-methylindol-5-yl)-3,4-dihydropyrazol-2-yl]-4-oxo-butanoic acid

| | |
|---|---|
| d.70 | 3-[2-acetyl-3-(1-methylindol-5-yl)-3,4-dihydropyrazol-5-yl]-4-benzyl-6-chloro-1H-quinolin-2-one |
| d.71 | 4-[5-(4-benzyl-6-chloro-2-oxo-1H-quinolin-3-yl)-3-(1-ethylindol-5-yl)-3,4-dihydropyrazol-2-yl]-4-oxo-butanoic acid |
| d.72 | 3-[2-acetyl-3-(1-ethylindol-5-yl)-3,4-dihydropyrazol-5-yl]-4-benzyl-6-chloro-1H-quinolin-2-one |
| d.73 | 4-[5-(4-benzyl-6-chloro-2-oxo-1H-quinolin-3-yl)-3-(1-methylindazol-5-yl)-3,4-dihydropyrazol-2-yl]-4-oxo-butanoic acid |
| d.74 | 3-[2-acetyl-3-(1-methylindazol-5-yl)-3,4-dihydropyrazol-5-yl]-4-benzyl-6-chloro-1H-quinolin-2-one |
| d.75 | 4-[5-(4-benzyl-6-chloro-2-oxo-1H-quinolin-3-yl)-3-(2-methylindazol-5-yl)-3,4-dihydropyrazol-2-yl]-4-oxo-butanoic acid |
| d.76 | 4-[5-(4-benzyl-6-chloro-2-oxo-1H-quinolin-3-yl)-3-(2-ethylindazol-5-yl)-3,4-dihydropyrazol-2-yl]-4-oxo-butanoic acid |
| d.77 | 3-[2-acetyl-3-(2-ethylindazol-5-yl)-3,4-dihydropyrazol-5-yl]-4-benzyl-6-chloro-1H-quinolin-2-one |
| d.78 | 4-[5-(4-benzyl-6-chloro-2-oxo-1H-quinolin-3-yl)-3-(1-ethylindazol-5-yl)-3,4-dihydropyrazol-2-yl]-4-oxo-butanoic acid |
| d.79 | 3-[2-acetyl-3-(1-ethylindazol-5-yl)-3,4-dihydropyrazol-5-yl]-4-benzyl-6-chloro-1H-quinolin-2-one |
| d.80 | 4-[5-(4-benzyl-6-chloro-2-oxo-1H-quinolin-3-yl)-3-(1-propylindazol-5-yl)-3,4-dihydropyrazol-2-yl]-4-oxo-butanoic acid |
| d.81 | 3-[2-acetyl-3-(1-propylindazol-5-yl)-3,4-dihydropyrazol-5-yl]-4-benzyl-6-chloro-1H-quinolin-2-one |
| d.82 | 4-[5-(4-benzyl-6-chloro-2-oxo-1H-quinolin-3-yl)-3-(2-propylindazol-5-yl)-3,4-dihydropyrazol-2-yl]-4-oxo-butanoic acid |
| d.83 | 4-[5-(4-benzyl-6-chloro-2-oxo-1H-quinolin-3-yl)-3-[4-(4-fluorophenyl)phenyl]-3,4-dihydropyrazol-2-yl]-4-oxo-butanoic acid |
| d.84 | 4-[5-(4-benzyl-6-chloro-2-oxo-1H-quinolin-3-yl)-3-[4-(4-chlorophenyl)phenyl]-3,4-dihydropyrazol-2-yl]-4-oxo-butanoic acid |
| d.85 | 3-[2-acetyl-3-[4-(4-chlorophenyl)phenyl]-3,4-dihydropyrazol-5-yl]-4-benzyl-6-chloro-1H-quinolin-2-one |
| d.86 | 4-[5-(4-benzyl-6-chloro-2-oxo-1H-quinolin-3-yl)-3-[4-(4-bromophenyl)phenyl]-3,4-dihydropyrazol-2-yl]-4-oxo-butanoic acid |
| d.87 | 3-[2-acetyl-3-[4-(4-bromophenyl)phenyl]-3,4-dihydropyrazol-5-yl]-4-benzyl-6-chloro-1H-quinolin-2-one |
| d.88 | 4-[5-(4-benzyl-6-chloro-2-oxo-1H-quinolin-3-yl)-3-[4-(4-methoxyphenyl)phenyl]-3,4-dihydropyrazol-2-yl]-4-oxo-butanoic acid |
| d.89 | 3-[2-acetyl-3-[4-(4-methoxyphenyl)phenyl]-3,4-dihydropyrazol-5-yl]-4-benzyl-6-chloro-1H-quinolin-2-one |
| d.90 | 4-[5-(4-benzyl-6-chloro-2-oxo-1H-quinolin-3-yl)-3-[4-(1-propylpyrazol-4-yl)phenyl]-3,4-dihydropyrazol-2-yl]-4-oxo-butanoic acid |
| d.91 | 3-[2-acetyl-3-[4-(1-propylpyrazol-4-yl)phenyl]-3,4-dihydropyrazol-5-yl]-4-benzyl-6-chloro-1H-quinolin-2-one |
| d.92 | 4-[5-(4-benzyl-6-chloro-2-oxo-1H-quinolin-3-yl)-3-[4-(1-ethylindazol-5-yl)phenyl]-3,4-dihydropyrazol-2-yl]-4-oxo-butanoic acid |
| d.93 | 4-[5-(4-benzyl-6-chloro-2-oxo-1H-quinolin-3-yl)-3-[4-(2-ethylindazol-5-yl)phenyl]-3,4-dihydropyrazol-2-yl]-4-oxo-butanoic acid |
| d.95 | 4-benzyl-6-chloro-3-(3-phenyl-2-propanoyl-3,4-dihydropyrazol-5-yl)-1H-quinolin-2-one |
| d.96 | 3-[2-acetyl-3-(p-tolyl)-3,4-dihydropyrazol-5-yl]-4-benzyl-6-chloro-1H-quinolin-2-one |
| d.98 | 4-[5-(6-chloro-2-oxo-4-phenyl-1H-quinolin-3-yl)-3-(3-pyridyl)-3,4-dihydropyrazol-2-yl]-4-oxo-butanoic acid |
| d.99 | 4-[5-(6-chloro-2-oxo-4-phenyl-1H-quinolin-3-yl)-3-(2-pyridyl)-3,4-dihydropyrazol-2-yl]-4-oxo-butanoic acid |
| d.101 | 4-[5-(4-benzyl-6-chloro-2-oxo-1H-quinolin-3-yl)-3-(3-pyridyl)-3,4-dihydropyrazol-2-yl]-4-oxo-butanoic acid |
| d.105 | 4-[5-(4-benzyl-6-chloro-2-oxo-1H-quinolin-3-yl)-3-(2-chlorophenyl)-3,4-dihydropyrazol-2-yl]-4-oxo-butanoic acid |
| d.106 | 4-[5-(4-benzyl-6-chloro-2-oxo-1H-quinolin-3-yl)-3-(3,4-dimethoxyphenyl)-3,4-dihydropyrazol-2-yl]-4-oxo-butanoic acid |
| d.109 | 4-[5-(6-chloro-4-morpholino-2-oxo-1H-quinolin-3-yl)-3-(4-methoxyphenyl)-3,4-dihydropyrazol-2-yl]-4-oxo-butanoic acid. |

\* \* \* \* \*